(12) United States Patent
Douglass et al.

(10) Patent No.: US 7,168,613 B2
(45) Date of Patent: Jan. 30, 2007

(54) CASH DISPENSING AUTOMATED BANKING MACHINE WITH TILT OUT FASCIA

(75) Inventors: Mark Douglass, North Canton, OH (US); James Booth, Kimbolton, OH (US); Pedro Tula, North Canton, OH (US)

(73) Assignee: Diebold Self-Service Systems, North Canton, OH (US)

( * ) Notice: Subject to any disclaimer, the term of this patent is extended or adjusted under 35 U.S.C. 154(b) by 261 days.

(21) Appl. No.: 10/797,593

(22) Filed: Mar. 10, 2004

(65) Prior Publication Data
US 2004/0222286 A1 Nov. 11, 2004

Related U.S. Application Data

(60) Provisional application No. 60/453,667, filed on Mar. 10, 2003.

(51) Int. Cl.
*G07F 19/00* (2006.01)

(52) U.S. Cl. .......................... 235/379; 902/30; 902/13

(58) Field of Classification Search ................ 235/379; 902/30–35, 13, 41
See application file for complete search history.

(56) References Cited

U.S. PATENT DOCUMENTS

| 4,919,058 | A | * | 4/1990 | Isozaki et al. | ............. | 109/24.1 |
| 6,206,284 | B1 | * | 3/2001 | Do et al. | ................... | 235/379 |

* cited by examiner

*Primary Examiner*—Karl D. Frech
(74) *Attorney, Agent, or Firm*—Christopher L. Parmelee; Ralph E. Jocke; Walker & Jocke

(57) ABSTRACT

An automated banking machine (10) is provided. The automated banking machine may include a fascia (50) in operative connection with a frame (110). The machine may include a plurality of hardware devices which are accessible through the fascia. The hardware devices may include a cash dispenser (24), receipt printer (20), and a card reader (22). The fascia may include replaceable bezels (550,552) with apertures therein for providing access to hardware devices. The bezels may be operative to float with respect to the fascia and hardware devices to automatically align hardware devices with the bezels. In addition the hardware devices may include movable portions which are operative to automatically align with the bezels. The bezels may include ramps, ribs, or other angled surfaces which guide the hardware devices into alignment with the openings in the bezels.

35 Claims, 97 Drawing Sheets

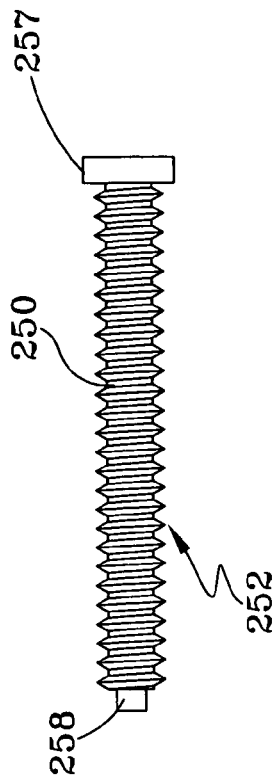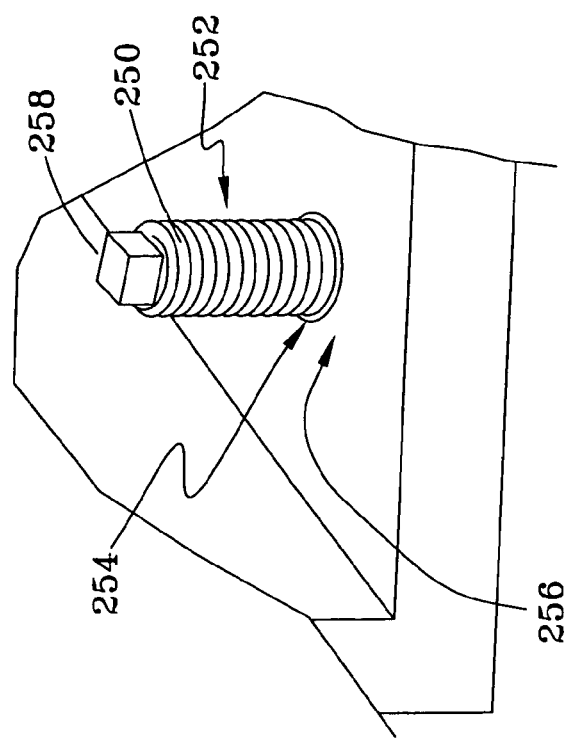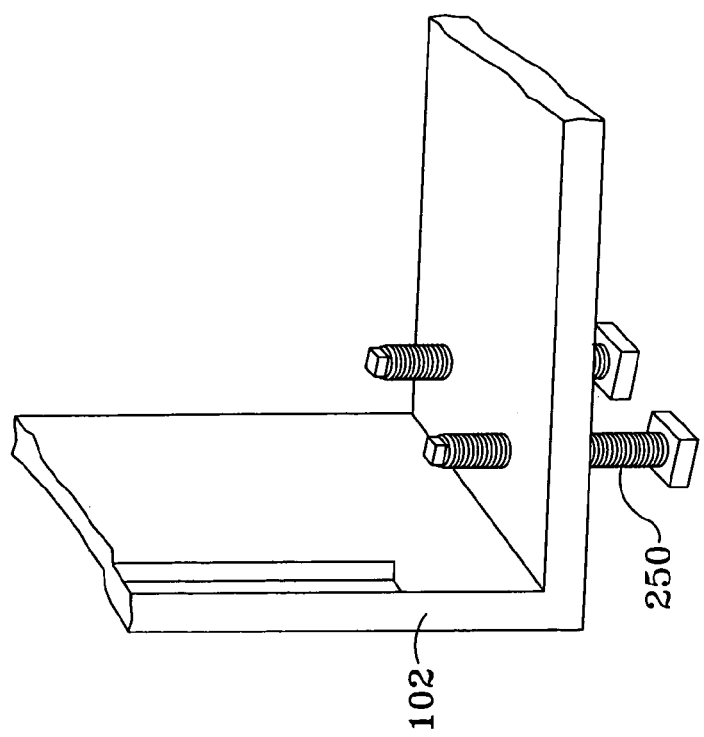

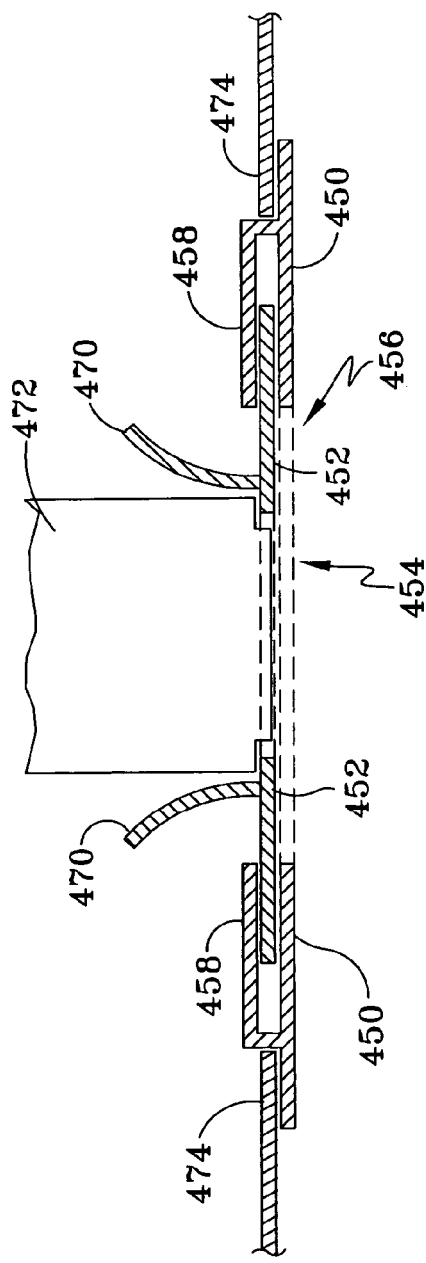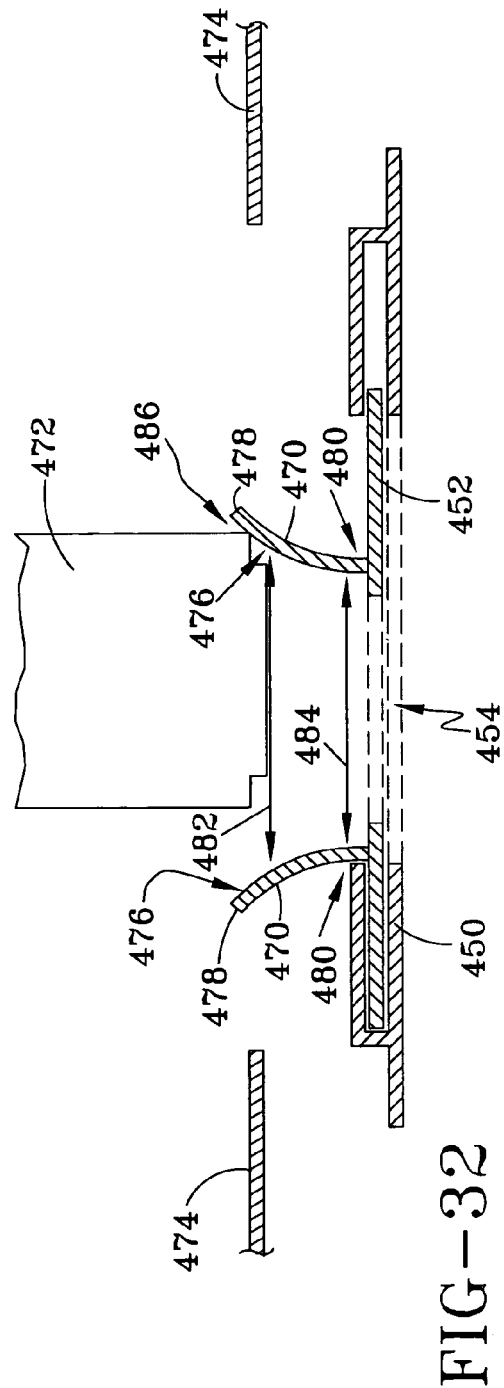

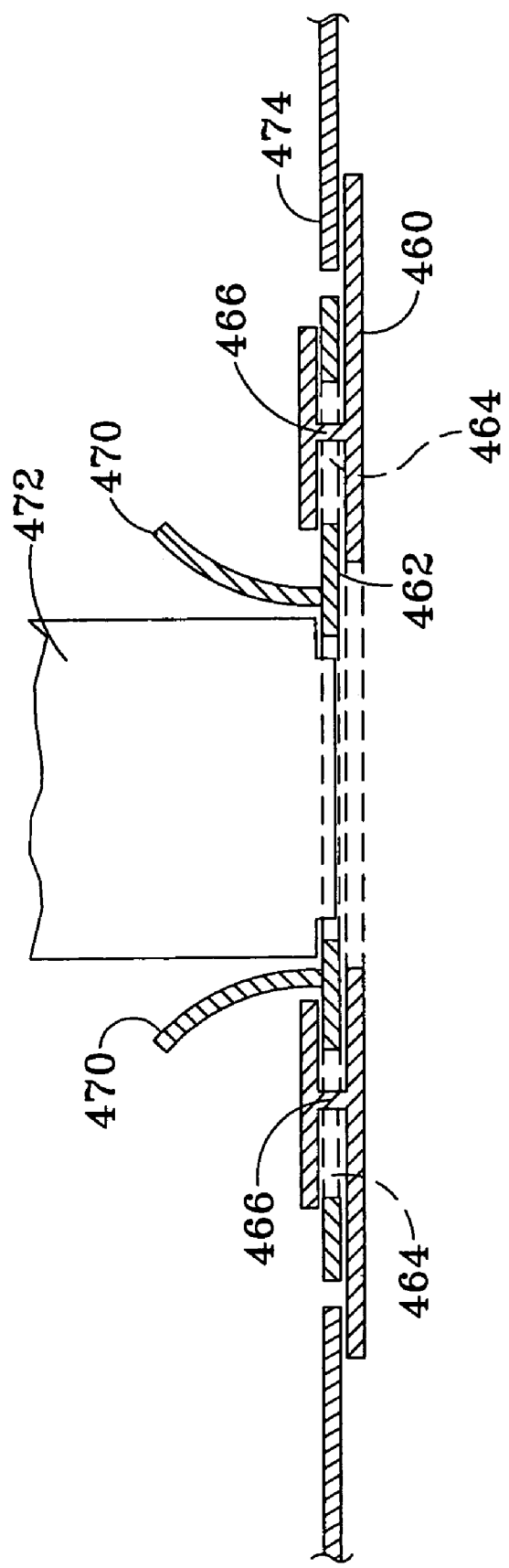

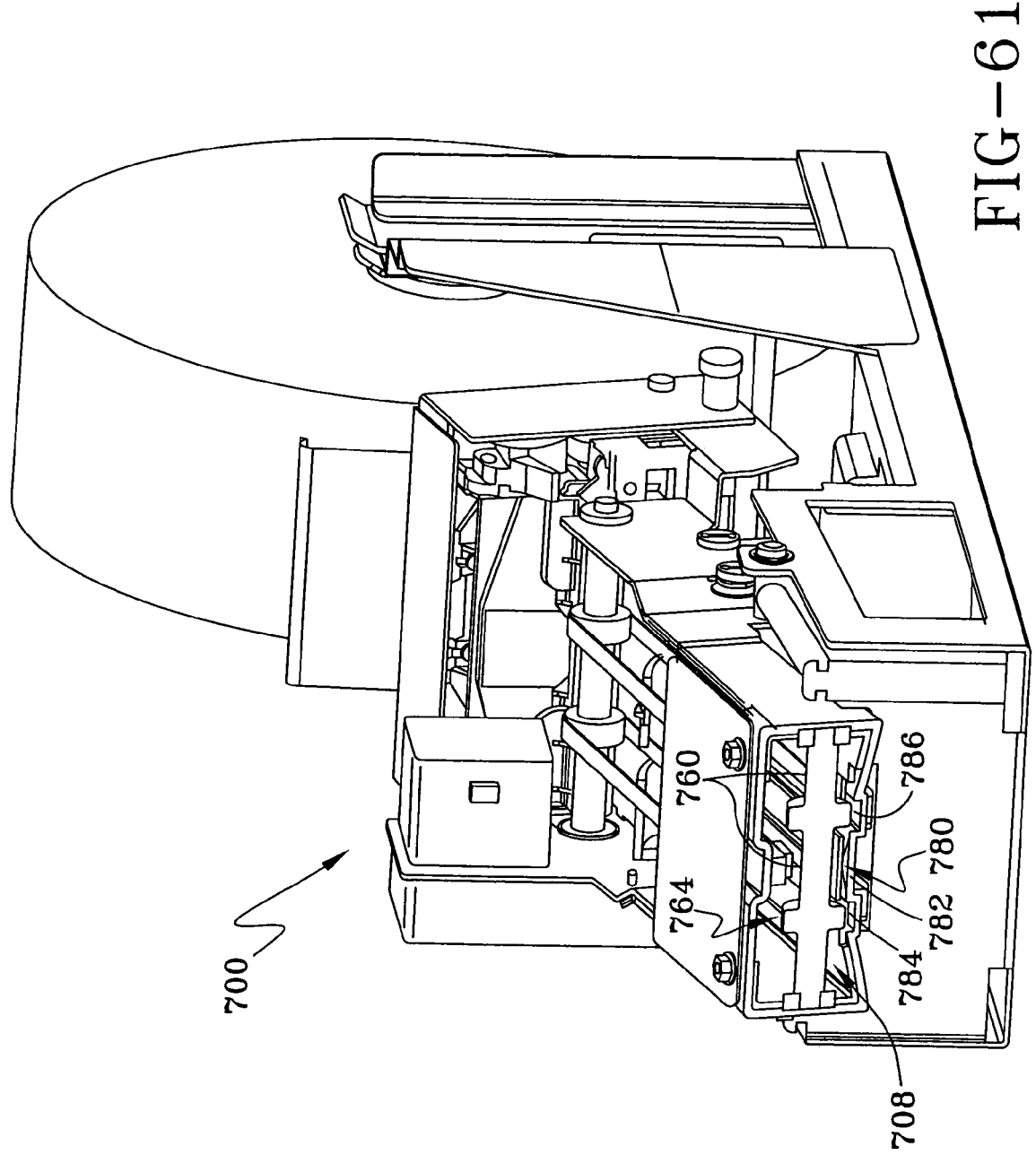

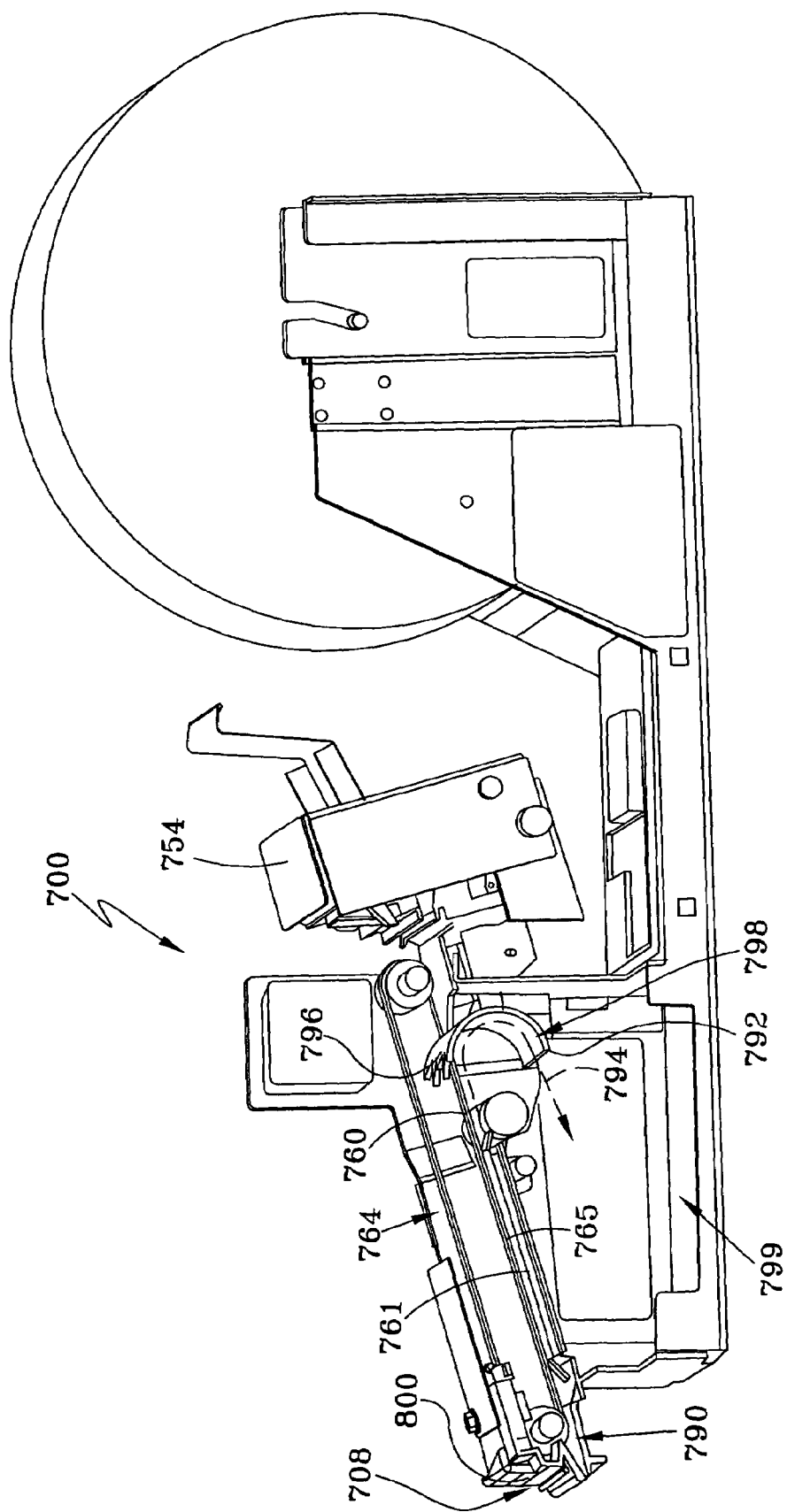

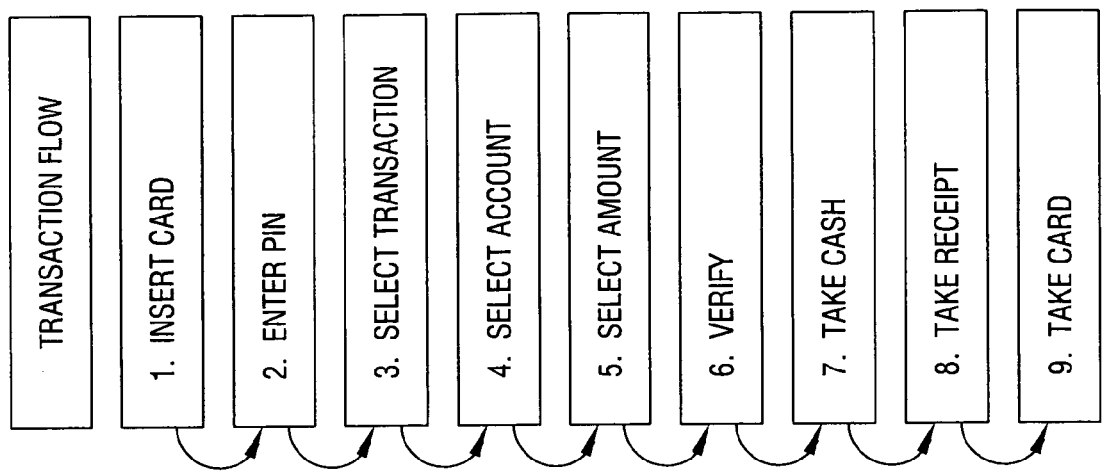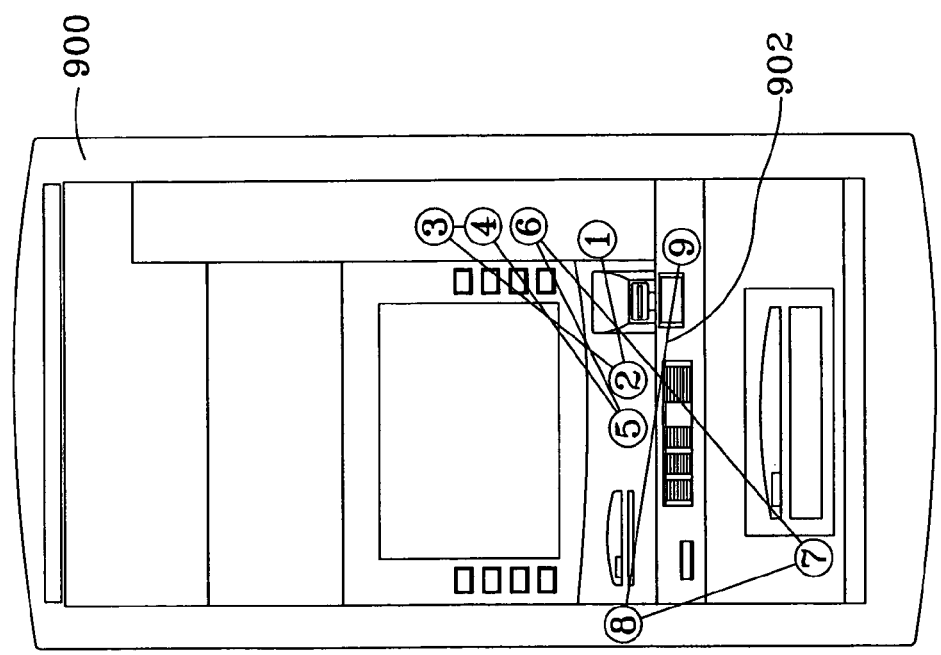
FIG-65

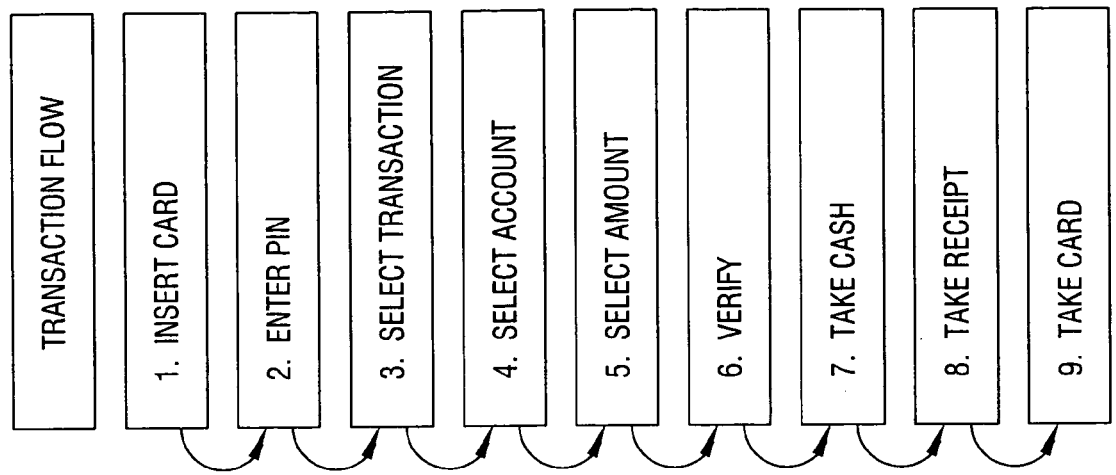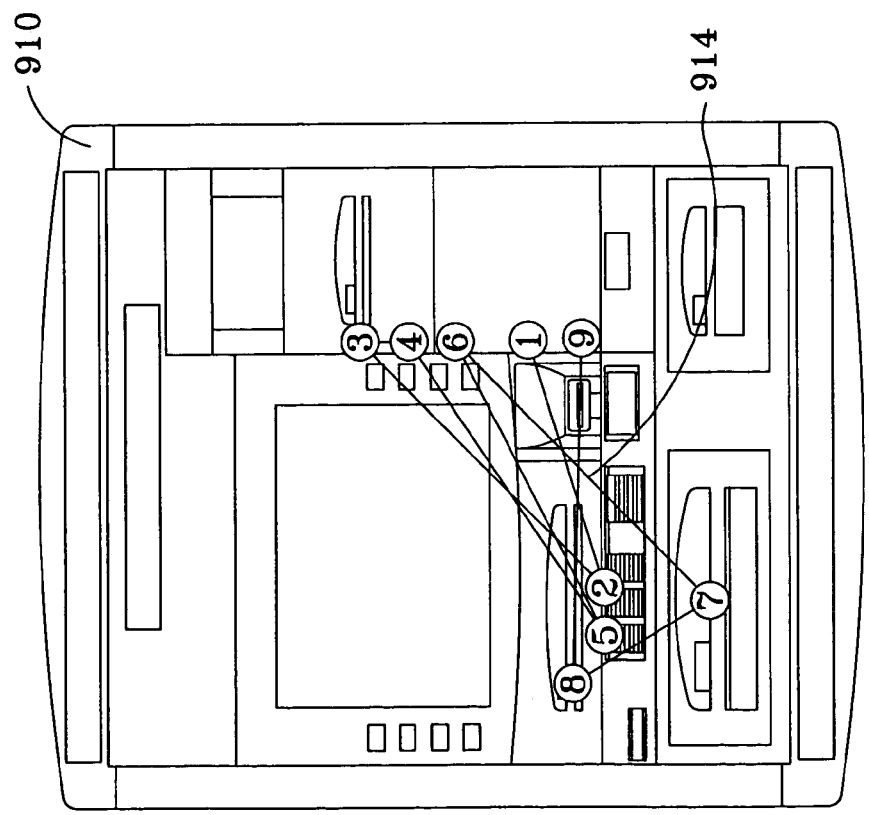
FIG-68

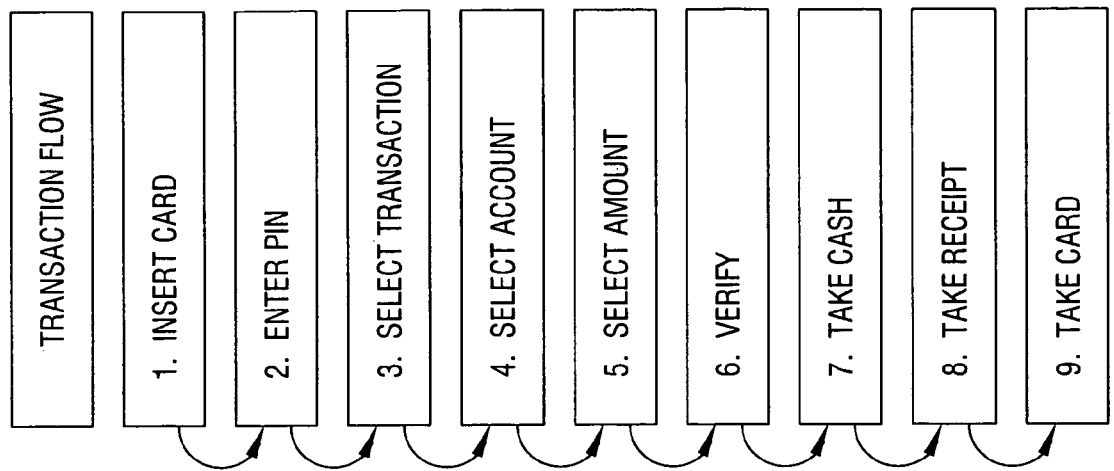
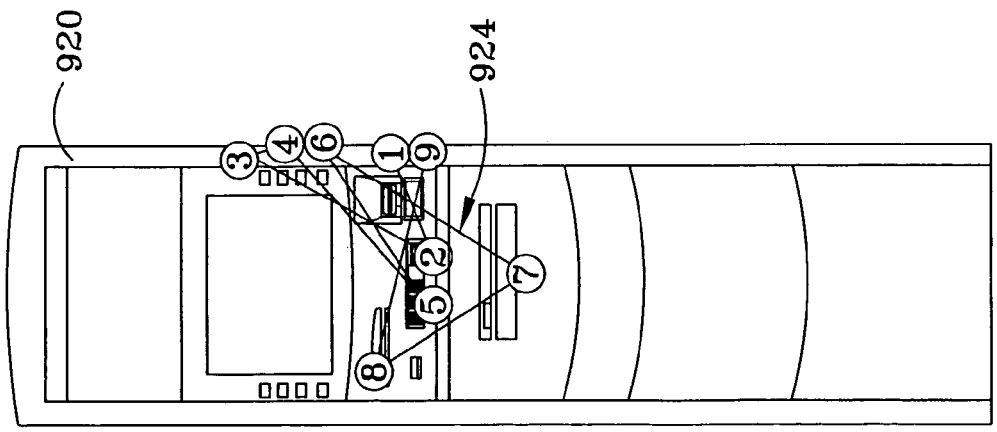
FIG-71

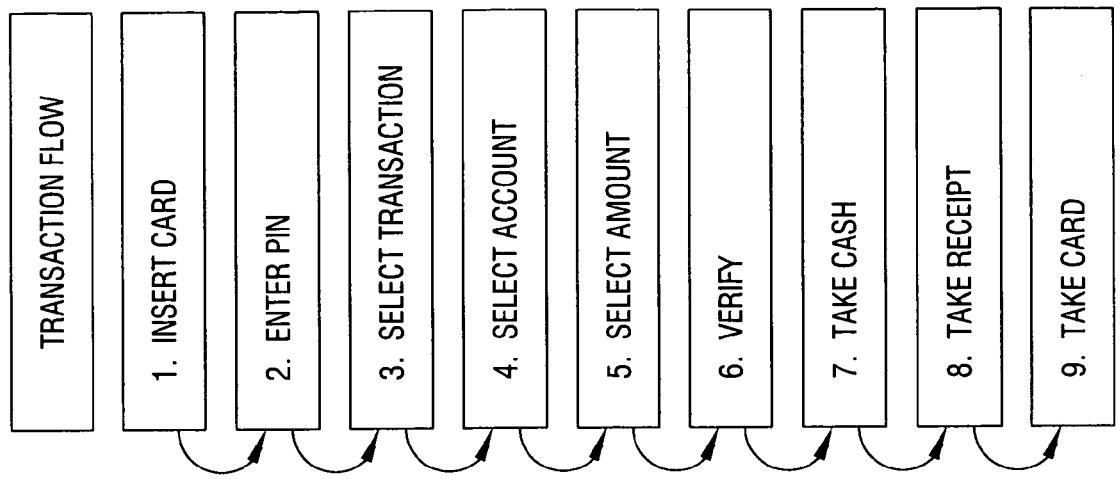
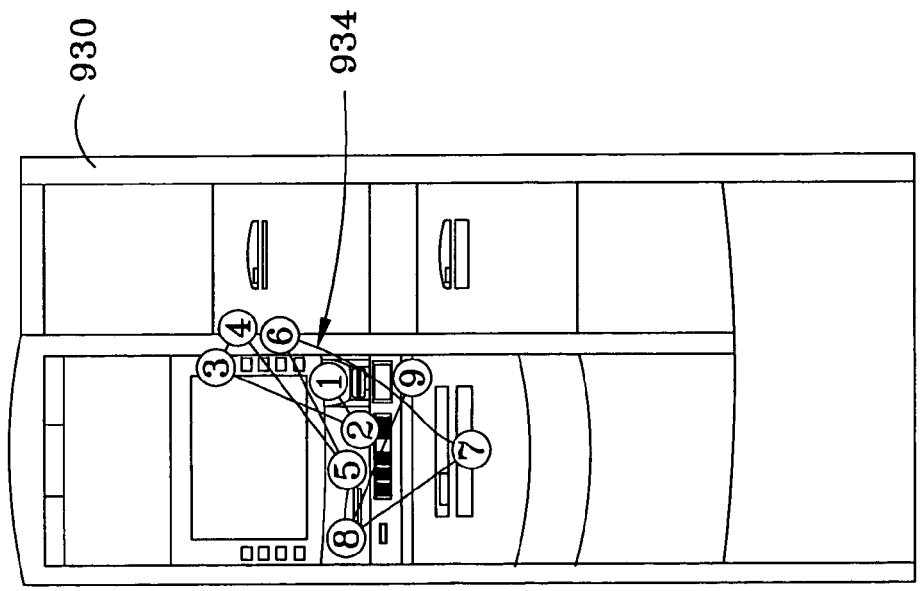
FIG-74

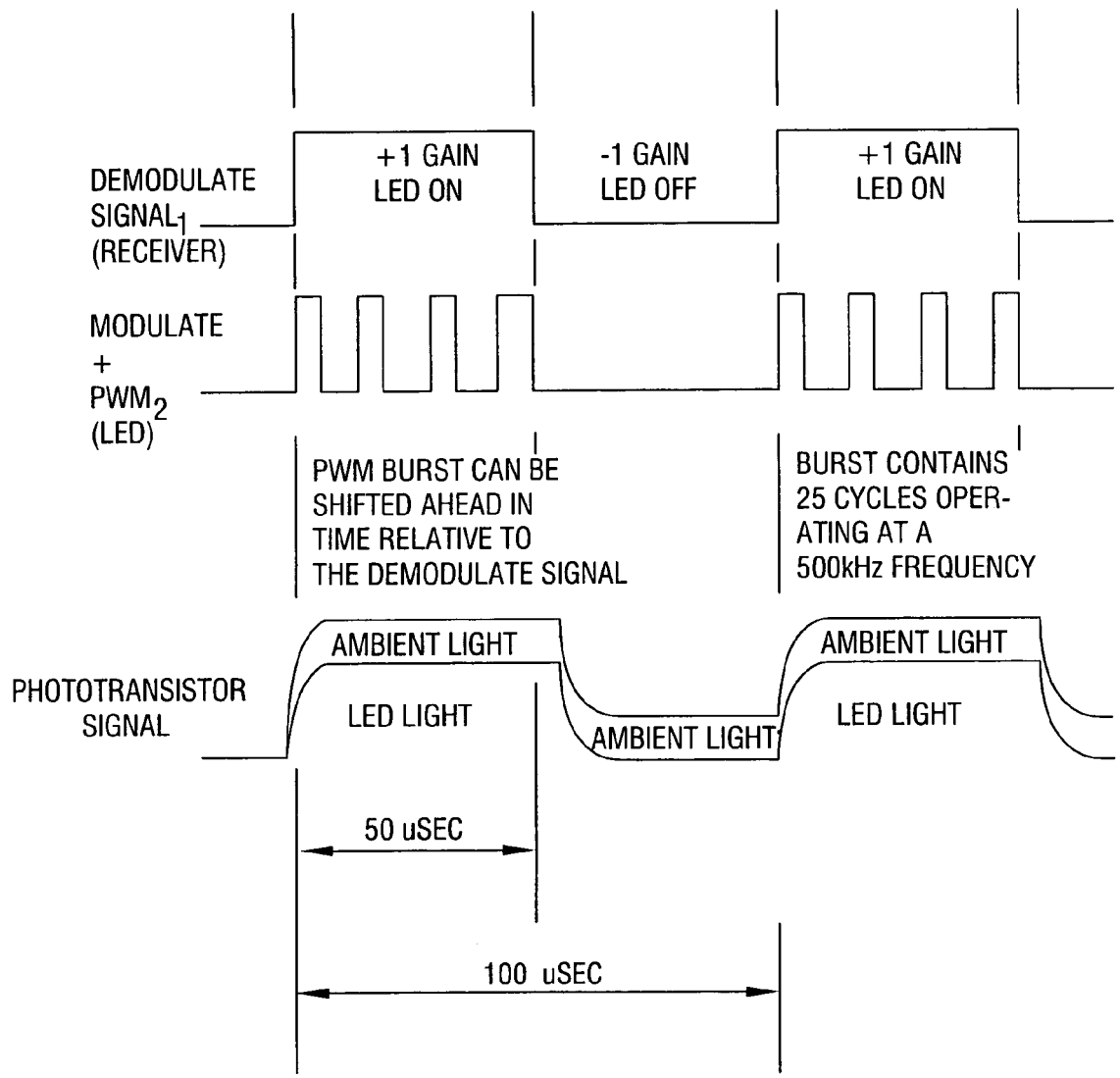
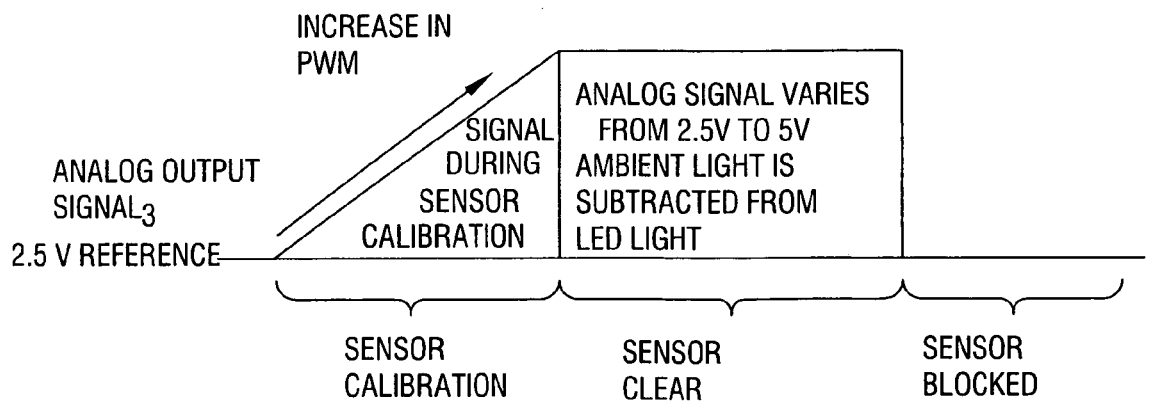
FIG-110

CASH DISPENSING AUTOMATED BANKING MACHINE WITH TILT OUT FASCIA

CROSS REFERENCE TO RELATED APPLICATIONS

This application claims benefit of U.S. Provisional Application Ser. No. 60/453,667 filed Mar. 10, 2003.

TECHNICAL FIELD

This invention relates to automated banking machines. Specifically this invention relates to an automated banking machine system and method which is operative to securely carry out a plurality of transactions including the dispense of cash and other transfers of value responsive to user inputs.

BACKGROUND ART

Automated banking machines are well known. A common type of automated banking machine used by consumers is an automated teller machine ("ATM"). ATMs enable customers to carry out banking transactions. Common banking transactions that may be carried out with ATMs include the dispensing of cash, the making of deposits, the transfer of funds between accounts, the payment of bills and account balance inquiries. The types of banking transactions a customer can carry out are determined by capabilities of the particular banking machine and the programming of the institution operating the machine. Other types of automated banking machines may allow customers to charge against accounts or to transfer funds. Other types of automated banking machines may print or dispense items of value such as coupons, tickets, wagering slips, vouchers, checks, food stamps, money orders, scrip or traveler's checks. For purposes of this disclosure an ATM, an automated banking machine, or an automated transaction machine shall encompass any device which carries out transactions including transfers of value.

DISCLOSURE OF INVENTION

It is an object of an exemplary form of the present invention to provide an automated banking machine at which a user may conduct transactions.

It is an object of an exemplary form of the present invention to provide an automated banking machine at which a user may dispense cash.

Further objects of exemplary forms of the present invention will be made apparent in the following Best Modes for Carrying Out Invention and the appended claims.

The foregoing objects may be accomplished in an exemplary embodiment by an automated banking machine that includes output devices such as a display screen and receipt printer. The machine may further include input devices such as a touch screen, keyboard, keypad, function keys, and a card reader. The automated banking machine may further include transaction function devices such as a cash dispenser mechanism for sheets of currency, a depository mechanism and other transaction function devices which are used by the machine in carrying out banking transactions including transfers of value. In the exemplary embodiment the automated banking machine may include at least one computer. The computer may be in operative connection with the output devices and the input devices, as well as with the cash dispenser mechanism, depository mechanism and other physical transaction function devices in the banking machine. The computer may further be operative to communicate with a host system located remotely from the machine.

In the exemplary embodiment, the computer may include software components that are executable therein. The software components of the automated banking machine may be operative to cause the computer to output user interface screens through a display device of the machine. The user interface screens may include consumer screens which provide a consumer with information for performing consumer operations such as banking functions with the machine. The user interface screens may further include service screens which provide an authorized user servicing the machine with information for performing service and maintenance operations with the machine. In addition the machine may include software components operative in the computer for controlling and communicating with hardware devices of the machine including the input devices, output devices and the transaction function devices.

In an exemplary embodiment, the automated banking machine may include a fascia with bezels and associated hardware components which are operative to automatically align with each other. In further exemplary embodiments, the automated banking machine may include an exterior surface comprised of panels which are securely mounted to the frame of the machine without the use of fasteners such as screws and bolts. In further exemplary embodiments, sheet metal parts of the machine may be assembled without the use of a jig and external fasteners by inserting tabs from one part into slots of another part and bending the tabs at about ninety degrees to urge the parts together into fixed engagement.

In further exemplary embodiments, the automated banking machine may include a passageway sensor which is operative to detect blockages in passageways and is operative to resist missing the detection of blockages as a result of foreign light sources. In addition, exemplary embodiments of the automated banking machine may include a cassette for receiving deposited items which is operative to enable the detection of unauthorized access to the items in the cassette. Exemplary embodiments of the cassette and associated bracketry may also be operative to close the cassette upon removal from the machine and may be operative to prevent a corresponding depository mechanism from being moved to a service position while the cassette is installed in the machine.

BRIEF DESCRIPTION OF DRAWINGS

FIGS. 25–27 show exemplary embodiments of leveling legs for an automated banking machine.

FIGS. 31–34 show exemplary embodiments of a floating bezel for a fascia of an automated banking machine.

FIGS. 56–62 show exemplary embodiments of a receipt printer of an automated banking machine.

FIGS. 63–74 show exemplary embodiments of a method of providing uniform patterns for performing transactions for a plurality of different types of automated banking machines.

FIGS. 108–110 show an exemplary embodiment of a passageway sensor in an automated banking machine.

BEST MODES FOR CARRYING OUT INVENTION

Figure 1:
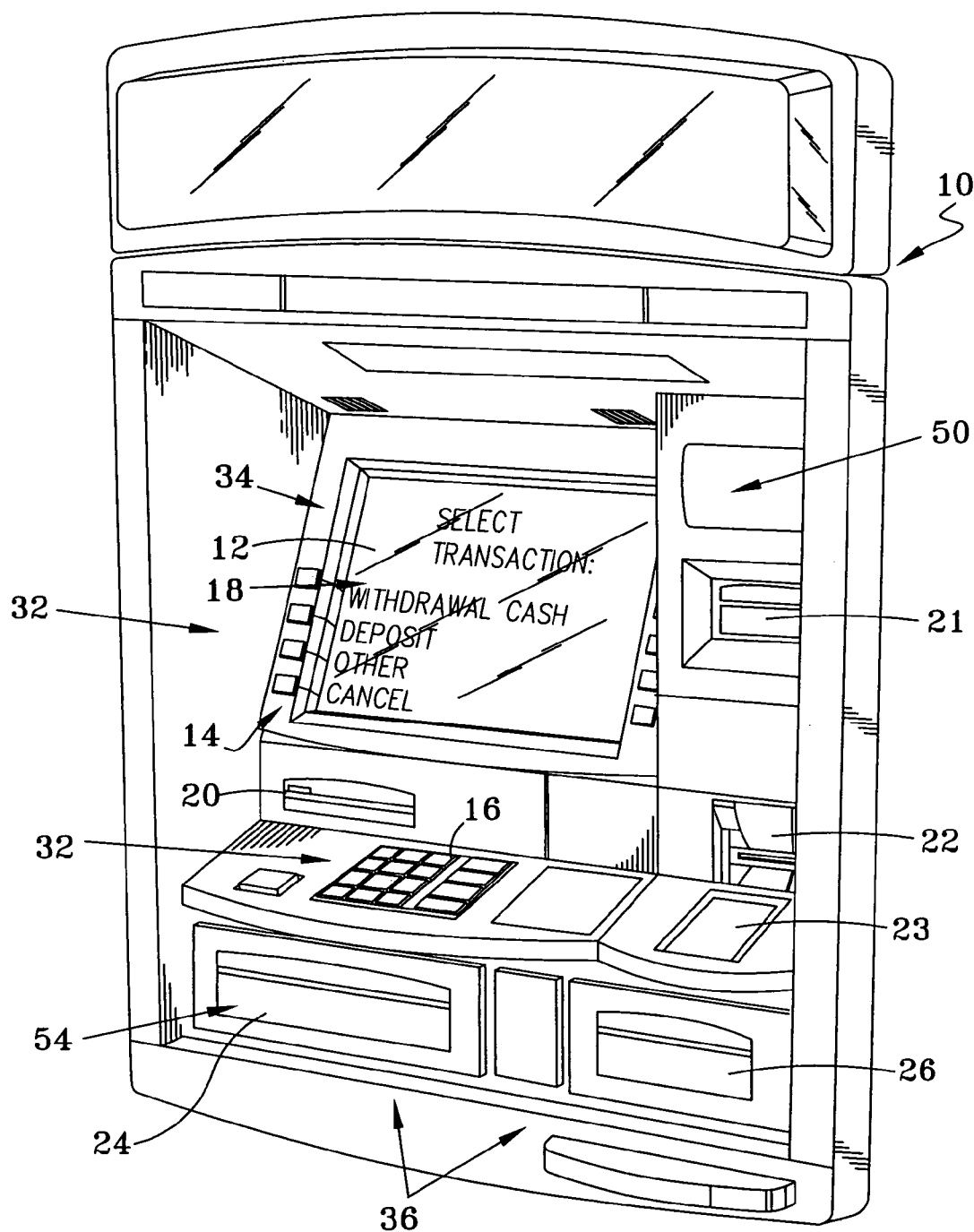
FIG. 1 is a perspective view representative of an exemplary embodiment of an automated banking machine.

Referring now to the drawings and particularly to FIG. 1, there is shown therein a perspective view of an exemplary embodiment of an automated banking machine 10. Here the automated banking machine 10 may include at least one output device 34 such as a display device 12. The output device 12 may be operative to provide a consumer with a user interface 18 that may include a plurality of screens or other outputs including selectable options for operating the machine. The exemplary embodiment may further include other types of output devices such as a receipt printer 20, statement printer 21, speakers, or any other type of device that is capable of outputting visual, audible, or other sensory perceptible information.

The exemplary embodiment of the automated banking machine 10 may include a plurality of input devices 32 such as an encrypting pin pad (EPP) with keypad 16 and function keys 14 as well as a card reader 22 and/or bar code reader 23. The exemplary embodiment of the machine 10 may further include or use other types of input devices, such as a touch screen, microphone, or any other device that is operative to provide the machine with inputs representative of user instructions or information. The machine may also include one or more biometric input devices such as a fingerprint scanner, an iris scanner, facial recognition device, hand scanner, or any other biometric reading device which may be used to acquire a biometric input that can be used to identify a user.

The exemplary embodiment of the automated banking machine 10 may further include a plurality of transaction function devices which may include for example a cash dispenser 24, a depository mechanism 26, a cash recycler mechanism, or any other type of device which is operative to perform transaction functions involving transfers of value.

Figure 2:
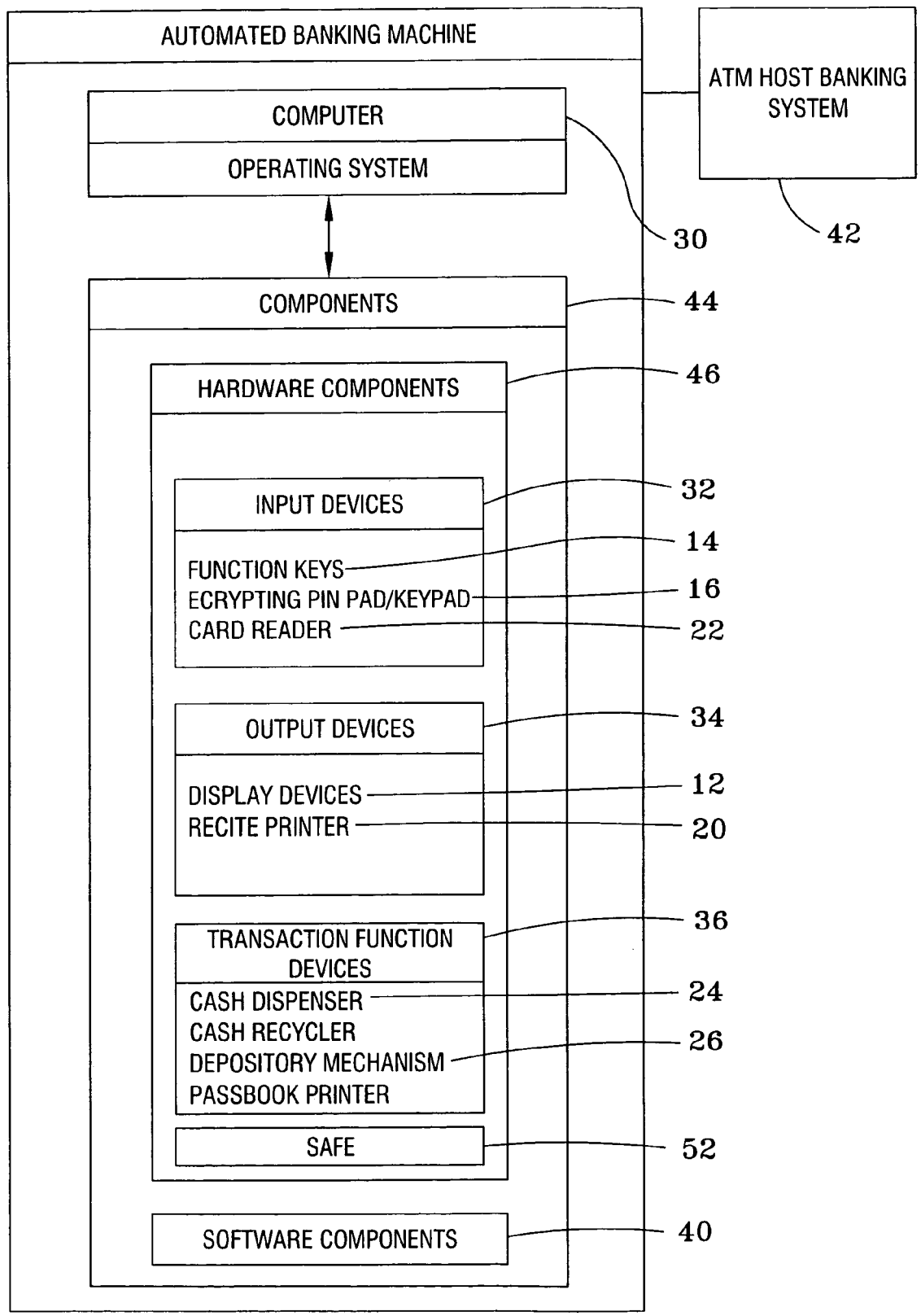
FIG. 2 is a schematic view of an exemplary embodiment of an automated banking machine.

FIG. 2 shows a schematic view of components which may be included or may be in communication with the automated banking machine 10. Exemplary embodiments of the automated banking machine 10 may be operative to communicate with a transaction processing server which is referred to herein as an ATM host banking system 42. Such an ATM host banking system 42 may be operative to authorize the automated banking machine 10 to perform transaction functions for users such as withdrawing cash from an account through operation of the cash dispenser 24, depositing checks or other items with the depository mechanism 26, performing a balance inquiry for a financial account and transferring value between accounts.

In addition, the machine 10 may include at least one computer 30. The computer 30 may be in operative connection with a plurality of components 44. Such components may include both hardware devices 46 and software components 40. The hardware devices 46 may correspond to the previously described input device(s) 32, output device(s) 34, and transaction function device(s) 36. In an exemplary embodiment, a transaction function device may be operative to perform a transaction function in response to at least one input through at least one of the input devices.

In exemplary embodiments the machine may include a secure chest or safe 52. Portable articles such as cash, notes, bills, checks, deposits or other items of value may be stored in the chest. In addition in exemplary embodiments portions of the computer 30 may be stored in the safe such as the mother board, processor, RAM, cd-rom drive, floppy disk drive, hard drive and other components of the computer 30. In further exemplary embodiments, the computer 30 may be stored outside the chest 52.

In an exemplary embodiment, the software components may correspond to one or more terminal control software components that are operative in the computer 30. The terminal control software components may be operative to control the operation of the machine by both a consumer and an authorized user such as a service technician. For example such terminal control software components may include applications which enable a consumer to dispense cash, deposit a check, or perform other transaction functions with the machine. In addition the terminal control software components may include applications which enable a service technician to perform configuration, maintenance, and diagnostic functions with the machine.

Figure 4:
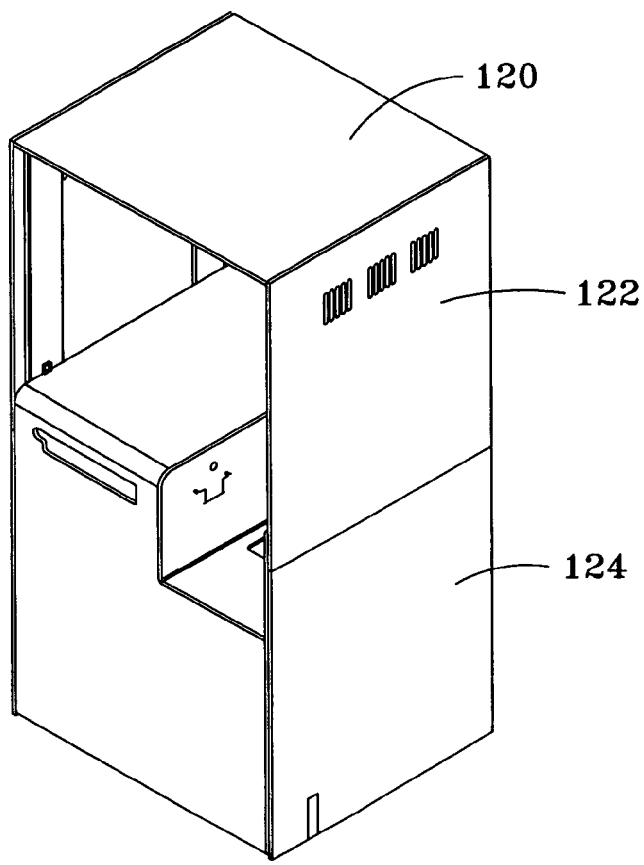
Figure 5:
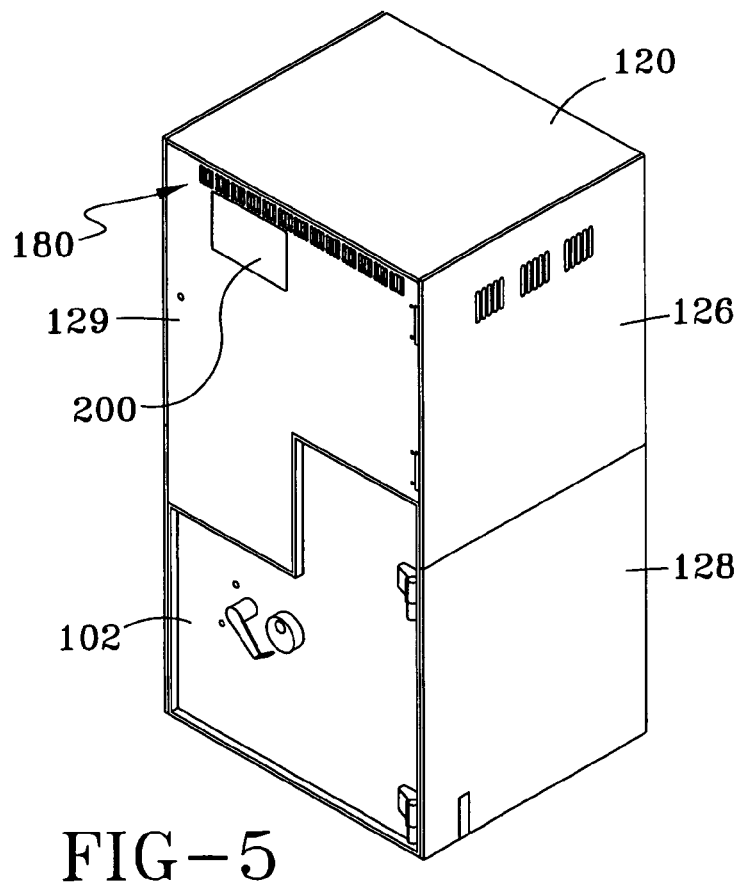
Figure 6:
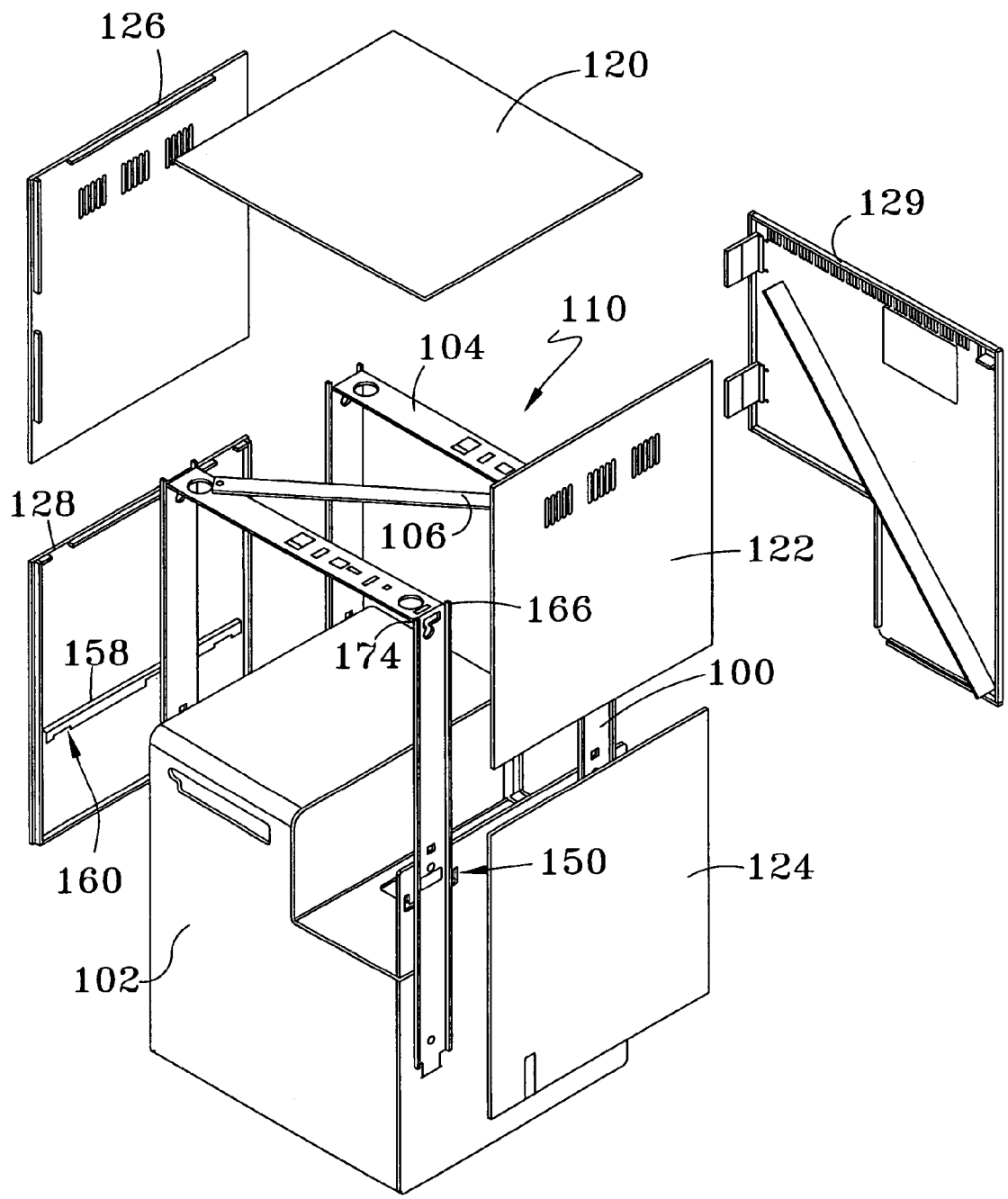

In exemplary embodiments of the machine, the previously described computer 30 and hardware components 46 may mounted within an enclosure. Such an enclosure may include a frame. The computer and components of the machine may be securely mounted to the frame. As shown in FIG. 1, the machine may include a fascia 50 which provides access to one or more of the hardware components by a user of the machine and also conceals the internal components of the machine and the frame from the view of a consumer FIGS. 3–6 show an exemplary embodiment of a frame 110 for an automated banking machine enclosure. The frame 110 may be comprised of four vertical struts 100 rigidly attached to a safe or chest 102. Horizontal struts 104 may be attached to each pair of vertical struts. A diagonal strut 106 may be attached to both horizontal struts to add stiffness. This described exemplary embodiment of the frame is operative to allow access to five sides of the enclosure to make the assembly and servicing of the machine more convenient to a technician. As shown in FIGS. 4 and 5 once the automated banking machine is assembled and tested, beauty panels 120–128 may be placed in operative connection with the frame to enclose the top portion of the machine and also to cover the sides of the ATM safe 102. In the described exemplary embodiment, the beauty panels may be hung onto the frame without the use of separate connectors or fasteners such as screws or bolts to hold these panels in place to the frame. The panels may be operative to butt together and, along with a rear access door 129, hold each other in place. The panels may include tabs, slots, or other interlocking features to enable the panels to be securely mounted to the frame without tools. As shown in FIG. 6, the outer panels 120–128 may be removed from the frame 110 without tools to provide access to service the upper enclosure.

In an exemplary embodiment, the vertical struts 100 may be mounted to the chest 102 using bolts, screws or other fasteners. In an exemplary embodiment the screws may be partially screwed into the safe prior to mounting the vertical struts. The vertical struts may then be placed adjacent the chest such that heads of the screws pass through apertures in the strut. The strut may then be moved downwardly to engage the screws within slots extending upward in the strut from the apertures. Once installed in this manner, the screws may be tightened to rigidly mount the vertical struts to the chest.

Figure 7:
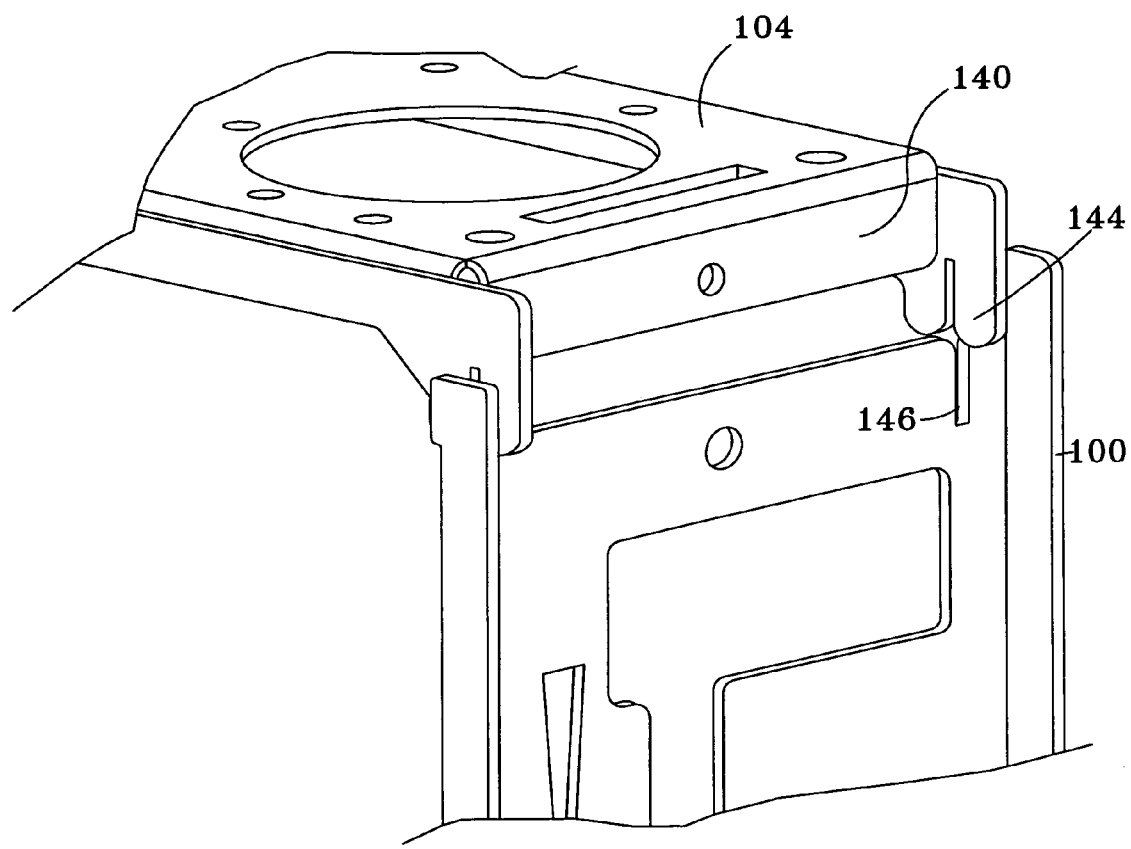
Figure 8:
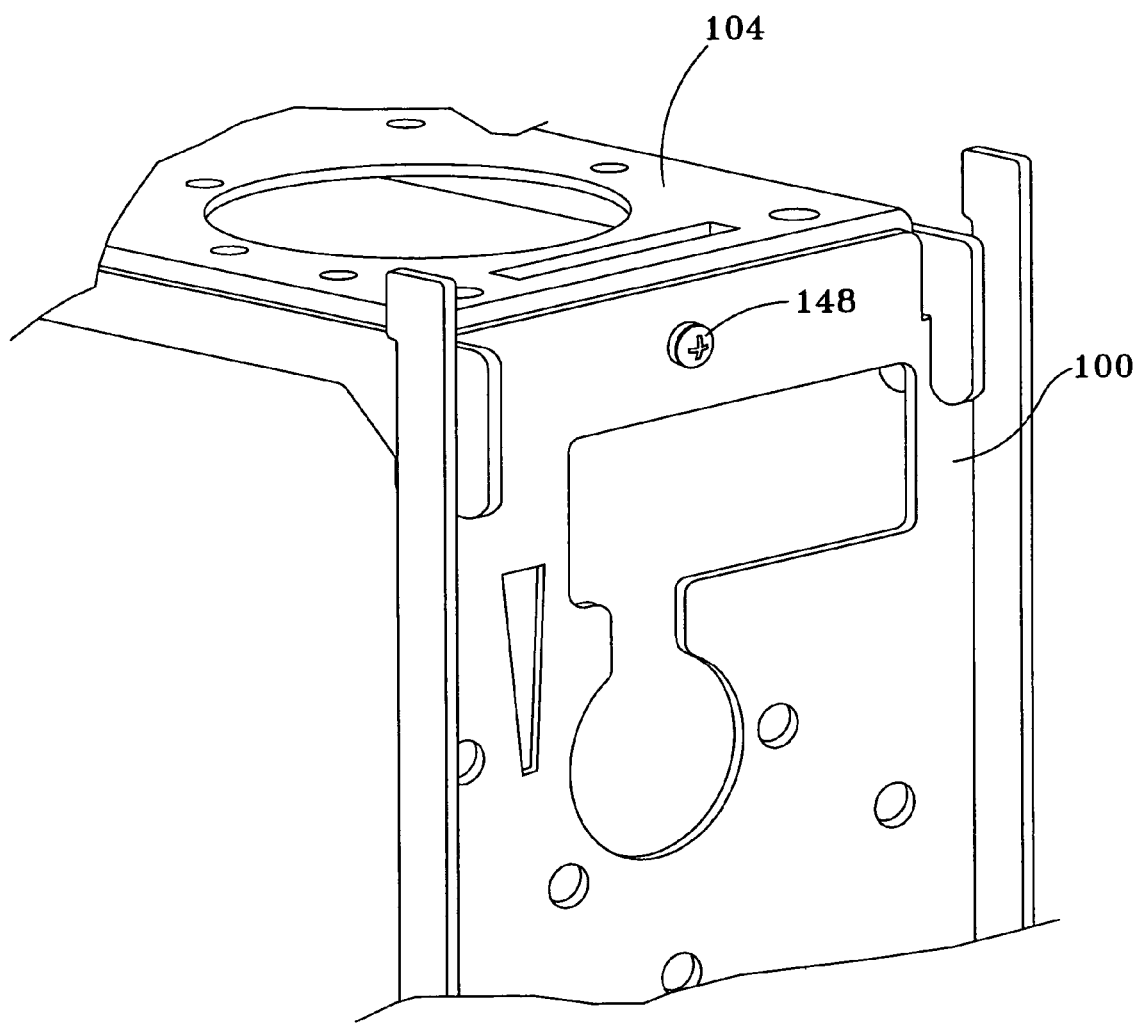
Figure 9:
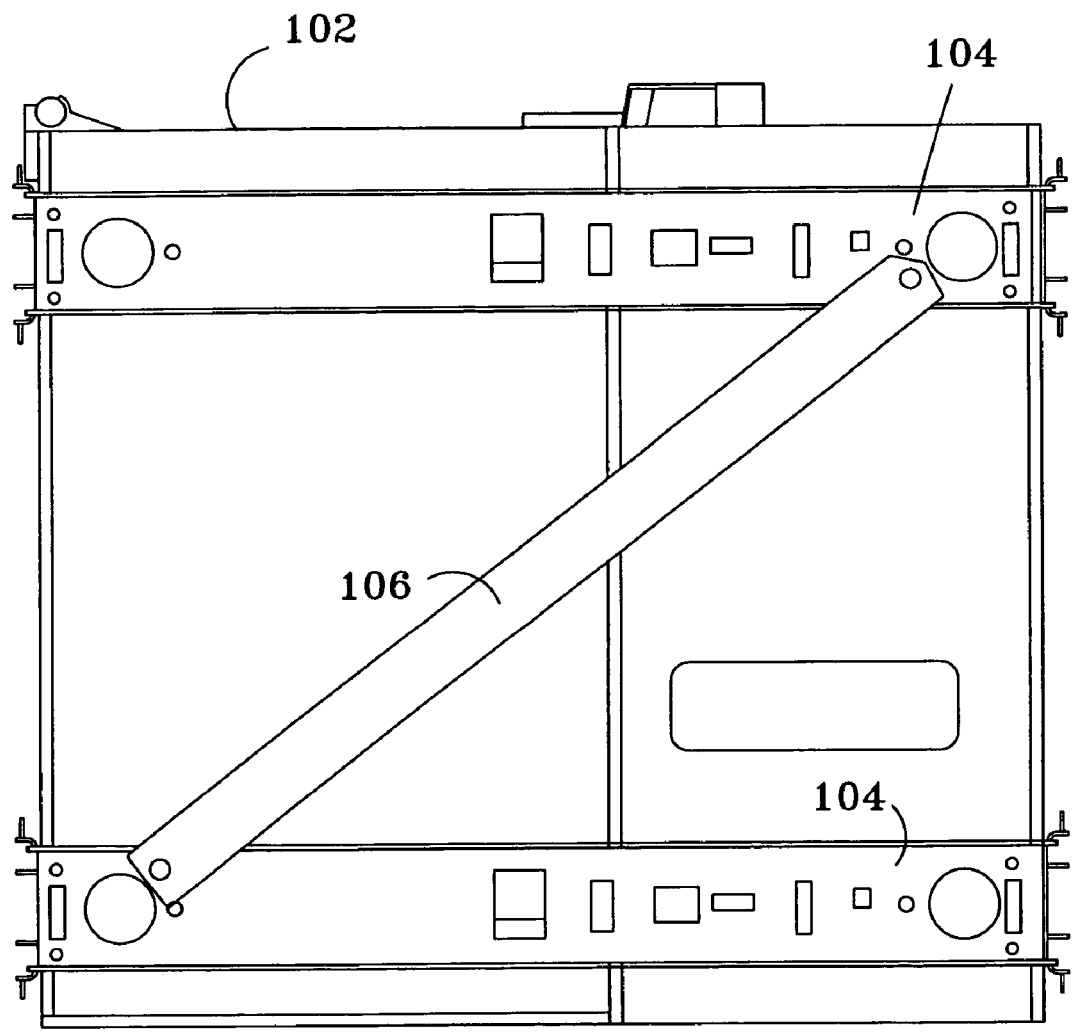

FIGS. 7 and 8 show the engagement of a horizontal strut 104 to a vertical strut 100. As shown in FIG. 7, the horizontal strut 104 may include two fingers 144 which interlock and self-locate the horizontal strut with the vertical slots 146 extending downwardly from the upper portions of the vertical struts 100. The horizontal strut 104 may further include a leg 140 which passes behind the vertical strut 100. As shown in FIG. 8, once the horizontal strut is engaged with the vertical strut, a screw 148 may be placed through apertures in the vertical strut and leg of the horizontal strut to lock the struts together. As shown in FIG. 9, the ends of the diagonal strut 106 may be mounted using screws or other fasteners to the oppose ends of the two horizontal struts 104.

Figure 10:
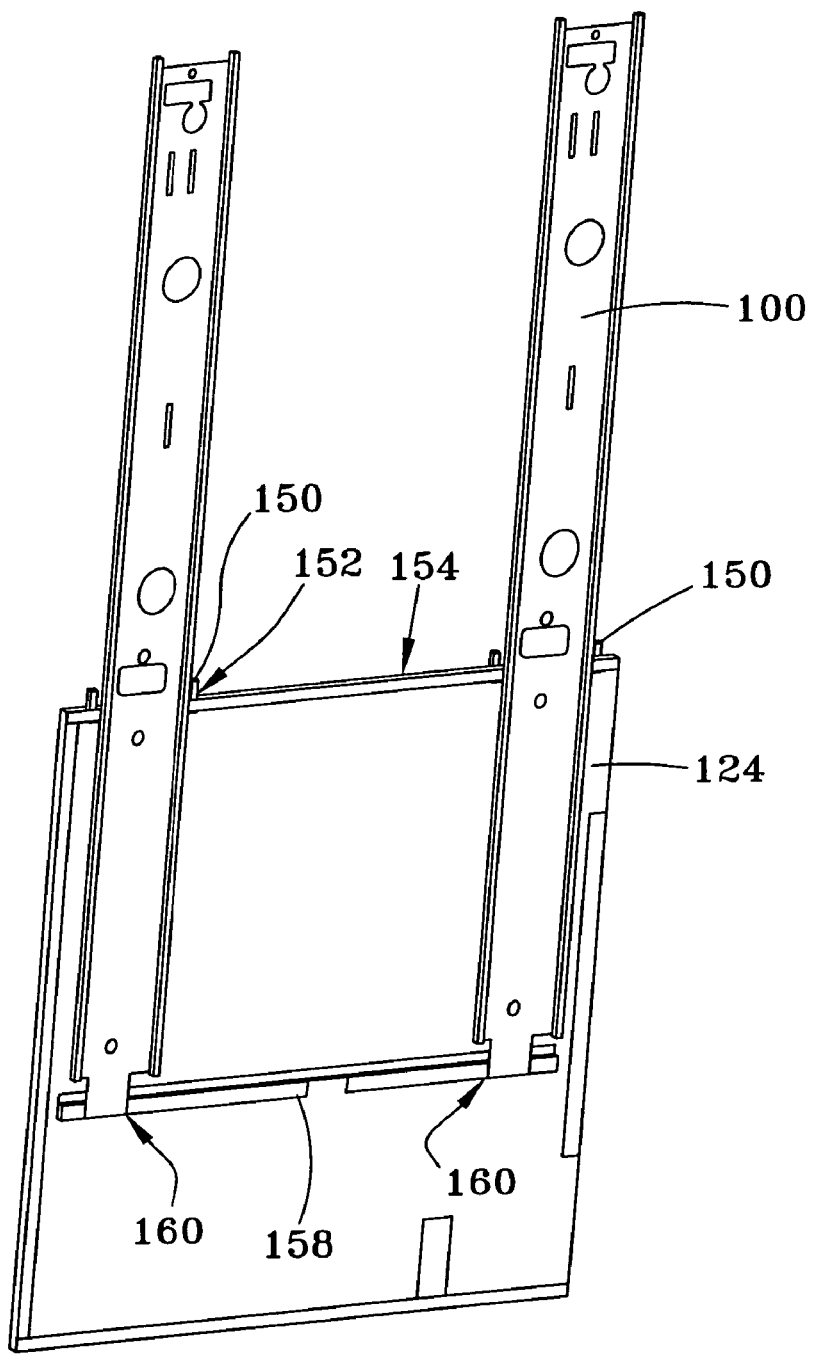
Figure 11:
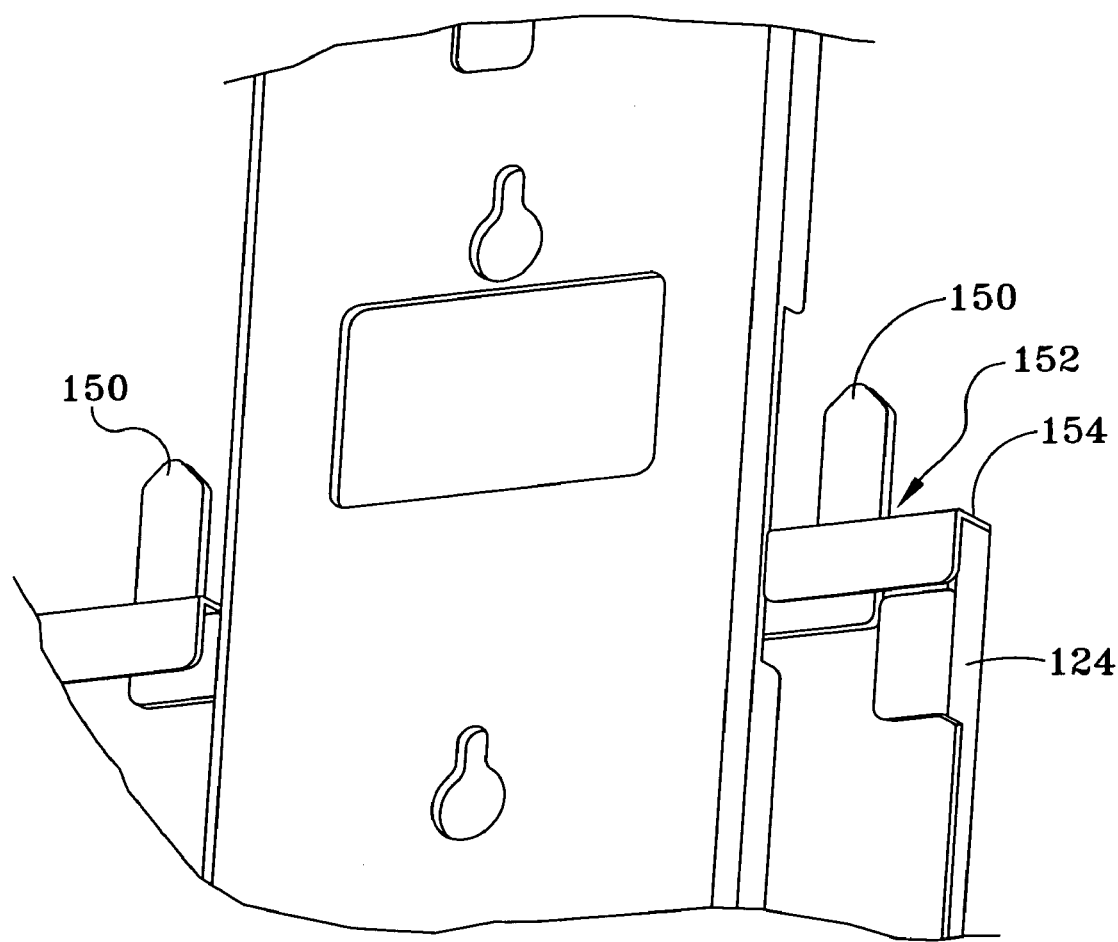
Figure 12:
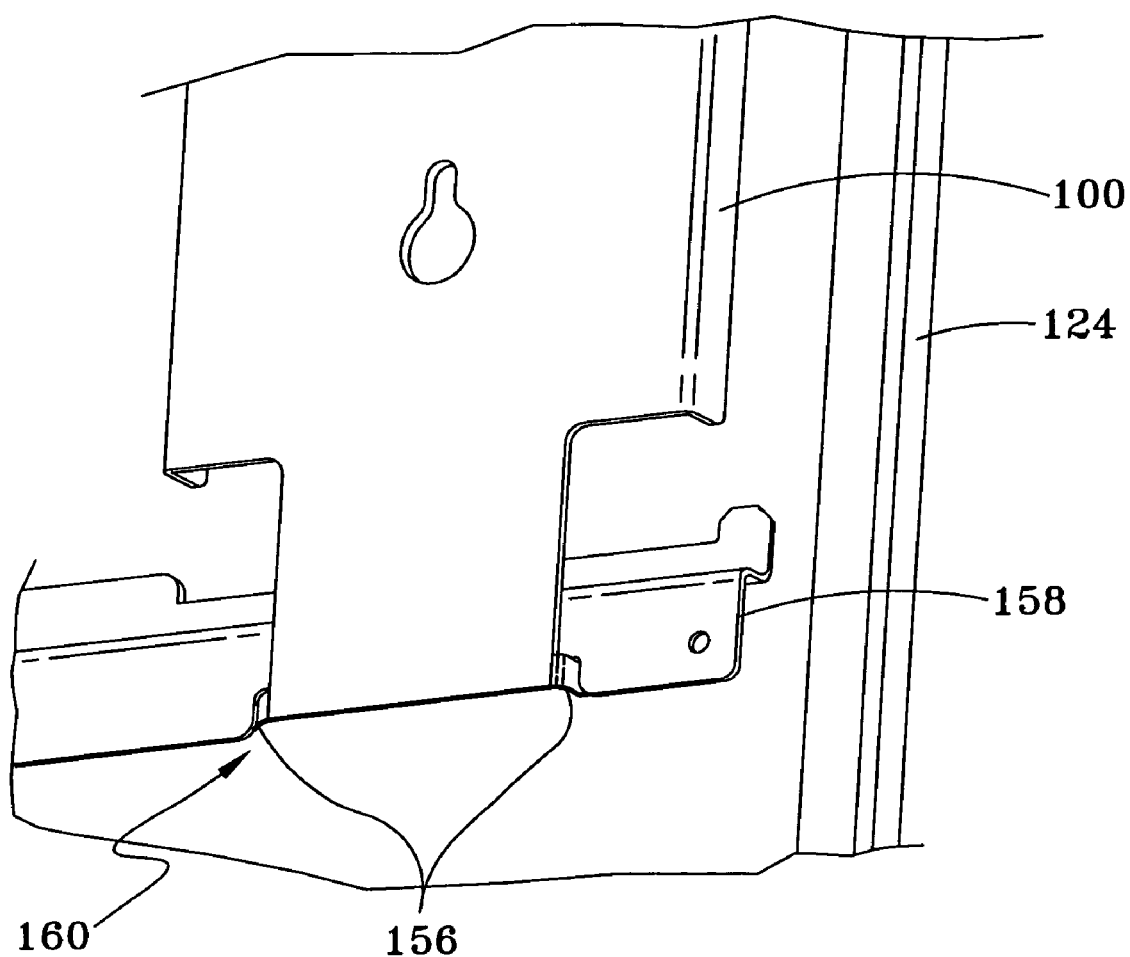

FIGS. 10–12 show an exemplary system and method for mounting the panels to the frame of the machine. As shown in FIGS. 10 and 11, the lower side panels 124, 128 may slide downward onto vertically extending tabs 150 of two vertical struts 100. The fingers may pass into horizontal apertures 152 in the top edges 154 of the side panels 124, 128. As shown in FIG. 12, the vertical struts 100 may further include tabs 156 which hook underneath a horizontal bracket 158 located on the inside surface of the side panels 124, 128. The horizontal bracket may include horizontal slots 160 which are positioned to receive the tabs 156.

Figure 13:
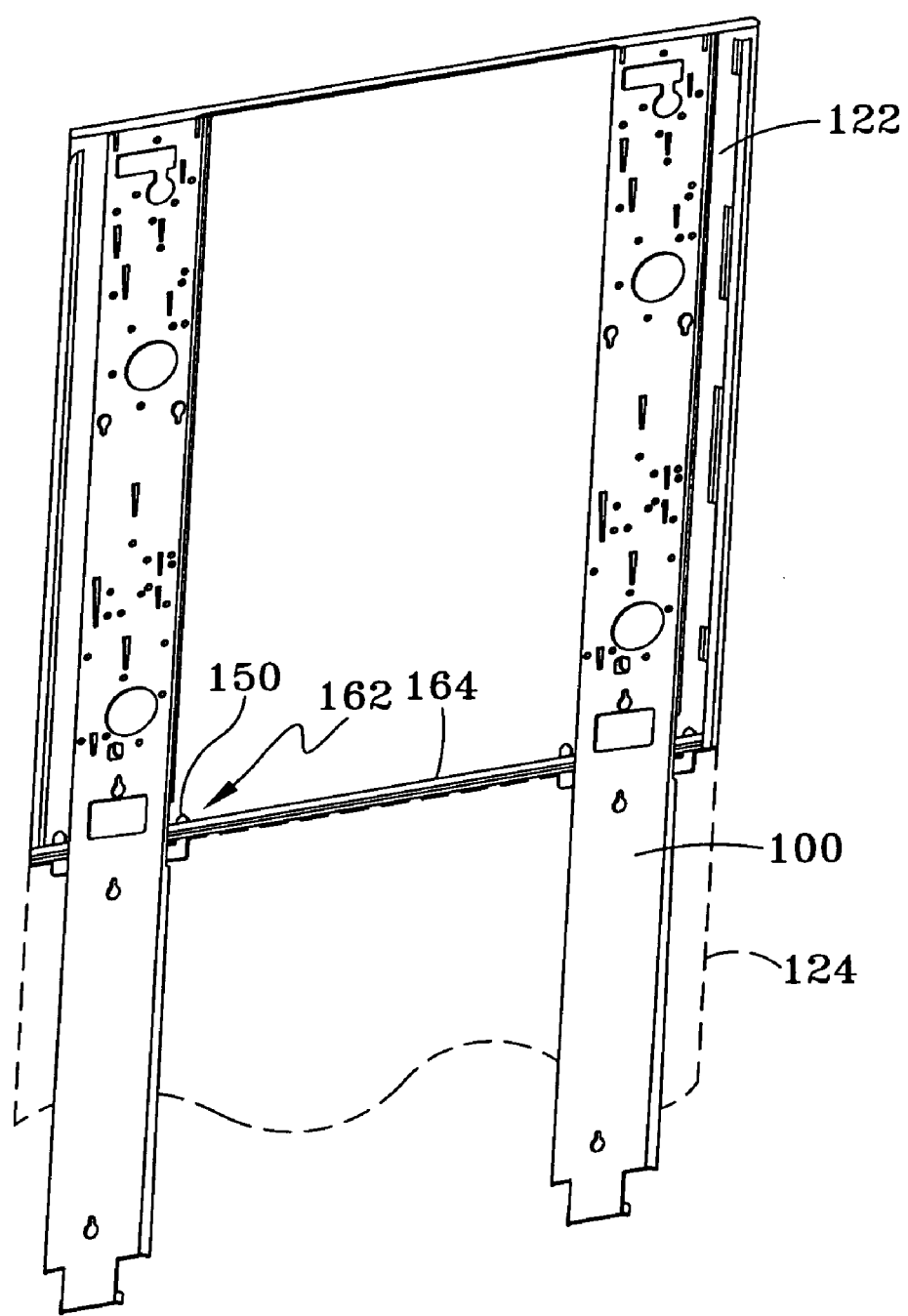

As shown in FIG. 13, once the lower panels 124, 128 have been mounted on the vertical struts, the upper panels 122, 126 may by mounted on the vertical struts. In this described exemplary embodiment, the upper panels are operative to prevent the lower panels from being removed from the frame by blocking the lower panels from moving upwardly to disengage from the vertical struts.

Figure 14:
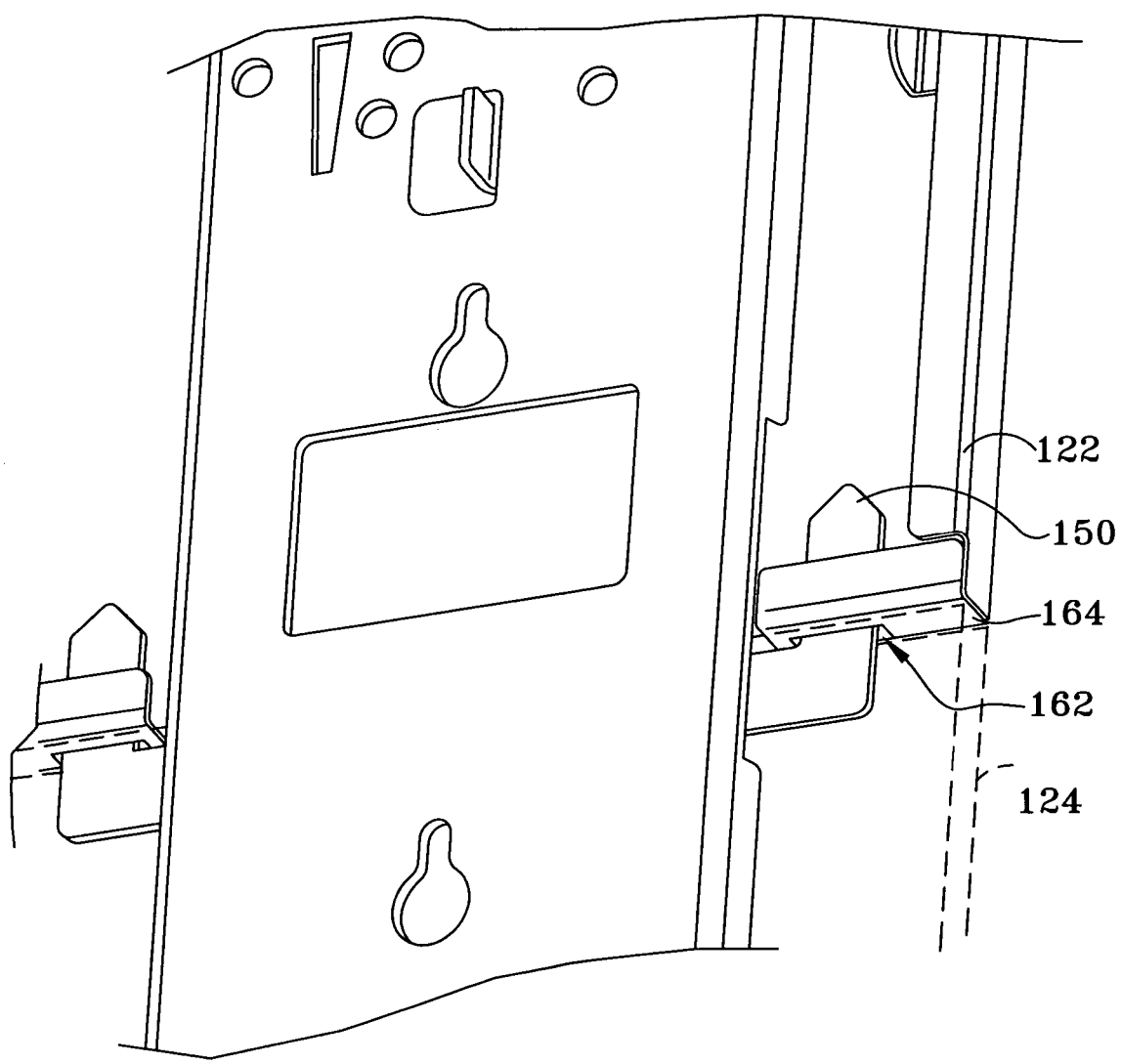
Figure 15:
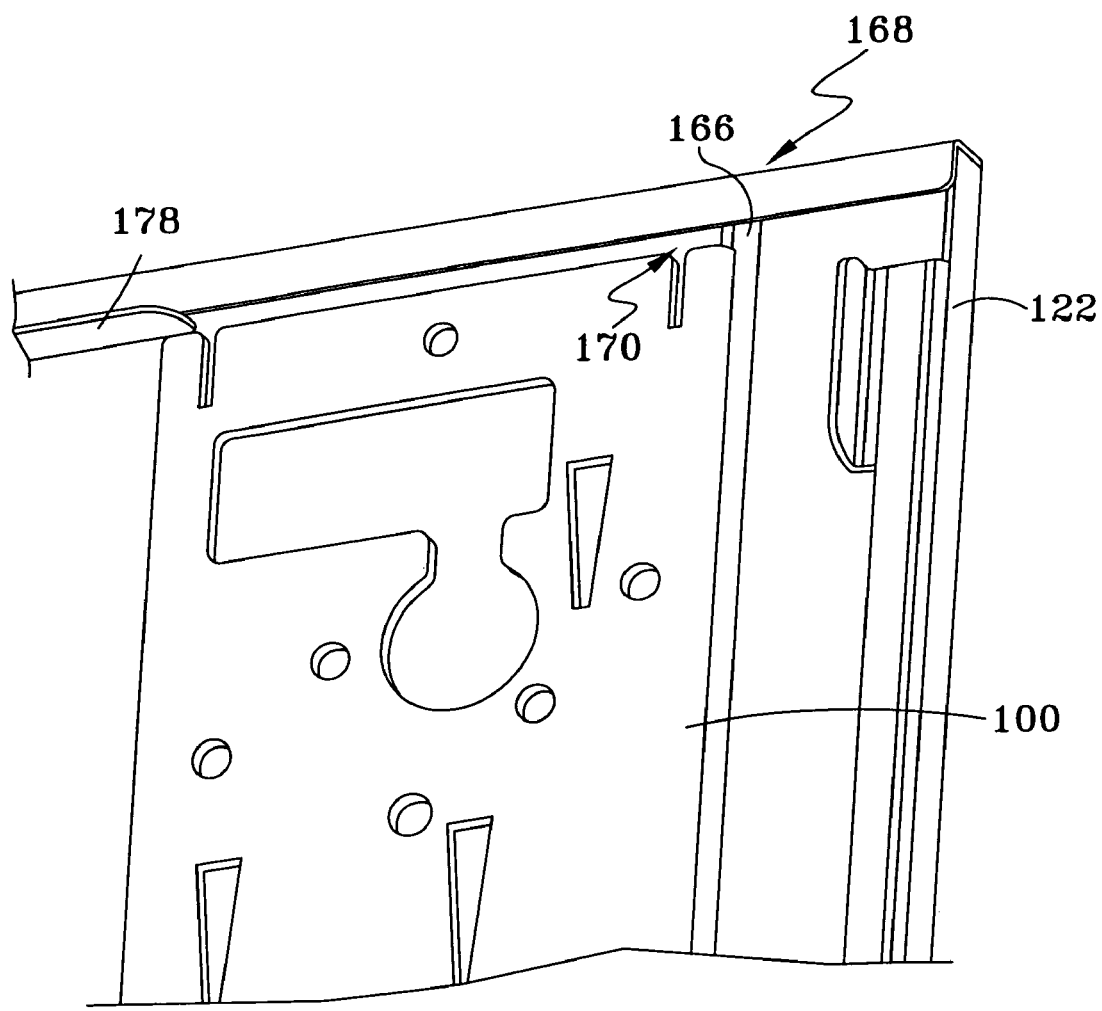

As sown in FIG. 14, the upper panels 122, 126 may include apertures 162 in a lower edge 164 of the panels 122, 126. When the upper panels are slid downward along the frame, the apertures 162 are operative to receive the vertically extending tabs 150 of the vertical struts 100 therethrough. In addition, as shown in FIG. 15, the vertical struts may further include vertically extending tabs 166 which are operative to hook inside a groove 170 located inside the upper edge 168 of the upper panels 122, 126.

Figure 16:
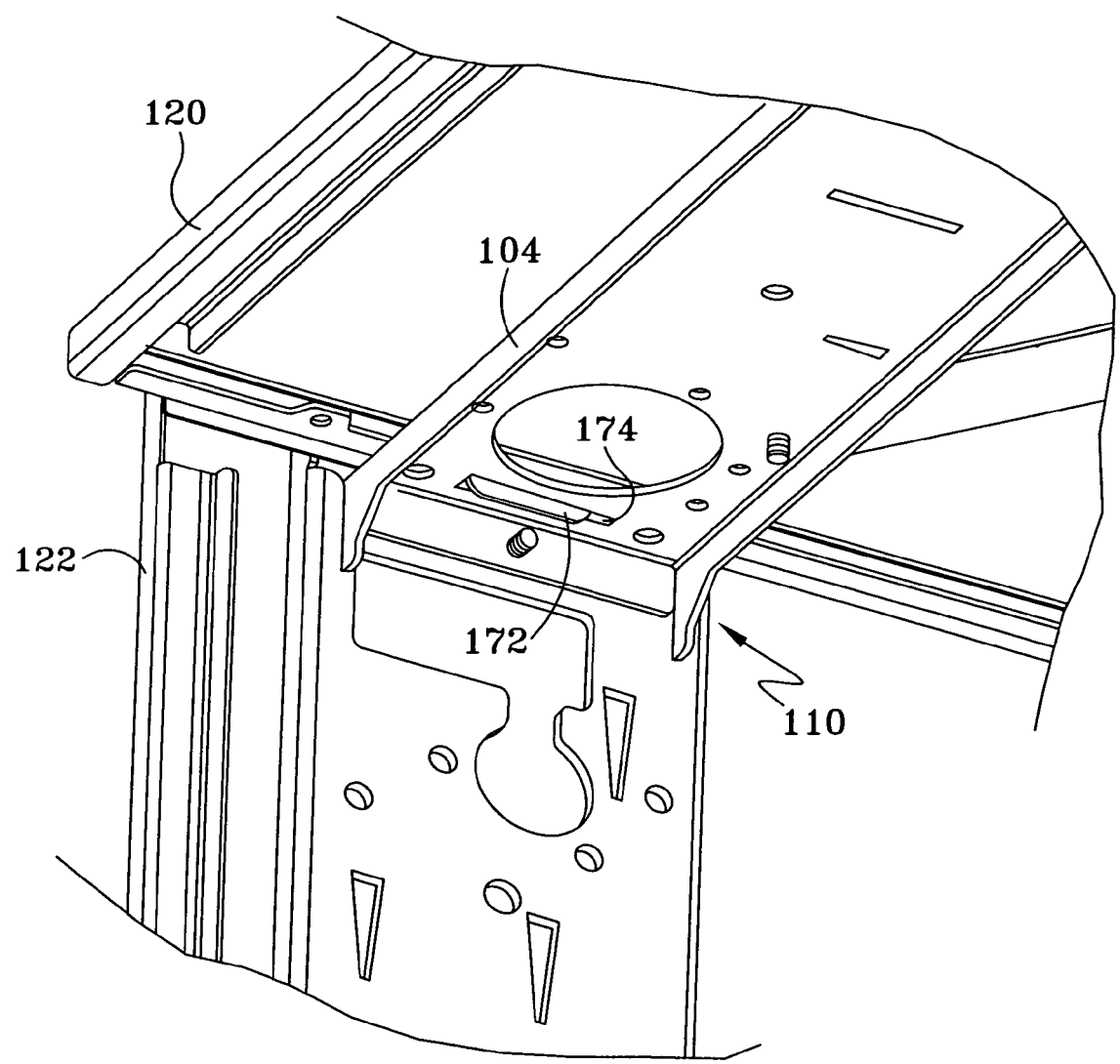
Figure 17:
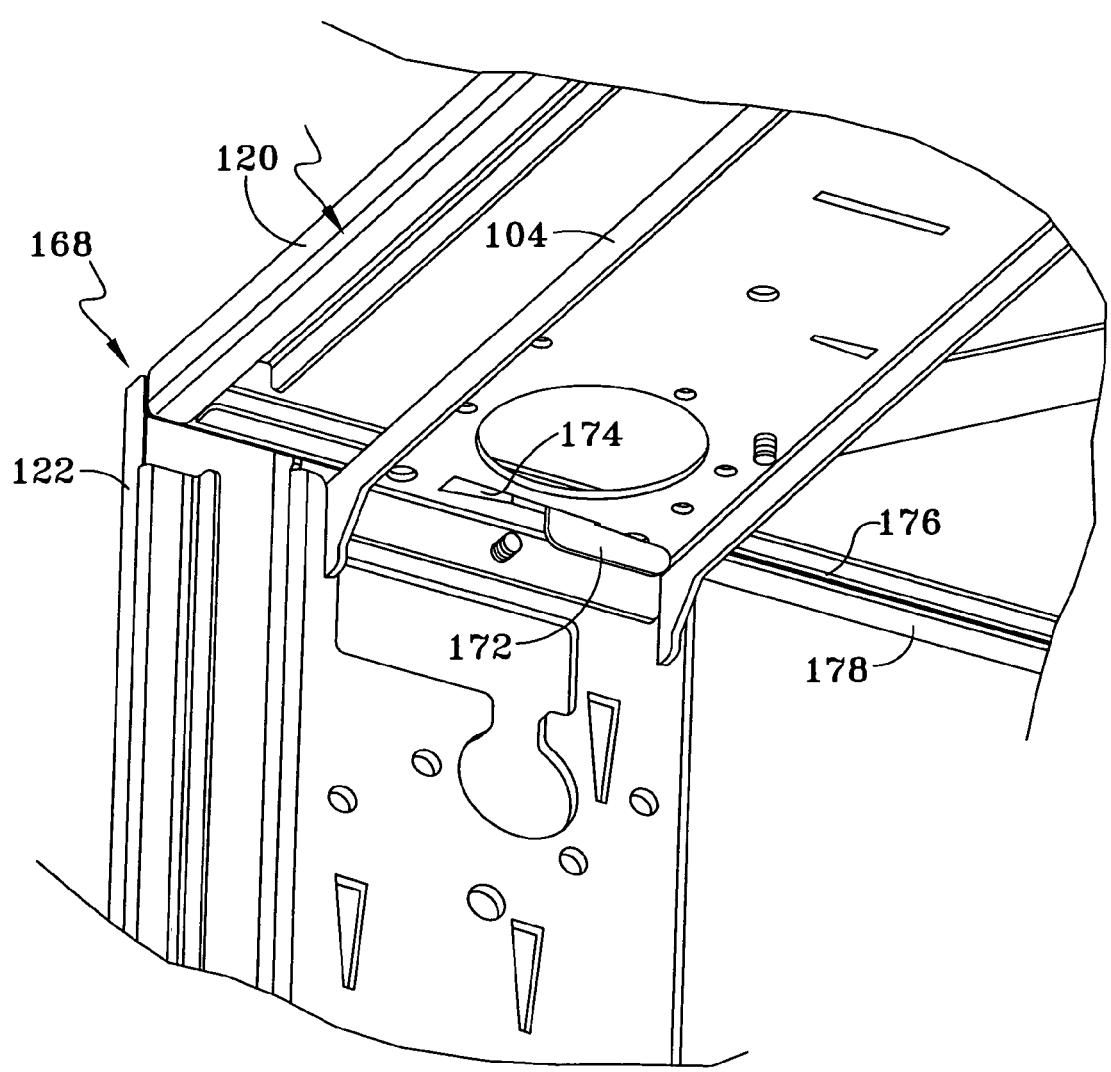

FIG. 16 shows the top panel 120 being mounted to the frame 110. In this described exemplary embodiment, the top panel when mounted to the frame is operative to prevent the side panels from being dismounted from the frame by blocking the side panels from moving upwardly to disengage from the vertical struts. The top panel may include tabs 172 which are operative to hook into slots 174 in the horizontal struts 104 of the frame 110. FIG. 17 shows a tab 172 fully engaged with a slot 174 of the horizontal strut 104. With the top panel in this engaged position, the side of top panel 120 includes a portion 176 which is located directly above portions 178 of the side panel 122 and is operative to prevent the side panel from moving upwardly and dismounting from the frame. In this described exemplary embodiment, the portions 178 of the side panel 122 may correspond to a flange or projection which extends underneath the top panel 120. In an alternative exemplary embodiments the top panel may be relatively higher than the side panel 122 and may have sufficient width as to extend above the upper edge 168 of the side panel 122 to block the side panels from moving upwardly.

Referring back to FIG. 5, when the door 129 is in the closed position, the top edge 180 of the door is operative to block the top panel 120 from sliding so as to unhook the tabs 172 (FIG. 17) in the top panel from the horizontal struts 104 of the frame. In this described exemplary embodiment, the door 129 may be locked in a closed position thereby preventing each of the top panel, upper side panels and bottom side panels from being removed. When the door 129 is opened the top panel 120 is enabled to be removed from the frame 110. When the top panel is removed the upper side panels are enabled to be removed from the frame 110. When the upper side panels are removed the bottom side panels are enabled to be removed from the frame.

In this described exemplary embodiment, the panels may be mounted to the frame without the use of separate fasteners such as screws and without the use of tools. The service door 129 is operative to prevent the panels from being removed when the door is in the closed position and is operative to enable the panels to be removed when the door is in the open position. In alternative exemplary embodiments, the automated banking machine may include other systems and methods for securing the panels to the frame including the use of fasteners or other connection devices.

Figure 18:
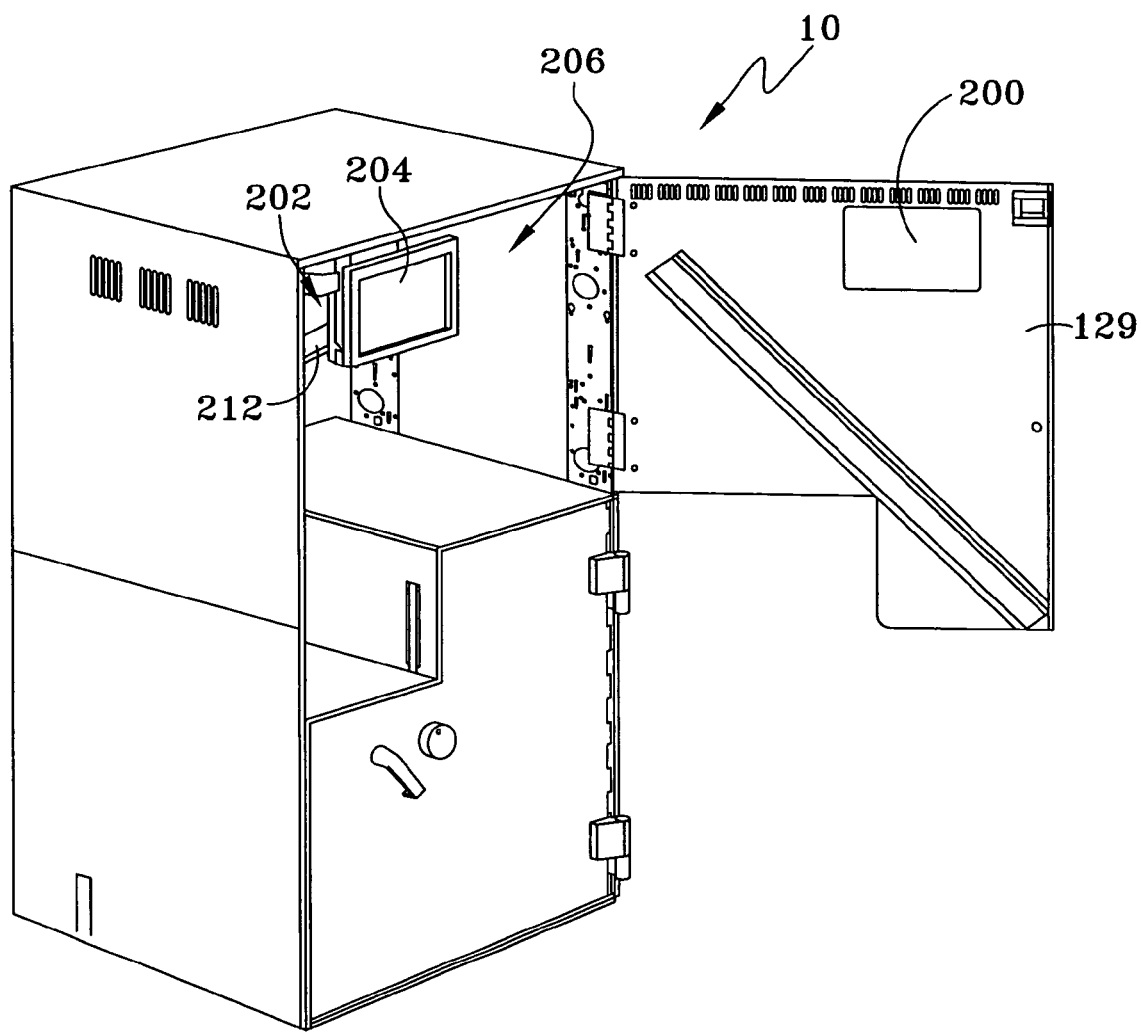
FIGS. 18–24 show exemplary embodiments of a swing arm assembly of an automated banking machine.

Referring back to FIG. 5, an exemplary embodiment of the automated banking machine may include a service door 129 which includes a window 200. The window may be used to view a display device such as a service monitor located within the enclosure. FIG. 18 shows an example of an automated banking machine 10 with the service door 129 in the open position. Within the machine may be mounted a service monitor swing arm assembly 202 which is operative to support a service monitor 204 in a plurality of different positions. For example, as shown in FIG. 18, the swing arm assembly 202 is operative to orient the service monitor 204 in a position adjacent the opening 206 of the machine. When the door 129 is closed, the window 200 of the service door 129 will be positioned in front of the monitor to enable all or at least portions of the display screen of the service monitor to be visible through the window 200.

Figure 19:
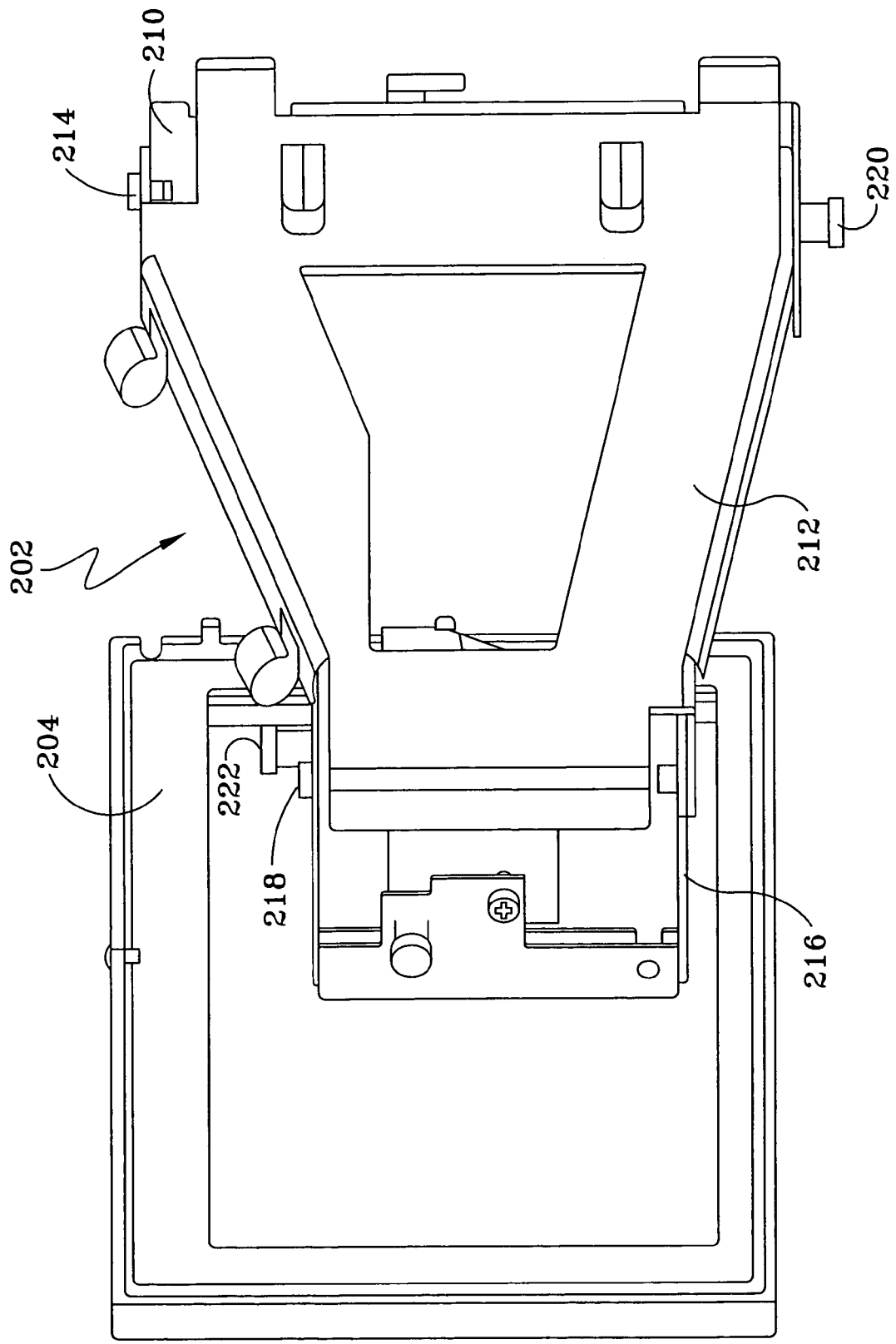
Figure 20:
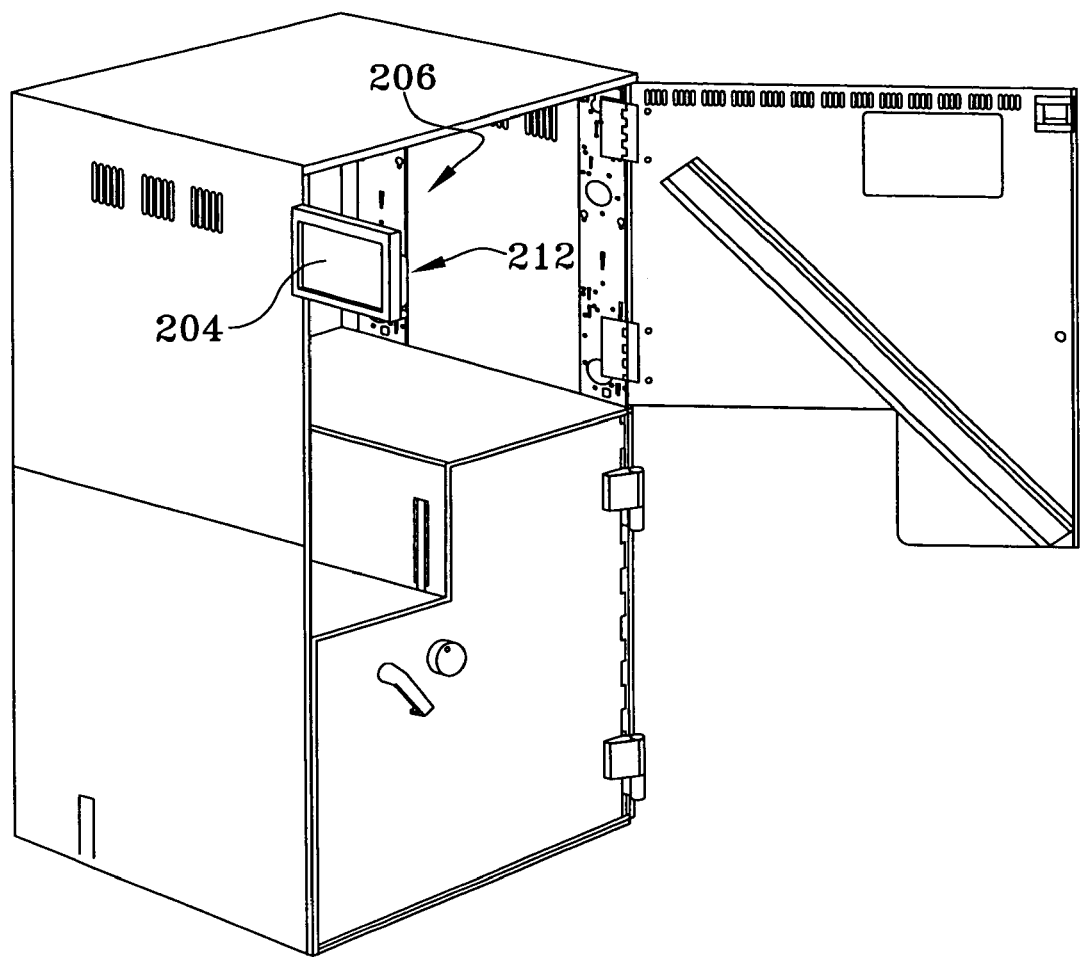

FIG. 19 shows a side view of the service monitor mounted to the swing arm assembly 202. In this described exemplary embodiment, the swing assembly may be operative to pivot independently at a plurality of points. In the exemplary embodiment, the assembly 202 may include a frame bracket 210 that is operative to mount to a vertical strut of the automated banking machine frame. The frame bracket may be in pivoting connection with a swing arm 212. For example, the swing arm may be operative to rotate with respect to a pin 214 in operative connection through portions of the frame bracket 210 and swing arm 212. As shown in FIG. 20, the swing arm may be operative to rotate 90 degrees with respect to the frame bracket to place the service monitor 204 outside the opening 206 to the interior of the machine.

Figure 21:
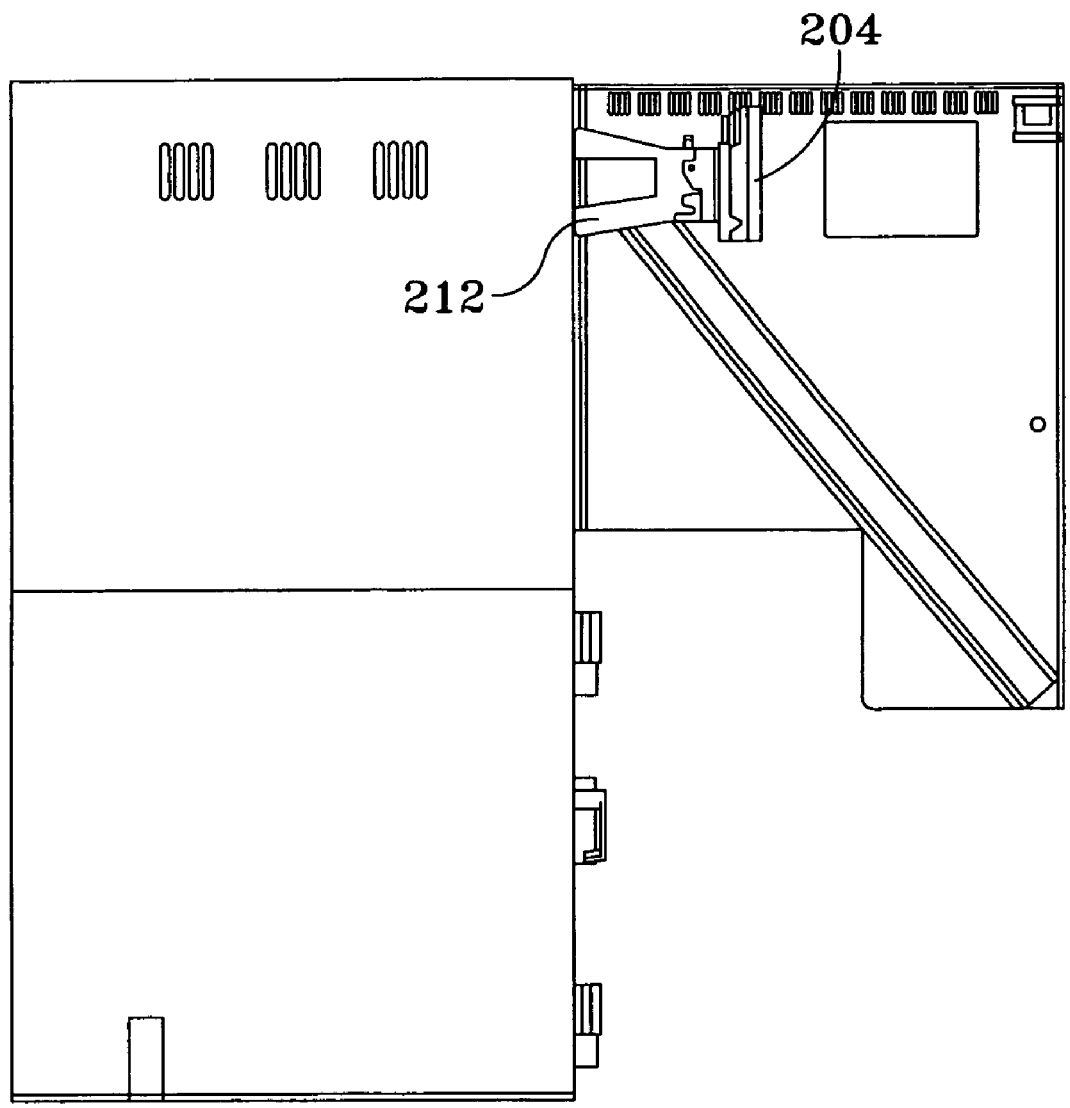
Figure 22:
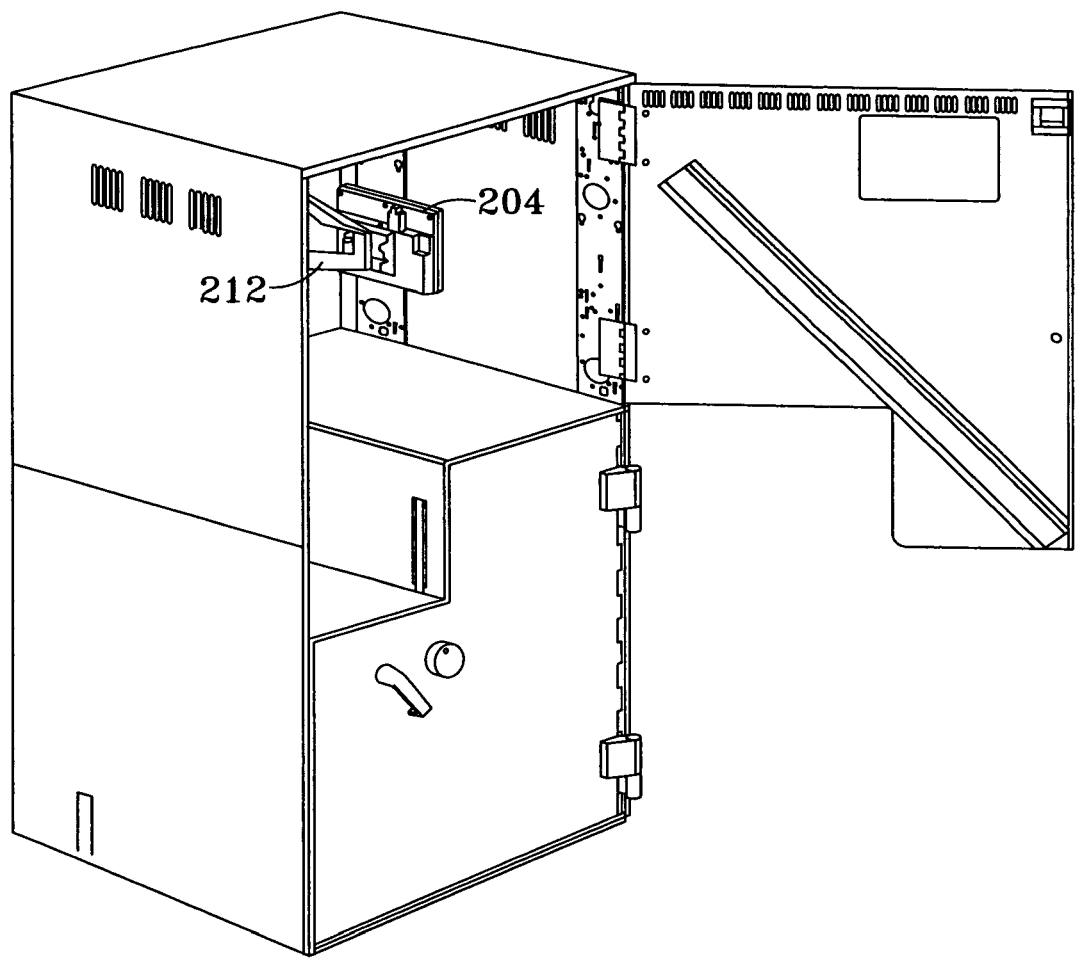

Referring back to FIG. 19, the assembly 202 may further include a monitor bracket 216 that is operative to attach the service monitor 204 to the assembly 202. In this described exemplary embodiment the monitor bracket 216 may be in pivoting connection with the swing arm 212. For example, the monitor bracket 216 may be operative to rotate with respect to a pin 218 in operative connection through portions of the monitor bracket 216 and swing arm 212. For example, with the swing arm rotated to extend outward as described previously (FIG. 20), the monitor bracket may be operative to rotate the monitor about 90 degrees (FIG. 21) with respect to the swing arm 212. In addition, in exemplary embodiments, the monitor bracket may be operative to rotate the monitor 204 about 180 degrees (FIG. 22) with respect to the swing arm 212.

Figure 23:
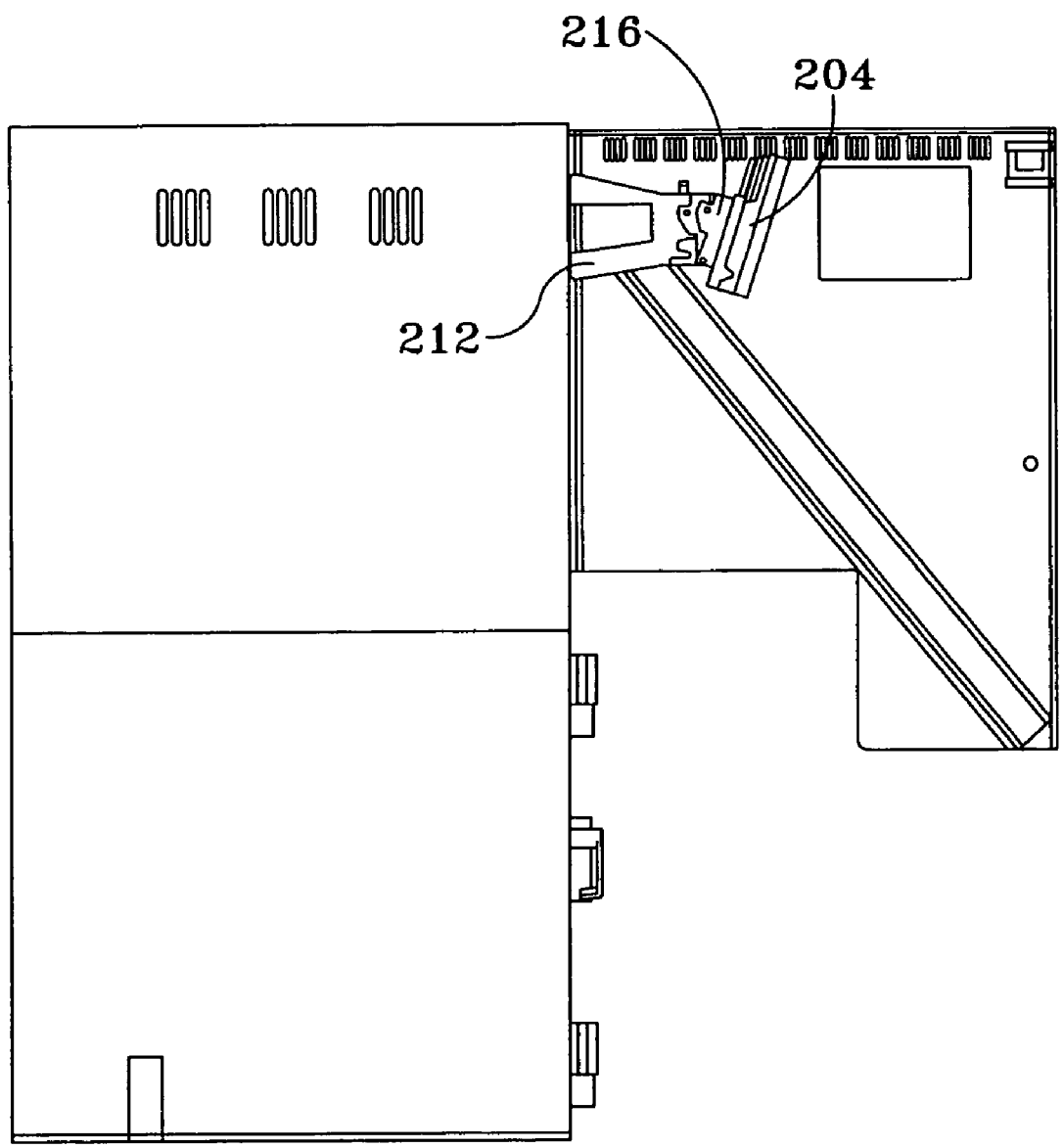

In addition to being operative to rotate the service monitor about a plurality of vertical axes, an exemplary embodiment of the assembly may be operative to adjust the vertical tilt of the service monitor. For example as shown in FIG. 23, the monitor bracket 216 may be operative to pivot along a horizontal axis to tilt the service monitor 204 downwardly. FIG. 23 shows an example of the assembly being orientated to tilt the service monitor downwardly by about thirteen degrees. However, it is to be understood that in alternative exemplary embodiments the service monitor swing arm assembly may be operative to tilt the monitor at other smaller and/or larger angles. Further exemplary embodiments of the assembly may be operative to rotate the monitor along one or more vertical axes to a plurality of different angles inwardly and outwardly with respect to the frame of the machine.

Referring back to FIG. 19, the assembly may include one or more spring plungers or other locking devices which are operative to lock the rotational positions of the assembly. For example a spring plunger 220 may be biased to move into a locked position which locks the swing arm 212 in its current rotational position relative the frame bracket 210. Pulling the spring plunger 220 may be operative to place the spring plunger 220 into an unlocked position which enables the swing arm 212 to rotate freely with respect to the frame bracket 210. The assembly may further include additional spring plungers 222 or other locking devices at other pivoting points as well.

Figure 24:
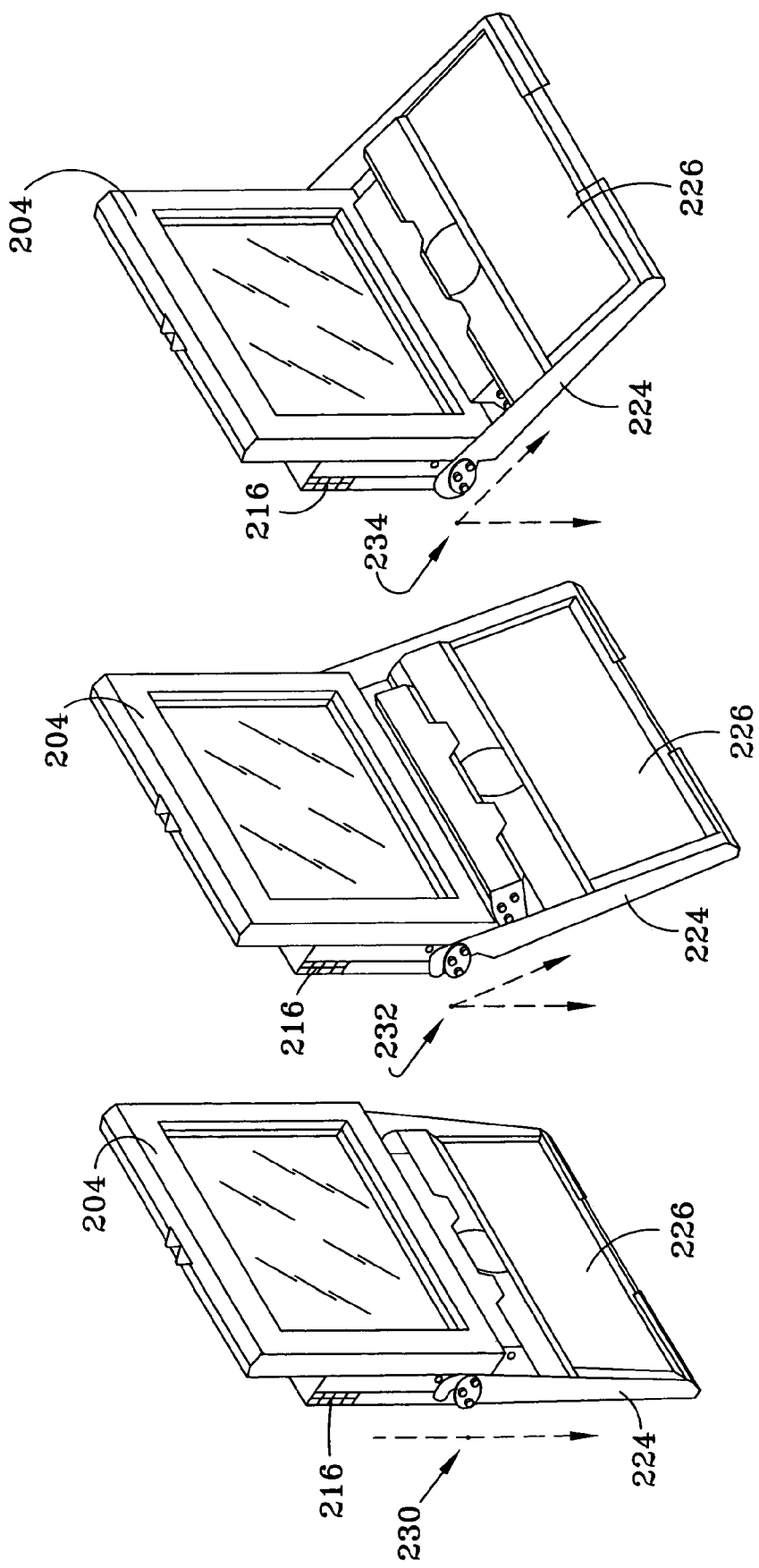

As shown in FIG. 24, an exemplary embodiment of the service monitor swing arm assembly may further include a support bracket 224 for a service keyboard 226 in pivoting connection with the monitor bracket 216. Such a support bracket 224 may be operative to rotate about a horizontal axis to tilt the keyboard 226 at a plurality of different angles. Such angles for example may include orienting the keyboard 226 at a vertical angle 230; a 30 degree angle 232 from vertical; and a 107 degree angle 234 from vertical.

Exemplary embodiments of the automated banking machine may include a plurality of legs under the chest which are operative to support the machine above a floor or other surface. In an exemplary embodiment such legs may be adjustable in height to account for surfaces which are not level or are uneven. In addition in exemplary embodiments the legs may be adjustable in height from within the chest. FIG. 25 shows an exemplary embodiment of a leveling leg 250 in operative connection with the chest 102 of the machine. As shown in FIGS. 26 and 27 the leveling leg may include a threaded shaft 252 that is operative to screw up or down within a threaded hole 254 through the bottom 256 of the chest. The leg may include a base or foot end 257 that is operative to engage and rest on a floor or other support surface. The foot 257 can comprise a flange extending in a radial direction perpendicular to the axis of the shaft 252. The flange can have a diameter greater than the diameter of the threaded portion of the shaft. The flange can have a circular, square, slotted, or other known shape or configuration. The foot end 257 can be of a size to ensure a sufficient contact area with the supporting surface. The support strength and the diameter of the threaded shaft and the flange can be predetermined based on the weight of the machine.

As shown in FIG. 27, the leg 250 may include a tool receiving end 258 which has a size that is adapted to be turned by a wrench. In the exemplary embodiment the tool receiving end may include a square projection which is relatively narrower than the diameter of the threaded shaft 252. When the automated banking machine is being assembled, the tool receiving end of the leveling leg may be inserted into the hole 254 from underneath the chest. The leveling leg may than be rotated to screw the leveling leg further upward into the chest.

To make an automated banking machine level on an uneven surface, one or more of the leveling legs may be rotated to increase or decrease the length of the leveling legs that extend below the chest. In an exemplary embodiment, the leveling process may include opening the chest door and turning one or more of the square tool receiving ends of the leveling legs with a wrench. For automated banking machines which include hardware devices in the chest such as currency cassettes, the hardware device may be either removed from the chest or the hardware device may be moved outward from the chest into a service position to provide access to the leveling legs.

As discussed previously, an automated banking machine may include a fascia in operative connection with the frame of the machine. Such a fascia may include a plurality of openings through which components of the machine are accessible. For example as shown in FIG. 1, the automated banking machine may include a component such as the cash dispenser 24. The cash dispenser may be mounted within the frame/chest of the machine. To enable a user to access the cash dispensed from the cash dispenser, the fascia may include an opening 54 therethrough.

In exemplary embodiments of the machine, to accommodate differently sized and shaped components, the fascia may include a plurality of openings therethrough which have different sizes and shapes. In addition, in exemplary embodiments, the size of the openings may be made sufficiently large to accommodate access to a plurality of differently sized and shaped components. Any gaps or spaces which remain between the edges of the openings in the fascia and the outer enclosure of the component may be filled with at least one obstructing block. The blocks may be securely mounted to the fascia, a removable fascia bezel and/or the component to prevent access to the interior of the machine.

Figure 28:
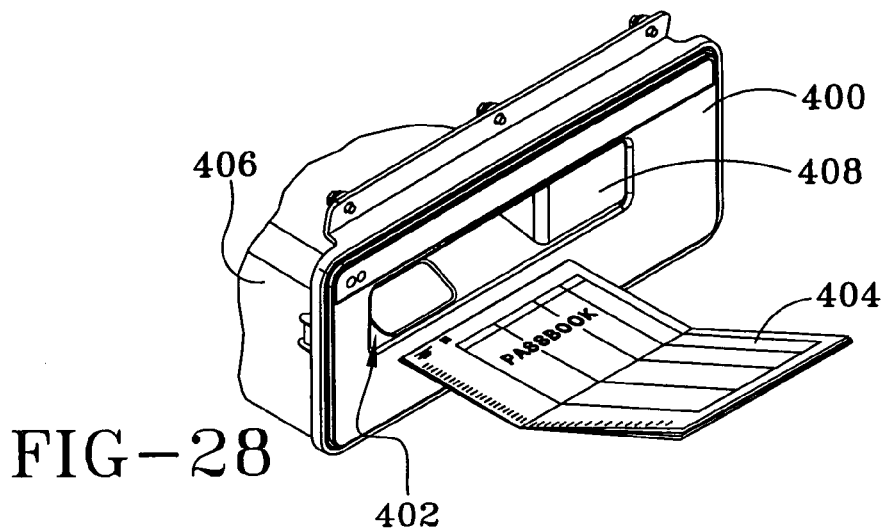
FIGS. 28–30 show exemplary embodiments of an adjustable bezel for a fascia of an automated banking machine.
Figure 29:
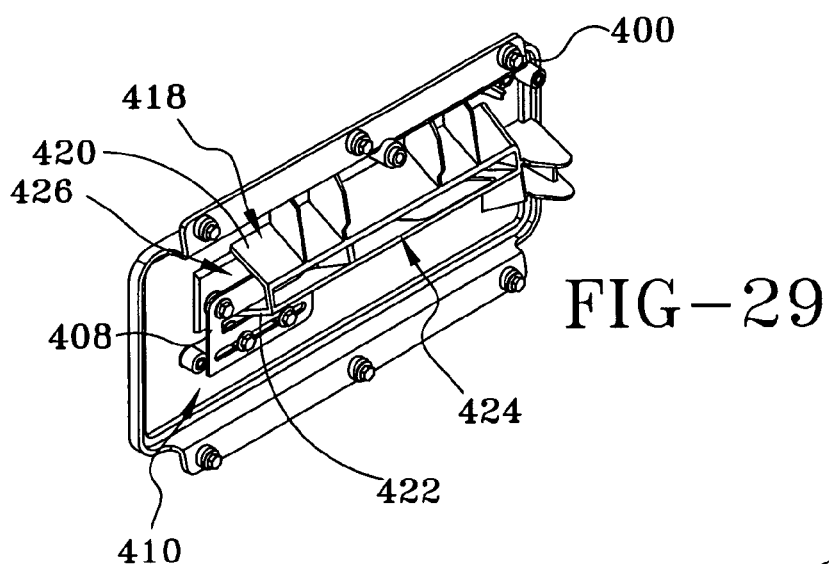
Figure 30:
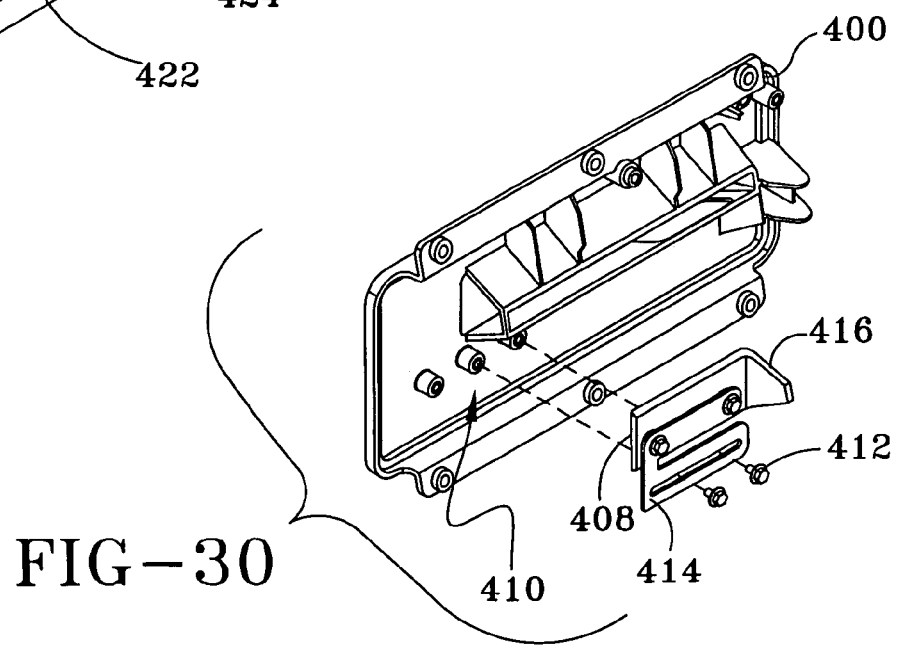

In exemplary embodiments the blocks may be formed with a size and shape which corresponds to the size and shape of the gap in the openings of the fascia. However, in an alternative exemplary embodiment, gaps may be minimized with openings in the fascia which are adjustable in size. FIGS. 28–30 show an example of a portion of a removable fascia bezel 400 which includes an adjustable opening 402. In this example, the opening 402 has a size and shape for receiving a passbook 404 therethrough for engagement with a passbook printer 406 of the automated banking machine. In exemplary embodiments automated banking machines may have different types of passbook printers for use with different types of passbook media. Such media may have different widths which require the opening 402 in the fascia bezel to be narrowed or widened.

In this described exemplary embodiment the fascia bezel may include an obstructing block 408 which can be selectively positioned to accommodate openings with different size requirements. As shown in FIG. 29, the obstructing block 408 may be in slidable connection with the back or inside portions 410 of the fascia bezel 400. As shown in FIG. 30, in this described exemplary embodiment, the obstructing block 408 may include a slot 414. Screws 412 or other fasteners may be placed through the slot and mounted to the inside portion 410 of the fascia bezel. The obstructing block 408 may be slid along the screws to a position which reduces or widens the portion of the opening 402 which is accessible to pass an item therethrough. The screws may then be tightened to rigidly lock the obstructing block in place to the fascia bezel. When a differently sized passbook printer or other component is installed adjacent the fascia bezel, the screws 412 may be loosened and the obstructing block may be repositioned to change the size of the portion of the opening to accommodate the different width of the new passbook printer. The screws may then be re-tightened to lock the obstructing block in place.

In an exemplary embodiment, the fascia bezel may include a funnel 418 with upper and lower walls 420, 422 that taper toward each other to reduce the outer opening 402 (FIG. 28) to a relatively narrower inner slit 424 (FIG. 29). The obstructing block 408 may include a flange 416 with a size and shape which corresponds to the inner cross-sectional shape of the funnel 418. When the obstruction block is mounted to the fascia bezel, the flange 416 of the obstruction block is slid into the funnel 418 through a side opening 426. The flange corresponds to a movable side wall within the funnel which is operative to cover gaps or holes which would otherwise be present when the width of the hardware device is less than the width of the slit 424 of the funnel.

In exemplary embodiments of the automated banking machine, the fascia may be in hinged connection with the frame of the machine. In other exemplary embodiments the fascia may be is slidable connection with the frame. When a service technician wishes to access the hardware devices of the machine behind the fascia, the fascia may be unlocked and opened by rotating the fascia about one or more hinges and/or sliding the fascia away from the fascia. In other exemplary embodiments the service technician may be operative to access the back of the machine and move individual hardware devices away from the fascia into a service position.

In either example, when the fascia and hardware devices are brought together, the openings in the fascia must align with the hardware devices installed to the frame of the machine. An exemplary embodiment of the automated banking machine includes systems and methods for automatically aligning hardware components with the openings in a fascia.

Figure 31:
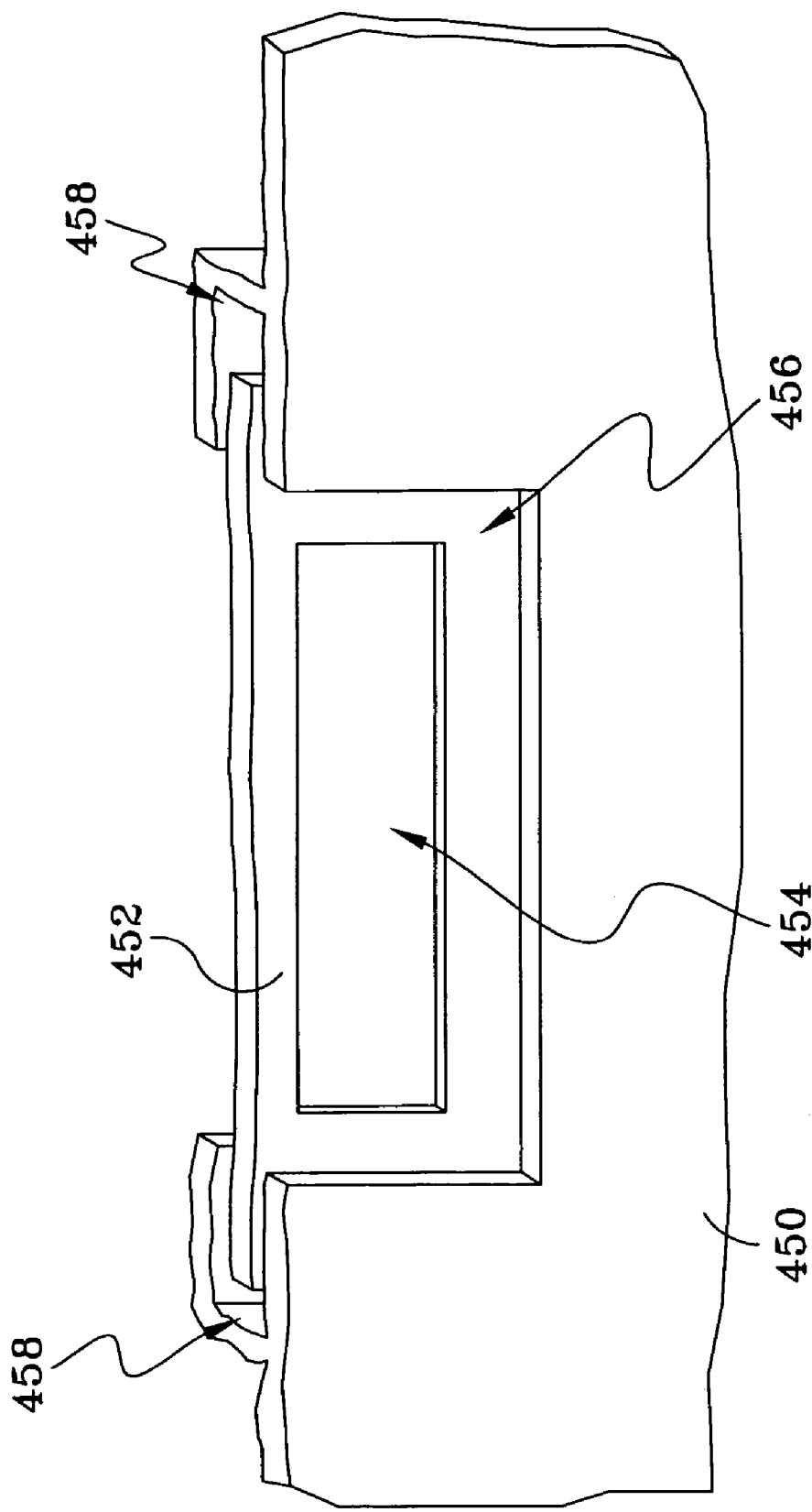

FIG. 31 show an example of a fascia 450 of an automated banking machine which includes a floating bezel 452. In FIG. 31 the top of the fascia is shown cut away to show the interior features of the floating bezel. Here the bezel includes an opening 454 which is to be aligned with an opening of a hardware device of the machine. The fascia 450 includes an opening 456 which is to be filled by the bezel 452. In this described exemplary embodiment, the bezel 452 is in sliding connection with the fascia and is operative to slide vertically and horizontally with respect to the fascia. In addition, the bezel 452 includes a size which is wider in both vertical and horizontal length with respect to the opening 456 in the fascia, such that when the bezel is slid either up, down, left, and/or right, the bezel will continue to fill the opening 456.

In the exemplary embodiment, the machine is operative to limit movement of the bezel to a range of vertical and horizontal movements with respect to the fascia. In the exemplary embodiment shown in FIG. 31, the fascia 450 may include one or more slots or channels 458 in which the bezel 452 slides. FIG. 32 shows a top cross-sectional view of the fascia 450 and bezel 452 prior to the fascia being closed shut adjacent the frame 474 and hardware devices of the machine. In this example, a hardware device 472 may not be aligned with the opening 454 of the bezel 542. However, in this described exemplary embodiment, the bezel 452 may include guides 470 which are operative to move the bezel 452 and its opening 454 into alignment with the hardware device 472 as the fascia is being closed. The guides 470 may include angled and/or curved surfaces 476 which act in the form of a funnel. The outer space 482 between the outer ends 478 of the guides is sufficiently wide to enable the hardware device 472 to enter the outer space 482 even when the bezel is significantly out of alignment with the hardware device. The inner space 484 between the inner ends 480 of the guides 470 is relatively narrower than the outer space 482 and about corresponds to the width of the hardware device.

As the fascia is being shut, at least one of the angled and/or curved surfaces 476 of the guides is operative to slide against a side 486 of the hardware device, and as a result urge the bezel to slide relative the fascia. As shown in FIG. 33, when the fascia 450 reaches its closed position adjacent the frame 474, the sliding of the hardware device along at least one of the guides is operative to cause the opening 454 of the bezel to move into aligned engagement with the hardware device.

FIG. 34 shows a top cross-sectional view of an alternative exemplary embodiment of a floating bezel 462. Here the bezel 462 includes one or more apertures 464. The fascia 460 includes projections 466 which pass through the apertures. In this described exemplary embodiment, the diameters of the apertures 464 of the bezel are relatively larger than the diameter of the projections 466 to enable the bezel to move into different horizontal and vertical positions relative the fascia.

Figure 35:
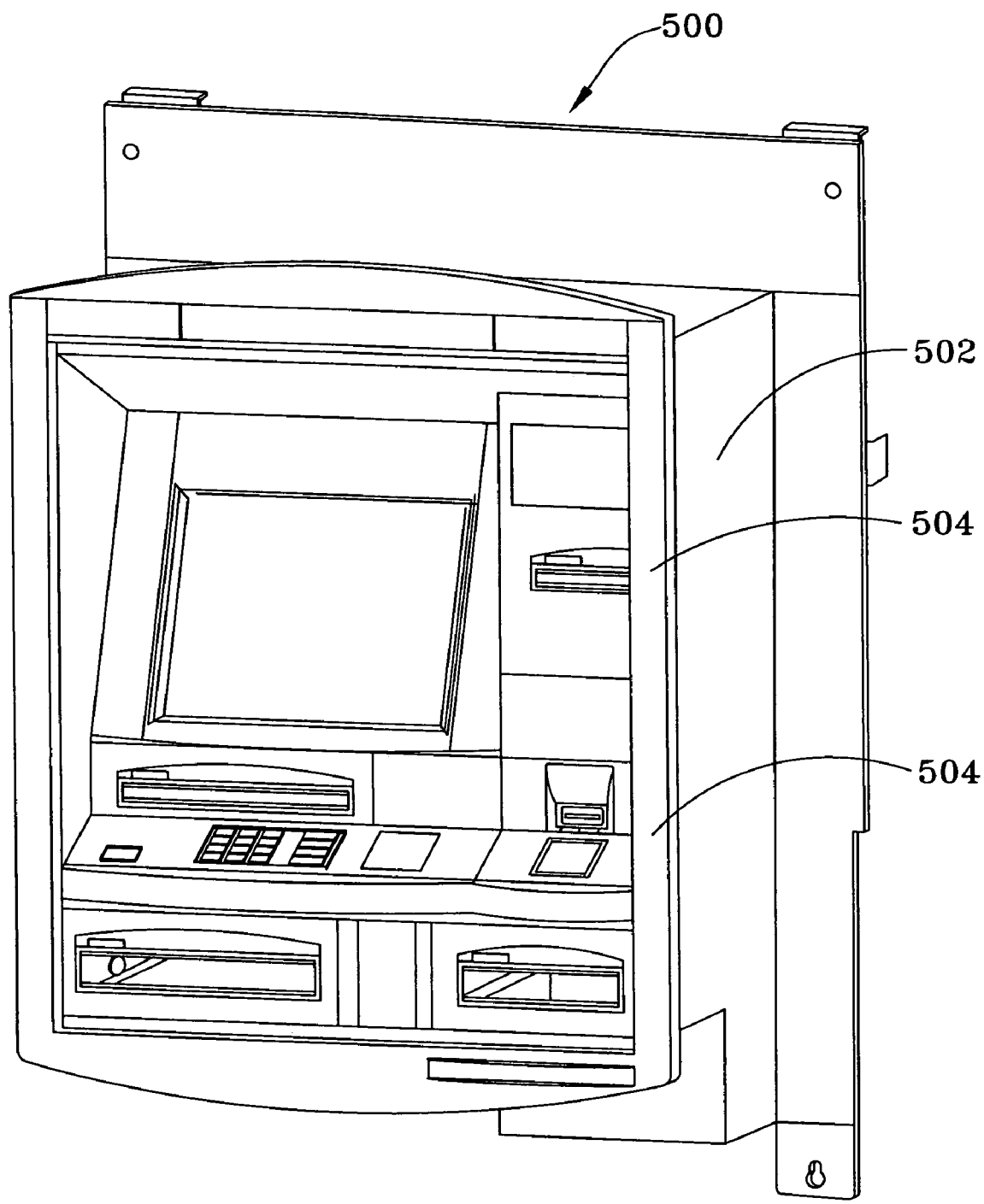
FIGS. 35–43 show exemplary embodiments of a tilting fascia of an automated banking machine.
Figure 36:
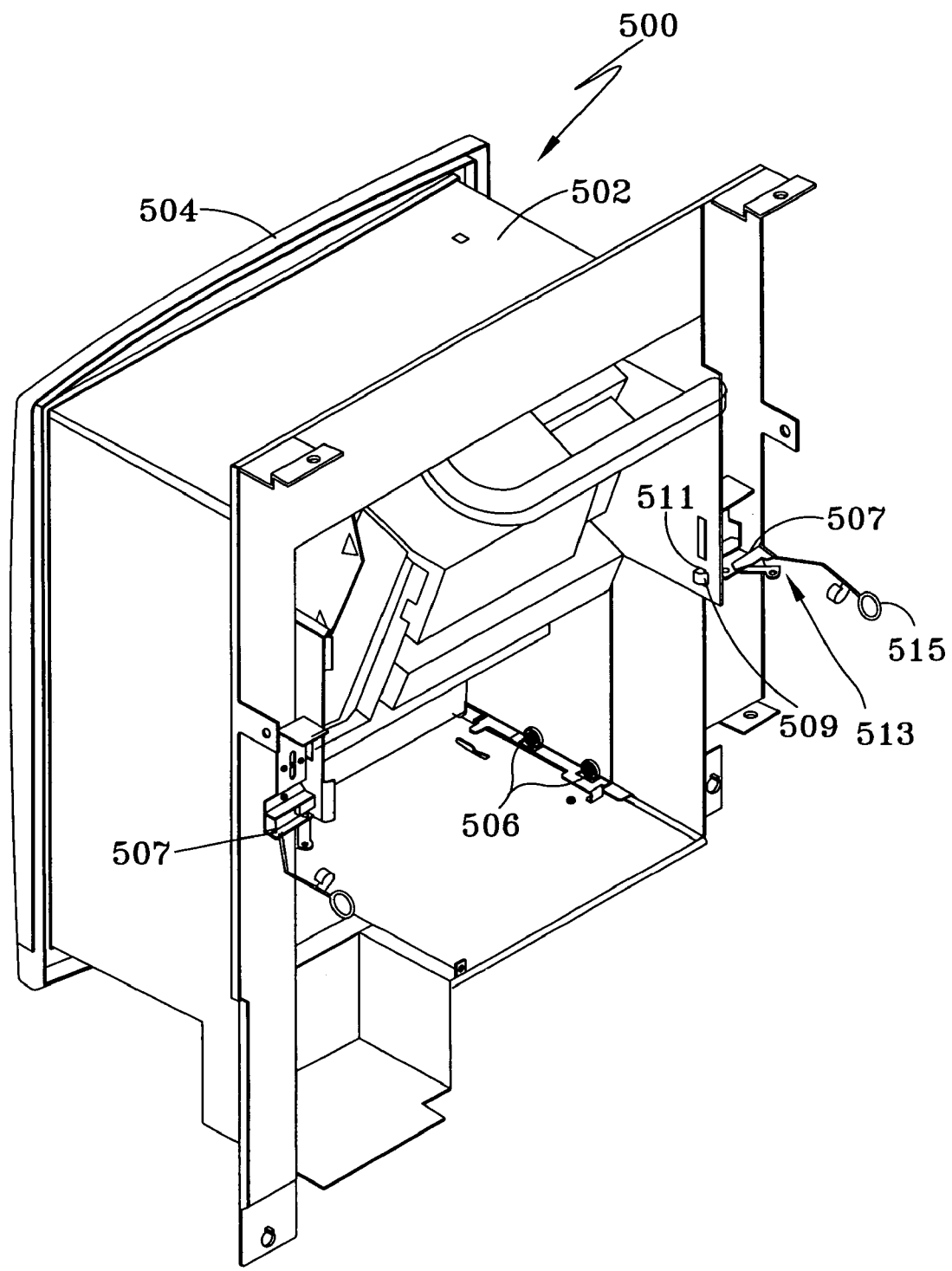

Exemplary embodiments of the automated banking machine may include a fascia which provides access to the components attached to the fascia without having to fully remove the fascia from the machine. In this described exemplary embodiment, the fascia may be operative to tilt relative the frame into an open position. FIGS. 35–40 show an exemplary embodiment of a fascia moving from a closed position to an open tilted position. In this described exemplary embodiment, the machine 500 may include a rainshield housing 502. FIG. 35 shows a front view of the fascia 504 in a closed position. FIG. 36 shows a back view of the fascia 504 in the closed position. The fascia 504 is operative to horizontally slide in and out of the rainshield housing 502 on roller/guide wheels 506 on each side of the fascia. The fascia may be retained in the rainshield housing in its docked (closed) position by one or more slam latches 507. Once the fascia is fully closed, these latches engage to lock the fascia in the closed position. In an exemplary embodiment the slam latches cannot be disengaged from the outside of the machine and may only be accessed and disengaged from the inside of the machine.

The slam latches may include a bolt 509 that is automatically urged into a slot 511 of the fascia, when the fascia is completely closed. The slam latch 507 may include a lever 513 that when pulled is operative to urge the bolt to move out of the slot. An exemplary embodiment of the slam latch may further include a pull handle 515 in operative connection with the lever 513. The pull handle 515 may extend toward the back of the machine to enable a technician to more easily unlock the slam latch from the back of the machine through a service door.

Figure 37:
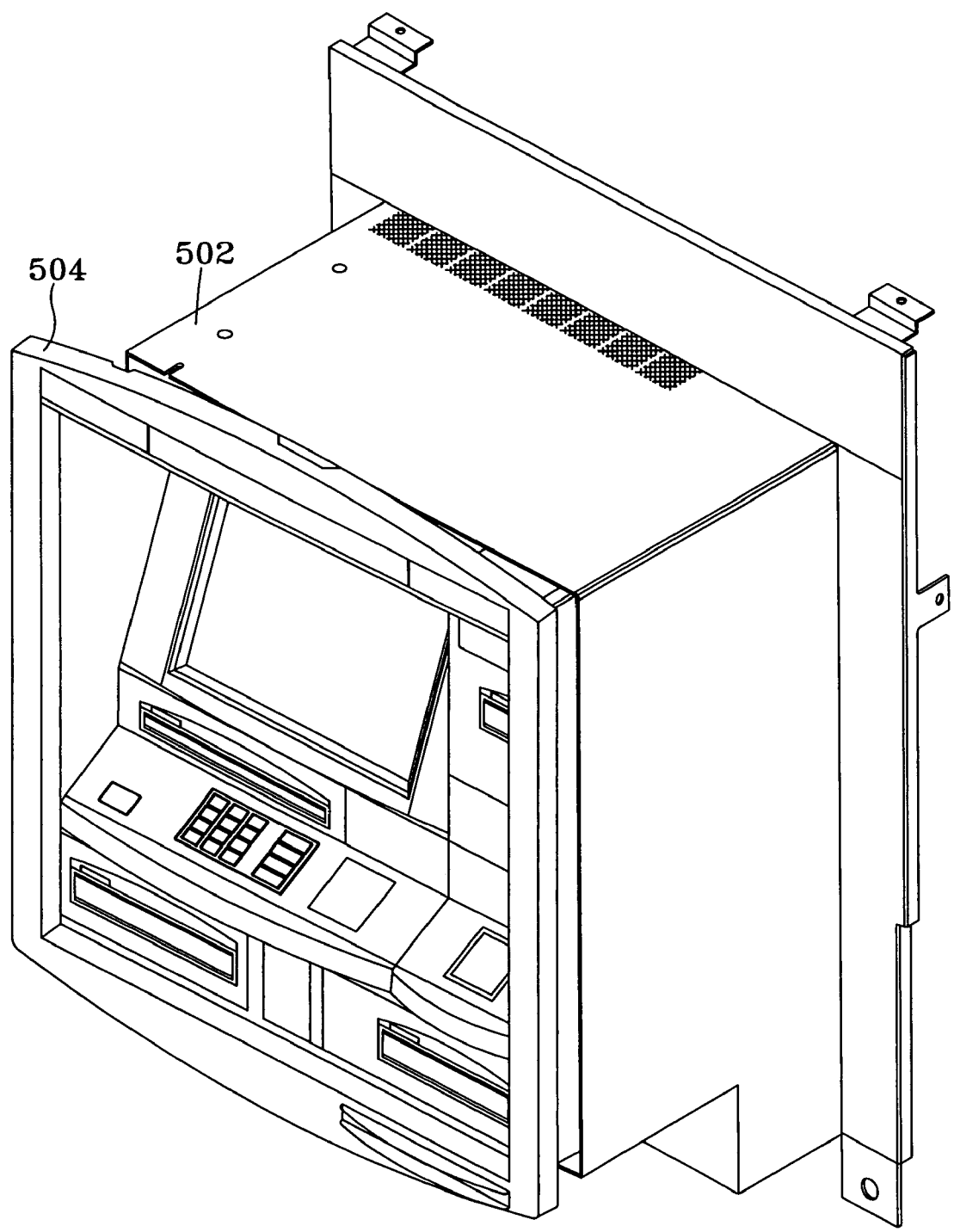
Figure 38:
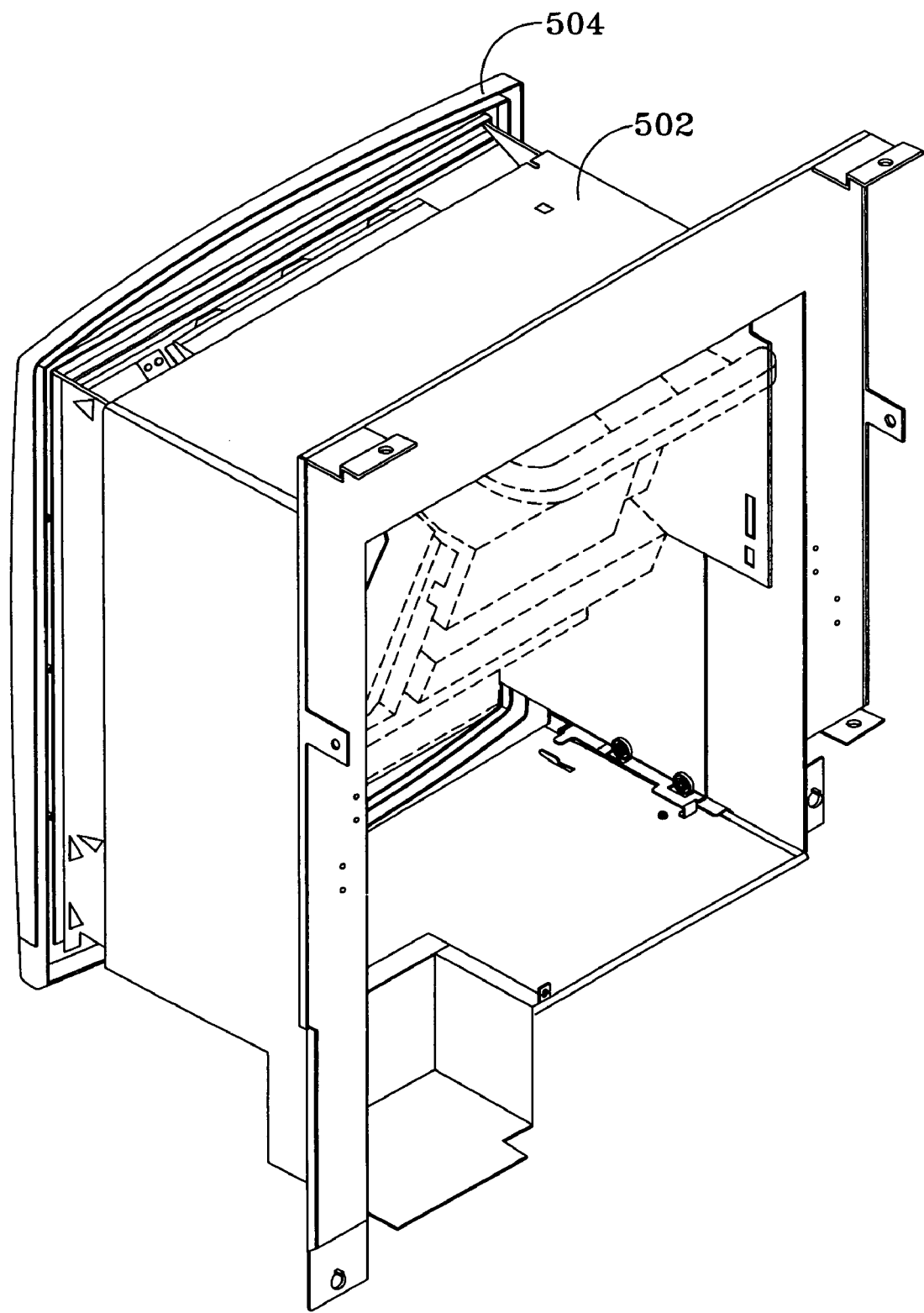
Figure 39:
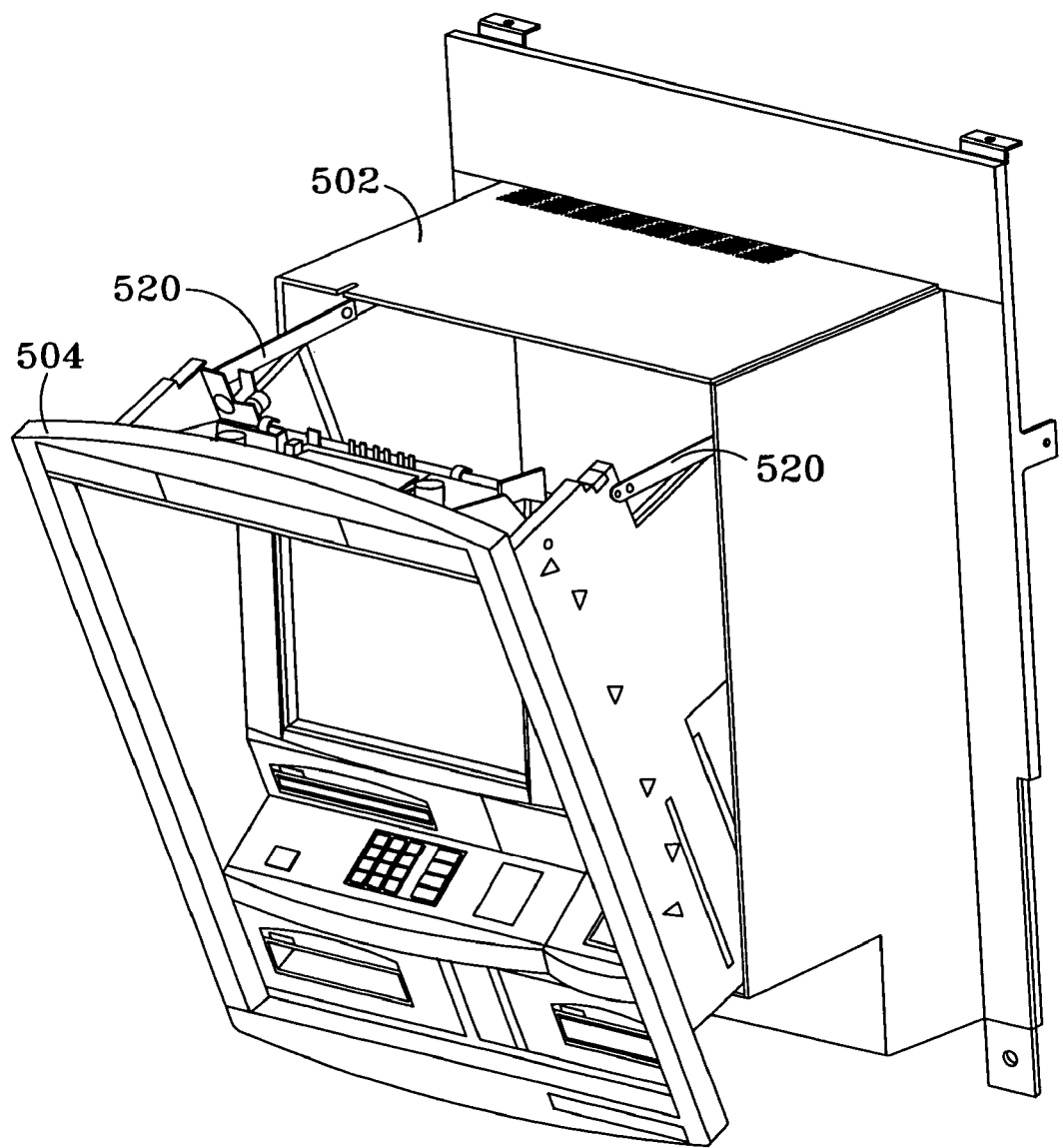
Figure 40:
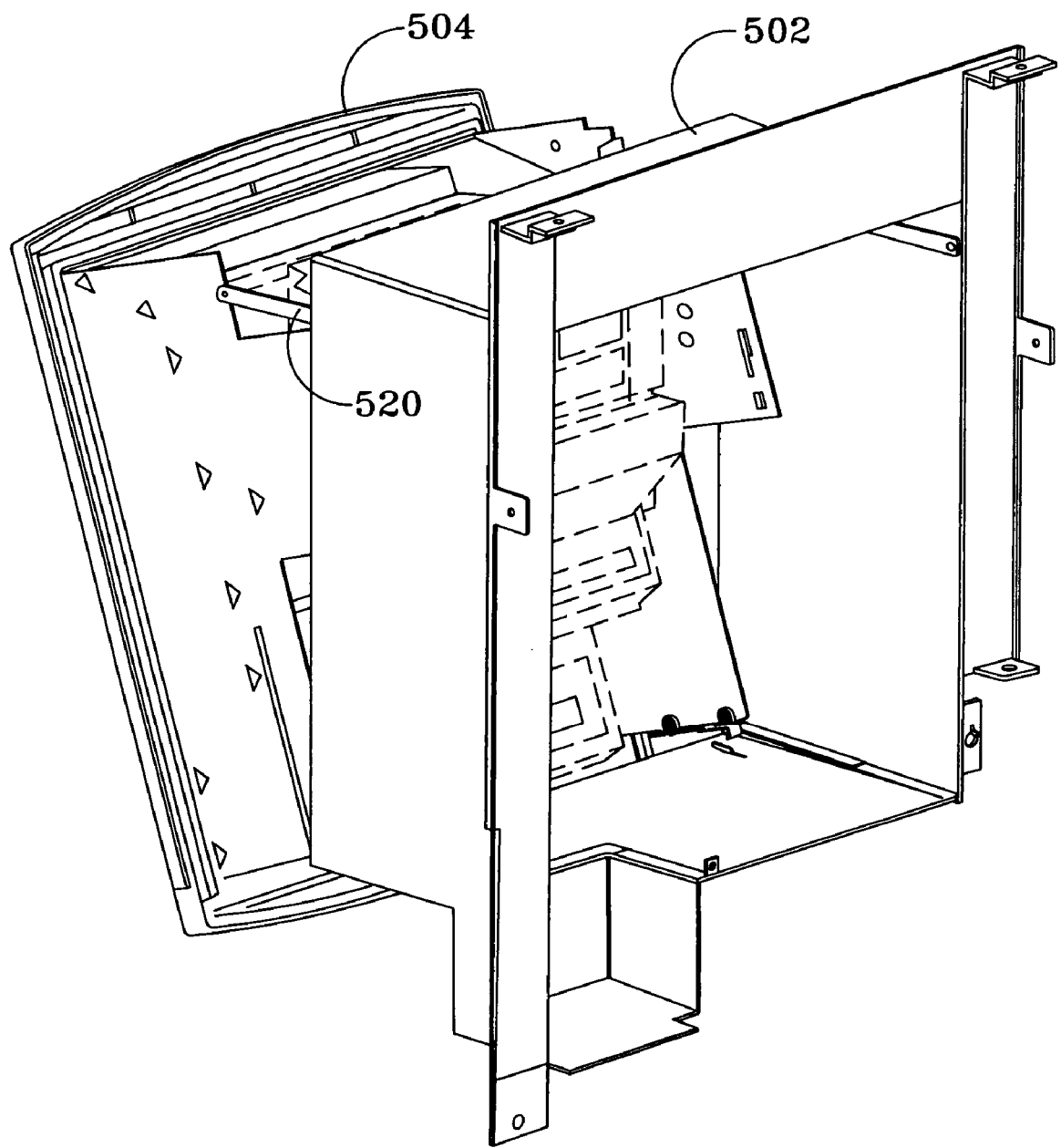
Figure 41:
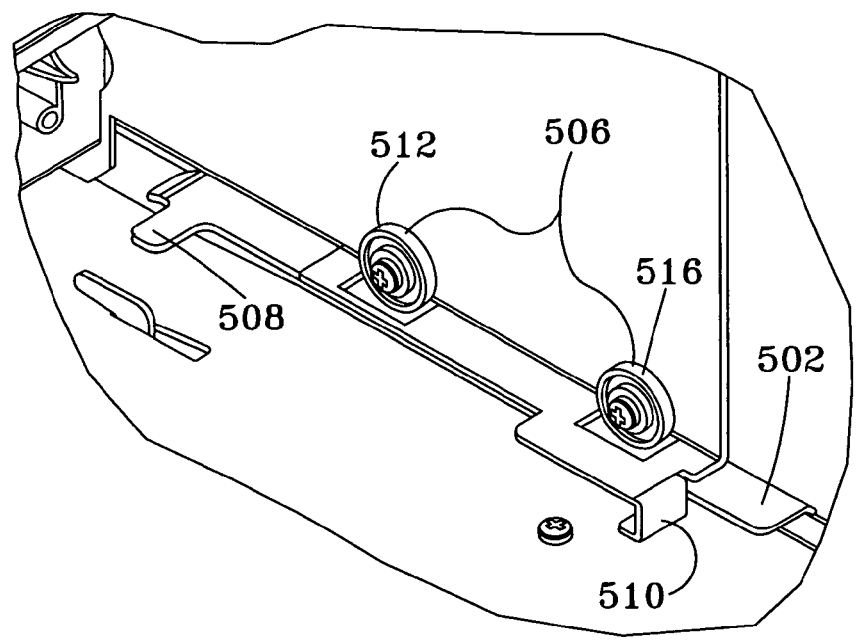
Figure 42:
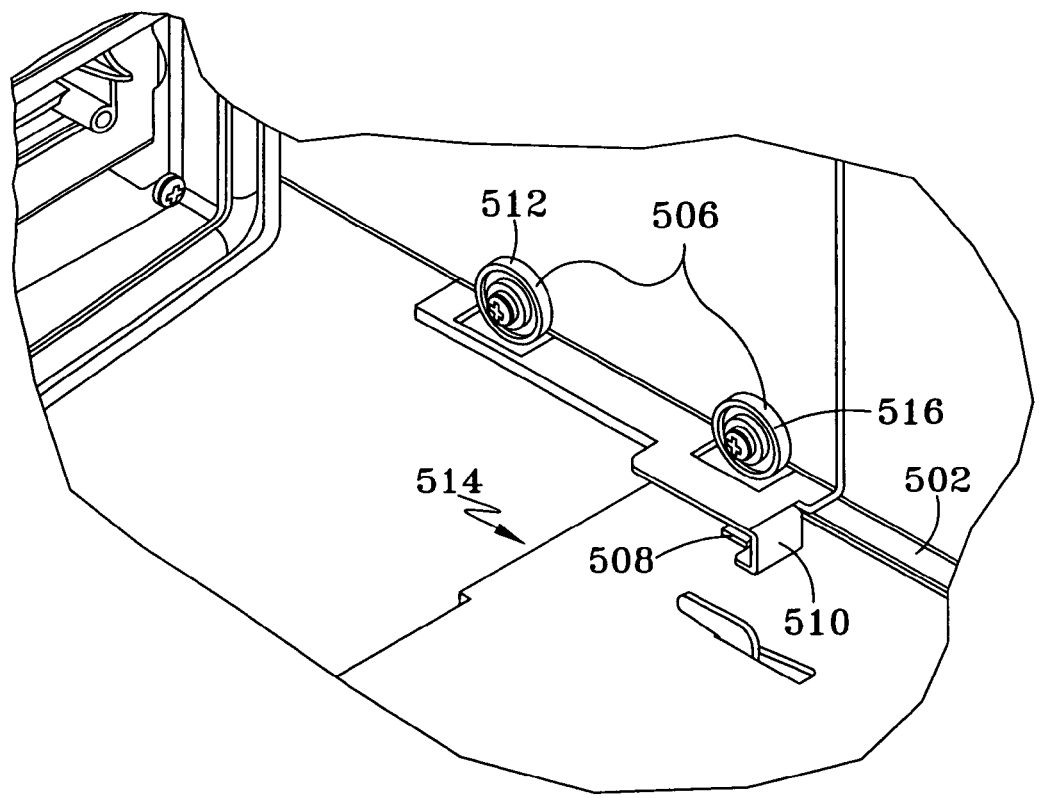

FIGS. 37 and 38 show the fascia sliding horizontally and outward from the rainshield housing 502. FIGS. 39 and 40 show the fascia extending outward from the rainshield in a tilted orientation. FIG. 41 shows the roller wheels 506 when the fascia is in the closed position. FIG. 42 shows the roller wheels 506 when the fascia is in the opened position. When the fascia is being opened or closed the roller wheels are operative to roll along the bottom wall of the rainshield housing 502. When the fascia is fully opened, the rainshield housing may include a projection 508 which is operative to block further outward movement of the roller wheels 506. In this described exemplary embodiment the fascia may include hooks 510 adjacent the roller wheels 506 which are operative to catch on the projection 508 of the rainshield housing to prevent further outward movement of the roller wheels.

Figure 43:
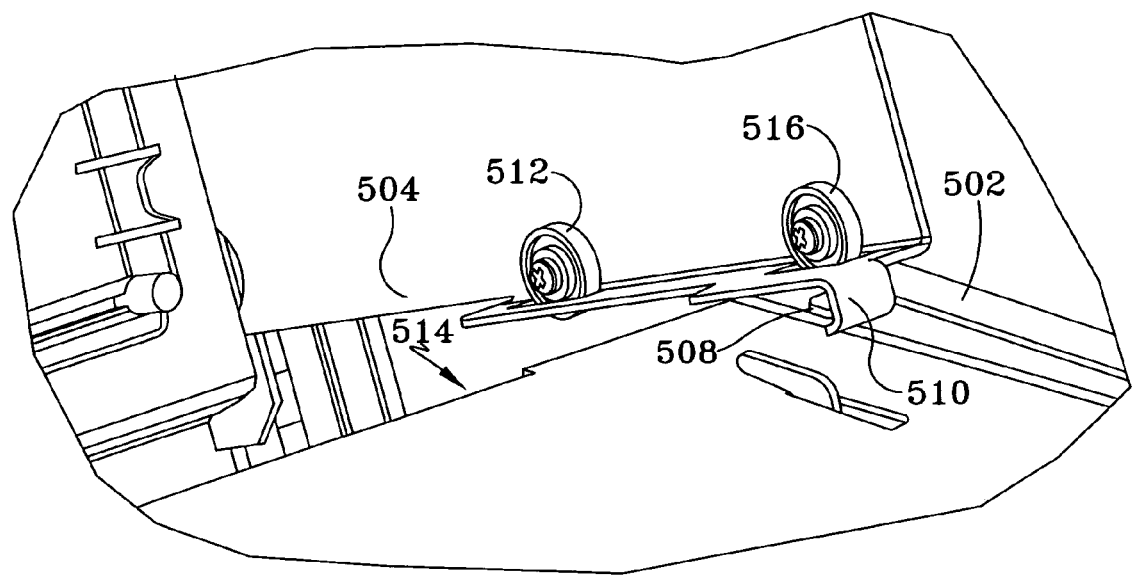

In this described exemplary embodiment, when the hook 510 has reached the projection of the rainshield housing, a forwardmost one of the roller wheels 512 may extend beyond the edge 514 of the rainshield, while a rearward roller wheel 516 remains in the rainshield. As shown in FIG. 43, in this extended position, the fascia is operative to tilt downwardly by pivoting on the projection 508.

Referring back to FIG. 39, an upper portion of the fascia may include articulating links 520 extending between the fascia 504 and the rainshield housing 502. The links 520 are operative to extend outward a set distance which limits the amount of tilt of the fascia 504 relative the rainshield housing 502.

Figure 44:
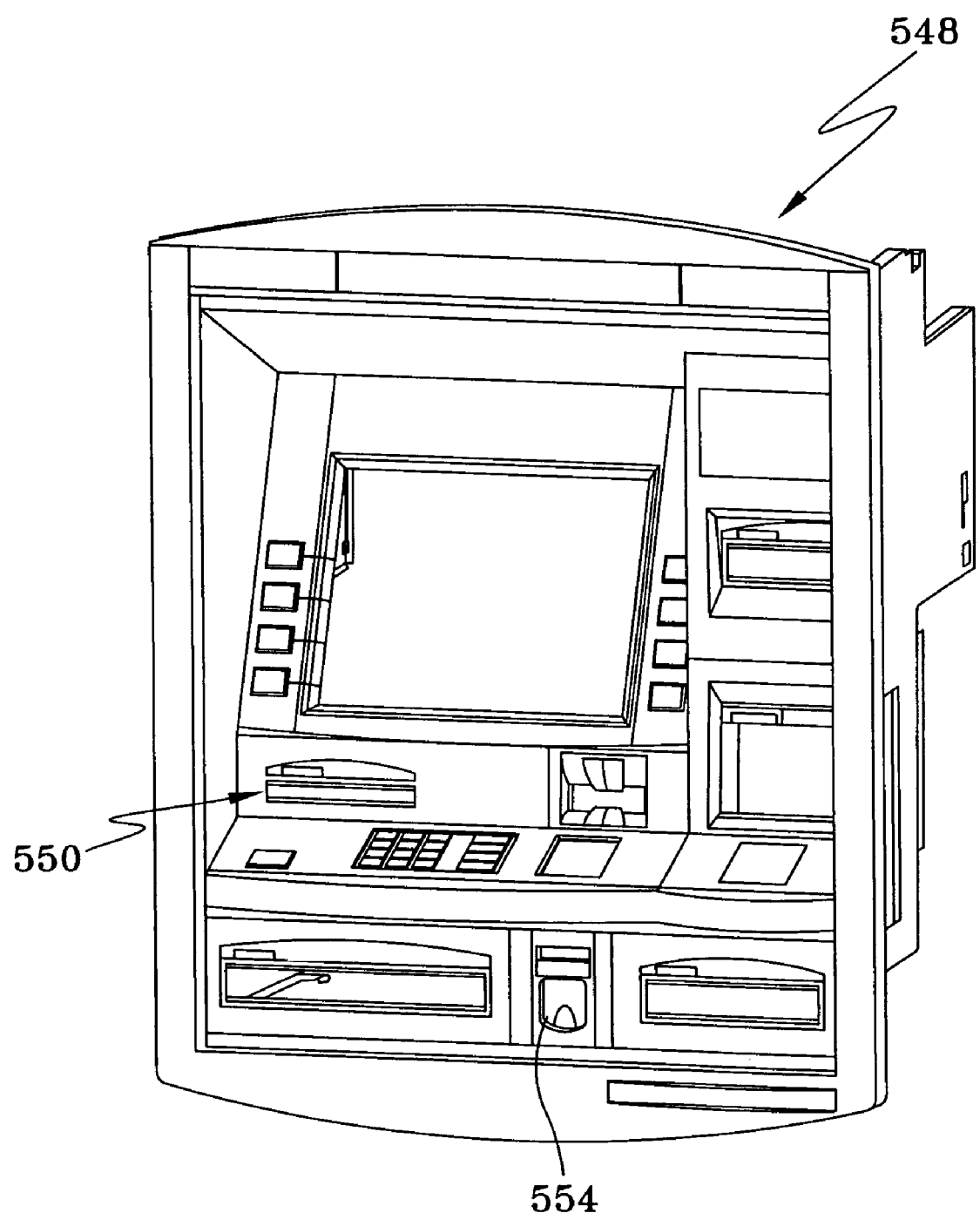
FIGS. 44–49 show exemplary embodiments of replaceable bezels for a fascia of an automated banking machine.
Figure 45:
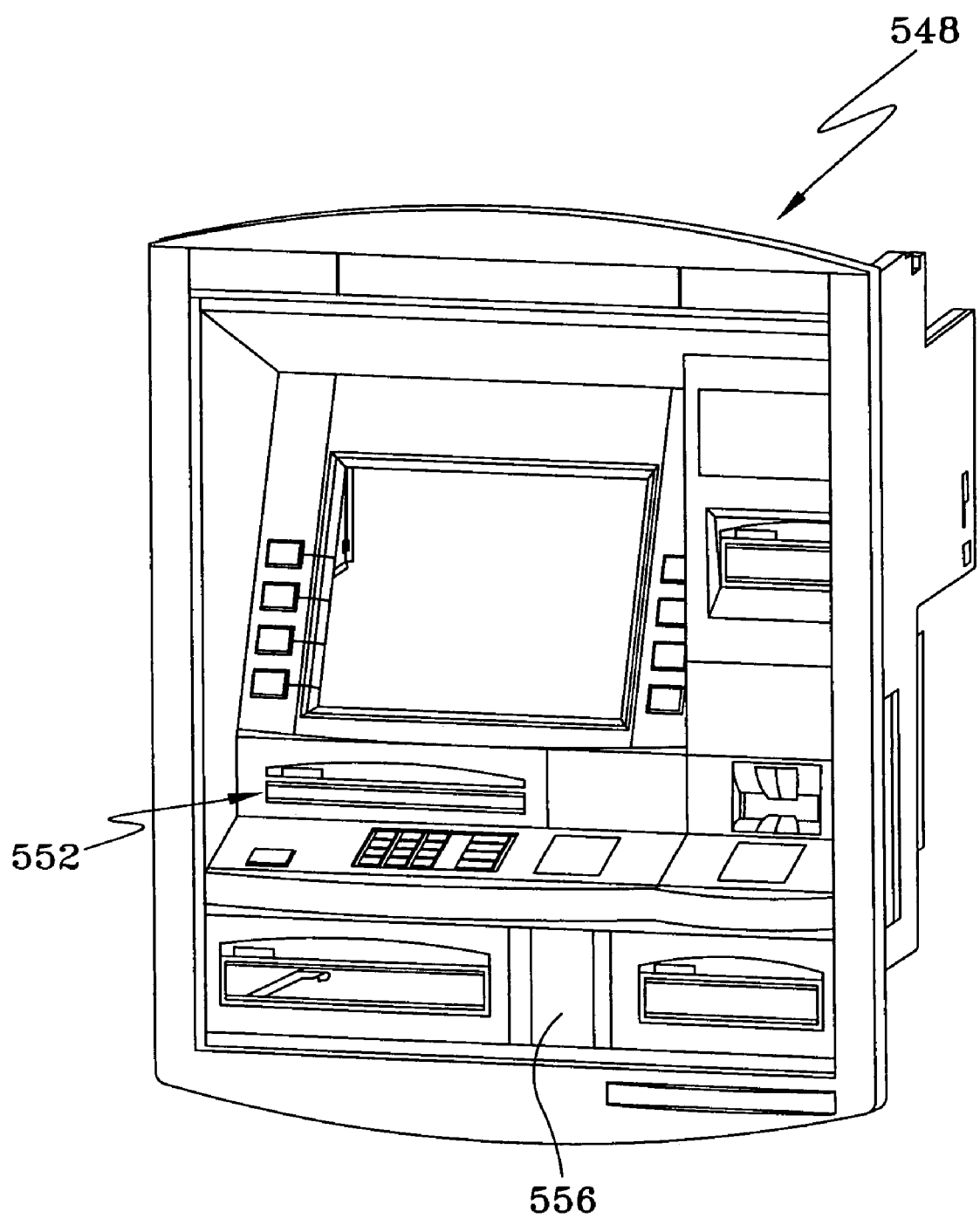

In exemplary embodiments of the automated banking machine, the fascia may be operative to enable different types of hardware devices with different sizes to be accessed through the fascia. For example as shown with respect to FIGS. 44 and 45, a fascia 548 may be configured with different bezels for engaging with a relatively narrow hardware device 550 (FIG. 44) or relatively wider hardware devices 552 (FIG. 45). Further, in some configurations bezels 554 may be included in the fascia for receiving hardware devices, while in other configurations a blank bezel 556 may be included in the fascia when a hardware device is absent.

Figure 46:
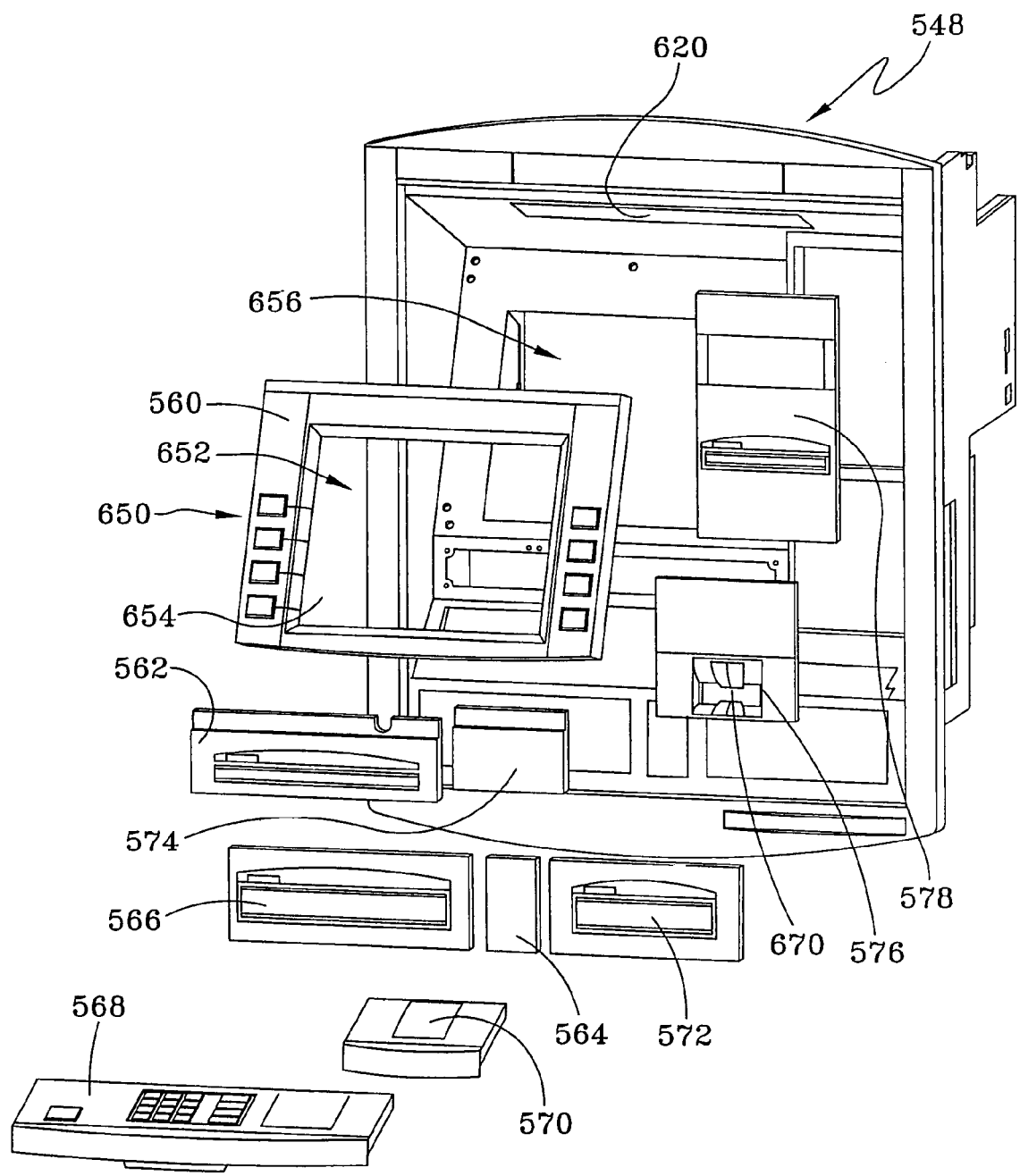

As shown in FIG. 46 an exemplary embodiment of the fascia 548 may be configured with a plurality of different bezels such as a display device bezel 560, a statement printer bezel 562, a blank coin bezel 564, a dispenser bezel 566, a keypad bezel 568, a bar code reader bezel 570, a depositor bezel 572, a blank card reader bezel 574, a card reader bezel 576, a receipt printer bezel 578, and/or other bezels which engage with hardware devices in the machine.

Figure 47:
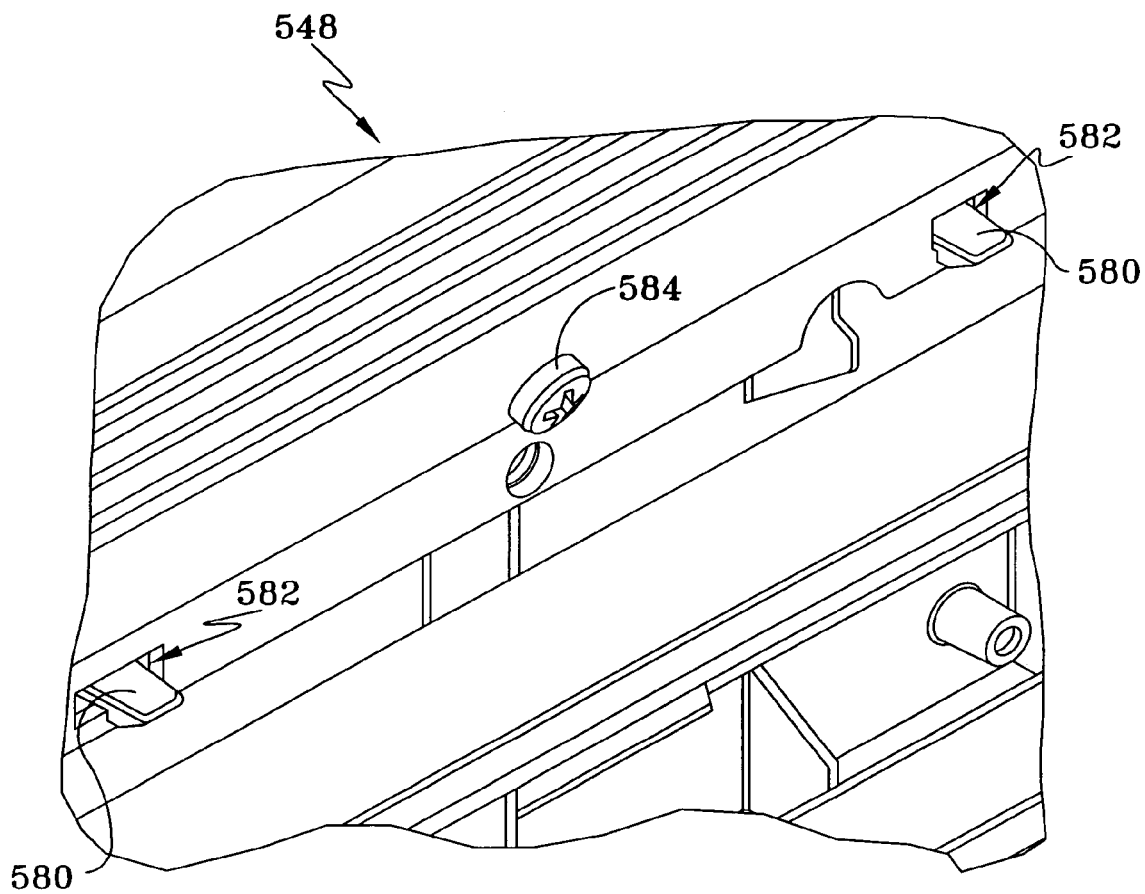

To provide flexibility as to the location of hardware devices mounted in the frame of the machine, the fascia may be adapted to receive individual bezels in different locations on the fascia. In this described exemplary embodiment of the fascia, the bezels may be installed from the front of the fascia and may be retained by snap features, tabs, or other fasteners from the back of the fascia. For example, FIG. 47 shows a back view of a fascia 548, in which a bezel is mounted to the fascia using snaps 580 on the bezel which extend through apertures 582 in the fascia. In addition, bezels may be mounted using fasteners such as screws 584 which are threaded into engagement with a bezel from the back of the fascia.

Figure 48:
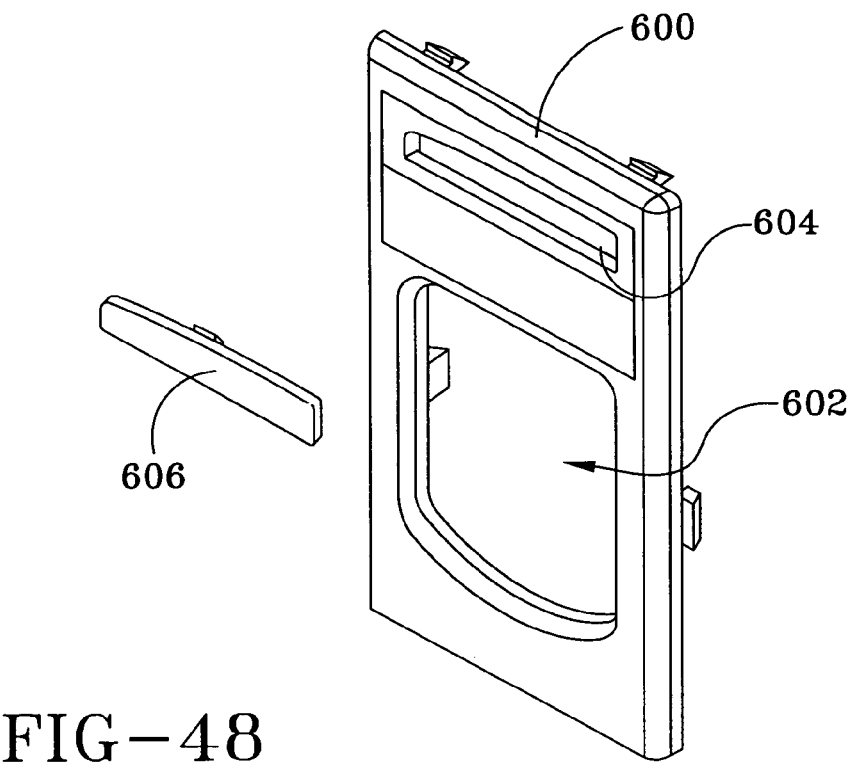
Figure 49:
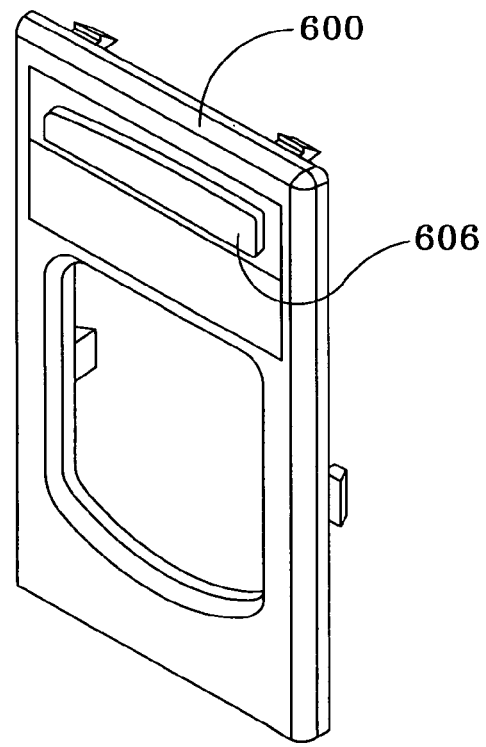

As shown in FIG. 48, these described exemplary embodiments of bezels 600 may include an opening 602 for providing access to a corresponding hardware device through the fascia. Such access may enable keys of a keypad or other portions of hardware devices to extend through the fascia. Such openings may also enable objects such as cash, cards, envelopes and other portable objects to pass into and out of a hardware device through the fascia. Exemplary embodiments of hardware devices in an ATM may include LEDs or other display elements which provide information to a user of the machine. For such hardware devices, corresponding bezels may include one or more further openings 604 which are adjacent the display elements of the hardware device. The further openings 604 enable the display elements such as LEDs of hardware devices to be visible through the fascia. As shown in FIG. 49, the bezel 600 may further include a transparent or translucent lens cover 606 in or adjacent to the further opening. Such a lens cover may have optical properties which are operative to magnify the light transmitted through the lens cover from the display elements of the hardware device. In other exemplary embodiments the lens covers may have other optical properties including acting as a diffuser or altering the color of the light emitted from LEDs.

Figure 50:
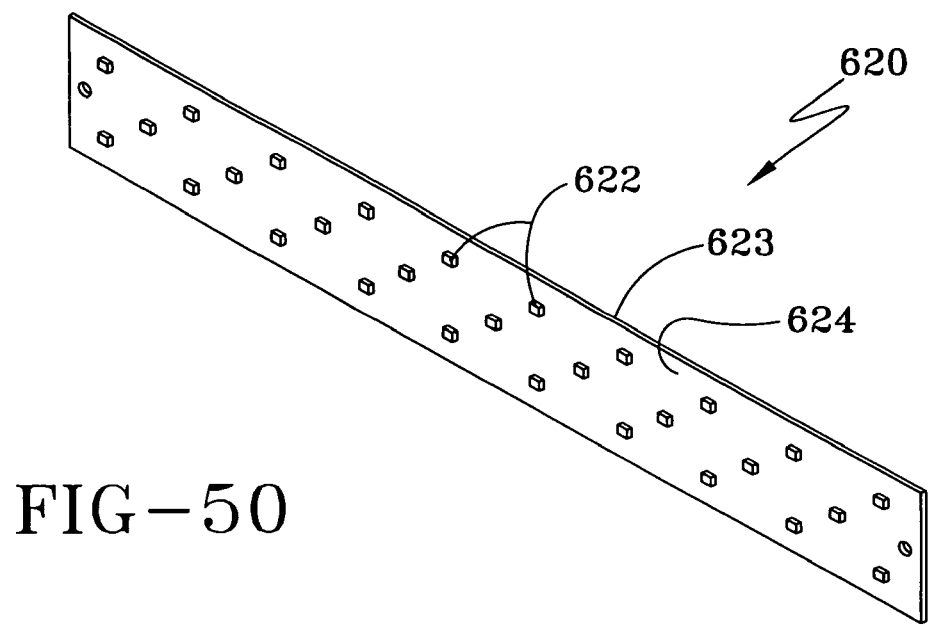
FIGS. 50–53 show an exemplary embodiment of a task lighting device for a fascia of an automated banking machine.
Figure 51:
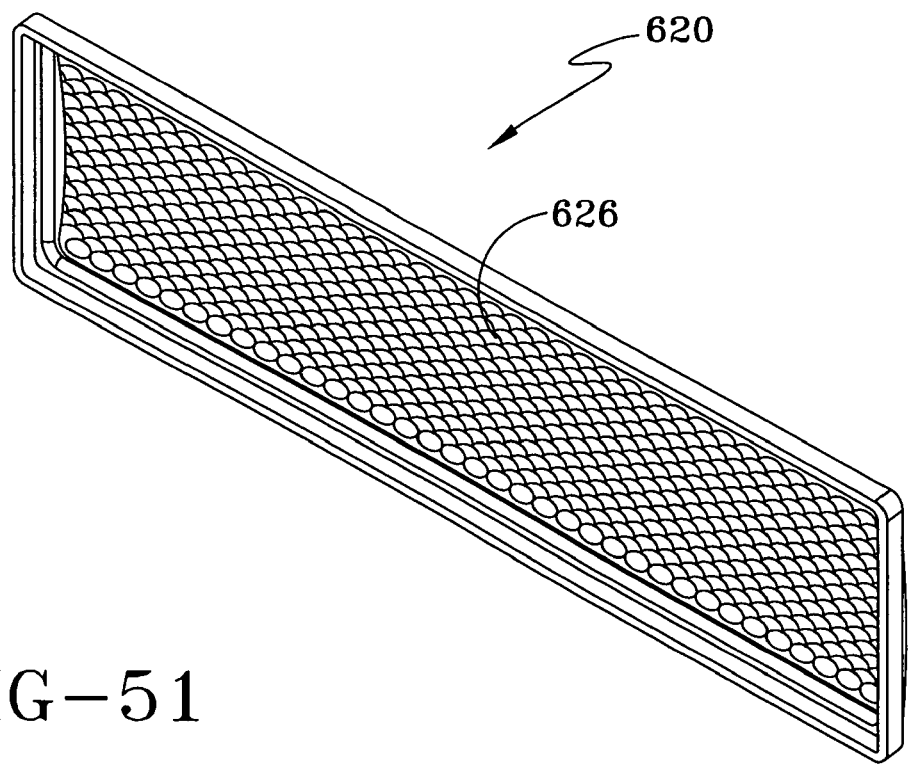

Referring back to FIG. 46, exemplary embodiments of the fascia 548 may include one or more task lighting devices 620 which may be operative to illuminate portions of the fascia including the machine's input, output and transaction function devices which are used by a consumer to perform transaction functions with the machine. As shown in FIG. 50, in an exemplary embodiment the task lighting device 620 may include a two dimensional LED grid 623 comprised of compact size LEDs 622 mounted on a PC board 624 or other substrate. Such an LED grid may be powered using a 24 Volt DC power supply of the machine for example. As shown in FIG. 51, the task lighting device may further include a parabolic refracting diffuser lens 626 or other diffuser device positioned in front of the LED grid 623.

Figure 52:
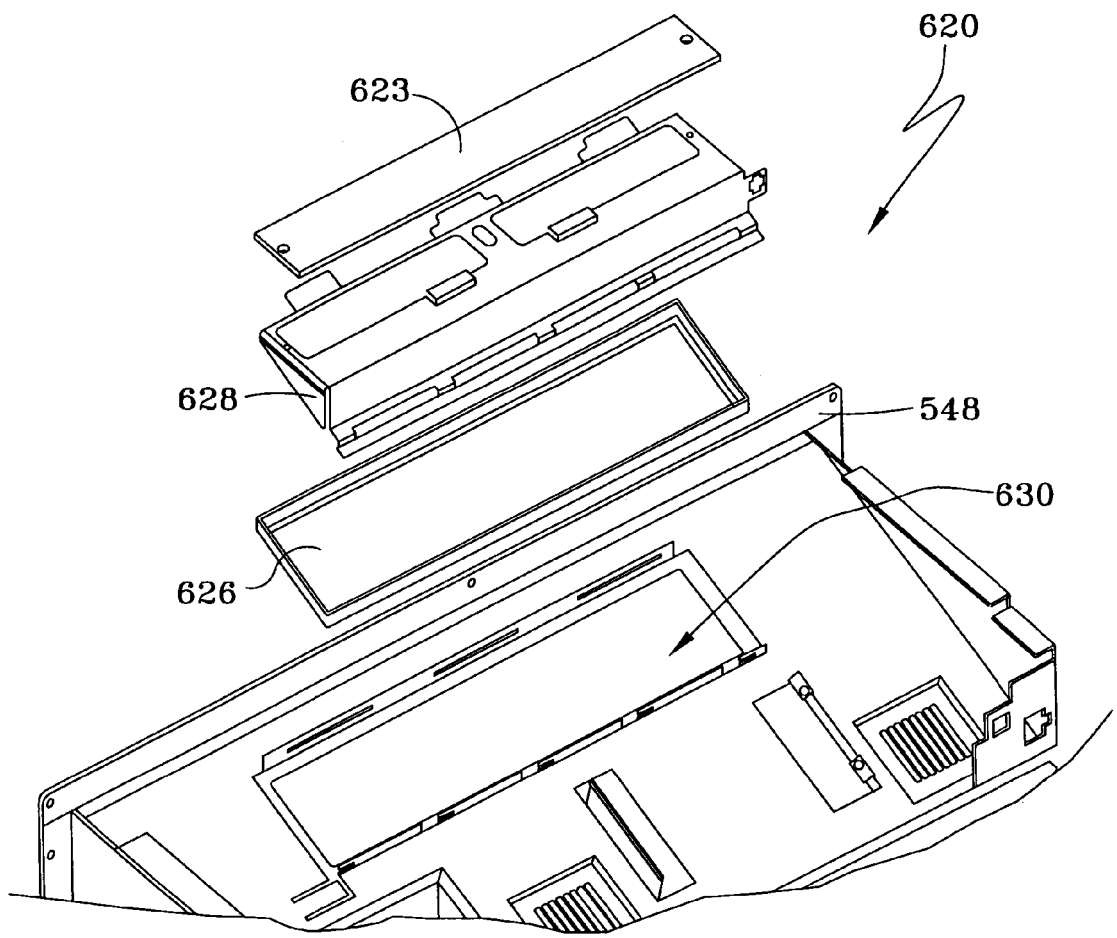
Figure 53:
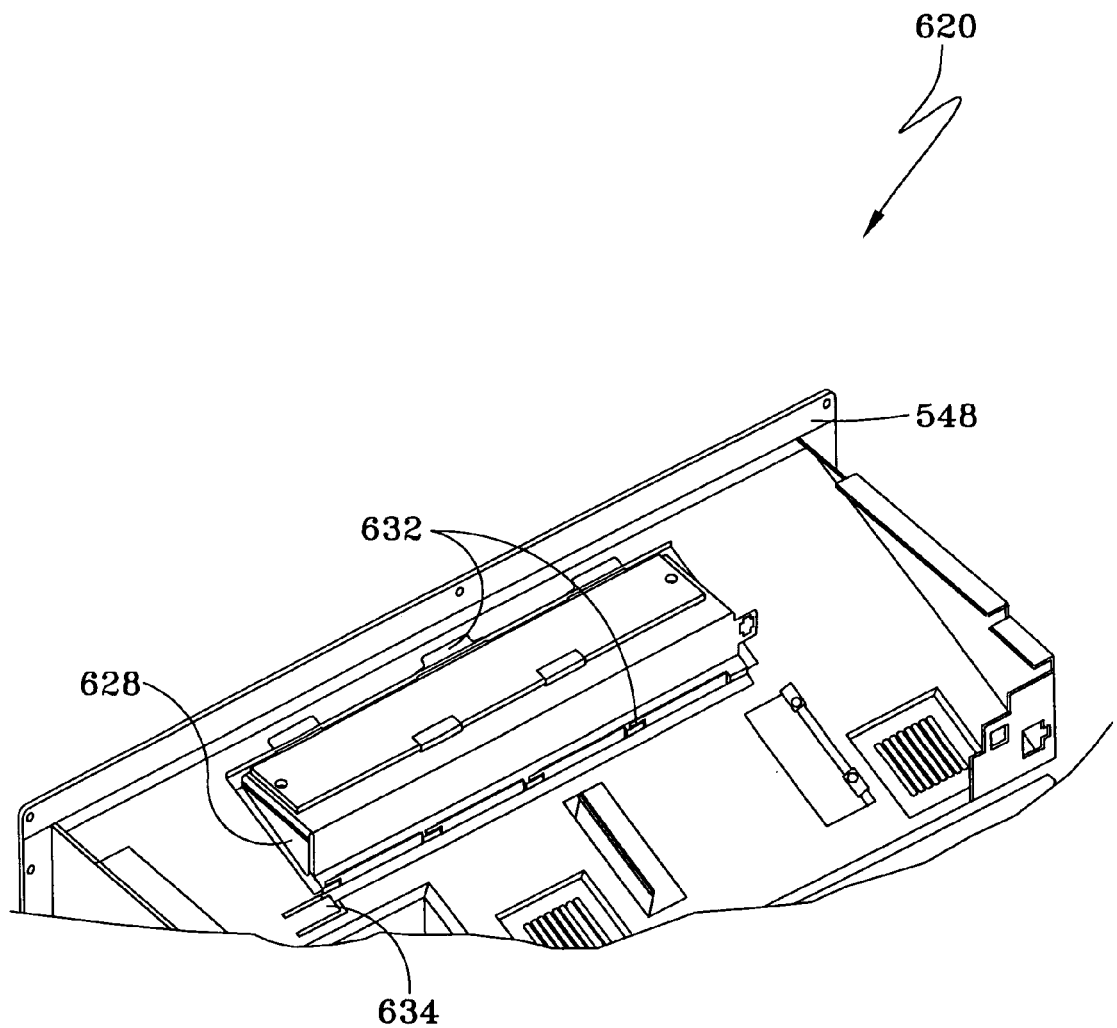

FIG. 52 shows an exploded view of the elements of an exemplary embodiment of the task lighting device 620. Here the task lighting device 620 may include a mounting bracket 628 that is in operative connection between the LED grid 623 and a diffuser lens 626. The combination of the LED grid 623, mounting bracket 628 and diffuser lens 626 may be connected to the fascia 548 adjacent an opening 630 in the fascia. As shown in FIG. 53 the mounting bracket 628 may include slide and snap-on devices 632 which are operative to releasably connect the task lighting device 620 to the fascia 548. The fascia 548 may further include a flexible unlocking tab 634 which may be bent downward to enable the task lighting device 620 to slide out of engagement with the fascia 548.

Although the described exemplary embodiment of the task lighting device includes a plurality of LED light sources, in alternative exemplary embodiments, the task lighting device may include incandescent, fluorescent, halogen, or other light sources.

As discussed previously with respect to FIG. 46, a fascia may include a removable display device bezel 560 which covers a display device of the machine such as an LCD or CRT monitor. In exemplary embodiments such a display device bezel 560 may include function keys 650 therein.

In exemplary embodiments, the fascia 548 includes an opening 656 at which the display device is mounted. The display device bezel 560 may include a corresponding opening 652 that is covered with a transparent vandal shield 654. Such a shield may be comprised of a crack or shatter resistant glass or plastic and may be operative to protect the display device from weather, and/or objects which could damage the display device.

In an exemplary embodiment the display device bezel 560 may include a gasket. When the display device bezel 560 is mounted to the fascia 548, the gasket may be positioned between the display device bezel 560 and the fascia 548 in surrounding relation about the opening 656 through the fascia. In this described exemplary embodiment, the function keys 650 may be positioned outside the gasket to prevent water entering the function keys to drain through the opening 656 in the fascia. In this described exemplary embodiment, the fascia may include a relatively smaller hole for receiving wires therethrough from the function keys of the display device bezel. Such a hole may be positioned above the function keys 650 when the display device bezel is mounted to the fascia.

As discussed previously, bezels for mounting to the fascia may include an opening through which a hardware device is accessible. For example as shown in FIG. 46, the fascia may include a card reader bezel 576 with an opening 670 through which a card may be inserted or removed from a card reader device. When an automated banking machine is being serviced, it is often necessary to separate one or more hardware device from engagement with the fascia. Unfortunately, when a hardware device is removed in this manner, users that are unaware that the machine is down for servicing may continue to attempt to insert objects such as cards through the openings in the bezels. If the hardware device such as the card reader is not adjacent the bezel 676, the card may fall into the interior of the machine.

Figure 54:
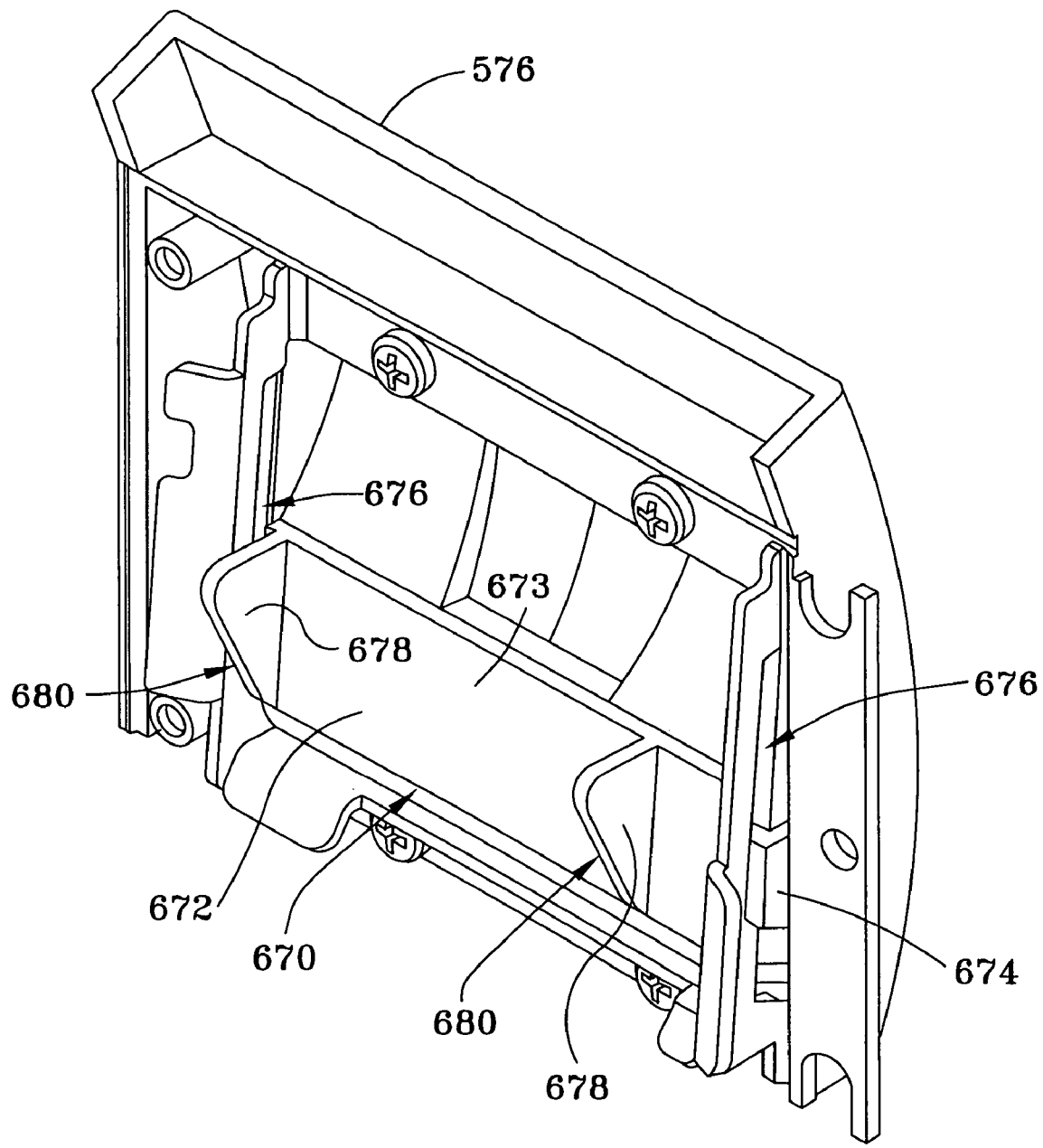
FIGS. 54 and 55 show exemplary embodiments of a movable gate for a bezel of an automated banking machine.
Figure 55:
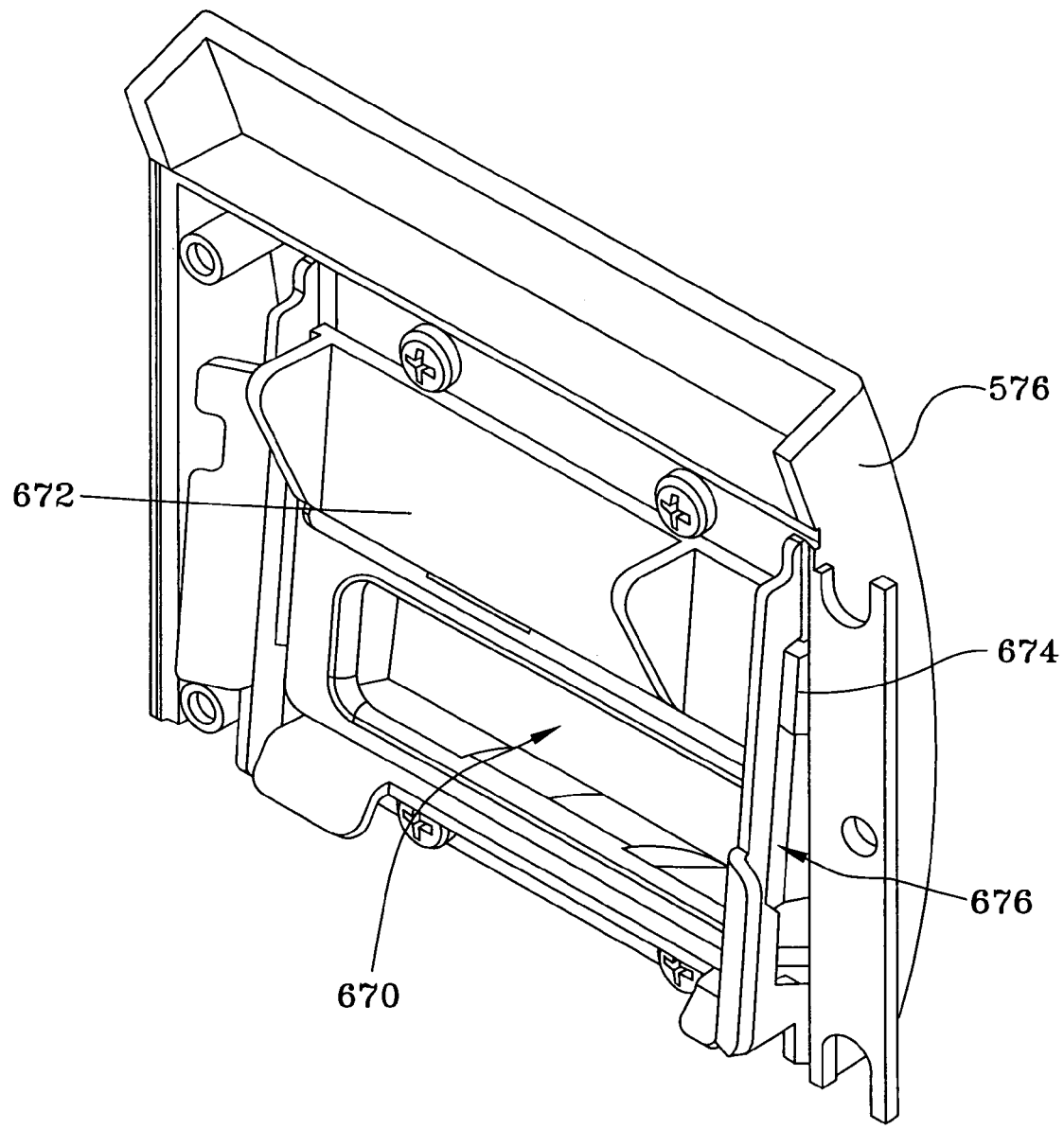

Exemplary embodiments of the bezels for the fascia may include gates which are operative to close the openings to the bezels when the corresponding hardware device is not positioned adjacent the bezel. FIG. 54 shows a back perspective view of a card reader bezel 576 which includes a gate 672. The gate 672 is operative to move between a first position which covers the opening 670 through the bezel 576 and a second position which uncovers the opening 670. FIG. 54 shows the gate 672 in the first or lowered position which covers the opening 670. FIG. 55 shows the gate 672 in the second or upward position which uncovers the opening 670. In this described exemplary embodiment the gate 672 includes projections 674 on opposed sides of the gate. The projections are operative to slide within vertical slots 676 adjacent opposed ends of the bezel 576. The gate may further include ribs 678 adjacent opposed ends of the gate. The ribs may include lower outer surfaces 680 which extend outwardly from the rear face or back surface 673 of the gate in an upward direction and at an acute angle with respect to vertically oriented back surface 673. When the card reader device is pulled back from the card reader bezel 576, gravity or an urging device such as a spring is operative to urge the gate to slide downwardly to cover the opening 670 of the bezel. When the card reader device is moved into engagement with the bezel, the card reader is operative to contact the outer surfaces 680 of the ribs 678 of the gate 672 and urge the gate upwardly away from the opening 670. In exemplary embodiments the acute angle of the lower surfaces 680 of the ribs may be between 30–60 degrees or some other angle which is operative to facilitate the gate being moved upwardly when the bezel 576 and card reader are brought into engagement.

In an exemplary embodiment, when the gate is in the second or lowered position, an outwardly facing surface of the gate may include a distinctive coloring and/or indicia which is visible through the opening. The distinctive color and/or indicia may serve to inform a user that the machine is not in service. For example, the gate may include a red coloring and/or may have words thereon representative of the machine or device being out of service.

As discussed previously, the automated banking machine may include floating bezels which provide an opening that may move vertically and/or horizontally to align with a hardware device. Also, in exemplary embodiments, the machine may include hardware devices which are operative to move in three dimensions relative the frame of the machine to automatically align and dock the hardware device with a fixed opening in a bezel of the fascia.

Figure 56:
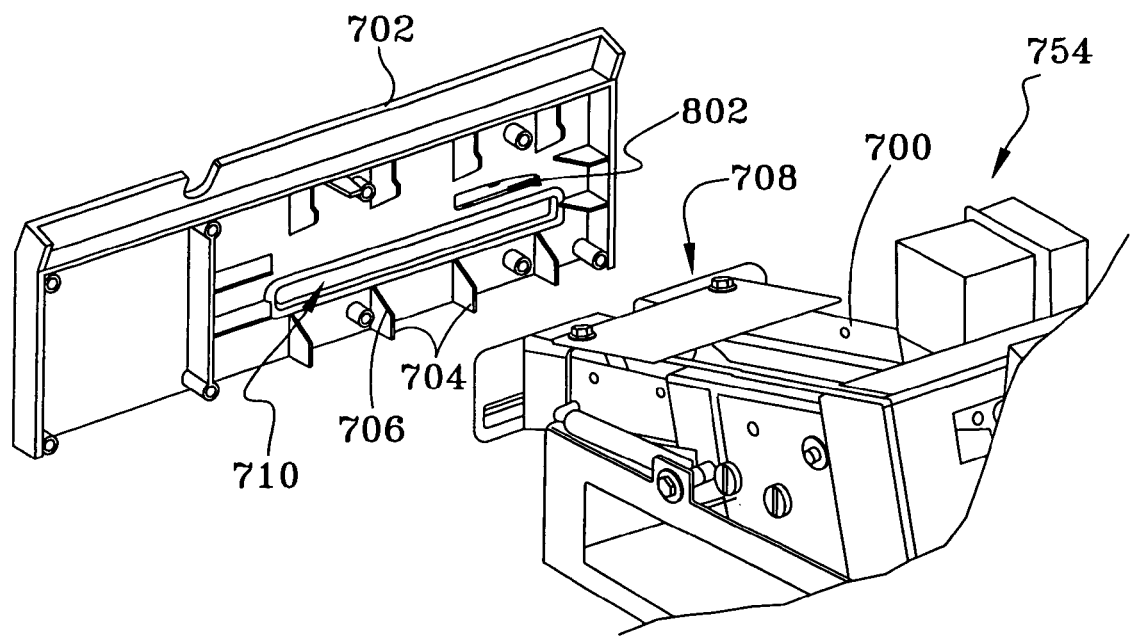
Figure 57:
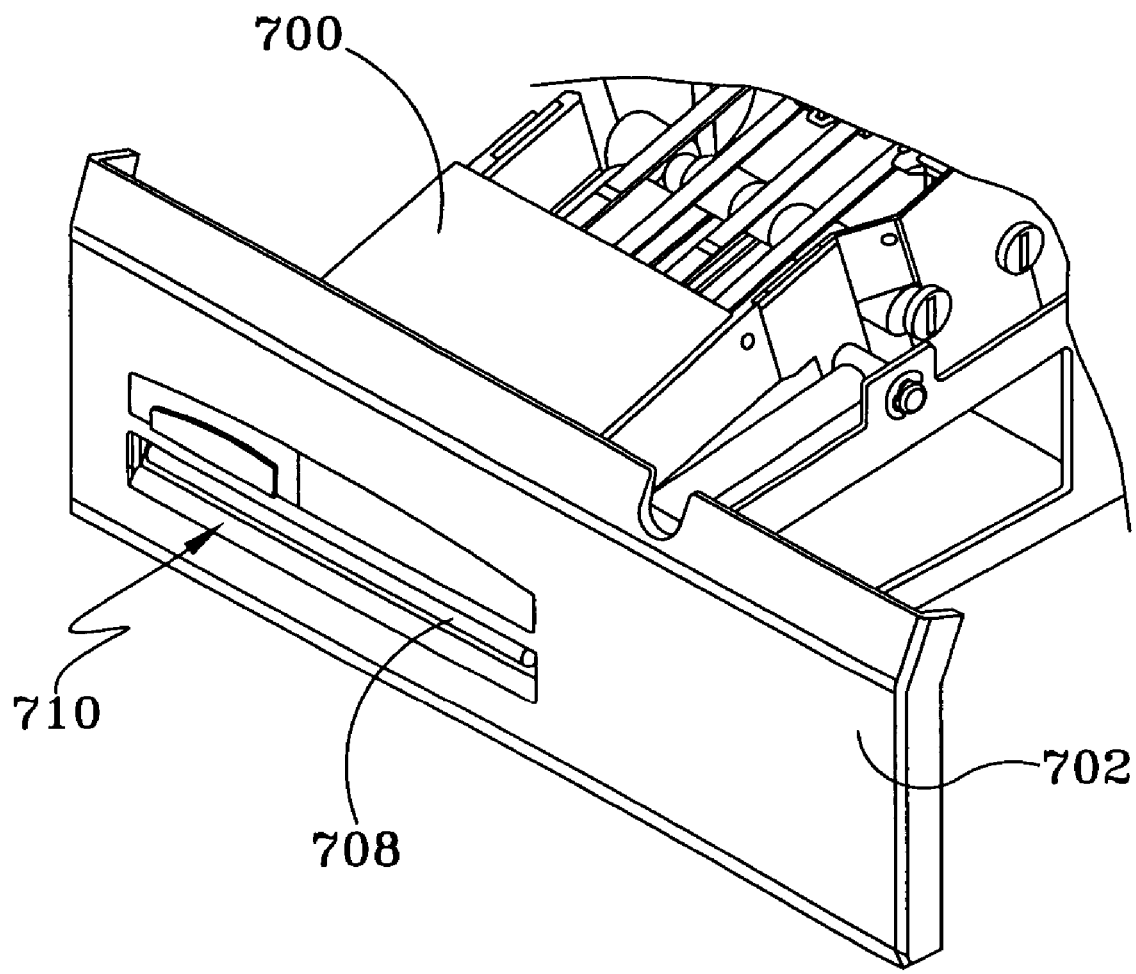

For example FIG. 56 shows an exemplary embodiment of a receipt printer device 700 which is operative to dock with a receipt printer bezel 702. Here the bezel includes one or more alignment ribs 704. The alignment ribs include inwardly angled or curved surfaces 706 which are operative to guide the front 708 of the receipt printer device 700 into docked engagement with the opening 710 of the bezel 702 when the fascia and receipt printer device are brought together. In exemplary embodiments the angled surface 706 of the alignment ribs may extend downwardly from below the opening 710 in the bezel 702 at an acute angle with respect to the generally vertical back surface of the bezel. Such an acute angle of the angled surface 706 may be between 30–60 degrees or some other angle that is operative to guide the printer into alignment with the opening 710 in the bezel when the printer and bezel are brought into engagement. In exemplary embodiments; a bezel of the fascia and a hardware devices may be brought together when a previously opened fascia is moved into a closed position relative the frame of the machine. In other exemplary embodiments, a bezel of the fascia and a hardware device may be brought together when a hardware device is returned from an outer service position to an inner docked position relative to the frame. FIG. 57 shows the receipt printer device 700 docked in aligned relation with the bezel 702.

Figure 58:
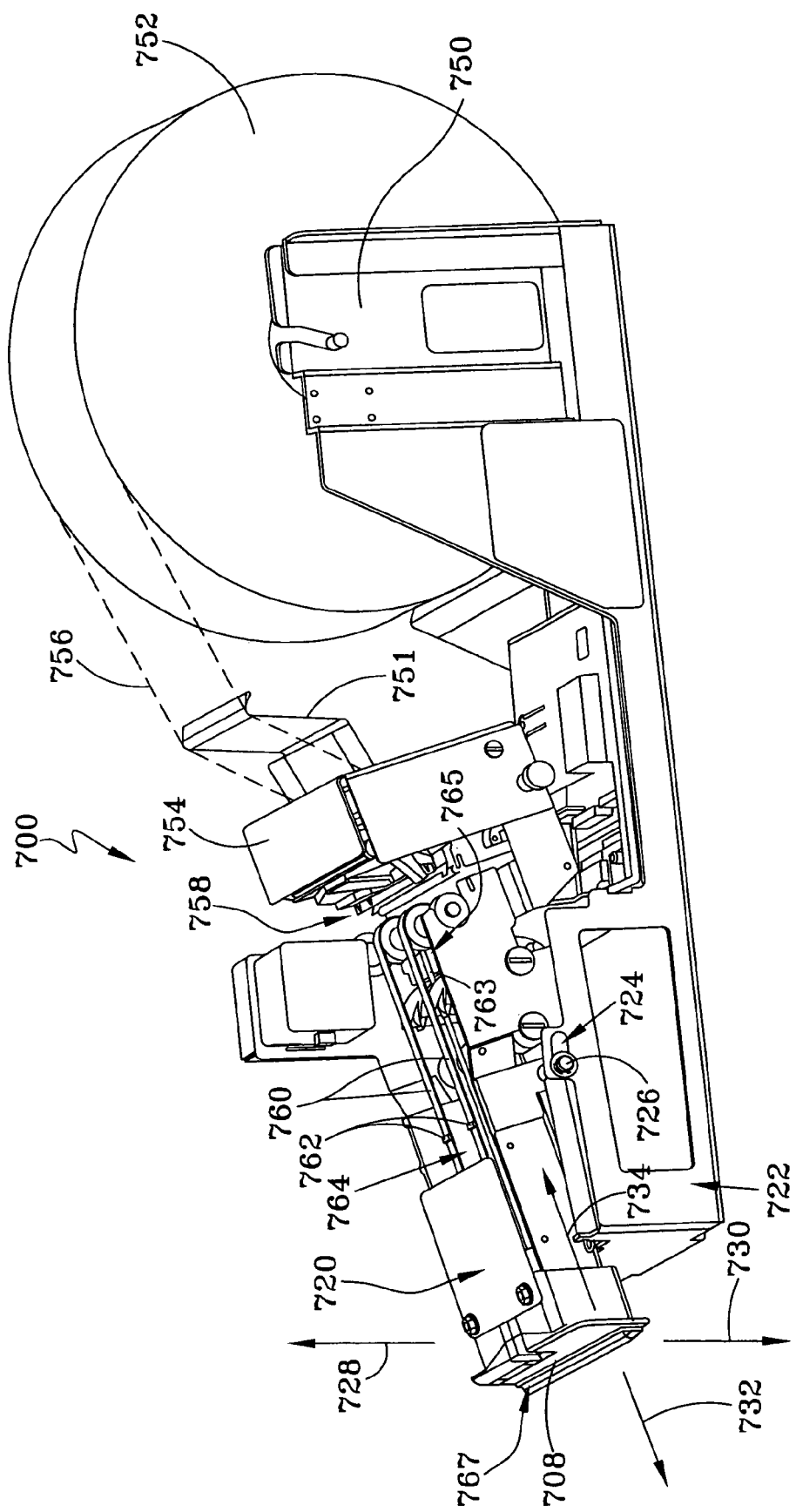

To achieve three dimensional adjustment of the hardware device, all or portions of the hardware device may be operative to move relative to the frame of the machine between a plurality of different up-down, side-to-side and forward-rearward positions. For example, FIG. 58 shows a perspective view of an exemplary embodiment of the receipt printer 700. In this described exemplary embodiment, the receipt printer may include movable portion 720 that is in pivoting connection with a fixed portion 722. When mounted to a frame of the automated banking machine, the fixed portion 722 may be mounted in generally rigid engagement with the frame. The movable portion 720 may then be operative to pivot with respect to the fixed portion 722 and the frame of the machine.

In this described exemplary embodiment, the receipt printer includes one or more pins 726 in operative connection between the movable portion 720 and the fixed portion 722. The movable portion 720 is operative to pivot with respect to the fixed portion at the pins 726. For example is this described exemplary embodiment, the pins 726 may extend from the movable portion 720 into pivoting engagement within slots 724 in the fixed portion 722. However, it is to be understood that in alternative exemplary embodiments, the fixed portion may include pins which extend into pivoting engagement with slots in the movable portion. In either embodiment, a front or exit end 708 of the movable portion 720 is operative to move in an upward direction 728 or a downward direction 730 relative the fixed portion 722 and fascia by pivoting the movable portion 720 with respect to the fixed portion 722.

As used herein the exit end 708 corresponds to the portion of the printer in which a sheet such as a receipt exits the printer. However, it is to be understood that in other types of transaction functions devices the front of the device may correspond to an input end which is operative to receive a deposit. Whether the front of a transaction function device corresponds to an exit end, input end or both, the portion of the front of the transaction function device which receive or outputs an item through an opening of the fascia is referred to herein as an opening to the transaction function device.

Figure 59:
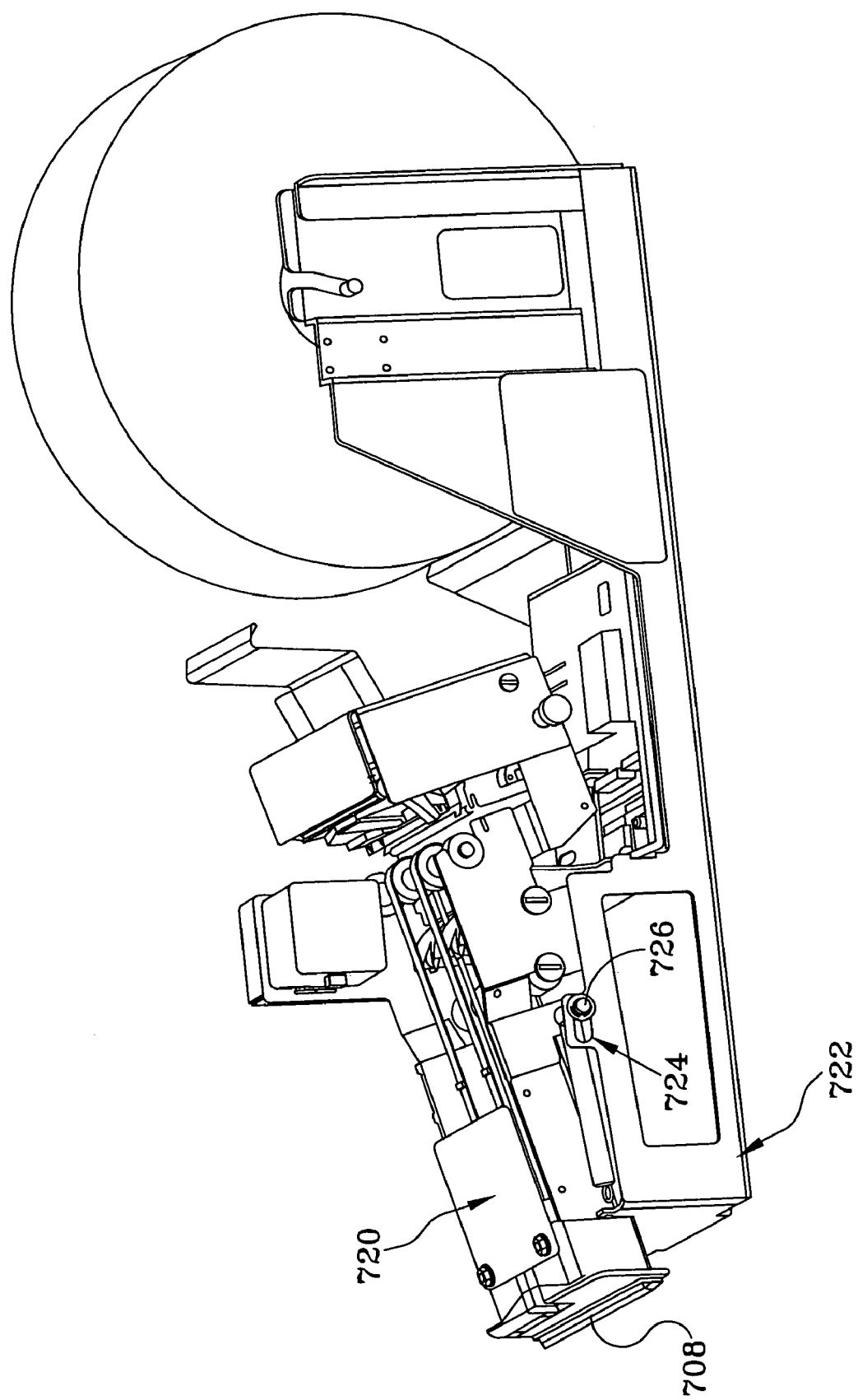

In the exemplary embodiment, the slots 724 may include a horizontal length which is longer than the diameter of the pins 726 and which is operative to enable the pins 726 to move forward or rearward in the slots 724. As a result the exit end 708 of the movable portion is operative to move in a forward direction 732 or a rearward direction 734 by the movement of the pins 726 in the slots 724. FIG. 58 shows an example of the pins 726 moved to a forward position in the slot 724, which moves the exit end 708 of the movable portion into a forward position with respect to the fixed portion 722. FIG. 59 shows an example of the pins 726 moved to a rearward position in the slot 724, which moves the front 708 of the movable portion into a rearward position with respect to the fixed portion 722.

Figure 60:
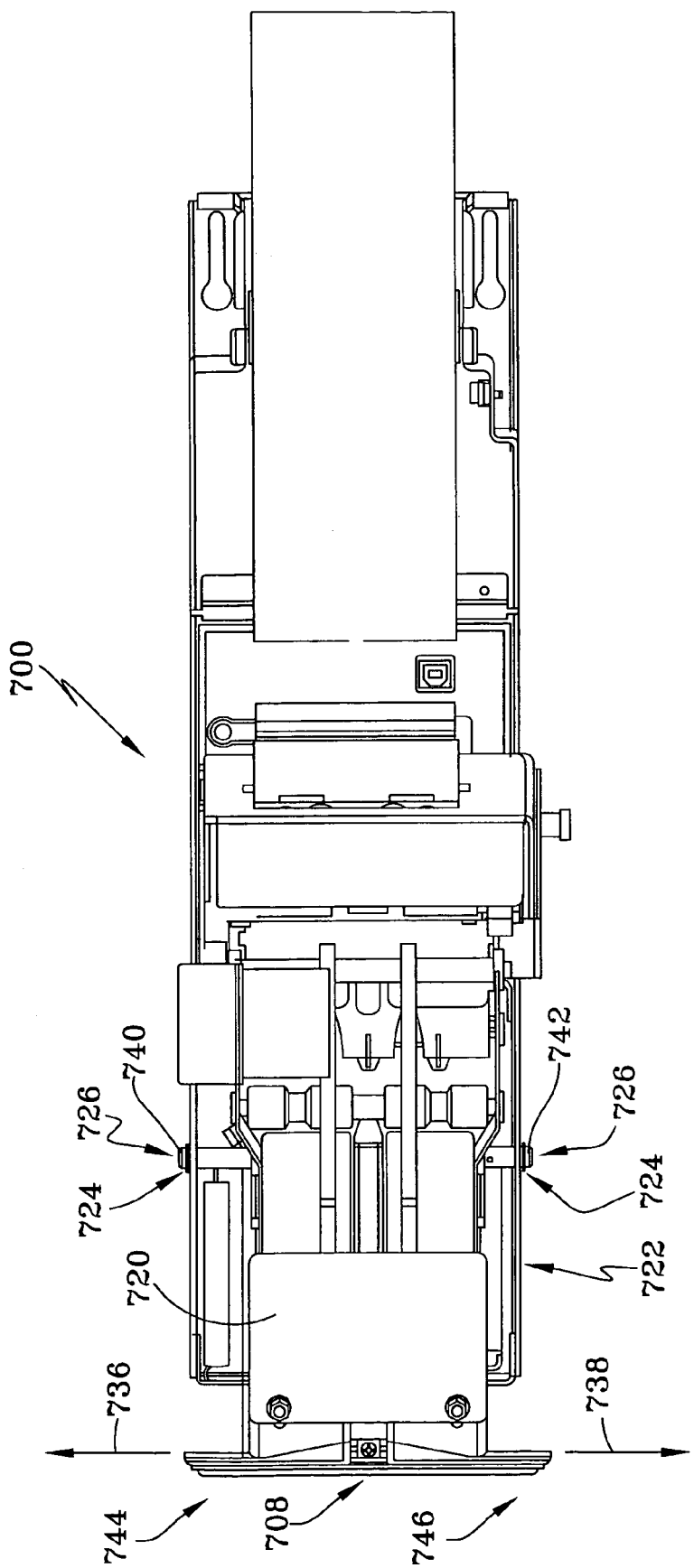

In addition to the pins of the receipt printer being operative to pivot with respect to the slots of the receipt printer and being operative to move to different forward or rearward positions in the slots, the pins 726 may further be operative to move in transverse directions with respect to the slot or vertical plan that includes the slot. For example FIG. 60 shows a top view of the receipt printer. The exit end 708 of the movable portion 720 is operative to move in either of the opposed side-to-side directions 736, 738 by the transverse movement of the pins 726 with respect to the slots 724.

In addition to the pins 726 moving in synchronous forward-rearward or upward-downward directions with respect to the slots 724, in exemplary embodiments, the pins may move independently with respect to each other in their respective slots 724. For example, a first one of the pins 740 may be operative to move to a forward position in its corresponding slot, while the second one of the pins 742 moves to a rearward position in its corresponding slot. As a result a first side 744 of the exit end 708 of the movable portion may move to a position that is further forward relative the fixed portion 722 compared to the position of a second side 746 of the exit end 708 of the movable portion relative the fixed portion 722.

Although in this described exemplary embodiment of the receipt printer, the movable portion is in operative connection with a fixed portion using pins which are operative to pivot and slide within elongated slots, in other exemplary embodiments, hardware devices or portion of the hardware devices may be operative to move relative to the frame and fascia using other connection devices. For example, in an alternative exemplary embodiments, a hardware device of the machine may include a movable portion that is mounted to a fixed portion using flexible, extensible, and/or resilient connection devices. An example of such flexible, extensible, and/or resilient connection devices may include a spring. In such an alternative exemplary embodiment the one or more springs may be used to connect the movable portion to the fixed portion of the hardware device. The springs may bias the movable portion into a home position. However, when the front of the movable portion contacts a bezel of a fascia, the springs may be operative to enable the movable portion to move out of its home position into an offset position in which the front of the movable portion is properly aligned and docked with the bezel of the fascia.

Referring back to FIG. 58, the exemplary embodiment of the printer may include a bracket 750 that is operative to support a roll of paper 752. Paper 756 from the roll of paper 752 may pass through a printer mechanism 754 which is operative to print indicia on the paper. In an exemplary embodiment, the printer mechanism may correspond to a thermal printer, ink jet printer, dot matrix printer or any other type of printer mechanism that is capable of producing indicia on the paper in one, or more colors on the paper 756. In this described exemplary embodiment, the fixed portion 722 of the printer may include the bracket 750 and the movable portion 720 may include the printer mechanism 754. In addition the movable portion 720 may include a spring 751 that is operative to apply tension to the paper which minimizes slack in the paper 756 as the movable member 720 moves with respect to the fixed member 722.

In an exemplary embodiment the printer mechanism may correspond to a thermal printer device which is operative to produce indicia such as letter and graphics in two colors. Such colors may include black and some other color such as red or blue based on the paper used to print the indicia. The printer may be operative to manage the power requirements for the printer head by alternating the input of power to the printer head through the use of different capacitors.

In the exemplary embodiment, the printer may further include a cutting mechanism 758 that is operative to cut the paper from the roll into individual receipts. In this described exemplary embodiment, the printer may include a set 764 of lugged belts 760 which are operative to rotate. A lower run 763 of the belts is operative to move the cut paper receipt across an inner surface 765 to the delivery opening 767 at the exit end 708 of the printer. The lugged belts 760 may include spaced apart projections 762 which are operative to assist the belts in grasping and urging the receipt paper to move from the printer mechanism 754 to the delivery opening 767.

FIG. 61 shows a front cross-sectional view of the receipt printer. The exemplary embodiment of the receipt printer may include a lower waffled surface 780 adjacent the exit end 708 of the printer. As used herein a waffled surface corresponds to a surface that includes a plurality of alternating and parallel ridges and troughs. The set 764 of lugged belts are operative to move a receipt over the waffled surface 780 and to urge the receipt to form a waffled or wavy shape which corresponds to the waffled surface 780. In the exemplary embodiment, the waffled surface may include a central ridge 782 positioned between two grooves 784, 786. Portions of the ends of the belts 760 may be positioned to move through the grooves 784, 786.

Although, the waffled surface 780 may be located adjacent the exit end 708 of the printer, in exemplary embodiments, the printer may further be operative to impart all or portions of the waffle shape into the receipt prior to reaching the exit end 708 of the printer. For example as shown in a cross-sectional side view of the receipt printer 700 in FIG. 62, the printer may include a elongated ridge 761 between the lower run 765 of the belts 760. When the belts move the receipt across the ridge, the ridge is operative to urge the center of the receipt to bow upward, while the belts are operative to urge portion of the receipt into the grooves.

In the exemplary embodiment, the automated banking machine may be operative to determine whether or not a user has taken a receipt from the receipt printer. For example, the receipt printer may include a sensor 790 which is operative to detect the presence or absence of a receipt adjacent the exit end 708 of the printer. The automated banking machine may use the sensor to determine if the receipt is still present after a predetermined amount of time has lapsed since the receipt was transported to the exit end 708 of the printer. When the machine determines that the user has not taken the receipt after the predetermined amount of time has lapsed, the machine may be operative to cause the receipt printer to retract the receipt.

In this described exemplary embodiment, the belts 760 may be driven in reverse to move the receipt away from the exit end the 708 of the printer and in a direction toward the printer mechanism 754. A gate 792 may rotate in response to gravity or other forces so that projections 796 of the gate 792 transversely extend through the lower run of the belts 760. When the receipt printer reaches the gate, the inner surface 798 of the gate is operative to direct a receipt 792 to move downwardly into a reservoir 799 for collecting retrieved receipts. Further examples of gates which may be used in exemplary embodiments of the printer are shown in U.S. Pat. No. 5,850,075 of Dec. 15, 1998 which is incorporated by reference herein in its entirety.

In exemplary embodiments, the receipt printer may include a serial, parallel, USB, or other interface for use with interfacing with the computer of the automated banking machine. In addition the printer may include one or more LED indicator lights 800 or other display elements which are operative to provide information about the operation of the printer to user's of the machine. Referring back to FIG. 56, the receipt printer bezel 702 may include a further opening 802 which is adjacent the LED indicator lights of the printer when the printer is docked adjacent the bezel 702, In alternative exemplary embodiments the bezel may include one continuous opening which combines the opening 710 for the delivery of a receipt through the bezel with the opening 702 for viewing the LED indicator lights of the printer.

An exemplary embodiment of the previously described waffle surface 720 may be orientated to slope downwardly from the printer mechanism 754 to the opening 710 through the bezel. In this orientation the waffled surface of the movable member may be operative to direct water entering the machine to drain back out of the bezel of the machine.

Although the previously described printer has been described as corresponding to a receipt printer, it is too be understood that the described features of the printer may also be used for other types of printers and/or other types of hardware devices in the automated banking machine. Such other types of printers in an automated banking machine may include a statement printer, passbook printer, ticket printer, money order printer or any other type of printer that may be used by an automated banking machine. Further the alignment and docking features of the described receipt printer and corresponding bezel may further be used in other hardware devices of the automated banking machine including, cash dispensers/acceptors, envelope dispensers/acceptors, card readers, display devices, coin dispensers/acceptors or any other hardware device which is accessible by a user through the fascia of the machine.

Figure 64:
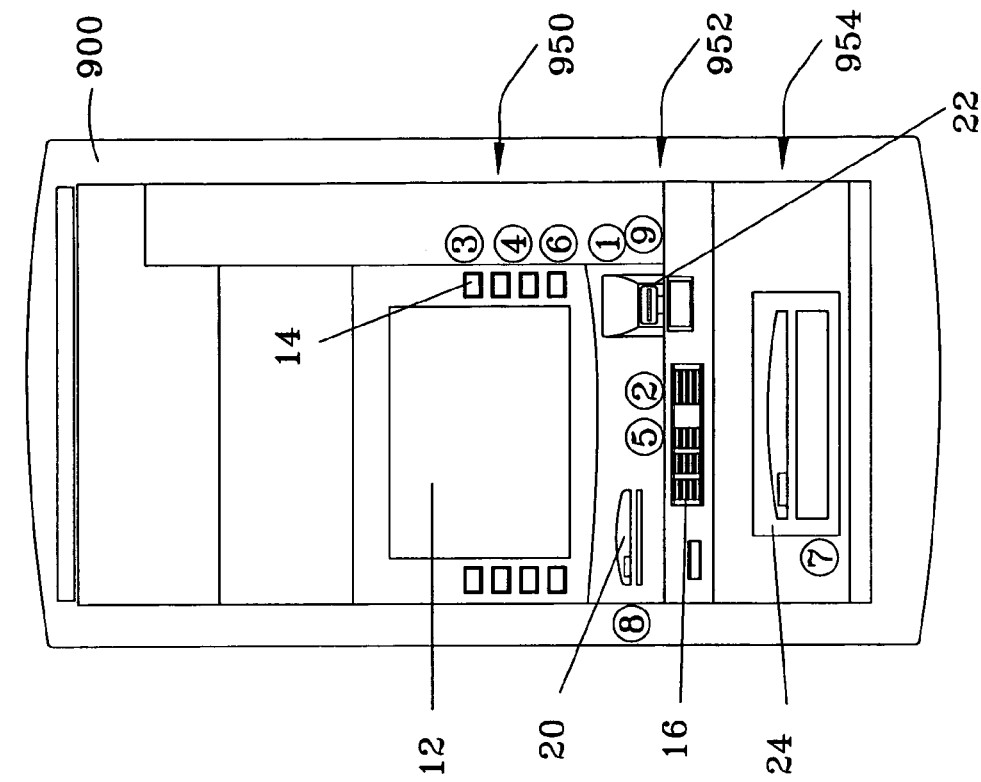
Figure 63:
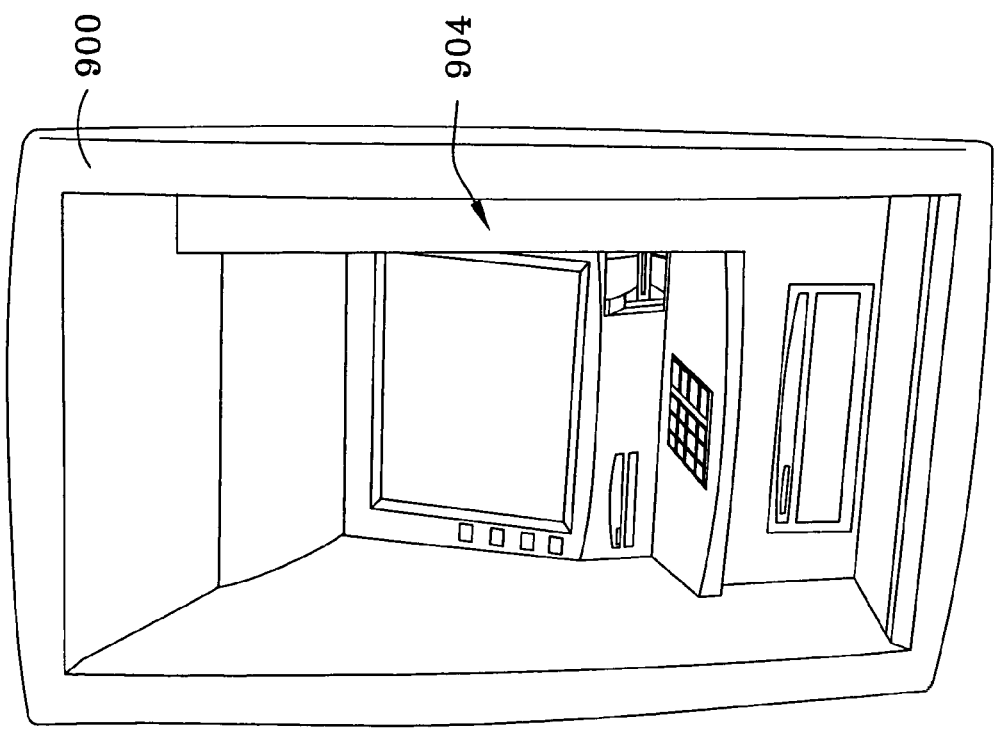

Automated banking machines may be manufactured for use in different locations. Depending on the location of the automated banking machine, the size, shape and configuration of the fascia and/or frame may be different. For example, FIG. 63 shows a relatively narrow automated banking machine which is designed for mounting through a wall of a building. As shown in FIG. 64, the relatively narrow wall mounted machine 900 may be configured with hardware devices which are capable of enabling a user to perform transactions such as the dispense of cash. FIG. 65 shows the relative motions of a user's hand to perform steps for dispensing cash with the relatively narrow wall mounted machine 900.

Initially at a first position 1 adjacent a card reader 22, the user may insert her card into the card reader. Next the user may move her hand in a generally leftward direction to a second position 2 adjacent a keypad 16, to type in the user's PIN. The user may next move her hand in an upward and rightward direction to a third position 3 adjacent the function keys 14 to press the function key corresponding to the withdraw of cash. As the user may have more than one type of account associated with her card, the user may move her hand to the same or another one of the function keys at a fourth position 4 adjacent the function keys to select an account. Next the user may move her hand downwardly and leftward to a fifth position 5 adjacent the keypad 16, to input the amount of cash to dispense.

For exemplary embodiments of the automated banking machine which include a display screen 12 with a touch screen, rather than pressing function keys to select a withdrawal transaction the user may tap graphical buttons displayed on the display screen to select a transaction and/or an account. As a result in alternative exemplary embodiments, after entering a PIN at the second position adjacent the keypad, the user may move her hand upwardly to a third/fourth position adjacent the display screen 12 rather than moving her hand upwardly and rightwardly to a third/fourth position adjacent the function keys 14. After the transaction and/or account have been selected using the display screen, the user may then move her hand downwardly from the display screen to the fifth position adjacent the keypad, to input the amount of cash to dispense.

Once the amount is entered, the user may move her hand upwardly and rightwardly to a sixth position 6 adjacent the function keys 14 to provide an input which verifies and/or initiates the dispense of the inputted amount of cash. Next the user may move her hand downwardly and leftwardly to a seventh position 7 adjacent the cash dispenser 24 to take the cash. In alternative exemplary embodiment of a machine with a touch screen, after the user has entered an amount with the keypad at position five, the user may move her hand upwardly to a sixth position adjacent the display screen 12 to provide an input which verifies and/or initiates the dispense of the inputted amount of cash. Subsequently the user may move her hand downwardly to a seventh position adjacent the cash dispenser 24 to take the cash.

After taking the cash, the user may move her hand upwardly and leftwardly to an eighth position 8 adjacent the receipt printer 20, to take her receipt. In addition the user may next move her hand rightwardly to a ninth position 9 adjacent the card reader to take her card from the machine.

FIG. 65 shows the relative positions 1–9 and the order that the hand of the user may move in to perform the steps to dispense cash. This order forms a spatial pattern 902 for which the same user or different user's may follow in order to perform the same transaction. An exemplary embodiment includes configuring the hardware devices and fascia of different types and models of automated banking machines for a series of machines to enable a user to generally follow the same spatial pattern 902 of positions when performing the same type of transactions at the different types and models of automated banking machines of the same series.

In alternative exemplary embodiments, the machine may be operative to prompt the user to select one of a plurality of different human languages with which the automated banking machine can output information. Further, in alternative exemplary embodiments, the automated banking machine may prompt the user to indicate if they would like a receipt, another transaction or other information related to functions performed at the machine. Such variations in the programming of the automated banking machines may vary the timing, distances, directions, and order in which the user movers her hand. However, even though the patterns may be different for different transactions and different configurations of the user interface, in exemplary embodiments, the automated banking machine of different types and models in a series are capable of enabling a user to move her hand in generally the same pattern for the same types of transactions and user interface configurations.

Figure 67:
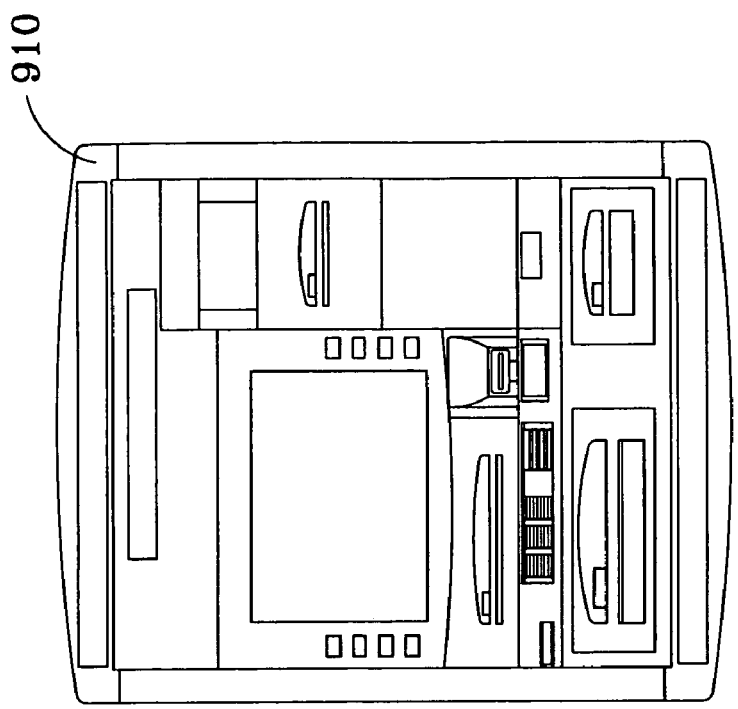
Figure 66:
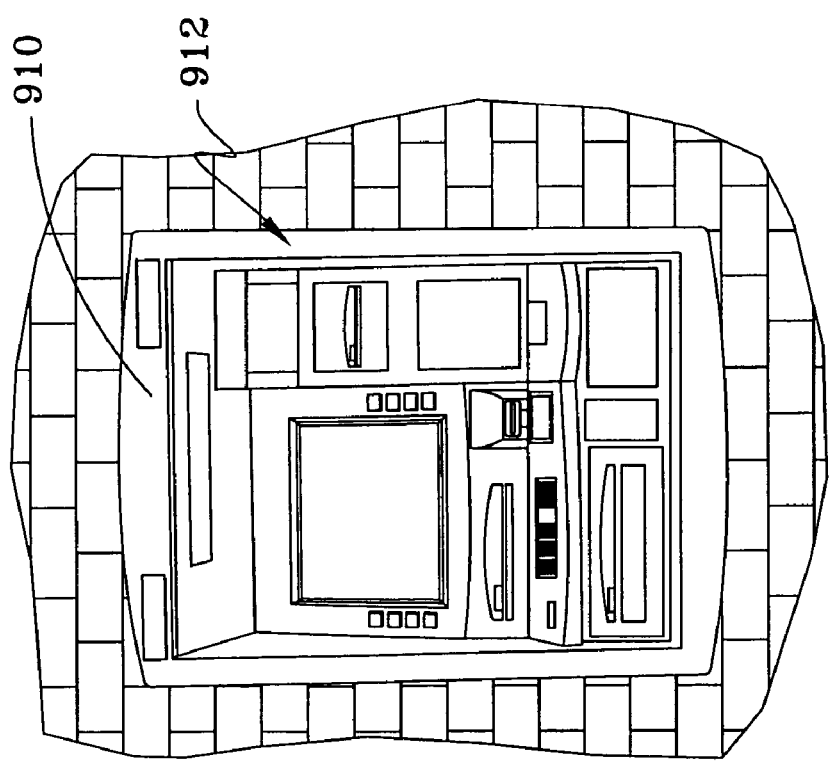

For example, FIGS. 66 and 67 show a relatively wider automated banking machine 910 which includes a different fascia 912 than the fascia 904 shown with the relatively narrower machine 900 in FIG. 63. The fascia 912 includes relatively more locations for hardware devices to be accessible through the fascia. However, as shown in FIG. 68, the relative spatial positions 1–9 at which a user's hand must follow in order to perform the previously described dispense transaction forms a generally similar pattern 914 compared to the pattern 902 as shown in FIG. 65.

Figure 70:
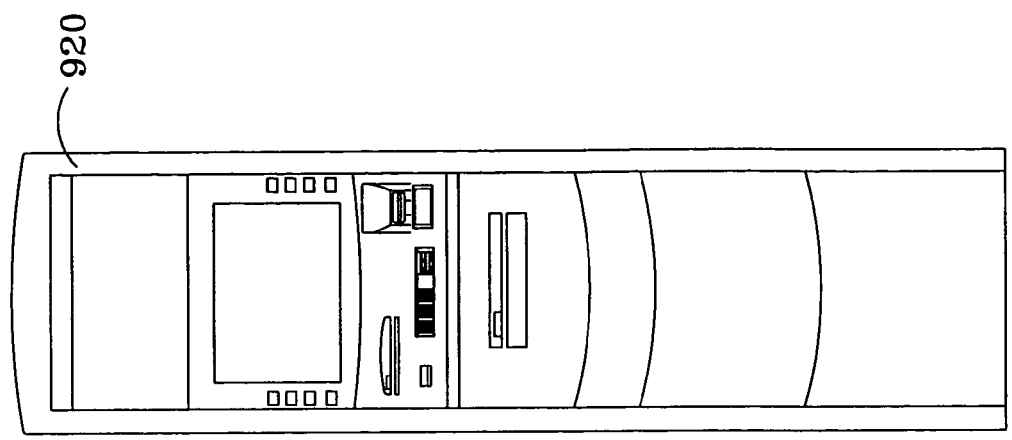
Figure 69:
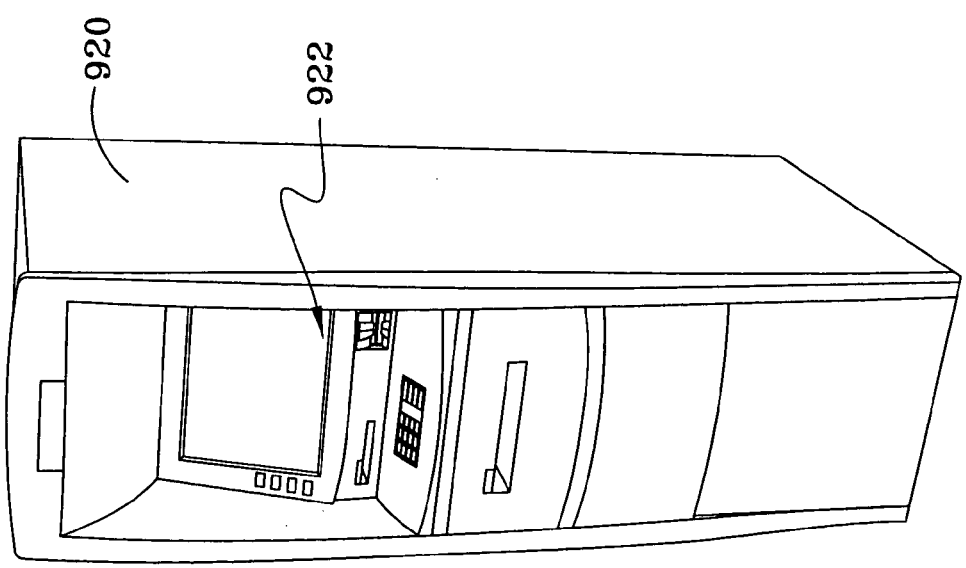

FIGS. 69 and 70 show a relatively narrower standalone automated banking machine 920 which includes a different fascia 922 than the previously described fascias 904, 912. Here the machine 920 is designed to be placed on the floor rather than through a wall and may also be referred to as a lobby model. However, as shown in FIG. 71, the relative spatial positions 1–9 at which a user's hand must follow in order to perform the previously described dispense transaction forms a generally similar pattern 924 compared to the patterns 902, 914 shown in FIGS. 65 and 68.

Figure 73:
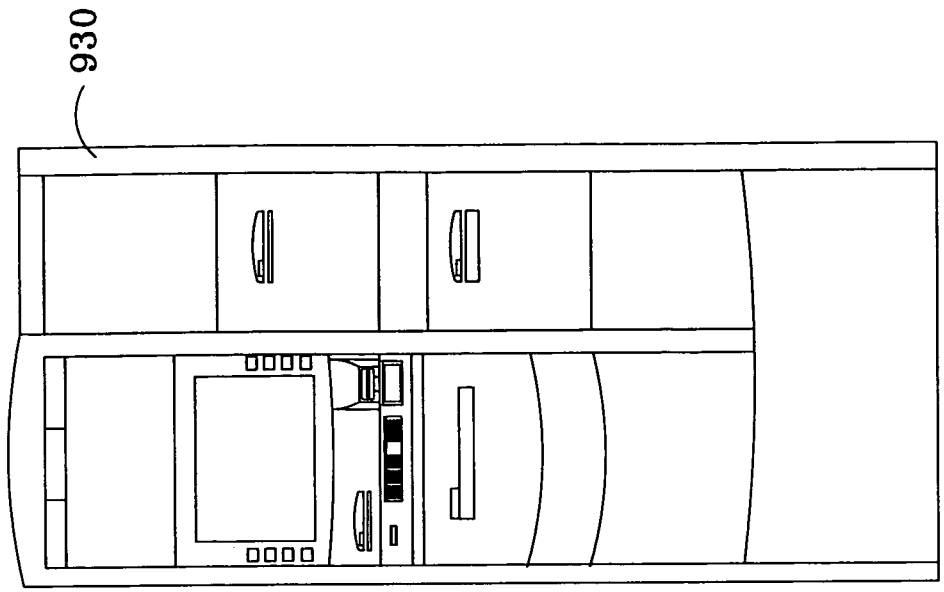
Figure 72:
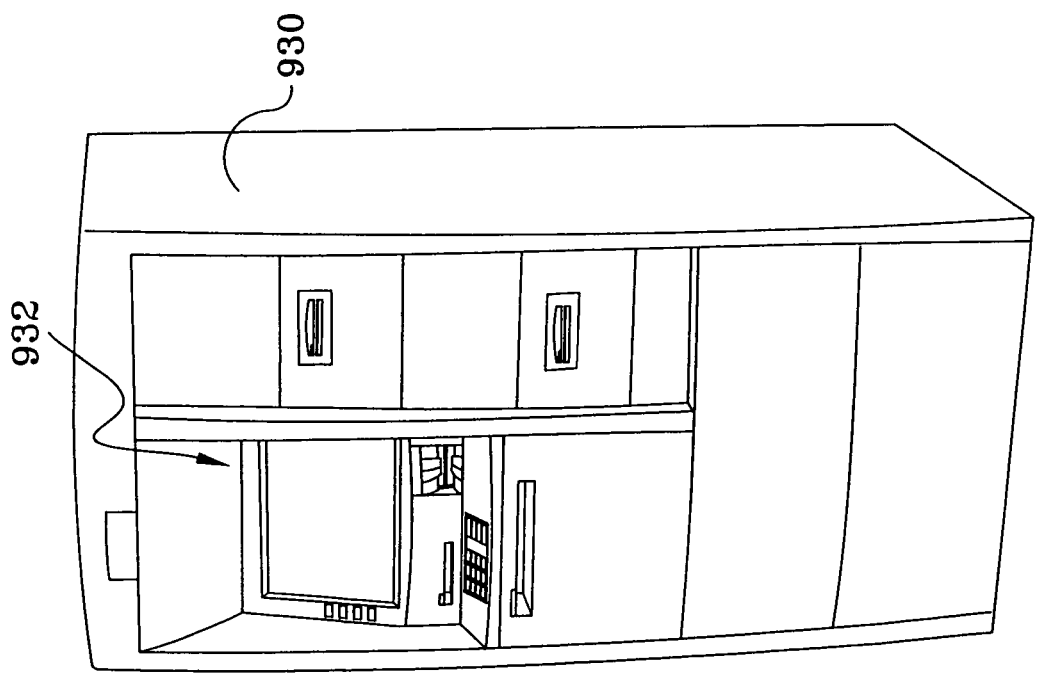

FIGS. 72 and 73 show a relatively wider standalone automated banking machine 930 which includes a different fascia 932 than the previously described fascias 904, 912, 922. Here the machine 930 is designed to be placed on the floor rather than within a wall and includes a configuration that is operative provide accesses to a larger number of hardware devices than the relatively narrow stand alone model 920. However, as shown in FIG. 74, the relative spatial positions 1–9 at which a user's hand must follow in order to perform the previously described dispense transaction forms a generally similar pattern 934 compared to the patterns 902, 914, 924 shown in FIGS. 65, 68, and 71.

In exemplary embodiments the distances between components may be different depending on the different models of the automated banking machines for a series. As a result the previously described patterns 902, 914, 924, 934 may require a user's hand to move shorter or longer vertical or horizontal distances between components depending on the model of machines. However in this described exemplary embodiment, the patterns are generally the same in regard to the relative up, down, right, and/or left directions a user's hand must follow to move from component to component to perform the same transaction at the different types and models of machines for the series.

As used herein, the different models of automated banking machines for a series which are operative to direct a user's hand to move in a common pattern to perform a common transaction include at least one freestanding or stand alone machine that is operative to support itself on a floor and at least one machine that is operative to be mounted in supporting connection through a wall.

The exemplary embodiment includes a method of manufacturing and/or configuring a series of different types and/or models of automated banking machines in which the relative positions of common hardware devices are orientated in the same spatial configuration. Further, the method may include providing each of the different types and/or models of automated banking machines in the series with user interface software which is operative to direct a user to access the hardware components in the same order for corresponding transactions.

To enable different automated banking machine models to produce a common pattern of hand motions for performing a common transaction, the different models may place common components in generally the same regions of the fascia. For example as shown in FIGS. 64, 67, 70, 73, the fascias of these different models of machines may include three vertically aligned regions which (as shown in FIG. 64) include an upper region 950, a middle region 952, and a lower region 952. For each of these models, the upper regions 950 may include the display screen 12 and the function keys 14. The middle regions 952 may include the receipt printer 20, keypad 16, and card reader 22. The lower regions 954 may include the cash dispenser 24. In addition for each of these models, the receipt printer 20 is positioned generally leftwardly of the keypad 16 and the card reader 22 is positioned generally rightwardly of the keypad 16 from the perspective of a user facing the machine.

However, as discussed previously, it is to be understood that exemplary embodiments of the fascia can be customized to place components in different positions. For example as shown in FIG. 1, the statement printer 21 and receipt printer 20 may switch locations. Nevertheless, in exemplary embodiments, the different models of automated banking machines described herein are capable of having common components placed in common locations to enable the hand motion patterns for performing transactions at the different models of the machines to be generally the same. Thus a user performing the same transactions at these different types and/or models of machines in a series of machines are enabled to follow the same familiar motions and patterns to complete the same types of transactions.

Exemplary embodiments of automated banking machines may include a number of components which include parts with cylindrical or curved surfaces. An example of cylindrical parts of the machine may include large capacitors. An exemplary embodiment of the machine may include a bracket for mounting such cylindrical or curved parts within the enclosure of the machine so that the parts are rigidly secured in a position that is accessible for inspection and replacement by a technician.

Figure 75:
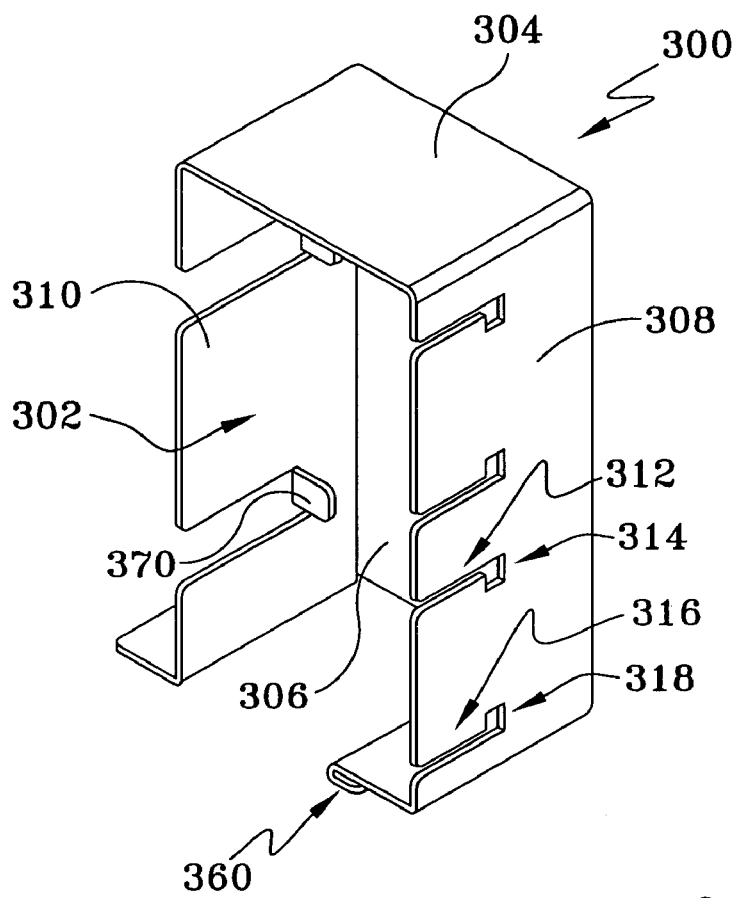
FIGS. 75–78 show an exemplary embodiment of a system for mounting components in an automated banking machine.
Figure 76:
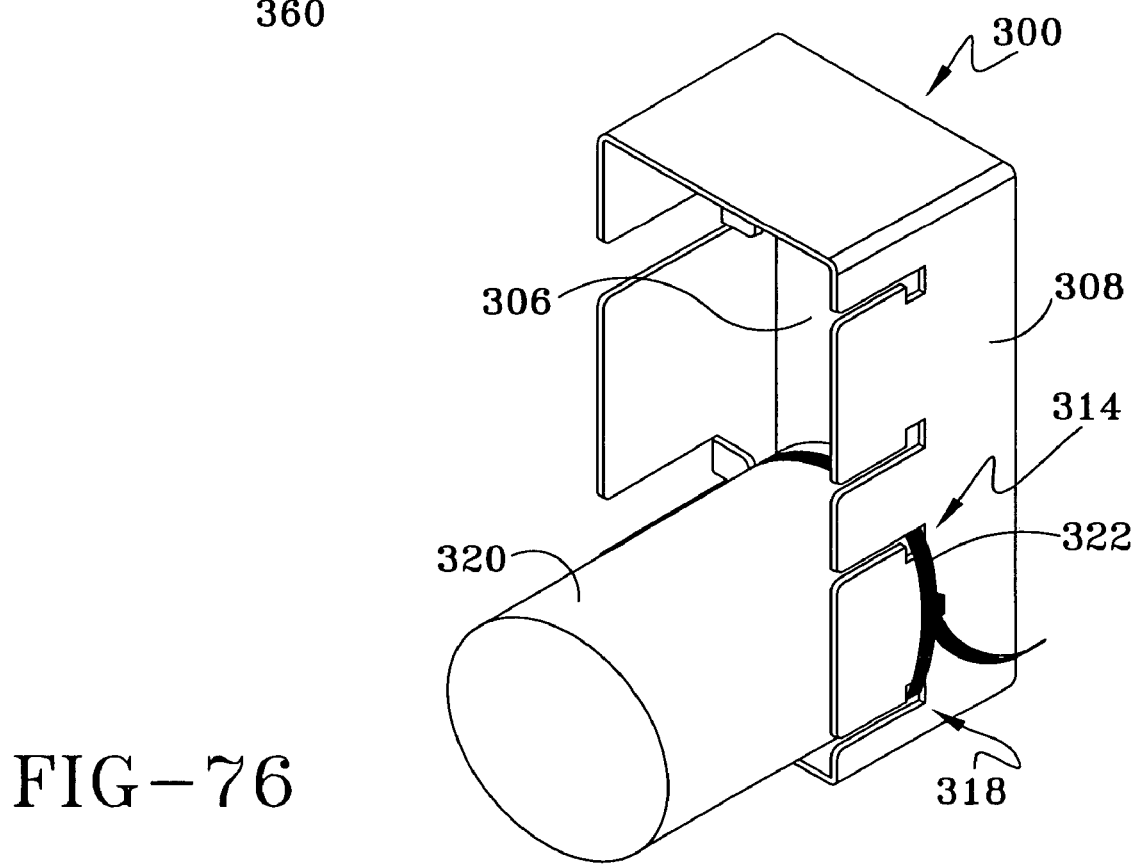

FIG. 75 shows an exemplary embodiment of a bracket 300 that may be used for mounting a capacitor or other object within an automated banking machine. The bracket may include an interior portion 302 defined by one or more walls 304, 306, 308, 310. At least one of the walls may include a plurality of channels 312, 316. The end of each channel may include a groove 314, 318 which extends in a generally perpendicular direction with respect to one side of each channel. In the exemplary embodiment a set of two adjacent channels 312, 316 may include facing grooves 314,318 which extend towards each other. As shown in FIG. 76, an object such as a capacitor 320 may be securely mounted to the bracket 300 using a cable tie 322 or other flexible fastener. The cable tie may extend through two adjacent grooves 314, 318 and around the capacitor 320.

Figure 77:
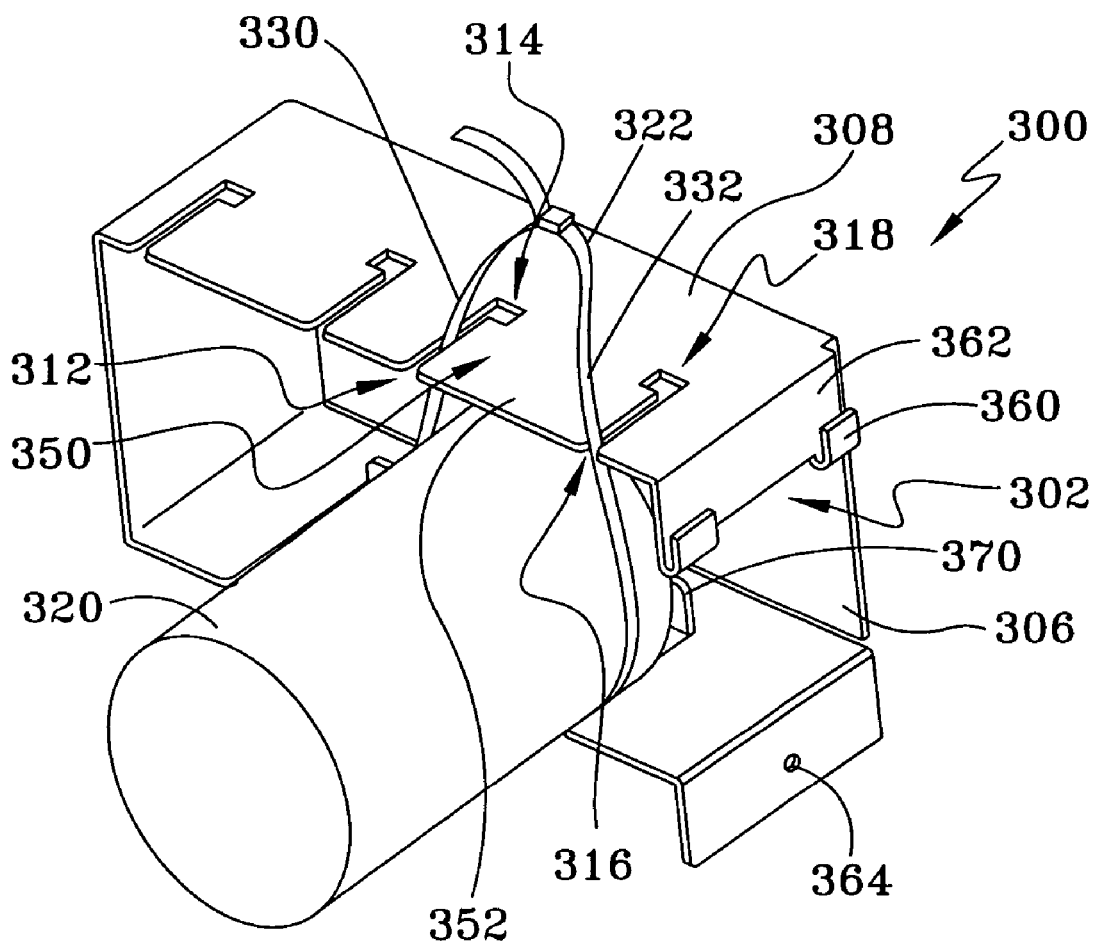

FIG. 77 illustrates a method for installing an object into the bracket 300. Here a cable tie 322 or other flexible fastener may be placed around the object such as the capacitor 320. Two ends 330, 332 of the cable tie 322 may be slid through adjacent channels 312, 316 in the bracket. Either before or after the cable tie is inserted through the channels, the ends of the cable tie may be connected together to form a loop 350. When the cable tie is slide into the two adjacent channels 312, 316, the capacitor 320 and the portion of the bracket 352 that extends between the two adjacent channels 312, 316 will extend through the loop 350 of the cable tie. When the ends of the cable tie reach the grooves 314, 318 the cable tie may be tightened to reduce the circumference of the loop 350. Reducing the circumference of the loop is operative to urge the ends of the cable tie 330, 332 into the grooves 314,318 and rigidly hold the capacitor to the wall 308 of the bracket.

Figure 78:
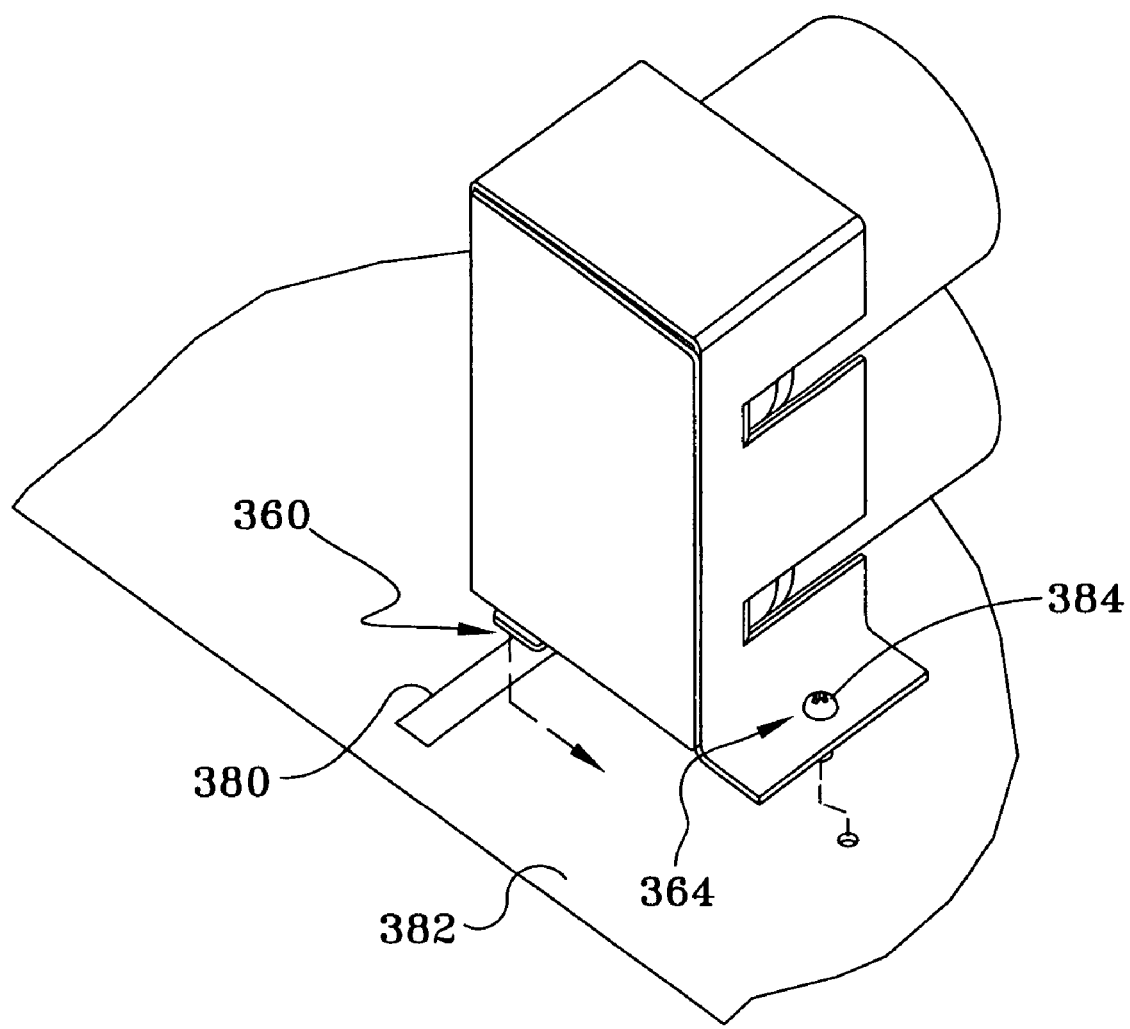

In an exemplary embodiment, the bracket may further include features which facilitate the bracket being mounted to the enclosure, frame or other portion of the automated banking machine. In the exemplary embodiment, such features may include tabs or hooks 360 which extend adjacent a wall 362 of the bracket. As shown in FIG. 78, the hooks 360 may be adapted to slide within one or more slots 380 in a portion 382 of the automated banking machine. In addition the bracket 300 may include a hole 364 which is operative to receive a screw 384 or other fastener therethrough. In this described exemplary embodiment, when the hooks 360 of the bracket are inserted into slots 380 of the automated banking machine, the screw 384 or other fastener may also be inserted into the hole 364 for use with rigidly connecting the bracket to the portion 382 of the automated banking machine.

As shown in FIG. 75, the bracket may further include flanges 370 in the interior portion 302 of the bracket. The flanges are operative to prevent the capacitor from moving into contact with the wall 306 thereby preventing electrical contacts of the capacitor from being in electrical communication with the wall 306.

Figure 79:
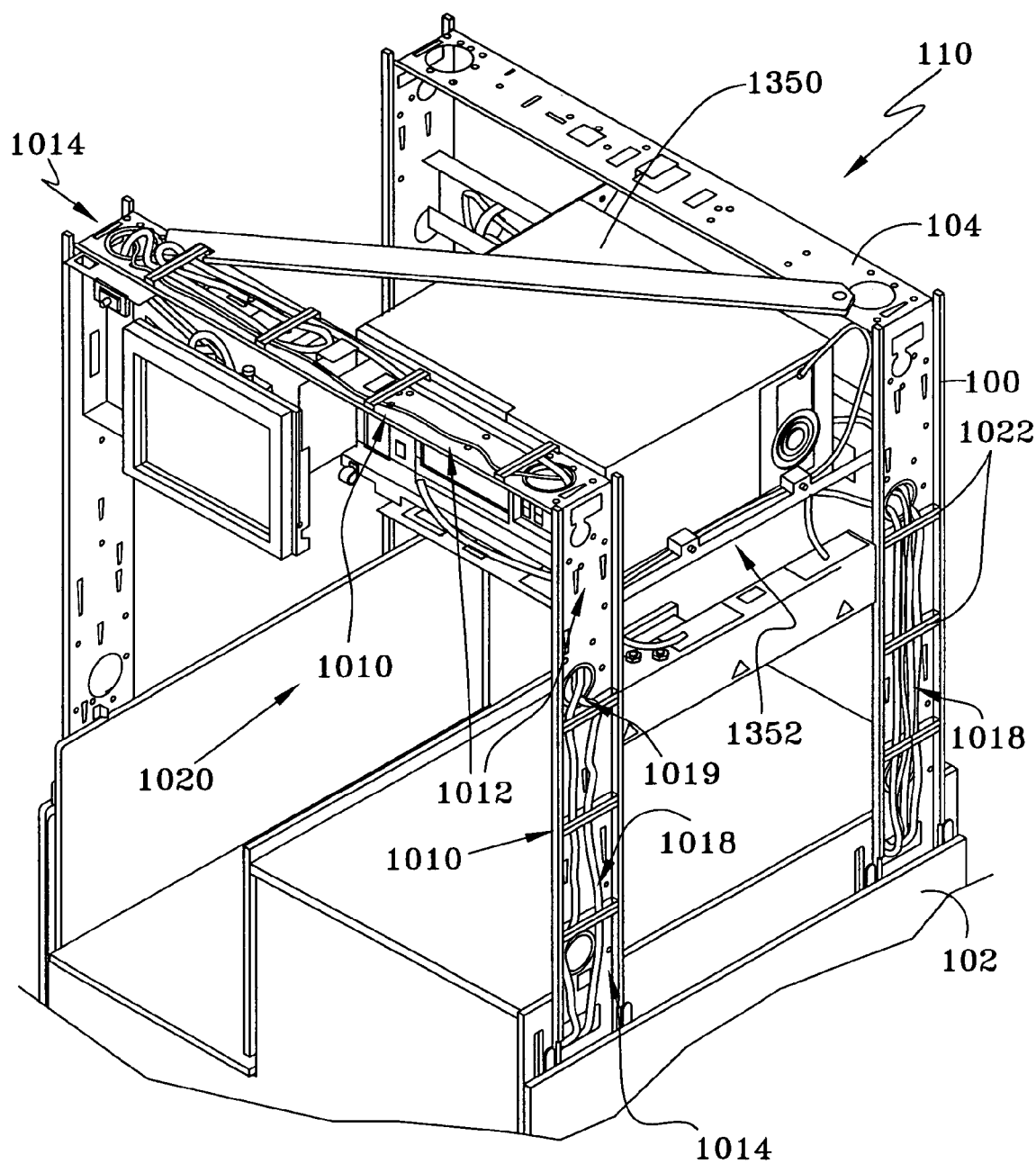
FIGS. 79 and 80 show exemplary embodiments of features for mounting cables in an automated banking machine.

As shown in FIG. 79, exemplary embodiments of the struts 100, 104 of the frame 110 of the automated banking machine may include outwardly extending ridges 1010 or other spacers. The ridges or other spaces are operative to support the panels at a sufficient distance from the surfaces 1012 of the struts to provide channels 1014 for receiving wires and cables 1018 of the hardware devices mounted within the frame 110. When looking into the interior 1020 of the frame, the struts are operative to hide from view the cables or wires being routed along the outside surfaces 1012 of the struts.

In this described exemplary embodiment, the struts may further include cable retainers 1022 which are operative to hold the wires and cables in place adjacent the channels 1014 of the struts. The exemplary embodiments of the struts may further include apertures 1019 therethrough for routing cables, wires, electrical lines or other components between the inner portions 1020 of the frame and the channels 1014 of the struts.

Figure 80:
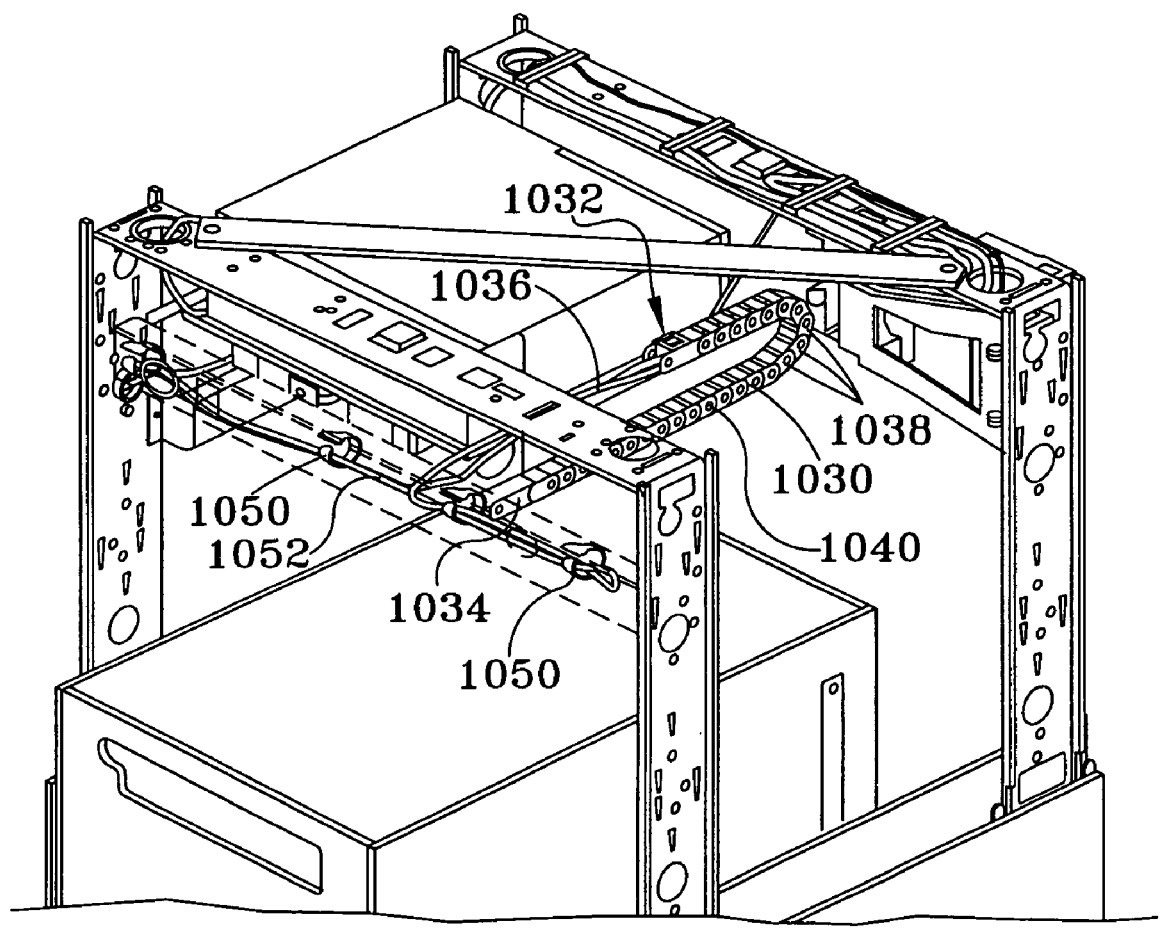

In addition to mounting cables adjacent the struts of the frame, exemplary embodiments may route cables and wires through flexible conduits. FIG. 80 shows an example of a flexible conduit 1030. The flexible conduit 1030 may include a continuous channel therethrough which extends between the ends of the conduit 1032, 1034. One or more cables or wires 1036 of the hardware devices of the machine may be routed through the channel of the conduit 1030. In this described exemplary embodiment, the conduit may be comprised of a plurality of hollow links 1038. Each link is connected to an adjacent link with a pin 1040. Each adjacent pair of links is operative to pivot with respect to each other about the pin. When a hardware device is positioned within the frame, the flexible conduit 1030 may be orientated in a curved or generally U-shaped orientation in which the opposed ends 1032, 1034 are relatively close together. When the hardware device is pulled out of the machine for servicing, the flexible conduit 1030 is operative to uncurl thereby enabling the distance between the ends 1032, 1034 to increase. In this described exemplary embodiment, one or both of the ends 1032, 1034 of the flexible conduit may be in pivoting connection with corresponding hardware devices, brackets, and/or frame of the machine.

To further retain cables and wires 1052, exemplary embodiments of the automated banking machine may include cable retention rings 1050. Such retention rings may include a base with an aperture therethrough for receiving a fastener such as a screw. The retention rings may be mounted as needed to the frame and/or hardware devices of the machine. Each retention ring may include a slit adjacent the base which enables cables to be passed into and out of the interior of the retention ring. In an exemplary embodiment the cable retainer may correspond to a curved or curled finger which at least partially surrounds a cable or electrical line.

Exemplary embodiments of the automated banking machine may include large hinges for opening various doors, portions of the fascia, the chest door, or any other component which rotates between an open and closed position. To prevent such hinges from being visible, an exemplary embodiment of the machine may include a trimcap linkage system which is operative to cover one or more hinges without interfering with the opening of a door associated with the hinges.

Figure 81:
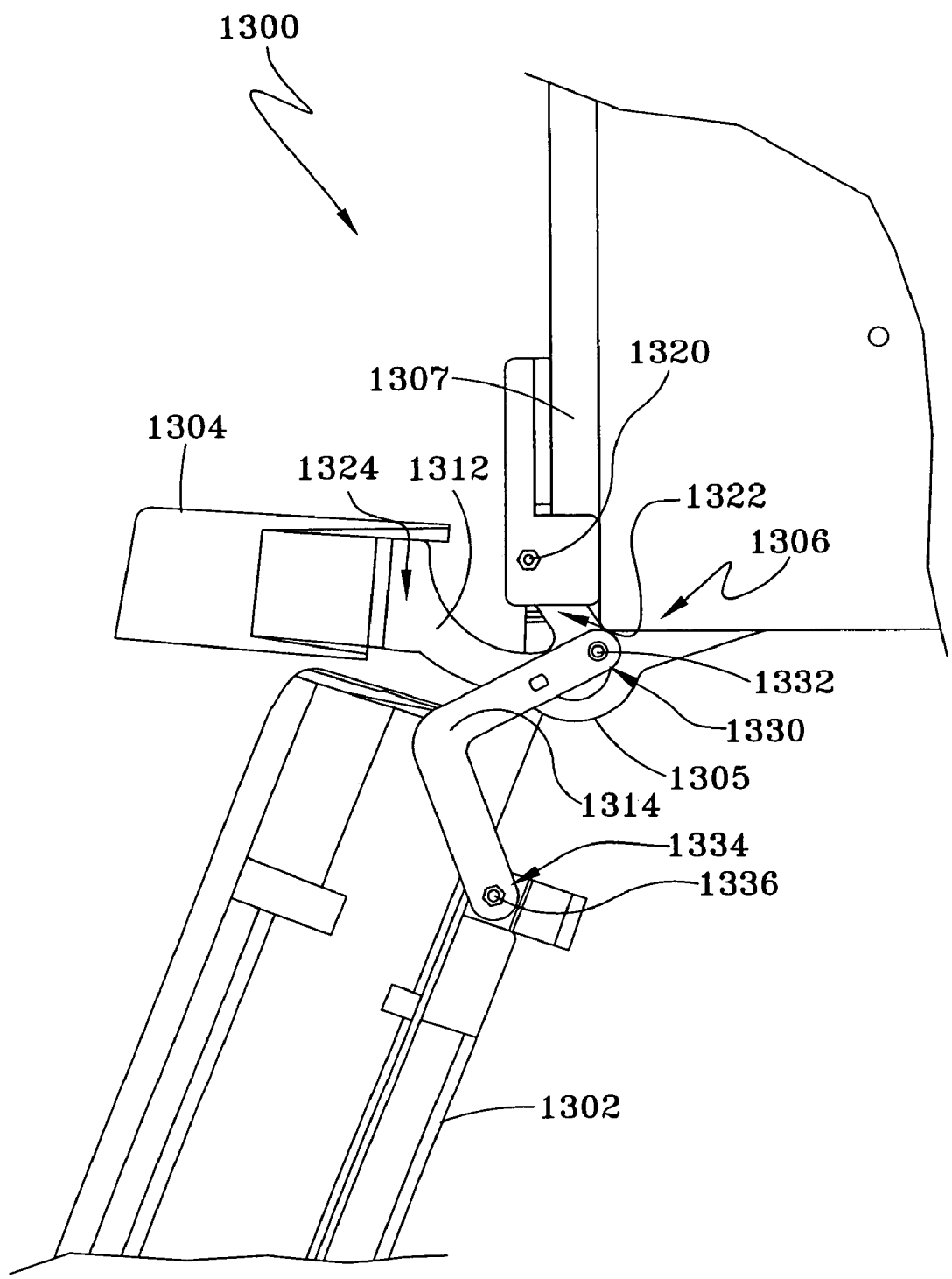
FIGS. 81 and 82 show an exemplary embodiment of a trim cap linkage system for an automated banking machine.
Figure 82:
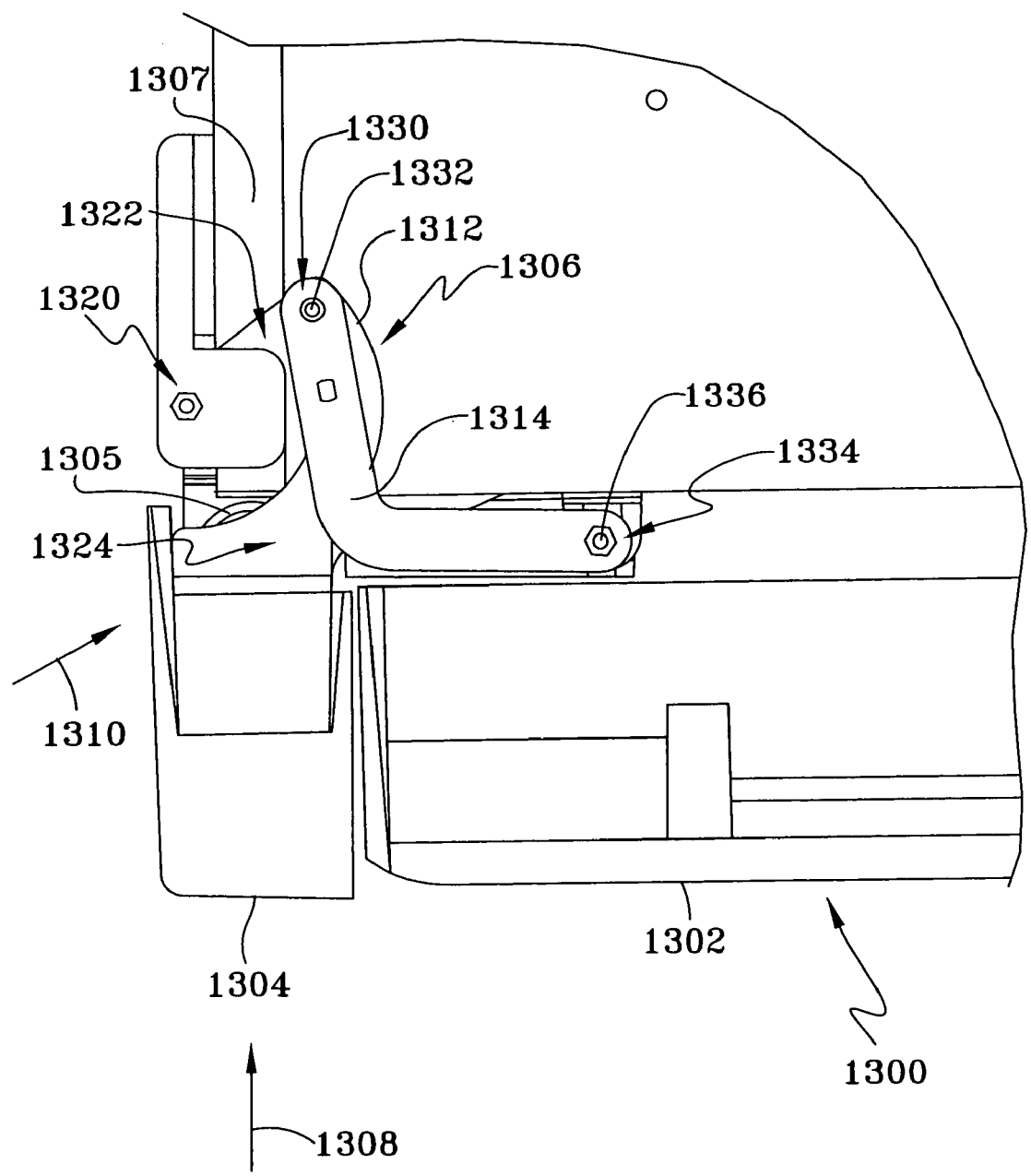

For example, FIG. 81 shows a top view of an automated banking machine 1300. The machine includes a door 1302 in hinged connection with a portion 1307 of the machine. The hinges 1305 of the machine 1300 may extend downwardly between the door 1302 and the portion 1307 of the automated banking machine. FIG. 81 shows the door in an open position. FIG. 82 shows the door in the closed position.

When the door is in the closed position (FIG. 82) a covering device or hinge cover 1304 (which may also be referred to herein as a trimcap) may be urged by a linkage system 1306 into a position which conceals or covers the hinges 1305 from a front facing viewpoint 1308 and/or side facing view point 1310. In this described exemplary embodiment, the trimcap may correspond to an elongated enclosure with an open end. When the door is closed the hinges are operative to pass into the opening of the enclosure so that at least portions of the hinges are located within the trimcap 1304. In alterative exemplary embodiments the trimcap may correspond to an elongated wall which when the door is closed moves adjacent the side of the door so as to conceal the hinges 1305 from the front facing viewpoint 1308.

The linkage system of the exemplary embodiment may include a first linkage 1312 and a second linkage 1314. A first end 1322 of the first linkage 1312 may be in pivoting connection with the portion 1307 of the machine at a first point 1320. The second end 1324 of the first linkage 1312 may be in operative supporting connection with the trim cap 1304 at a second point. A first end 1330 of the second linkage 1314 may be in pivoting connection with the first linkage 1312 at a third point 1332. Also, a second end 1334 of the second linkage 1314 may be in pivoting connection with the door 1302 at a fourth point 1336.

In this described exemplary embodiment, when the door is moving from an open position (FIG. 81) to the closed position (FIG. 82), the second linkage 1314 is operative to urge the first linkage 1312 to rotate the trimcap to a position which conceals the hinges 1305. When the door is moving in the opposite direction from the closed position (FIG. 82) to the open position (FIG. 81), the second linkage 1314 is operative to urge the first linkage 1312 to rotate the trimcap away from the hinges 1305. In the open position, the trim cap is moved a sufficient distance from the hinges 1305 to provide room for the door to rotate about the hinges.

Figure 83:
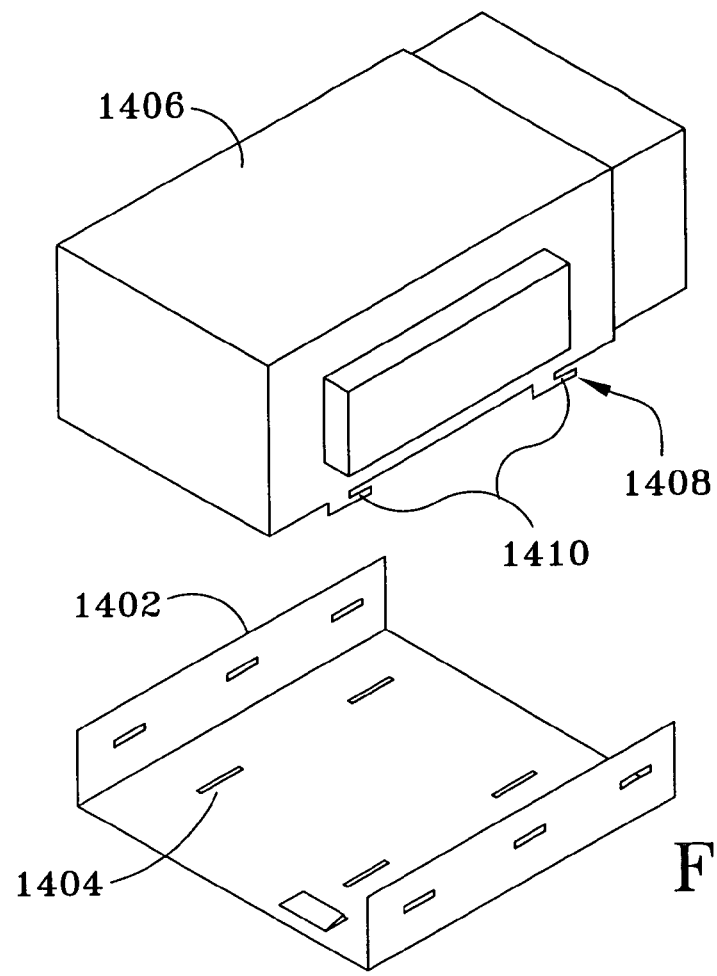
FIGS. 83–101 show exemplary embodiments of devices for mounting components in an automated banking machine.

As with the previously described system for mounting capacitors to the automated banking machine, other types of hardware devices may be mounted within the frame without the use of tools. For example, the frame of the machine may include one or more trays mounted therein for receiving hardware devices in supporting connection therewith. An example of such a tray 1402 is shown in FIG. 83. The tray may include one or more slots 1404 therethrough. In the exemplary embodiment, the hardware devices 1406 may include mounting brackets 1408. The mounting brackets of the hardware devices may include hooked tabs 1410 similar in configuration to the hooks 360 shown in FIG. 78.

Figure 84:
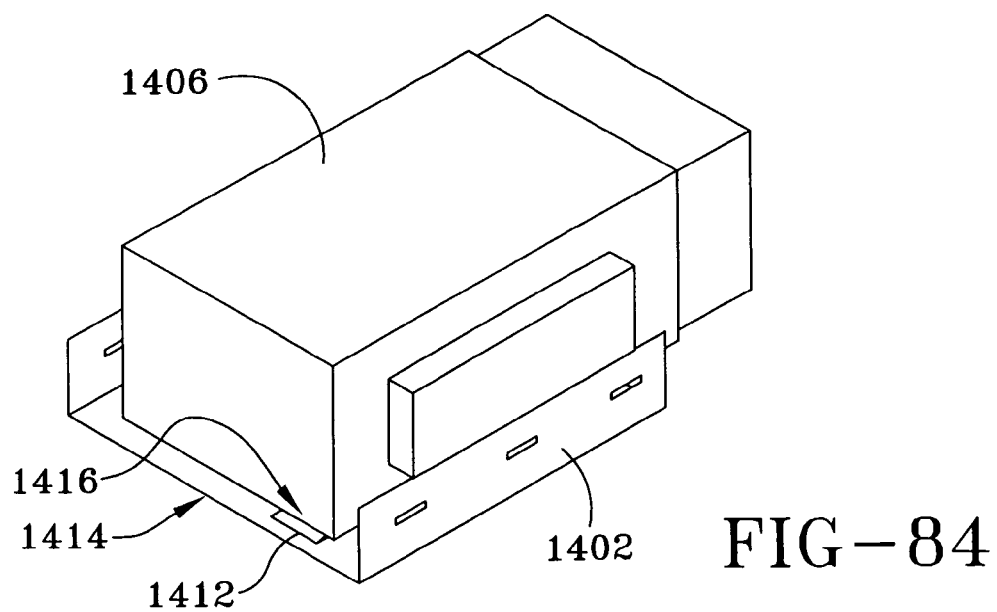

To connect the hardware device to the tray, the hooked tabs 1410 may be slid into the slots 1404 of the tray 1402. As shown in FIG. 84, the tray may further include an upwardly angled tab 1412 positioned adjacent an edge 1414 of the tray 1402. In this described exemplary embodiment, the angled tab 1412 is operative to contact a side 1416 of the hardware device 1406 thereby blocking the hardware device from sliding its hooked tabs out of the slots of the tray. To insert or remove the hardware device, the angled tab 1412 may be pushed downward to enable the hardware device 1406 to pass overtop of the angled tab.

Figure 85:
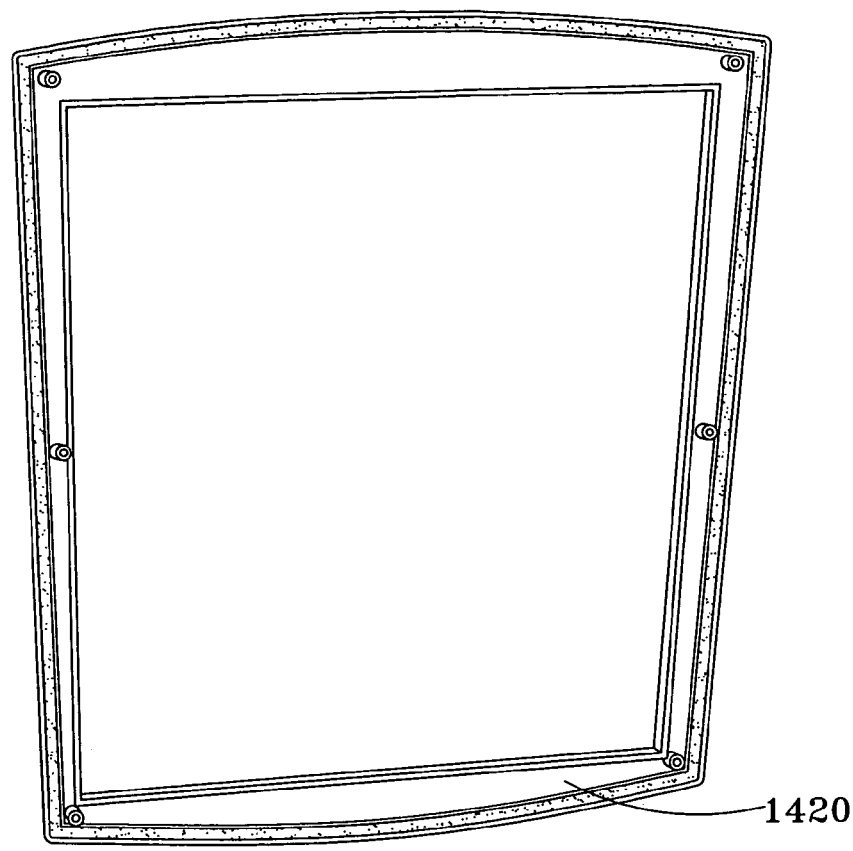
Figure 86:
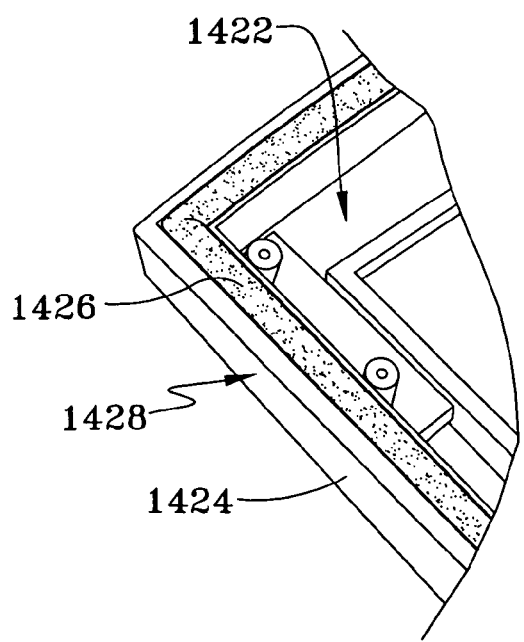

An exemplary embodiment of the automated banking machine may include various parts which are mounted to an exterior of the machine. As shown in FIG. 85, such parts may include portions of the fascia such as a trim ring 1420. The trim ring may be comprised of more than one separate parts which are placed together to form the complete ring. For example as shown in FIG. 86 such separate parts may include a top portion 1422 and a side portion 1424. An exemplary embodiment may include a method of mounting an assembly of parts to the automated banking machine. The method may include placing the parts together and inserting a gasket 1426 into both parts, which gasket transverses the interface 1428 where the two parts meet. In this described method, the gasket is operative to hold the separate parts together while the assembly is being installed to the automated banking machine. In addition, in this described exemplary embodiment, the gasket may further be operative to block rain water and other elements from passing between the installed part and the automated banking machine.

Figure 87:
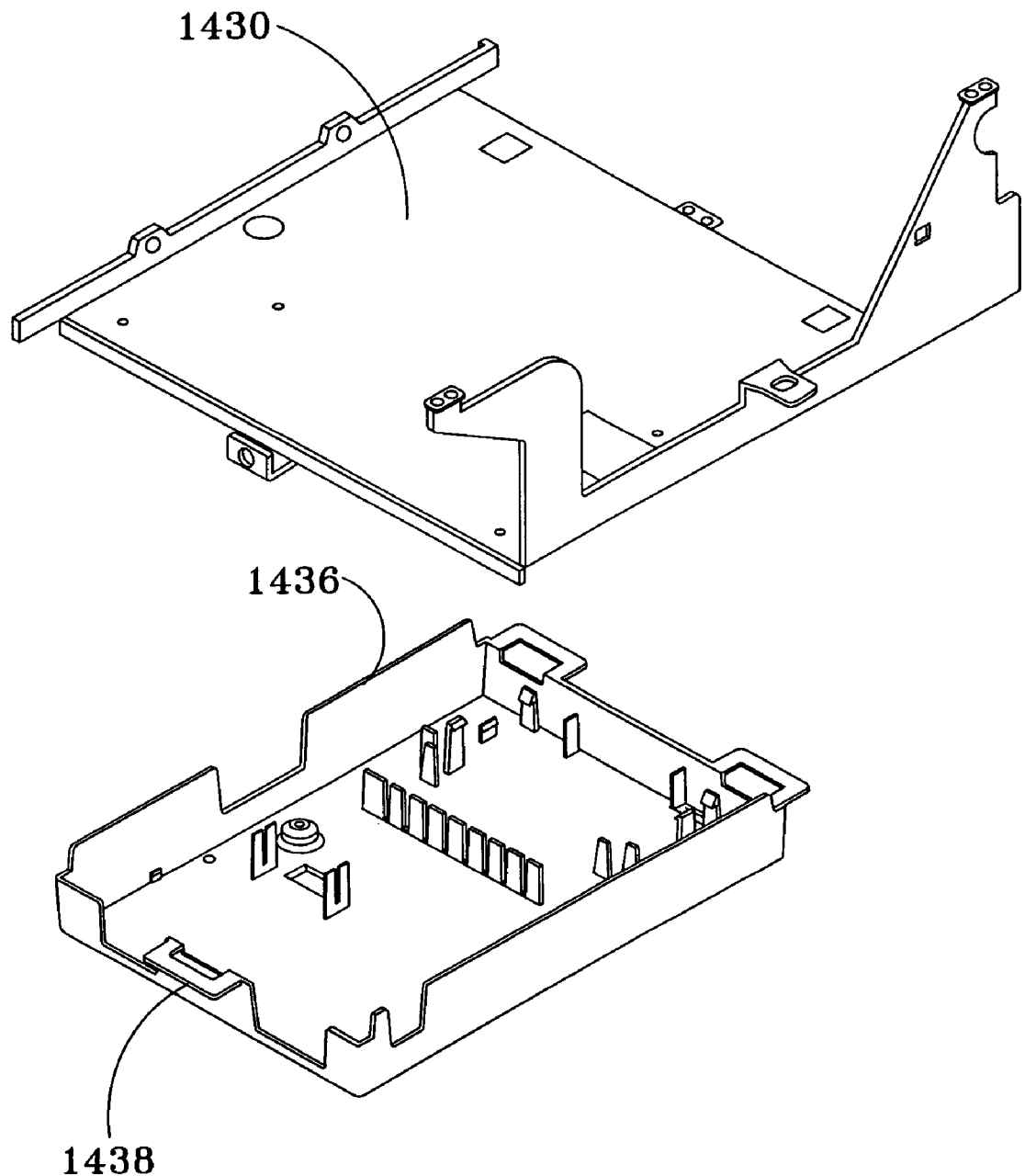
Figure 88:
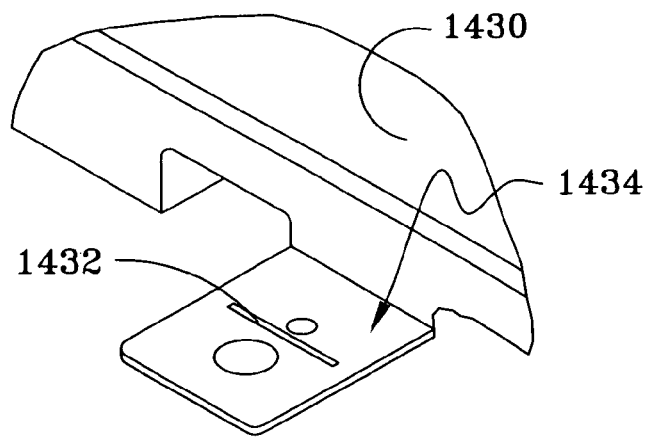

Exemplary embodiments of the automated banking machine may include other features and methods for mounting hardware devices, components, and brackets to the machine without the use of fasteners such as screws. For example, FIG. 87 shows an exemplary embodiment of a sheet metal bracket 1430. As shown in FIG. 88, the bracket may include one or more pre-bent tabs 1434. The tabs may include a groove 1432 cut partially into a surface of the tab 1434. In an exemplary embodiment, the groove may be cut with a laser to have a depth which is less than the thickness of the tab.

Figure 89:
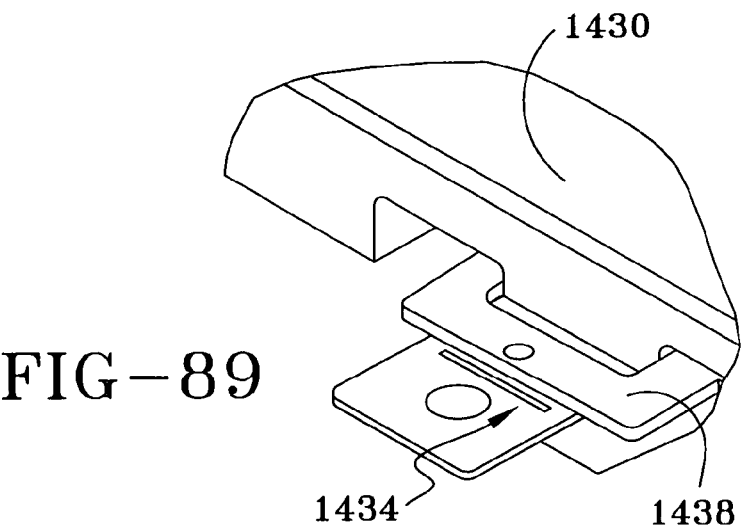
Figure 90:
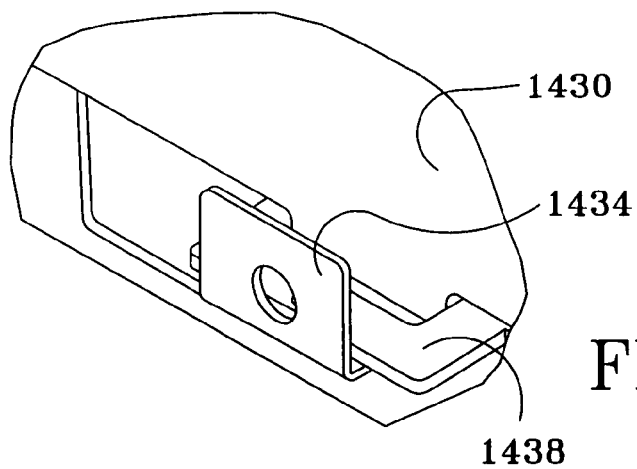

Referring to FIG. 87, components 1436 of the automated banking machine such as a plastic cover for example, may be mounted to a sheet metal bracket 1430. The component 1436 may include a U-shaped tab 1438 which forms a loop with a slot therethrough. As shown in FIG. 89, the U-shaped tab 1438 may be placed around the tab 1434 of the metal bracket 1430 so that the metal tab passes through the slot in the loop. As shown in FIG. 90, the metal tab 1434 may be bent upward to form a second bend which locks the U-shaped tab in place. In this described exemplary embodiment, the metal tab 1434 is operative to bend at the groove 1432. To remove the component, the metal tab 1434 may be bent back down to enable the U-shaped tab to slide off of the metal tab 1434.

Figure 120:
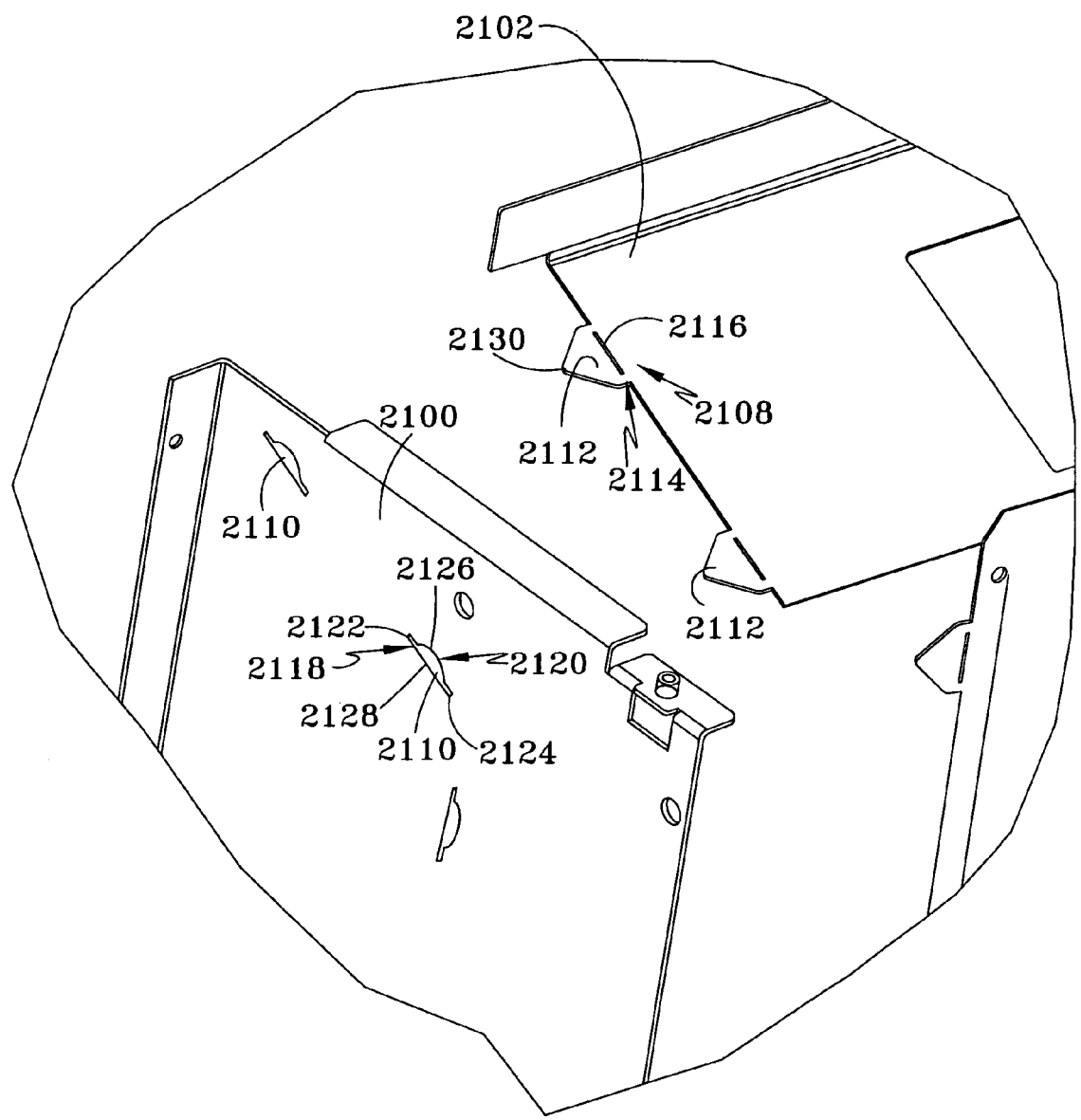
FIGS. 120 and 121 show an exemplary embodiment of sheet metal parts of the machine being mounted together using tabs and slots of the parts.

Exemplary embodiments of the automated banking machine may include components comprises of sheet metal parts which are connected together by inserting a tab of one part into a slot of another part and then bending the tab to lock the parts together. FIG. 120 shows an example of an exemplary first automated banking machine part 2100 which includes a plurality of slots 2110 therethrough. In an exemplary embodiment the slot 2110 is operative to receive therein a tab 2112 of a second part 2102 of the automated banking machine. In exemplary embodiments, the tab 2112 may have a base portion 2114 adjacent the body 2108 of the second component which tapers to a relatively narrower tip portion 2130.

The slot may include an elongated portion 2118 with a width that about corresponds and/or is slightly larger than a width of the base portion 2114 of the tab 2112. The elongated portion 2118 may include at least two side edges 2126, 2128. At least one of the side edges may includes a outwardly bowed portion 2120 which provides the slot 2110 with a wider center relative the thickness of the slot at each of the ends 2122, 2124 of the elongated portion. In the exemplary embodiment, the bowed portion 2120 have a generally semi-circular shape. Also exemplary embodiments, the bowed portion 2120 may not extend to each of the end portions 2122, 2124. When a tab, or set of tabs is being inserted into a slot or set of slots, the relatively wider bowed portion 2120 of the slots is operative to facilitate centering and aligning the tabs 2112 with the slots 2110. The relatively narrower end portions 2122, 2124 are sufficiently narrow to minimize a fully inserted tab from sliding in directions parallel to the surface of the first part 2100.

To facilitate the tabs being bent accurately and consistently at the base, such tabs may be laser cut as discussed previously with respect to the metal tab 1432 shown in FIG. 90. For example, as shown in FIG. 120, the base 2114 of the tabs 2112 may include a small thin groove 2116 with a depth that is less than the thickness of the tab. In exemplary embodiments the length of the groove may be equal to or less than the width of the base of the tab. In and exemplary embodiment, the groove may not extend to the edges of the tab.

Figure 121:
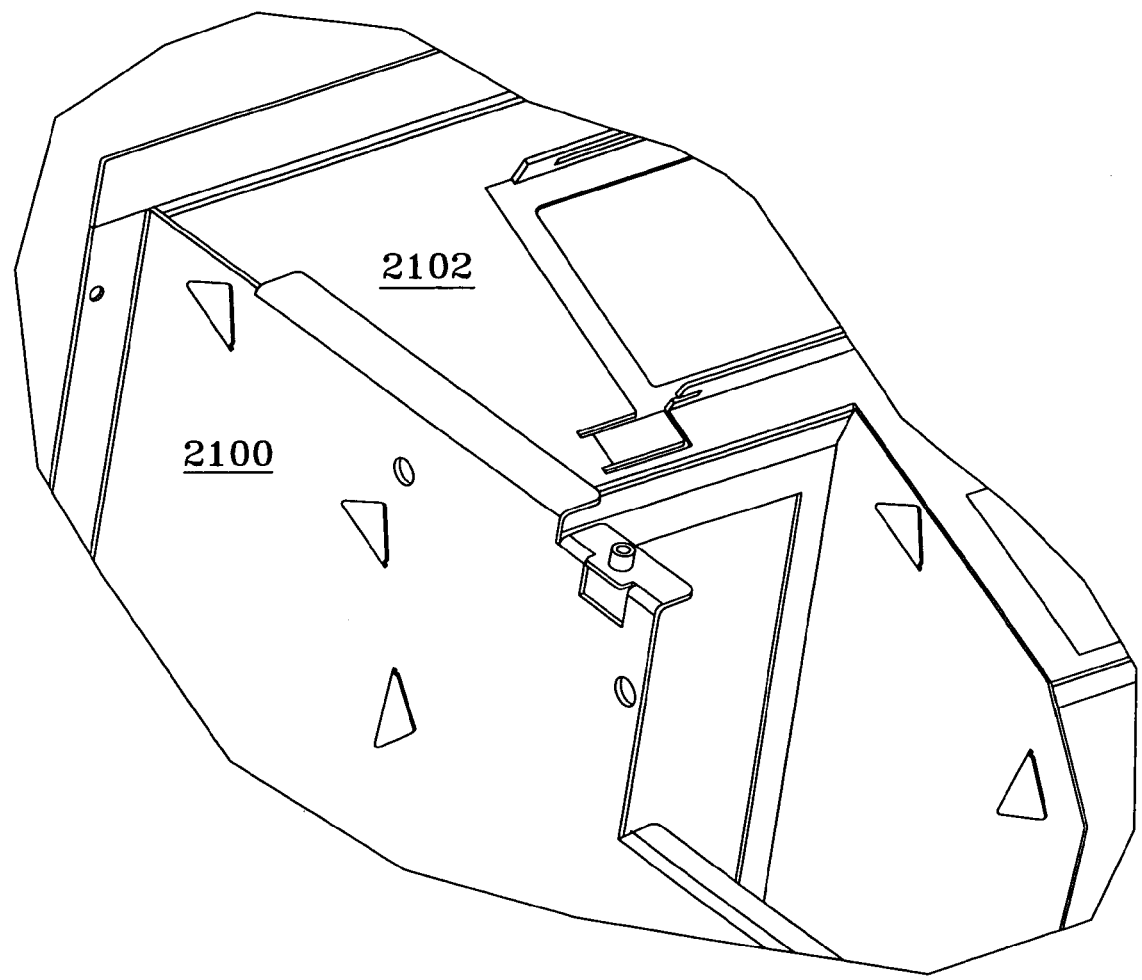

After a tab 2112 has been inserted into a slot 2110, force may be applied adjacent a side of the tab using hand tools such as pliers and/or a rubber mallet. In the exemplary embodiment, the tab is operative to bend at the groove which is operative to draw the two parts 2100 and 2102 together to form a tight and/or rigid connection between the parts. For example, hand tools such as pliers may be used to initially start bending a tab which is operative to urge the parts closer together and shrink gaps between the mating surfaces of parts. Subsequently a hand tool such as a rubber mallet may used to bend the tab generally flat (FIG. 121) and at about ninety degrees to lock the two parts together.

Figure 91:
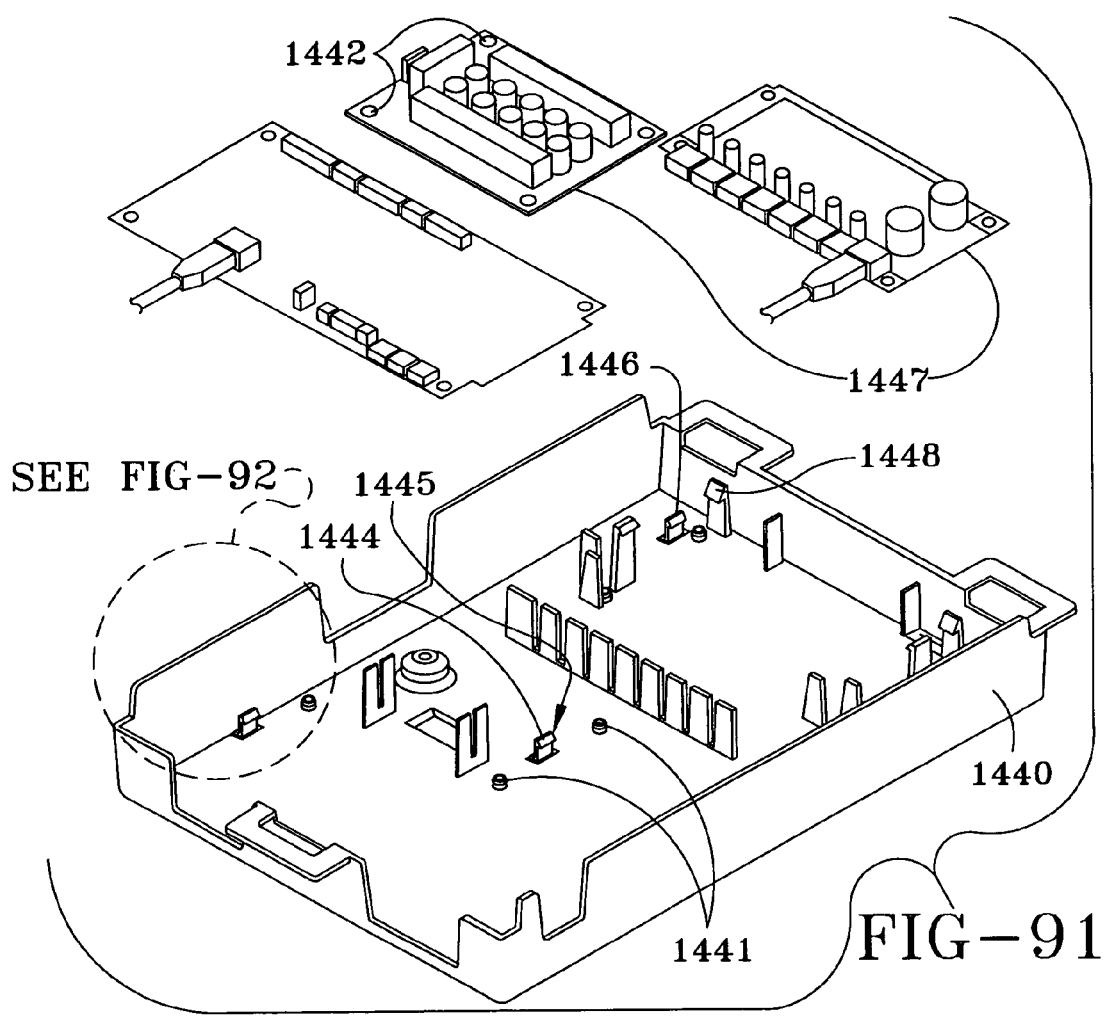
Figure 92:
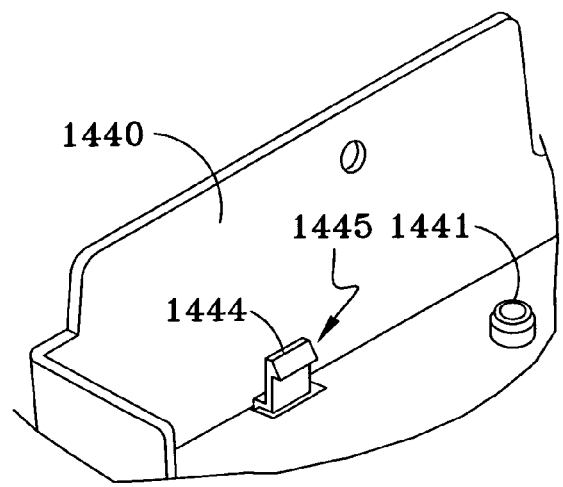

Exemplary embodiments of the automated banking machine may be operative to mount PC boards in the automated banking machine without the use of tools. For example FIGS. 91 and 92 show an exemplary embodiment of a PC board cover 1440 that may be mounted in an automated banking machine. The PC board cover 1440 may include stepped bosses 1441 which are operative to cooperatively engage with apertures 1442 through PC boards 1447 to support the PC Boards on the cover 1440. The PC board cover 1440 may further include flexible snaps 1444 with projections 1445 which are operative to hook overtop of a PC board 1447 to releasably lock the PC boards to the bosses 1441.

Figure 93:
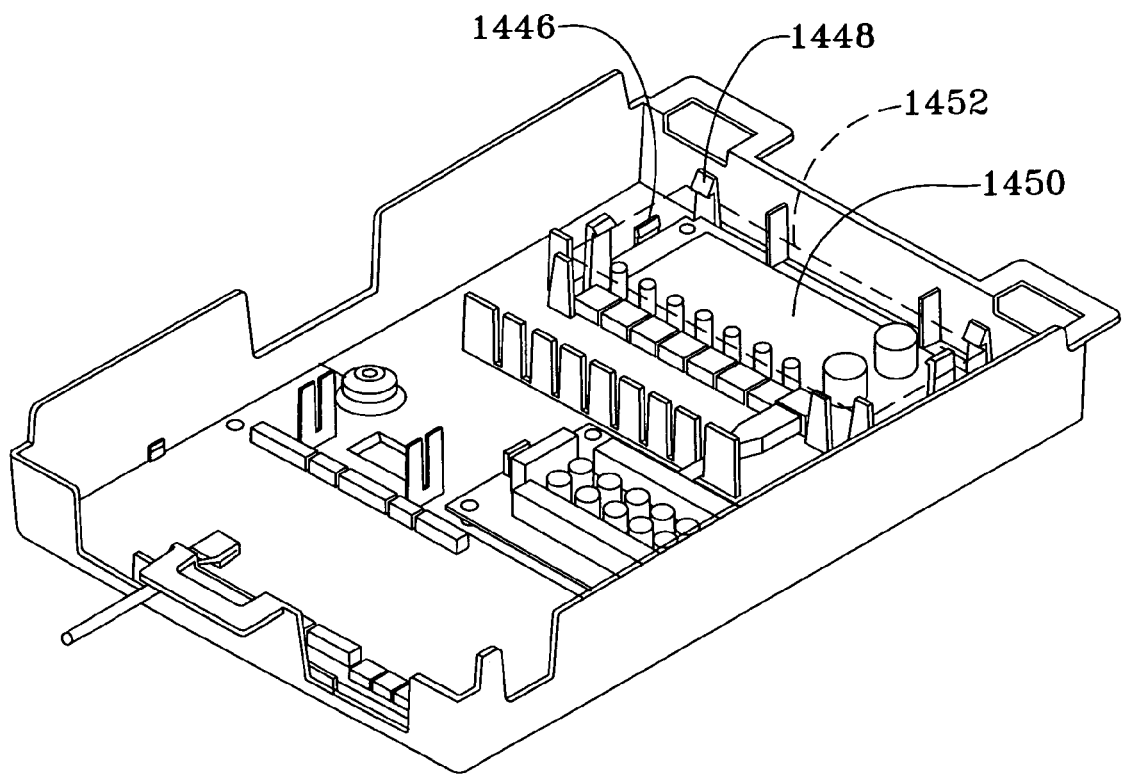

As shown in FIG. 91, the PC board cover 1440 may include relatively shorter snaps 1446 adjacent taller snaps 1448. As shown in FIG. 93, the relatively shorter snaps 1446 may be used to mount a first PC board 1450 to the cover, while the relatively taller snaps 1448 may be used to mount a second PC board 1452 to the cover in a position that is above the first PC board. The tops of the shorter snaps 1446 or other spacing devices may be used to support the second PC board 1452 in spaced apart relation above the first PC board 1450. The snaps may be manually flexed open to assemble the PC board on the cover and then flexed back to hold the PC board in place.

Figure 94:
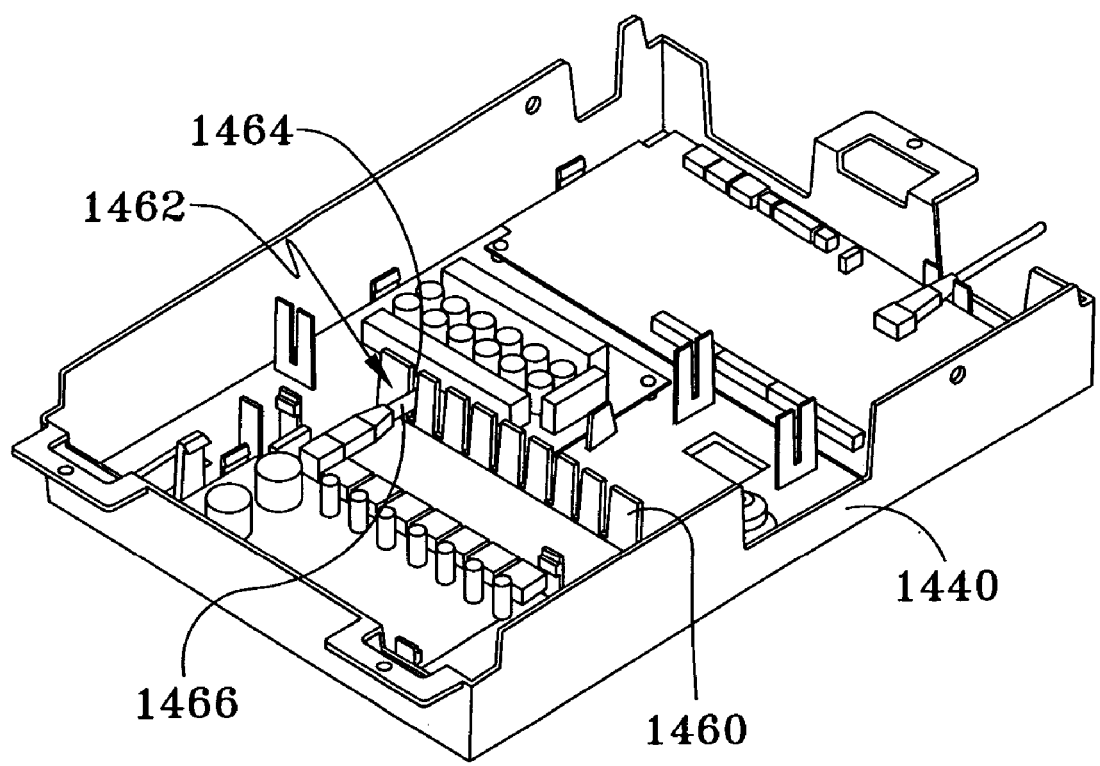
Figure 95:
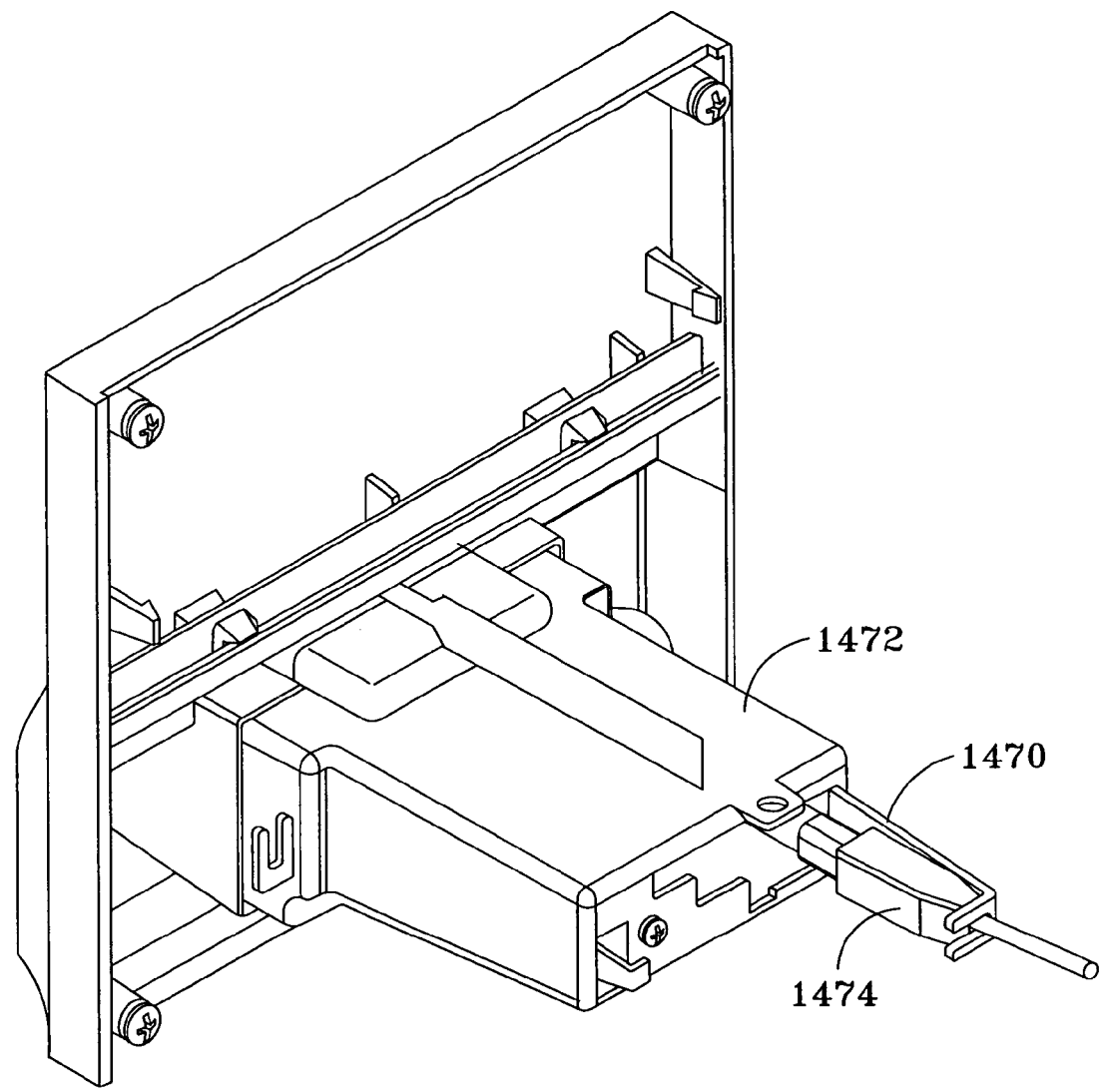

In exemplary embodiments of the automated banking machine, cables which plug into hardware components may be secured in place using cable locks. For example FIG. 94 shows the previously described PC board cover 1440. Here the cover is shown with integral cable locks 1460. The cable locks may include a plurality of ribs 1462. Adjacent ribs may include an undersized gap 1464 therebetween for creating an interference fit between the ribs and a cable 1466. As shown in FIG. 95, plastic housings 1472 for hardware devices and or the hardware devices themselves may include one or more cable locks 1470 adjacent locations that cables 1474 may be connected to the hardware devices.

Figure 96:
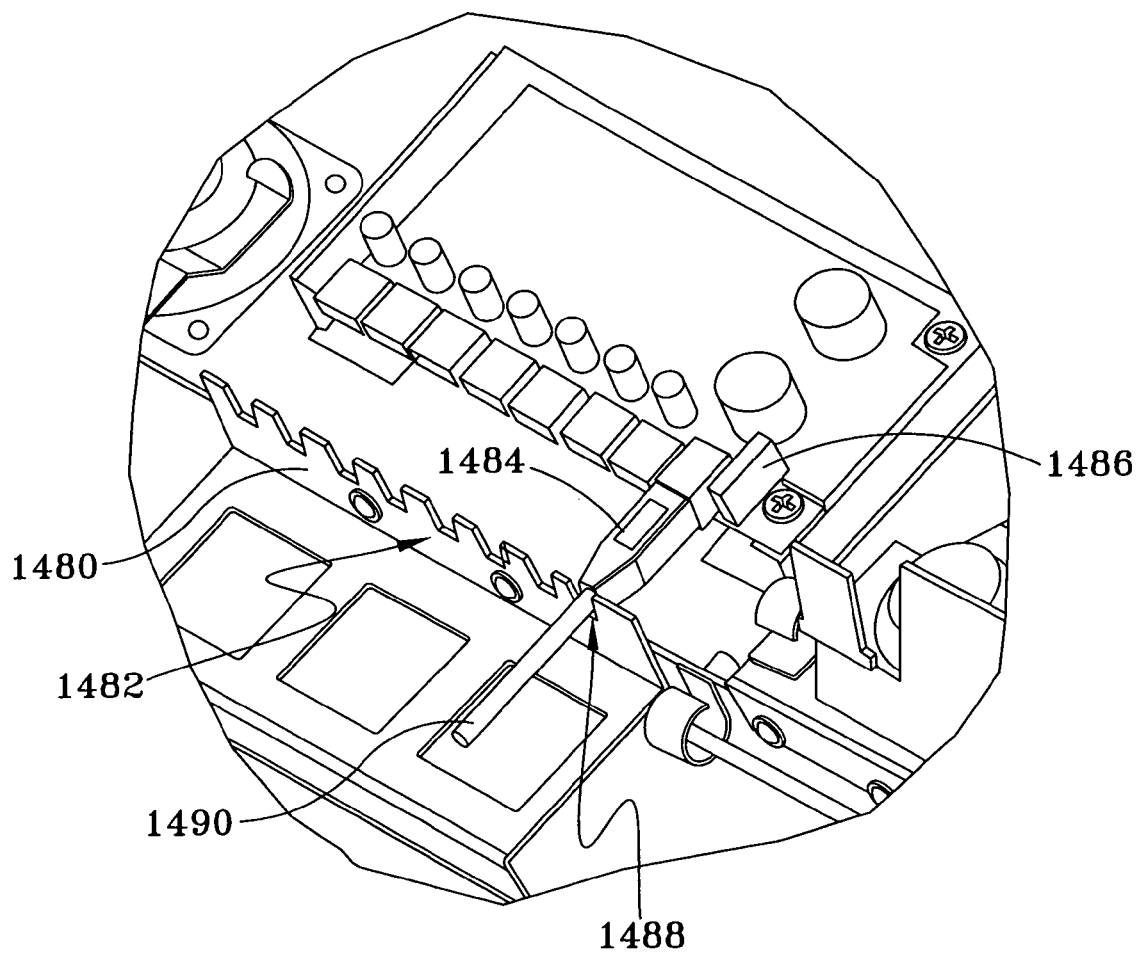

FIG. 96 shows an alternative exemplary embodiment of a cable lock 1480 integrated into a sheet metal bracket. Here the bracket may include a plurality of ribs 1482 that receive cables therebetween. The cable locks may be positioned sufficiently close to a head 1484 of a connected cable 1490 so as to block the cable from moving completely out of connection with the hardware device 1486. Here the width of the gap 1488 may be relatively narrower than the width of the head 1484 of the cable 1490. In this described exemplary embodiment the cable 1490 may be installed at an acute angle into the port of the hardware device 1486 and then pushed down into the cable lock 1480 to secure the cable in place generally perpendicular with respect to the hardware device port. In this described exemplary embodiment, the cable locks 1480 may or may not have gaps between adjacent ribs that are sufficiently small to form an interference fit with the cable.

Figure 97:
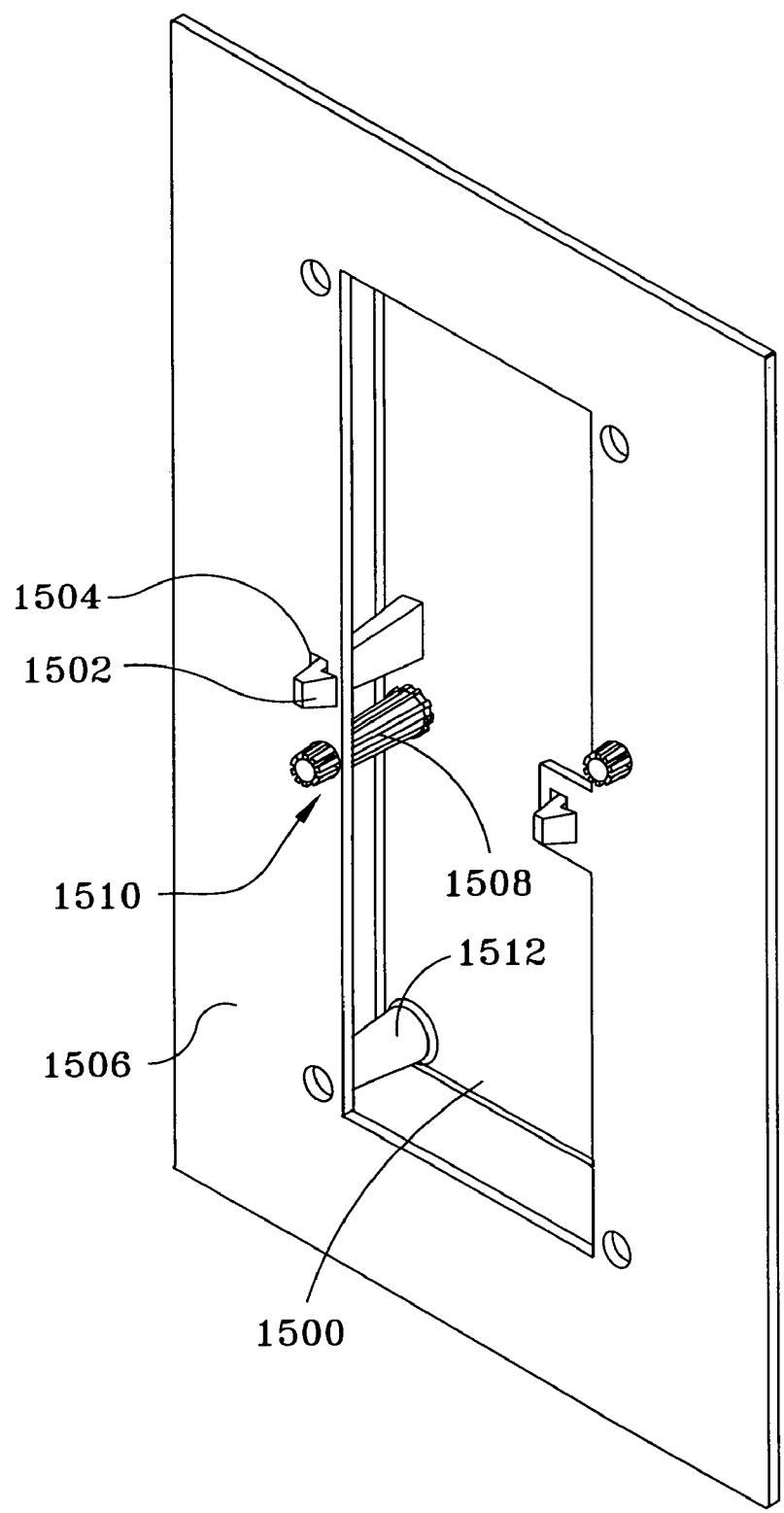

Exemplary embodiments of the automated banking machine may include various methods of connecting plastic parts to metal parts. Such methods may include the use of flexible snaps as discussed previously with respect to the PC board cover in FIG. 92. For example as shown in FIG. 97, a plastic bezel 1500 may include pins 1508 which pass through apertures 1510 in a sheet metal bracket 1506 to assist in properly positioning the bezel to the sheet metal bracket. In addition the plastic bezel may include flexible snaps 1502 which may be inserted into slots 1504 in the sheet metal bracket 1506 to lock the bezel in place.

In an exemplary embodiment of assembling the automated banking machines, only the snaps and pins may be used to secure the bezel in place. However the exemplary embodiment of the bezel may further include threaded supports 1512, which may be used at a later time to mount a screw or other fastener for holding the bezel to the sheet metal bracket when the pins or snaps of the bezel have become damaged or worn.

Figure 98:
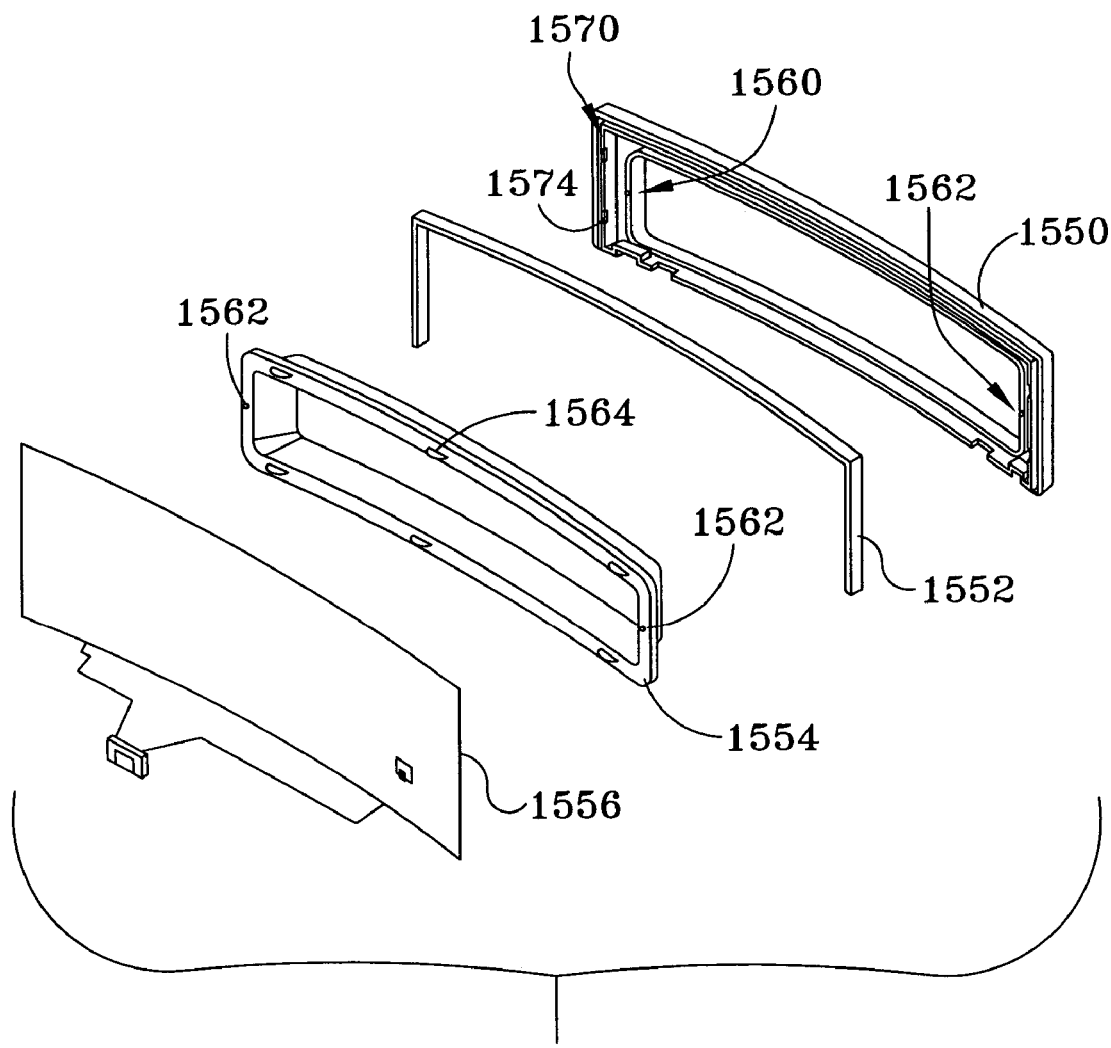

Exemplary embodiments of the automated banking machine may further include other methods and systems for assembling parts without the use of tools or fasteners such as screws. For example FIG. 98 shows an example of a plastic trim bezel 1550, rubber gasket 1552, and light diffuser being assembled to a sheet metal bracket 1556. In this described exemplary embodiment a first part such as the trim bezel 1550 may include cruciform ribs or pins 1560 which act as a locator to position a second part being assembled to it such as the light diffuser 1554. The second part may further include apertures 1562 which receive the cruciform pins 1562 therethrough.

In addition the second part may include ribs 1564 which fit against a third part such as the sheet metal bracket 1556. The ribs may be operative to prevent the second part from being pushed inwardly and out of engagement with the first part after assembly. The first part may include a trough 1570 for receiving the gasket 1552. The gasket may be operative to seal the assembly to prevent rain penetration. The gasket may also be operative to provide friction between the first part 1550 (e.g. the bezel) and the third part 1556 (e.g. the sheet metal bracket) as the first and second part assembly is slid into engagement with the third part. The additional friction provided by the gasket may also keep the assembly from coming apart during shipping.

Figure 99:
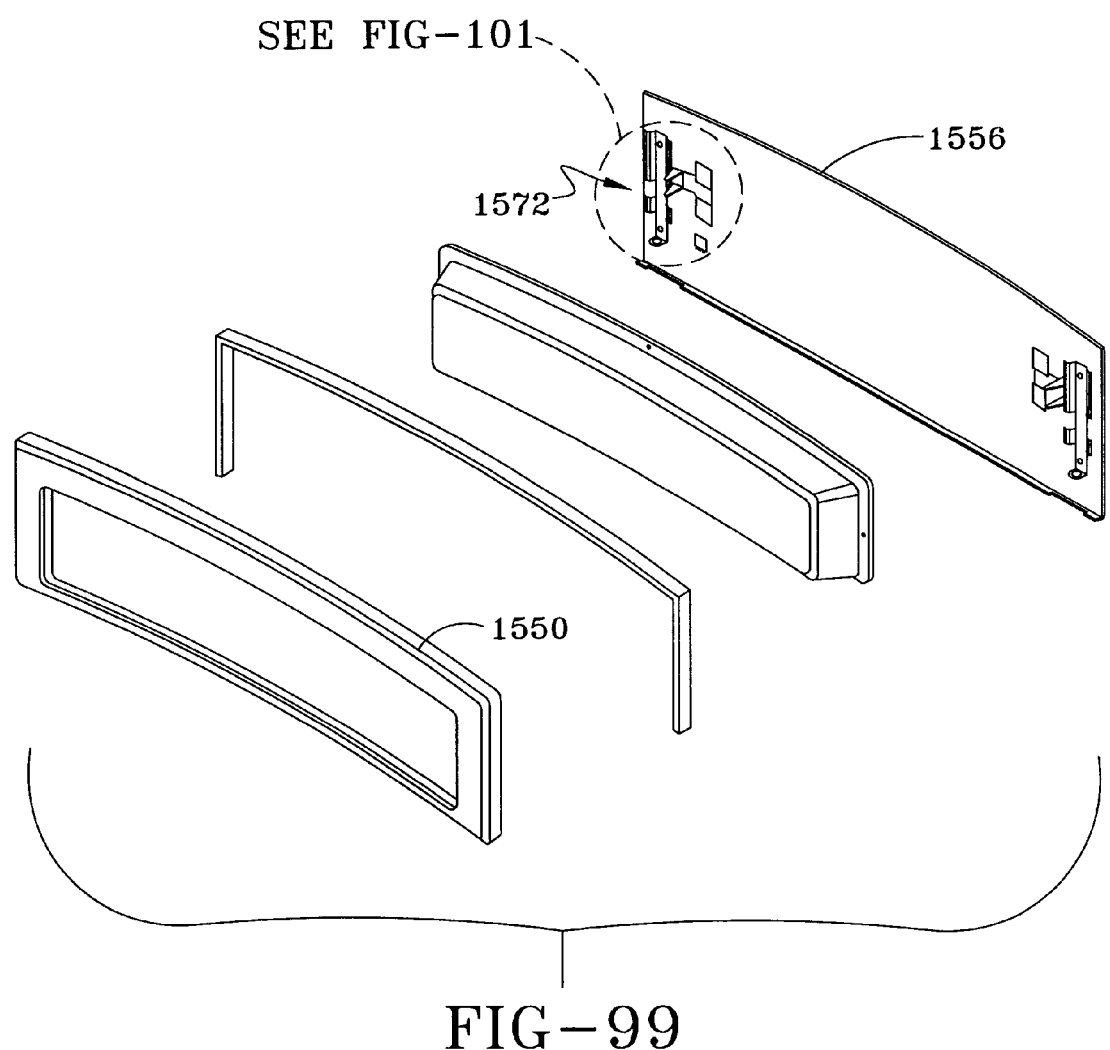
Figure 100:
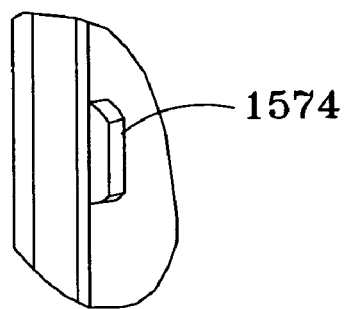
Figure 101:
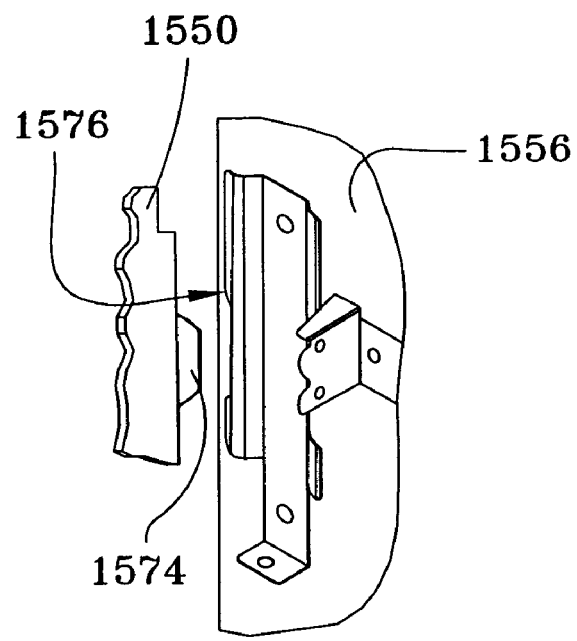

As shown in FIG. 99, in the exemplary embodiment, the third part 1556 (e.g. the sheet metal bracket) may include an L-shaped portion 1572 that is operative to guide the first part 1550 (e.g. the bezel) during installation and is operative to stop the first part once it is slid into position. As shown in FIG. 100 the first part 1550 may include undercut ribs 1574. As shown in FIG. 101, the first part 1550 may be engaged to the third part 1556 by sliding the undercut ribs 1574 behind flanges 1576 of the third part 1556.

Figure 103:
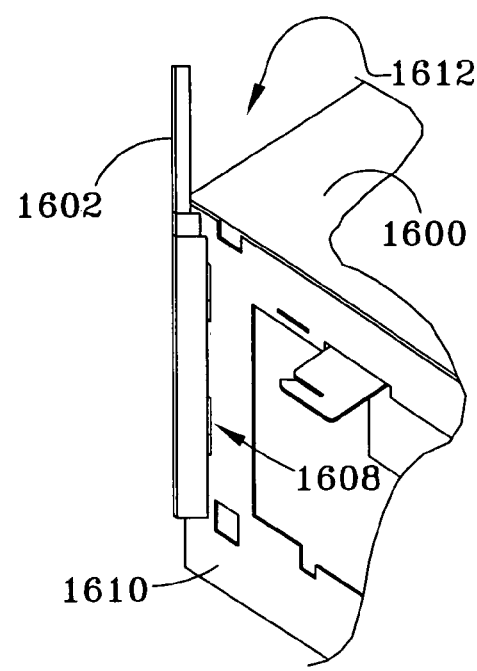
Figure 104:
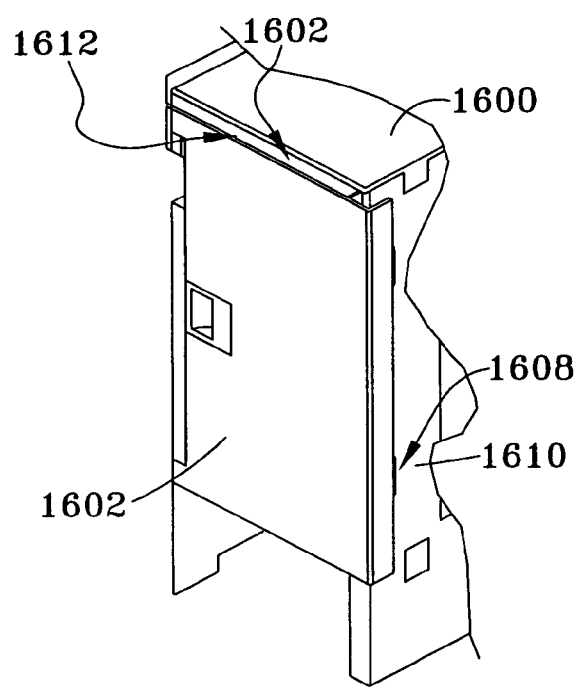
Figure 105:
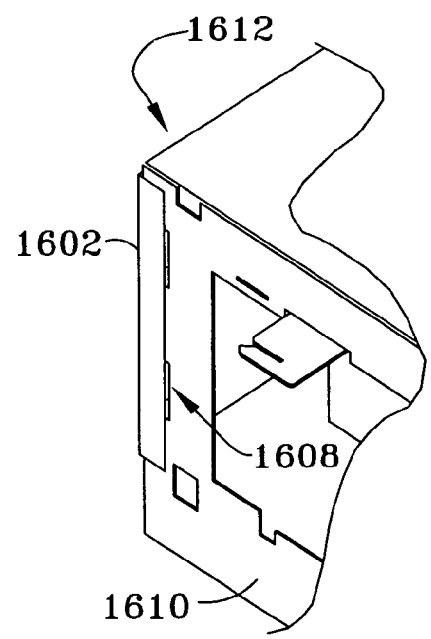

An exemplary embodiment of the automated banking machine may include one or more enclosures therein. FIGS. 102–107 show an exemplary embodiment of an automated banking machine enclosure 1600. The enclosure includes a door 1602. The door 1602 includes at least one tab 1604 with a hook or lance 1605 formed at one edge 1606 of the door. The tab 1604 may be bent inwardly from the edge 1606 at an angle such as 45 degrees. As shown in FIG. 103, the door 1602 may be mounted to the enclosure 1600 by sliding the tabs 1604 of the door into slots 1608 in a wall 1610 of the enclosure. A lance 1605 of the tab 1604 may then be slid downward behind the wall 1610 of the enclosure. As shown in FIGS. 104 and 105, in this described exemplary embodiment, the slots 1608 are located in a wall 1610 of the enclosure which is perpendicular to the side 1612 of the housing that is being closed by the door 1602.

Figure 102:
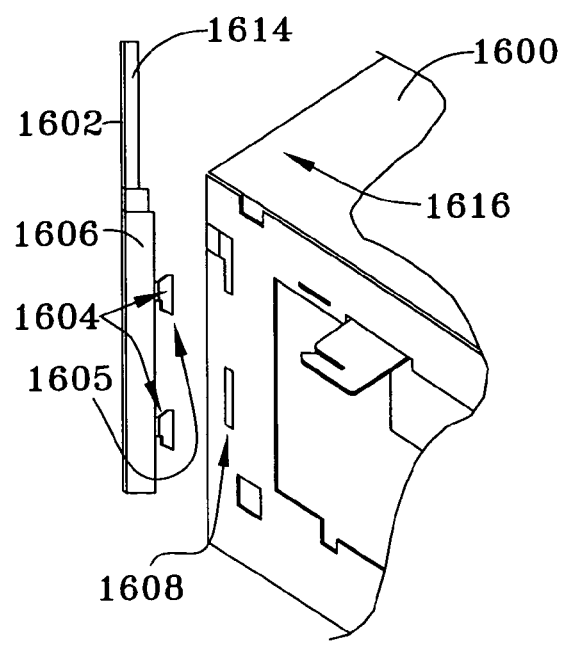
FIGS. 102–107 show an exemplary embodiment of an enclosure of an automated banking machine.

As shown in FIG. 102, the door 1602 may include a lip 1614 along an upper edge of the door 1602. When the door is in the closed position, the upper lip 1614 is located in the opening of the enclosure under the top wall 1616 of the enclosure to prevent the door from being removed by sliding it upwardly. When the door is in the open position, the door may be removed by sliding the tabs 1604 out of the slots 1608 of the enclosure. In this described exemplary embodiment the door is operative to rotate about 90 decrees from the closed position to the opened position.

Figure 106:
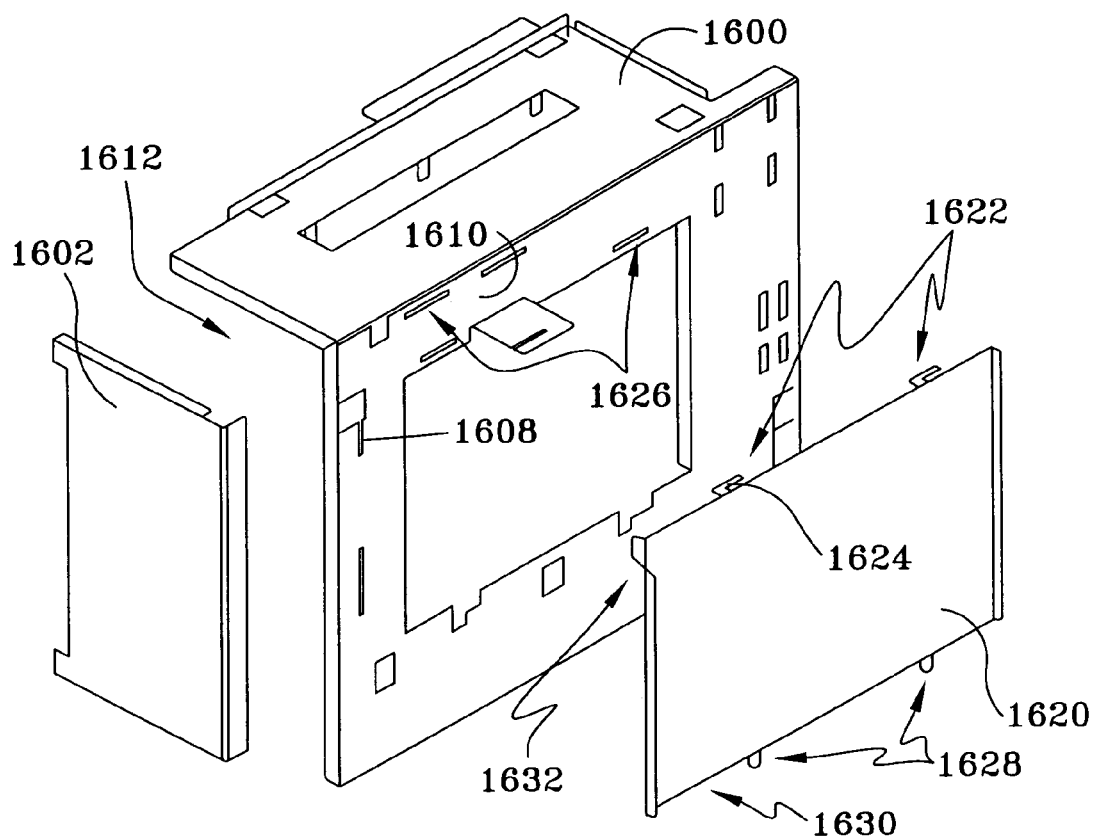

As shown in FIG. 106, exemplary embodiment of the enclosure 1600 may include a removable cover 1620 adjacent the wall 1610 which includes the slots 1608 for receiving the tabs of the door 1602. The cover may include tabs 1622 with lances 1624 that are operative to slide within slots 1626 in the wall 1610 of the enclosure prior to the door being mounted to the enclosure. When the tabs 1622 have been inserted into the slots 1626, the cover may be slid in a direction that extends away from the side 1612 that will include the door. As the cover slides the lances 1624 of the tabs 1622 slide behind the wall 1610. Also tabs 1628 at an edge 1630 of the cover may slide behind the wall 1610.

Figure 107:
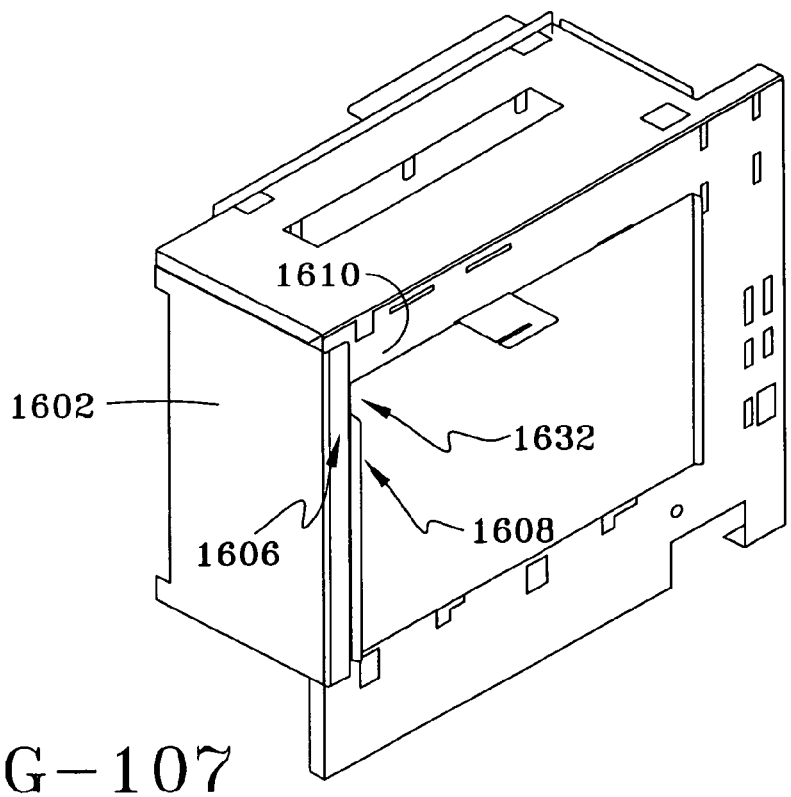

In the exemplary embodiment the cover 1620 includes a locking tab 1632. As shown in FIG. 107, when the cover is installed on the enclosure, the locking tab 1632 extends through the wall 1610. When the tabs of the door 1602 are mounted in the slots 1608 of wall 1610, the edge 1606 of the door is operative to block the locking tab 1632 and cover 1620 from sliding toward the door and disengaging from the enclosure. In this described exemplary embodiment, to remove the cover, the door must be removed first.

Referring back to FIG. 79, and exemplary embodiment of the automated banking machine may include a computer 1350 mounted outside the chest 102. The machine may include a PC chassis 1352 which is operative to support the computer 1350 in the frame. The computer may include a hard drive bay bracket which is removable without using tools according to one or more of the previously described methods of mounting components without tools (e.g. tabs with lances, bendable tabs, and locking tabs). Further in an exemplary embodiment the hard drive may be in releasable connection with the hard drive bay bracket such that the hard drive may be removed from the hard drive bay bracket while the hard drive bay bracket, power supply and/or other components of the computer remain in the chassis.

Exemplary embodiments of the automated banking machine may include one or more devices which transport media into and out of the machine. For example, such devices may include the previously discussed cash dispenser and receipt printer. Such devices such as a cash dispenser for example may include one or more optical sensors which are operative to determine if a location in a transport in which the media passes or is deposited includes an item therein. Such an item may be the media itself, a portion of the device, or a foreign object.

In an exemplary embodiment, these sensors may be used to verify media counts. The sensors may also be used to determine a mechanical position of portions of the device such as a push plate mechanism. The sensors may also be used to signal when a media has been removed from a location such as a gate of the dispenser.

Optical sensors may include a light source and a light detector. An object blocking light from the light source from reaching the light detector may be operative to trigger a determination by the automated banking machine that there is an obstruction. However, there exists the possibility that an individual placing an obstruction adjacent the optical sensor may attempt to fool the optical sensor by providing a substitute light source directed toward the light detector. Because the light detector continues to detect light from the substitute light source, the automated banking machine may not be able to detect the obstruction.

An exemplary embodiment of the automated banking machine may include one or more optical sensors adjacent a media pathway which are operative to provide protection against fraudulent actions which involve fooling the light sensor. For example, an exemplary embodiment of a sensor may include a light source such as an LED. When the light source is turned on, the automated banking machine is operative to cause the signal detected by the light detector to be evaluated. The sensor and/or other portions of the machine such as software operating in the computer of the machine may be operative to evaluate the detected signal.

For example, in an exemplary embodiment, the sensor may include a circuit which is operative to evaluate the signal. Other extraneous light frequencies such as ambient light, factory light, and sunshine detected by the light detector may be canceled out by the circuit. In exemplary embodiments, the sensor may include a lens which is operative to attenuate light frequencies other than infra-red. The lens may act as a passive filter which is operative to limit the type of light that is detected by the sensor.

In the exemplary embodiment, the sensor light source may be AC coupled to portions of the circuit to produce a signal which can be distinguished by the circuit from a DC light source such as a flash light. For example, the sensor light source may generate a light signal which various in intensity over time with a set frequency or other pattern. Light detected by a light detector of the sensor may be evaluated by the circuit to determine if the detected light signal changes in intensity over time at a corresponding frequency or pattern as the light signal generated by the light source.

If the detected light does not change in intensity or does not change in intensity with a frequency or pattern that corresponds to the light signal from the light source, the circuit is operative generate a signal representative of there being a problem with the passageway. The automated banking machine may be responsive to the problem signal to take the machine out of service and/or send a message to a remote server which conveys the detection of the problem by the circuit.

If the detected light signal does change in intensity with a pattern that corresponds to the pattern of intensity change of the light signal generated with the light source, the automated banking machine may be responsive to the circuit to attempt to move an item through the pathway.

Figure 108:
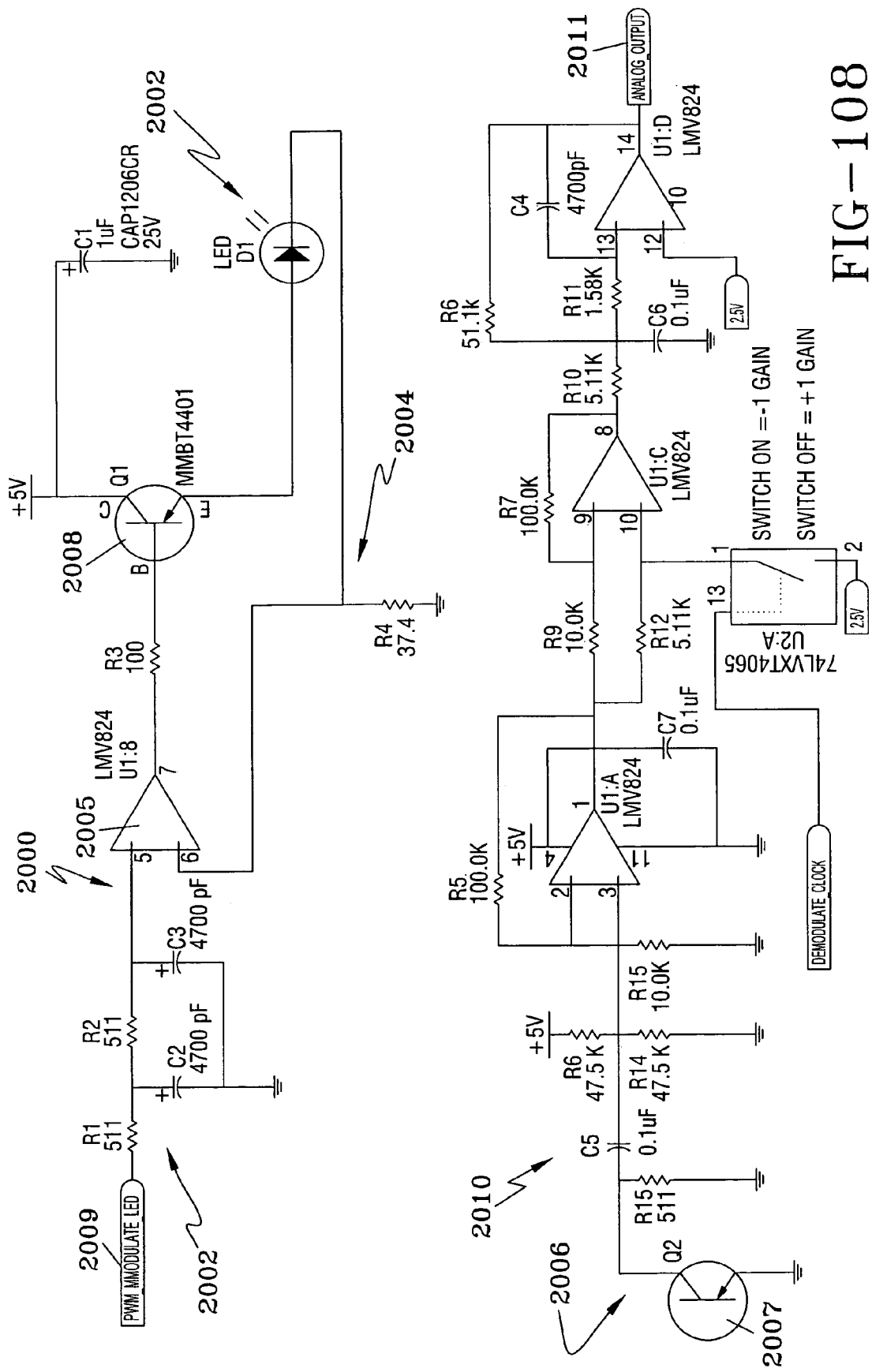

An exemplary embodiment of a circuit 2000 that may be used to operate the sensor is shown in FIG. 108. The sensor circuit 2000 may include a light source that corresponds to an LED drive circuit 2002 comprised of an op-amp circuit 2005 and drive transistor 2008. The sensor circuit 2000 may also include a feedback circuit 2004 comprised of a sense resistor that is fed back into the inverting terminal of the op-amp 2005. The LED current may be adjusted by a 6-bit PWM (pulse width modulation) control 2009. The duty cycle may vary from 0% to 100%. This may provide a range of LED current from 0 mA to 80 mA respectively in 48 increments.

The sensor circuit 2000 may further include a light detector that corresponds to a phototransistor receiver circuit 2006. A signal received with a phototransistor 2007 may be pulled high to the V/2 reference level with a low resistance. The value of this resistor may be kept low to minimize any near field coupling issues and to reduce the sensor's sensitivity to ambient light. The signal may then be passed through a series DC-block capacitor 2010. This stage may provide high pass filtering along with keeping out any DC signals that would otherwise be amplified through the following stages and cause possible saturation. The signal may then be amplified through a non-inverting gain stage. The next stage of the circuit may incorporate an op-amp that is switched between a +1 and −1 gain. This may provide a demodulated signal to the integrating stage. The signal may integrate over several cycles in order to subtract out the ambient light. The final output signal 2011 may consist of a DC level analog voltage varying in voltage from 2.5 volts to 5 volts. Signals of 2.5 volts may indicate that the passageway adjacent the sensor is either blocked or the LED is off. Signals above 2.5 volts may indicate that the passageway adjacent the sensor is clear.

The exemplary embodiment of the sensor may be calibrated according to the following method. Initially the method may include selecting a zero PWM to turn the LED off and recording the resulting sensor signal. This recorded sensor signal corresponds to the baseline from which the blocked or unblocked statuses can be made. Next the method includes increasing the LED current by increasing the PWM duty cycle. In addition the method includes monitoring the analog voltage fed back through an A/D Converter.

In the exemplary embodiment, there are three cases that may be handled during the PWM adjustments. Case 1 allows the sensor to calibrate to full range. When the analog voltage read back reaches a maximum range of (V−0.2) and the PWM value is below 1000%, the LED drive current may be set. The maximum range of (V−0.2) may be chosen for example to be 6% from the absolute full range of the sensor output to avoid saturation. This maximum sensor range may be stored/saved by software operating in the automated banking machine. Case 2 occurs if the voltage read back does not reach the maximum range. During this situation, the voltage read back needs to be above [V/10+baseline]. This ensures that there is enough signal to noise ratio. Case 3 occurs if the sensor does not reach the minimum value of [V/10+baseline]. This case 3 will generate a fault indicating calibration out of range.

Figure 109:
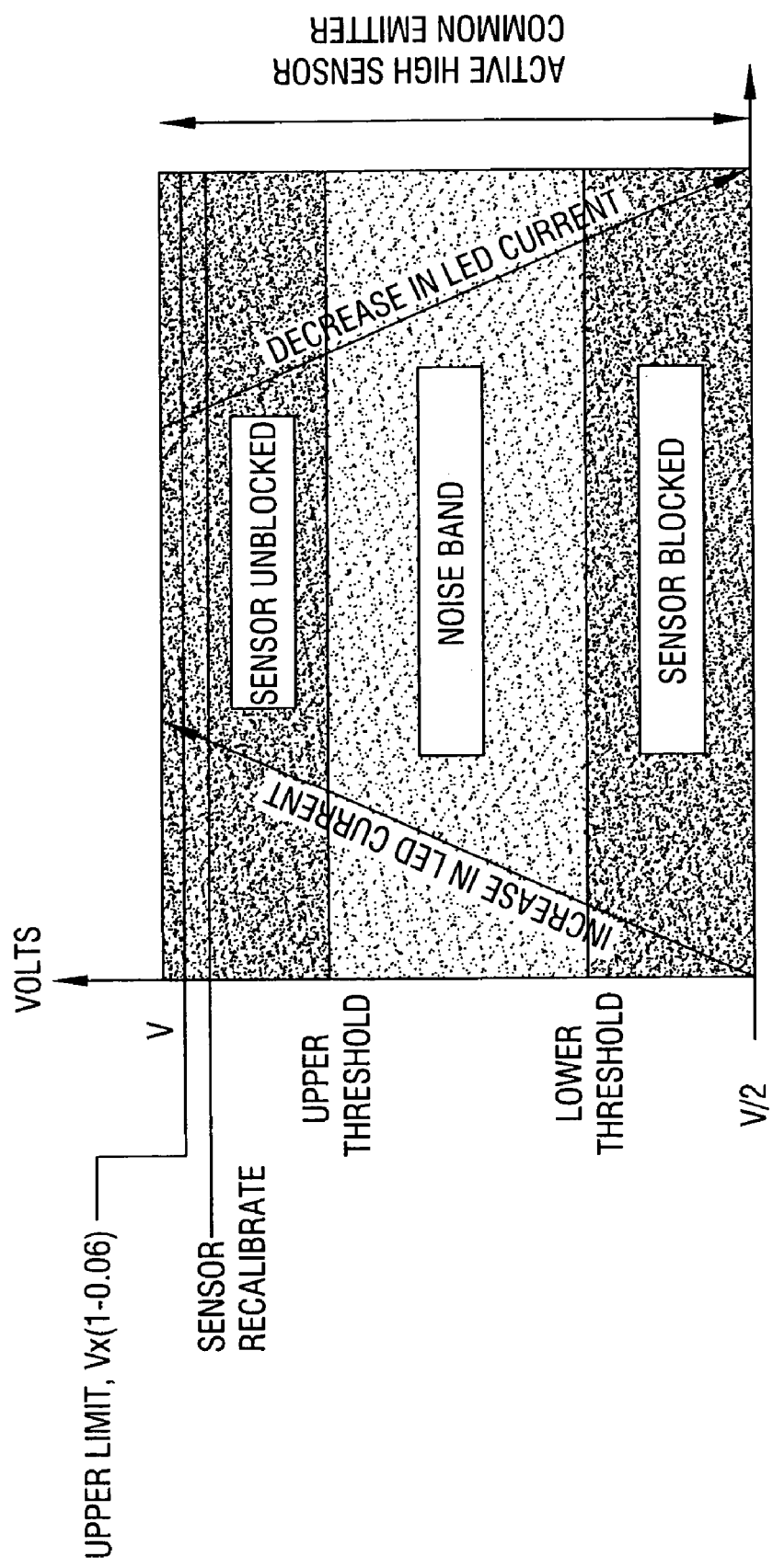

The calibration method may next include setting upper and lower thresholds for both case 1 and case 2. As shown in FIG. 109, such upper and lower thresholds may be set to a 30% margin from both the baseline (nominally V/2) and the maximum range achieved. This may provide a 40% noise band area. The upper and lower thresholds may be stored in a data store by the circuit and/or software operating in the automated banking machine. Signals will need to be equal to or above the upper threshold to indicate that a passage is not blocked. Signals will need to be equal to or below the lower threshold to indicate that the passage is blocked.

In addition the calibration method may include setting a recalibration threshold between the sensor unblocked value or baseline and the upper threshold. The sensor reading can be continually checked against this threshold to indicate when the sensor needs to be recalibrated. The recalibration threshold may be stored/set by software operating in the automated banking machine. Signals below this recalibration threshold may indicate recalibration of the circuit is required.

As shown in FIG. 110, in this described exemplary embodiment, a modulated PWM may be used. The carrier frequency may be 10 kHz and the sub-carrier frequency may be 500 kHz for example. The demodulation signal may be 10 kHz with a 50% duty.

Exemplary embodiments of the automated banking machine may include accepting devices which accept items from users of the machine. For example, the machine may include a cash acceptor which accepts individual bills or stacks of bills. In addition, the machine may include an envelope acceptor which receives deposits provided in envelopes. In each of these cases, the machine may store received bills, envelopes, or other items in a reservoir referred to herein as a cassette.

Figure 111:
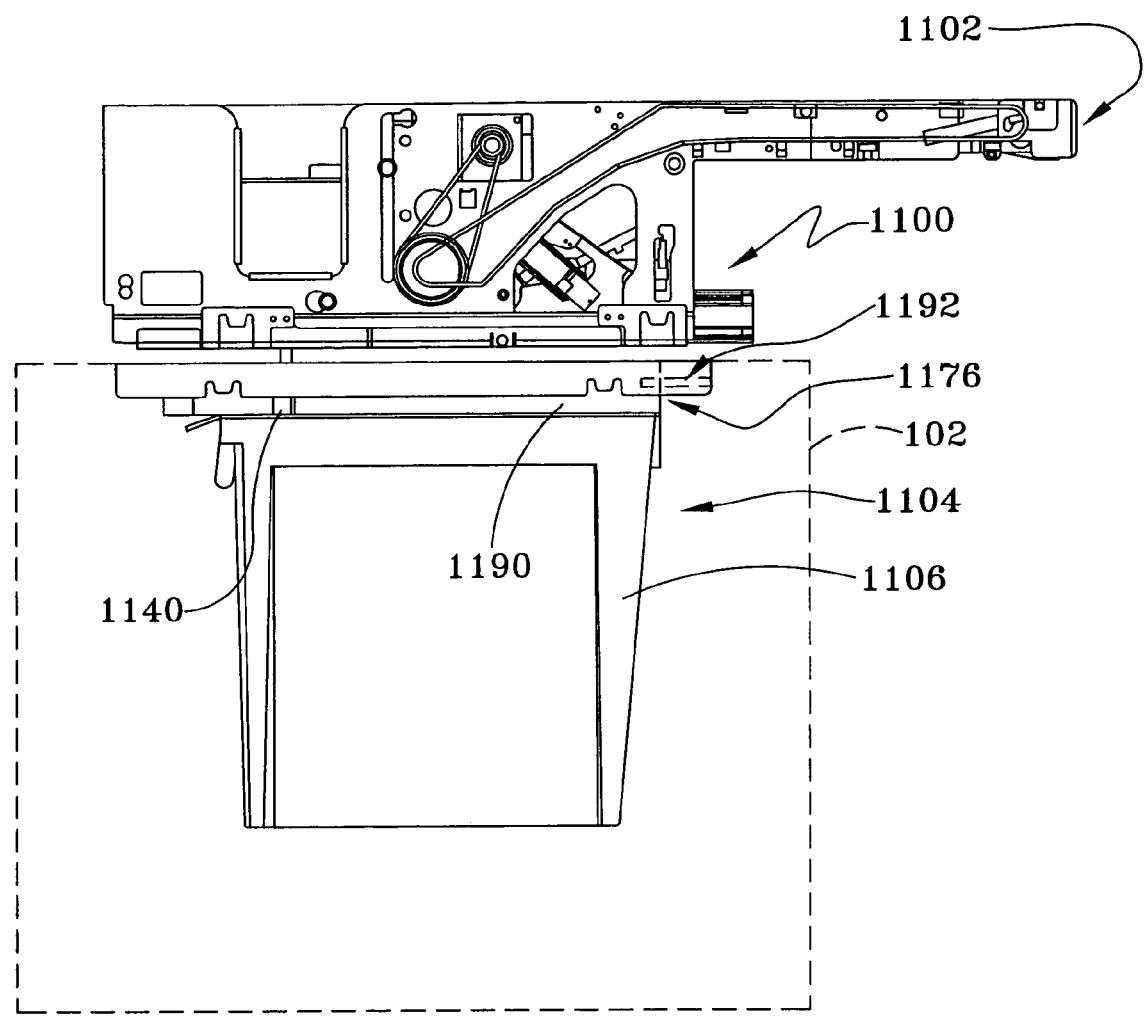
FIGS. 111–119 show an exemplary embodiment of a cassette for receiving deposited items in an automated banking machine.

FIG. 111 shows an example of an acceptor device 1100 of an exemplary embodiment of the automated banking machine which is operative to accept deposited items from users and store the deposited items in an internal storage area. Here the acceptor device 1100 corresponds to an envelope acceptor which is operative to receive envelopes deposited by users at an opening 1102. One or more belts of the acceptor device move the deposited envelope into a removable deposit holding container which is referred to herein as a cassette 1104.

Figure 112:
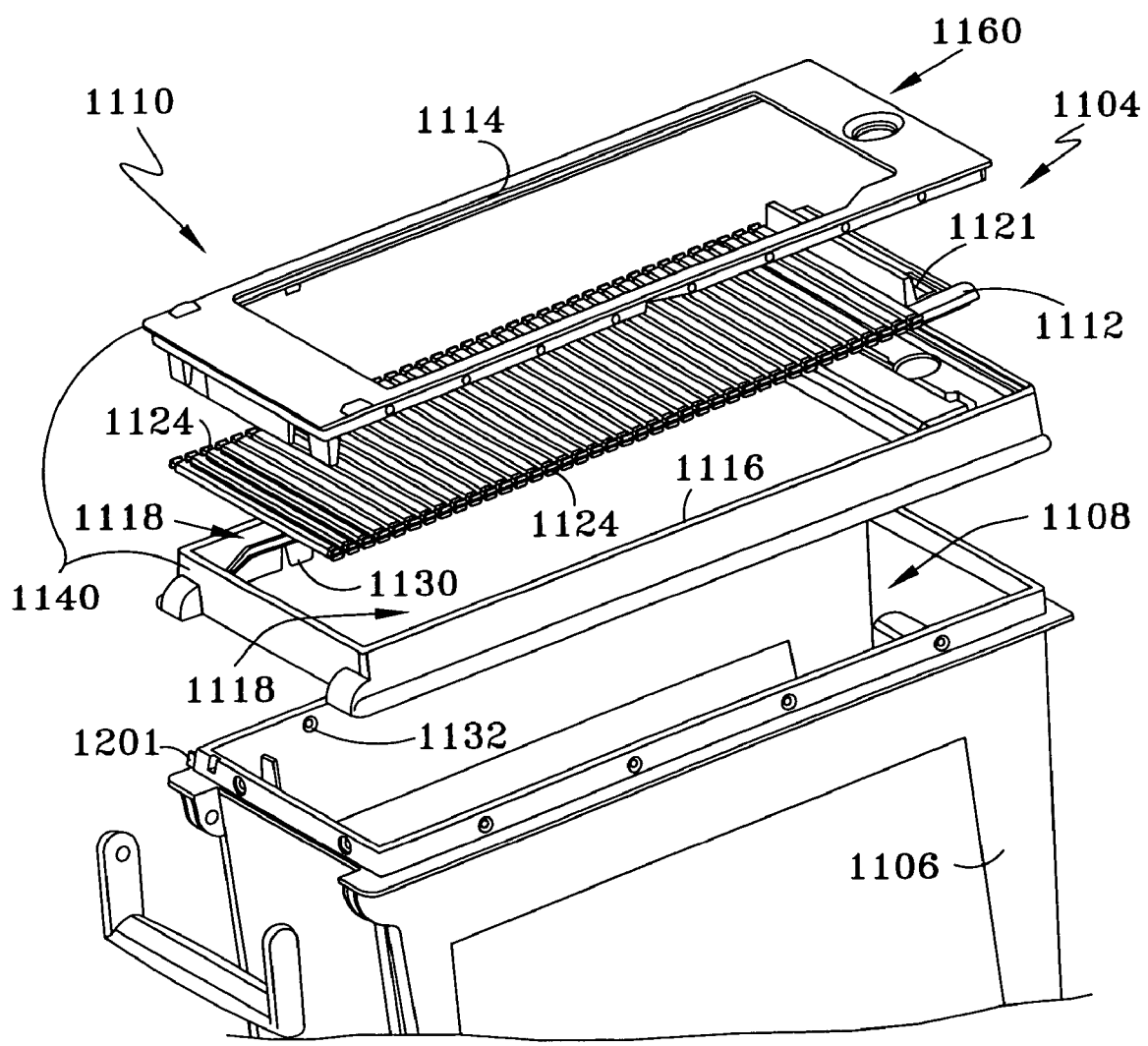

FIG. 112 shows an exploded view of the cassette 1104. The cassette may include a reservoir 1106 with an upper opening 1108. A door mechanism 1110 may be in operative connection with reservoir adjacent the opening. The door mechanism 1110 may include a door 1112 which is operative to move between a closed position which closes the opening to the reservoir and an open position which opens the opening to the reservoir. The door may be in sliding engagement with a frame 1140, the frame may be formed integral with the reservoir or may be mounted to the top of the reservoir. The reservoir may correspond to a plastic or metal bucket, a flexible bag or any other type of reservoir which is operative to hold deposits.

In this described exemplary embodiment the door may correspond to a tambour door comprised of a flexible plastic or other material which is in sliding engagement within the frame 1140. When the door is being slid open portions of the door may be directed to move inwardly into the reservoir.

Figure 113:
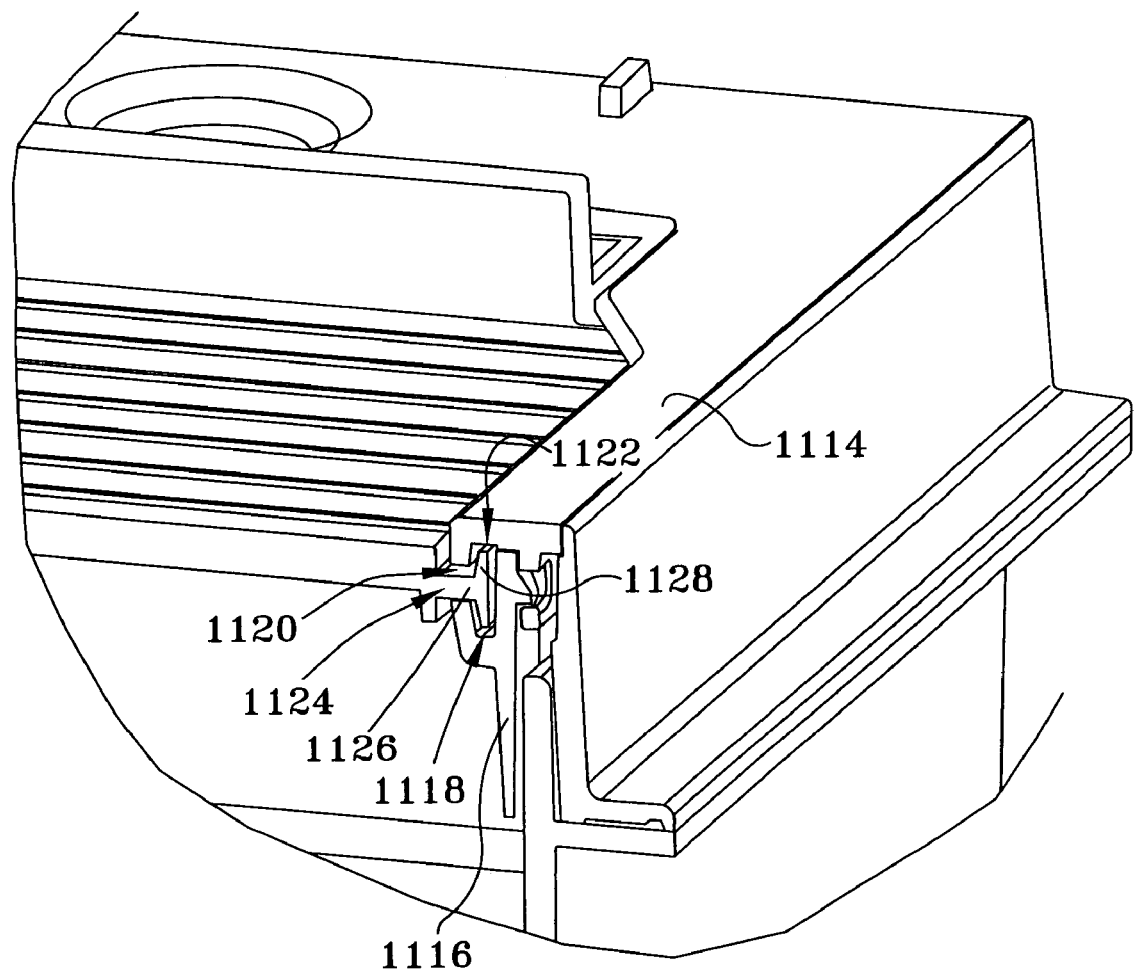

As shown in FIG. 112, the frame may be comprised of an upper portion 1114 and a lower portion 1116. As shown in FIG. 113 when the upper and lower portions 1114, 1116 are connected together, a channel 1118 is formed adjacent each of the opposed sides of the opening to the reservoir. The tambour door may include side flanges 1124 in sliding engagement within the channels 1118 of the frame. To open or close the tambour door, the flanges 1124 of the tambour door are operative to slide within the channels 1118 in directions that are parallel to the channels of the frame.

In the exemplary embodiment the channels and the flanges are cooperatively adapted to resist movement of the flanges out of the channels in a direction that is perpendicular to the channels. For example, the channels 1118 may includes a relatively narrow opening 1120 connected to a wider inner area 1122. The flanges of the tambour door may include a relatively narrow stem 1126 extending through the narrow opening 1120 of the channel. The stem 1126 of the flange may then be connected to a relatively wider portion 1128 which extends in the wider inner area 1122 of the channel. In the described exemplary embodiment, the cross-section of the flange 1124 may have a generally "T" shape which slides through a generally "T" shaped cross-section of the channel 1118. In other exemplary embodiments, the channels and flanges may have a generally "L" shape or any other shape which is operative to mechanically lock the flanges of the tambour door within the channels.

In the exemplary embodiment, the relatively wider portion of the flange is operative to resist being pulled through the narrow opening 1120. In cases where a significant amount of force is applied to the tambour door, portions of the channel and/or portions of the flange of the tambour door may be operative to deform and/or break in a manner which is visually apparent, thereby indicating that the tambour door has been tampered with.

In an exemplary embodiments of the cassette, a person could attempt to break into the cassette through the tambour door by applying excessive downward force in the middle of the door. Such downward force may be operative to deform the flange of the door sufficiently to enable the flanges to pull out of the channels 118 through the opening 1120 of the channels.

In cases where the flange and or frame have not suffered visible damage, the size of the opening 1120 to the channel 1118 may be sufficiently small relative to the size of the wider portion 1128 of the flange 1124 to make it difficult to push the flange back through the opening 1120 to the channel 1118. As a result the visible appearance of the flange of the door not being properly seated in the channels of the frame is operative to indicate that the tambour door has been tampered with.

Referring back to FIG. 112, when the door mechanism is initially being assembled, the flanges of the tambour door may be placed into the channels 1118 being formed by the upper portion 1114 and lower portion 1116 of the frame. In addition in this described exemplary embodiment, the upper portion 1114 and the lower portion 1116 may be operative to snap together to form an integral frame which is further snapped onto the reservoir 1106. In the exemplary embodiment the connection between the first and second portions 1114, 1116 of the frame and the connection between the frame and the reservoir 1106 is adapted to be difficult to separate without damage to the frame/reservoir or without access to the interior of the frame/reservoir. For example the portions of the frame and the reservoir may include tabs 1130 which snap into slots 1132 to engage and lock the components together. Such tabs may only be accessible from the interior of the frame or reservoir. In alternative exemplary embodiments separate fasteners may be used to connect the portions of the frame and the reservoir. Such fasteners may only be accessible from the interior of the frame or reservoir.

Figure 114:
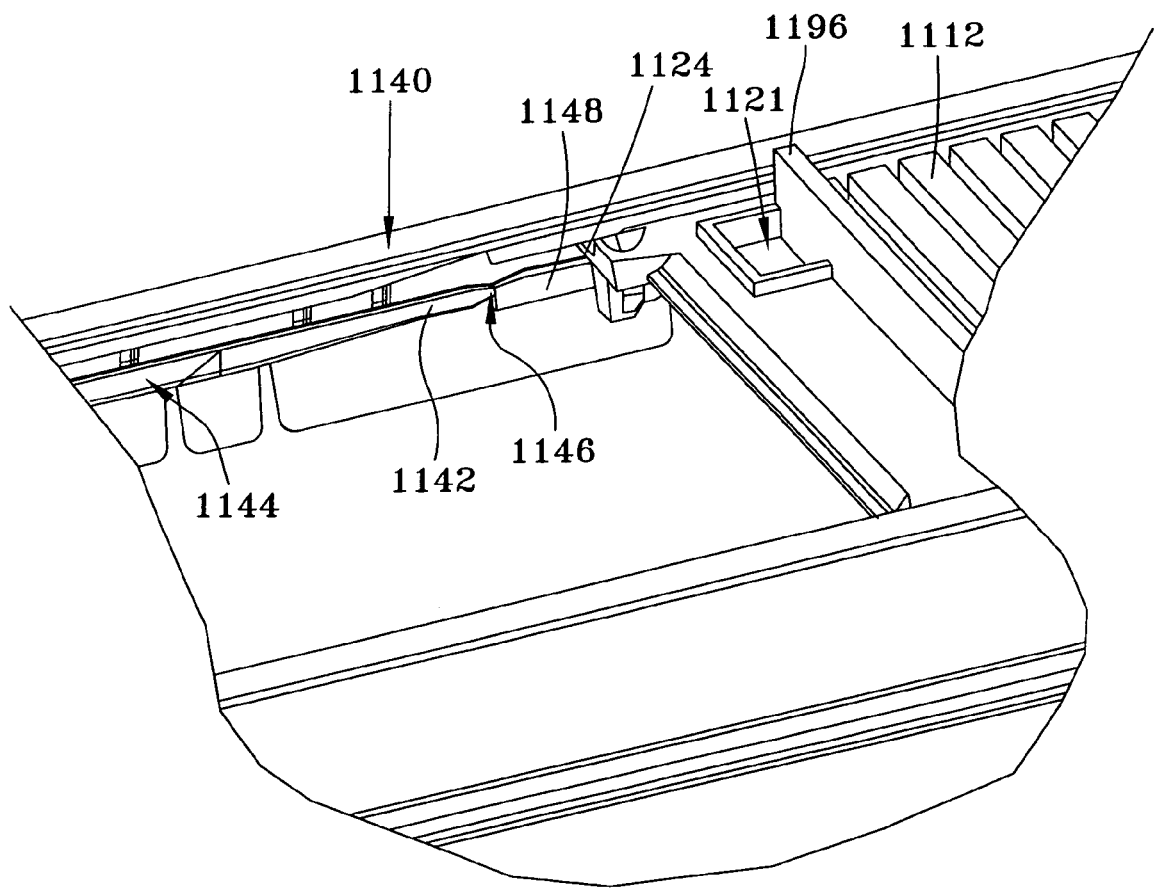

In cases where the tambour door has been damaged and must be replaced, the exemplary embodiment of the frame may include features which enable the tambour door to be replaced without separating the upper portion 114 and the lower portion 1116 of the frame. For example as shown in FIG. 114, a wall 1144 of the frame which bounds the channel 1118 may include a frangible portion or tab 1142. The frangible tab 1142 may include a portion 1146 which is structurally weaker than adjacent portions 1148 of the wall and is operative to break cleanly away from the adjacent portion 1148 of the wall.

Figure 115:
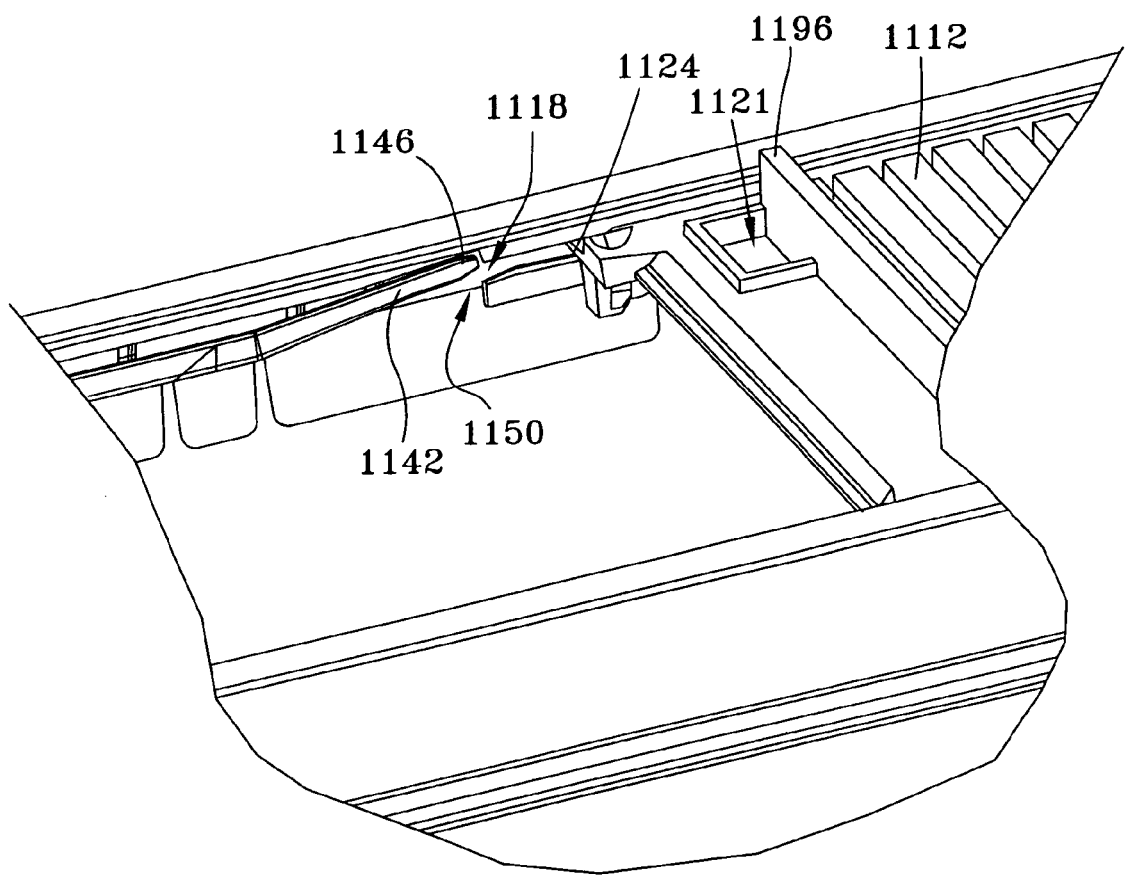

As shown in FIG. 115, the frangible tab 1142 may be sufficiently flexible to bend into the channel 1118 to form an opening 1150. The opening 1150 may be sufficiently large to enable the flange 1124 of the tambour door 1112 to slide out of the channel 1118. In this described exemplary embodiment opposed sides of the frame may include frangible tabs to enable each side of a tambour door to be removed and or inserted back into the frame. When a tambour door is inserted into the channels through the opening formed by the break in the frangible tab, the frangible tab may be sufficiently resilient to return the breakaway portion of the tab 1146 into alignment with the adjacent portions 1148 of the wall.

Figure 116:
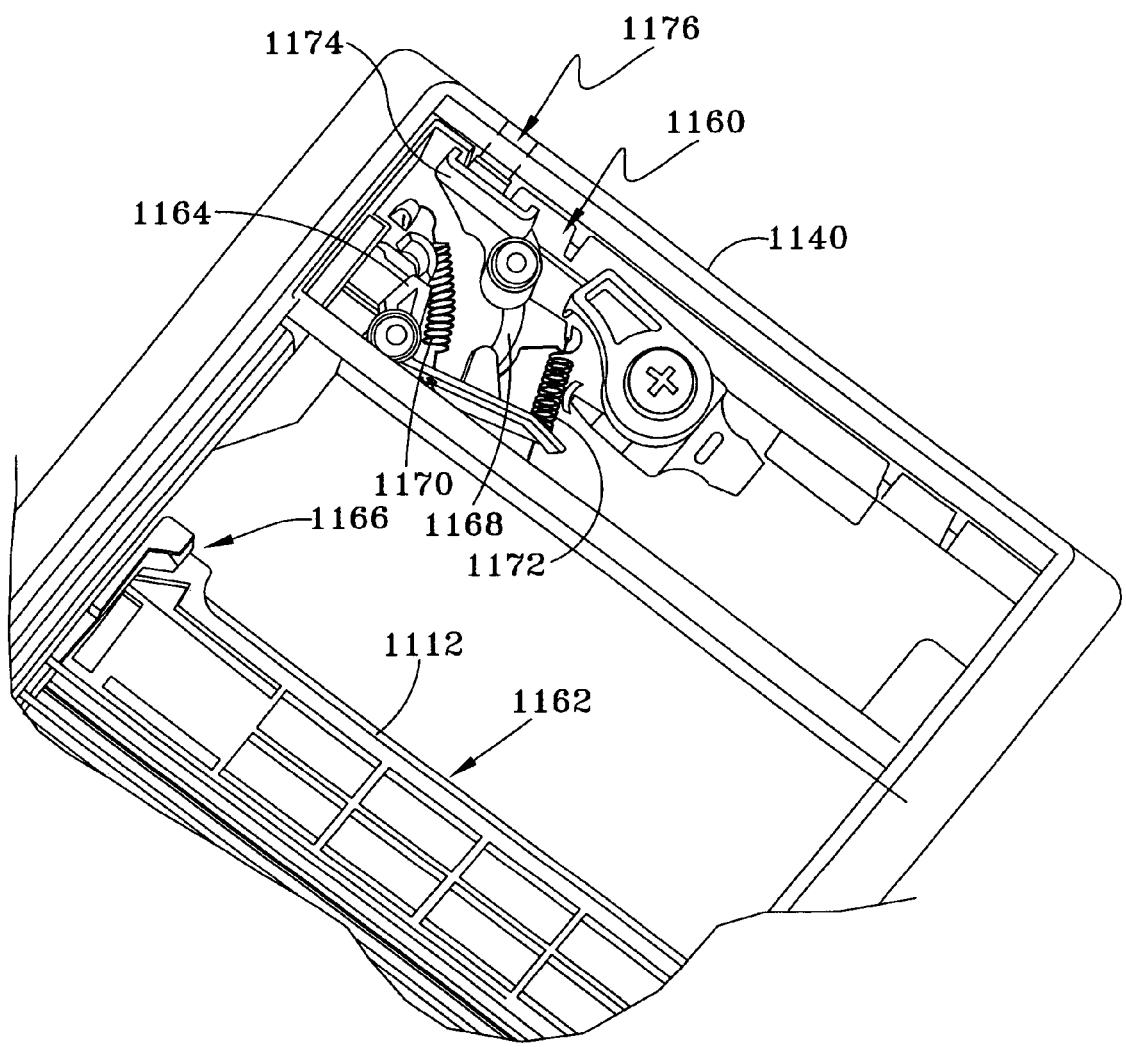
Figure 117:
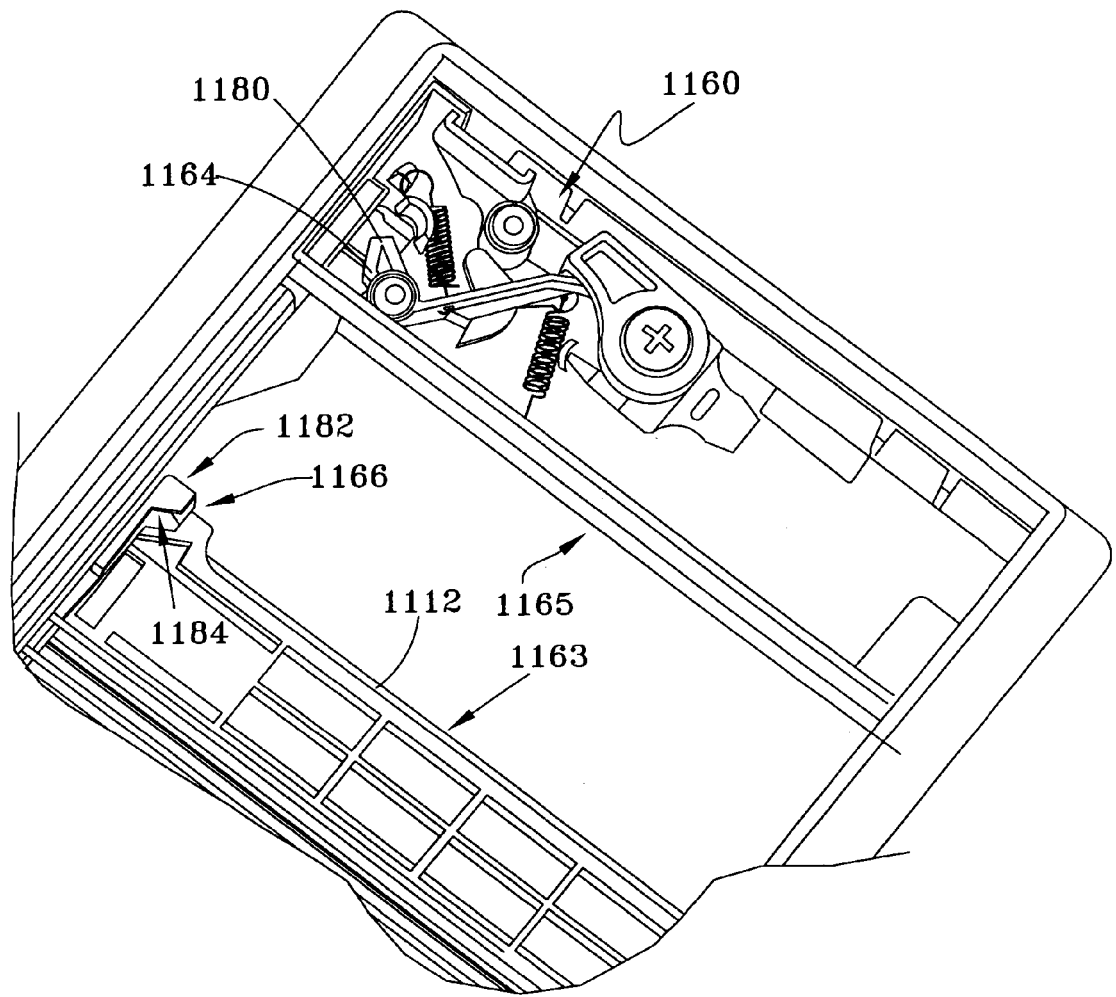

FIGS. 116 and 117 shows an exemplary embodiment of a locking mechanism 1160 of the cassette. In the exemplary embodiment, the locking mechanism 1160 is operative to lock the tambour door in a closed position which prevents access to the interior of the reservoir. The exemplary embodiment of the locking mechanism may be placed in different states including an armed state and a locked state. FIG. 116 shows the locking mechanism in the armed state. In the armed state a locking arm 1164 is rotated upwardly. In this position, the end 1162 of the door 1112 may be moved to a closed position adjacent the locking mechanism, however, the door will not become locked shut and may still be slid open again.

The locking arm 1164 is biased with a spring 1170 to rotate into a lowered position which is operative to engage with a slot 1166 in the door 1112. However, as shown in FIG. 116, when the locking mechanism is in the armed state, the locking arm 1164 is held upwardly by a further arm 1168. The further arm 1168 is operative to rotate between a first position which holds the locking arm upwardly and a second position which releases the locking arm 1164 to rotate downwardly. The further arm 1168 is biased to rotate to the first position by a spring 1172. The further arm includes a portion 1174 which is extends adjacent an aperture 1176 through the side of the frame 1140. As will be discussed further in more detail, when the cassette is inserted into the automated banking machine, a pin in the automated banking machine is operative to pass into the aperture 1176 in the frame and urge the further arm 1168 to rotate to the second position. As discussed previously, in the second position the further arm is operative to move to a location which frees the locking arm 1164 to rotate downwardly to place the locking mechanism into the locked state.

FIG. 117 shows an example of the locking mechanism in the locked state. Here the locking arm 464 has rotated downwardly. When the tambour door is slid into the closed position adjacent the locking mechanism, the tip 1180 of the locking arm 1164 is operative to rotate into the slot 1166 in the door. In this described exemplary embodiment when the door is being closed, an upper wall 1182 adjacent the slot may initial push the tip 1180 of the locking arm to rotate upwardly. When the wall 1182 has slide passed the tip 1180 of the locking arm, the locking arm rotates downwardly into the slot 1166. In the exemplary embodiment, the tip 1180 of the locking arm is operative to contact an inside surface 1184 and block the wall 1182 and tambour door 1112 from sliding into an opened position.

In the exemplary embodiment, the locking mechanism may be returned to the armed state responsive to turning of a key clockwise to an unlocking position and then turning the key counterclockwise. The clockwise rotation of a key is operative to urge the locking lever 1164 into the upward position shown in FIG. 116 with the further arm 1168 in the first position.

If the key remains in the unlocking position, the exemplary embodiment of the locking mechanism is operative to prevent the locking arm from rotating downward. In this described unlocked state of the locking mechanism, the locking mechanism may be operative to prevent the key from being removed from the locking mechanism.

When the key is rotated counterclockwise to a locked position, the locking mechanism is placed in the armed state and the locking mechanism is operative to enable the key to be removed and. As discussed previously, when the locking mechanism is in the armed state the locking arm is capable of moving downwardly responsive to the further arm 1168 being rotated to the second position.

In the exemplary embodiment the slot 1166 may be located adjacent an edge of the tambour door 1112 rather than in the center of the door. When the tambour door is moved to the closed position, envelopes, cash or other relatively thin flexible items could become caught between the front of the door 1163 and the front 1165 of the frame. However, with the locking arm 1164 engaging the slot 1166 adjacent the side of the tambour door, the presence of such items caught between the door is less likely to interfere with the engagement of the locking arm 1164 in the slot 1166.

Referring back to FIG. 111, the exemplary embodiment of the automated banking machine may include a bracket 1190 positioned beneath the acceptor device 1100. Both the bracket 1190 and the cassette 1104 may be located within the chest 102 of the automated banking machine. The cassette 1104 may be operative to removably slide into engagement with the bracket to place the reservoir 1106 of the cassette 1104 directly underneath the acceptor device 1100.

In this described exemplary embodiment, the bracket may include the previously described pin 1192. When the side of the frame 1140 with the aperture 1176 has reached the end of the bracket, the pin 1192 is aligned to enter the aperture 1176 in the frame (FIG. 116) which causes the lock to change from the armed state to the locked state.

Figure 118:
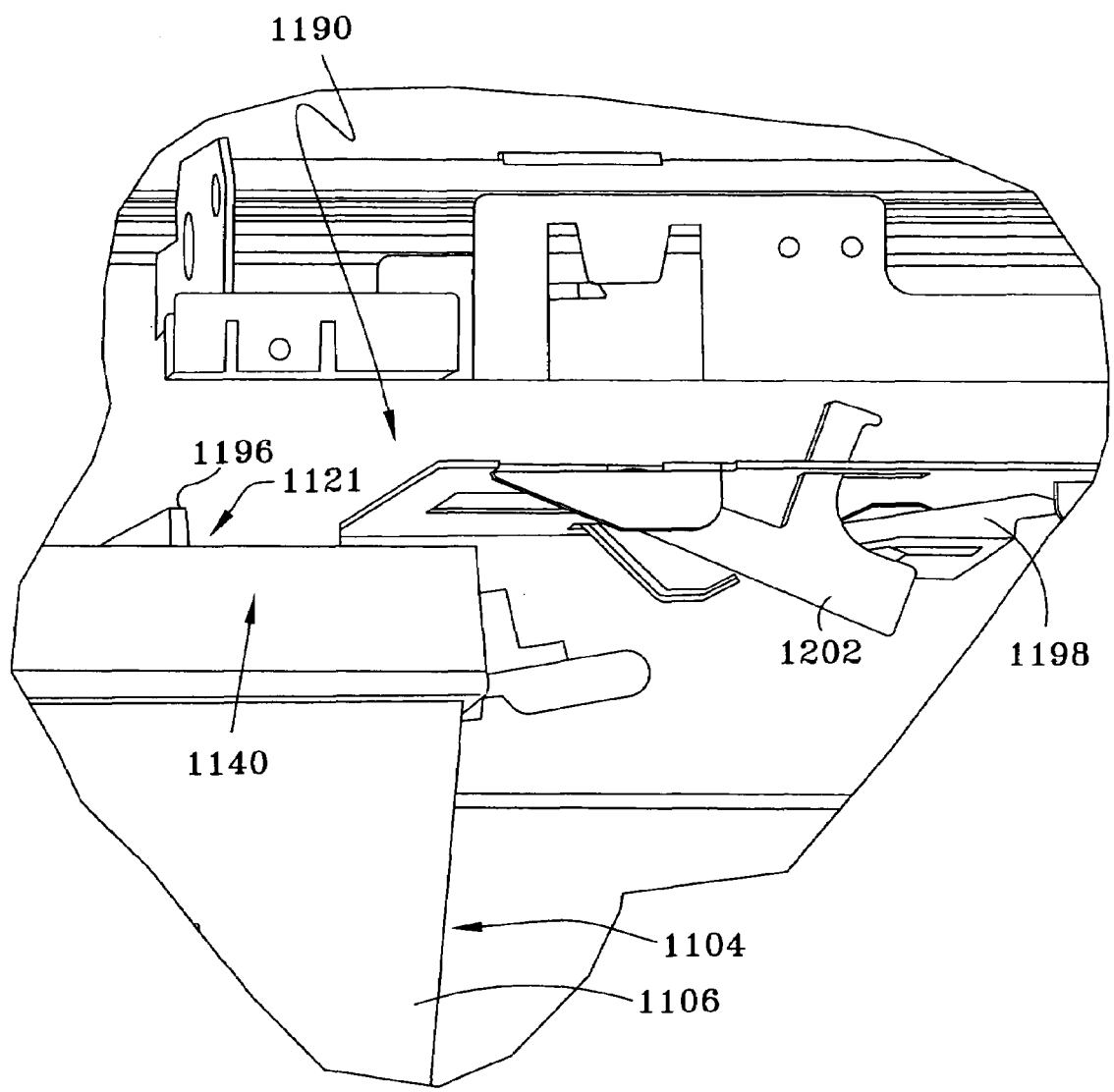

As shown in FIG. 118, when the cassette is slid into the bracket 1190, an upwardly directed portion or handle 1196 on the tambour door is operative to contact a downwardly extending arm 1198 of the bracket. The arm 1198 is operative to block the movement of the handle into the bracket. As a result the tambour door is urged to slide relative the frame 1140 into an open position as the cassette is inserted into the bracket. When the door is in the open position, deposited items from the acceptor device 1100 are operative to pass through the frame of the cassette into the reservoir 1106.

When the cassette 1104 is inserted into the bracket 1190, the arm 1198 of the bracket is operative to engage with a slot 1121 (see also FIG. 115) in the tambour door 1112. When the cassette is removed from the bracket, the arm engaged with the slot of the tambour door is operative to urge the tambour door to slide to a closed position. As discussed previously, because the pin 1192 of the bracket previously placed the locking mechanism into a locked state, when the tambour door slides to the closed position as the cassette is being removed, the tambour door engages with the locking mechanisms and becomes locked shut. In this described exemplary embodiment, the tambour door is operative to remain locked shut until a key is rotated in the locking mechanism to place the locking mechanism in an unlocked or armed state.

In the exemplary embodiment, the cassette may be inserted with the tambour door either opened or closed. However, when the cassette is removed, the tambour door is closed and locked. In addition when the cassette is in the armed state prior to being inserted into the bracket, the tambour door may be opened or closed many times without the tambour door being locked shut. In addition the exemplary embodiment of the cassette and bracket is operative enable the cassette to only be inserted into the bracket in one direction. As shown in FIG. 112, the reservoir or frame may include a projection 1201 on the side of the cassette opposite the locking mechanism 1160. If a user attempts to insert the cassette in the wrong direction (i.e. with the end of the cassette with the projection 1201 entering first), the bracket is operative to contact the projection 1210 and prevent the cassette from being inserted.

In the exemplary embodiment, the top of the chest may include therethrough an opening positioned between the cassette 1104 located inside the chest and the acceptor device 1100 located above the chest. Exemplary embodiments of the machine may include acceptor devices which are capable of sliding outwardly from the frame of the machine into a service position. When the acceptor device slides outwardly, the opening into the chest may be exposed which could provide access through the opening to items in the cassette.

Figure 119:
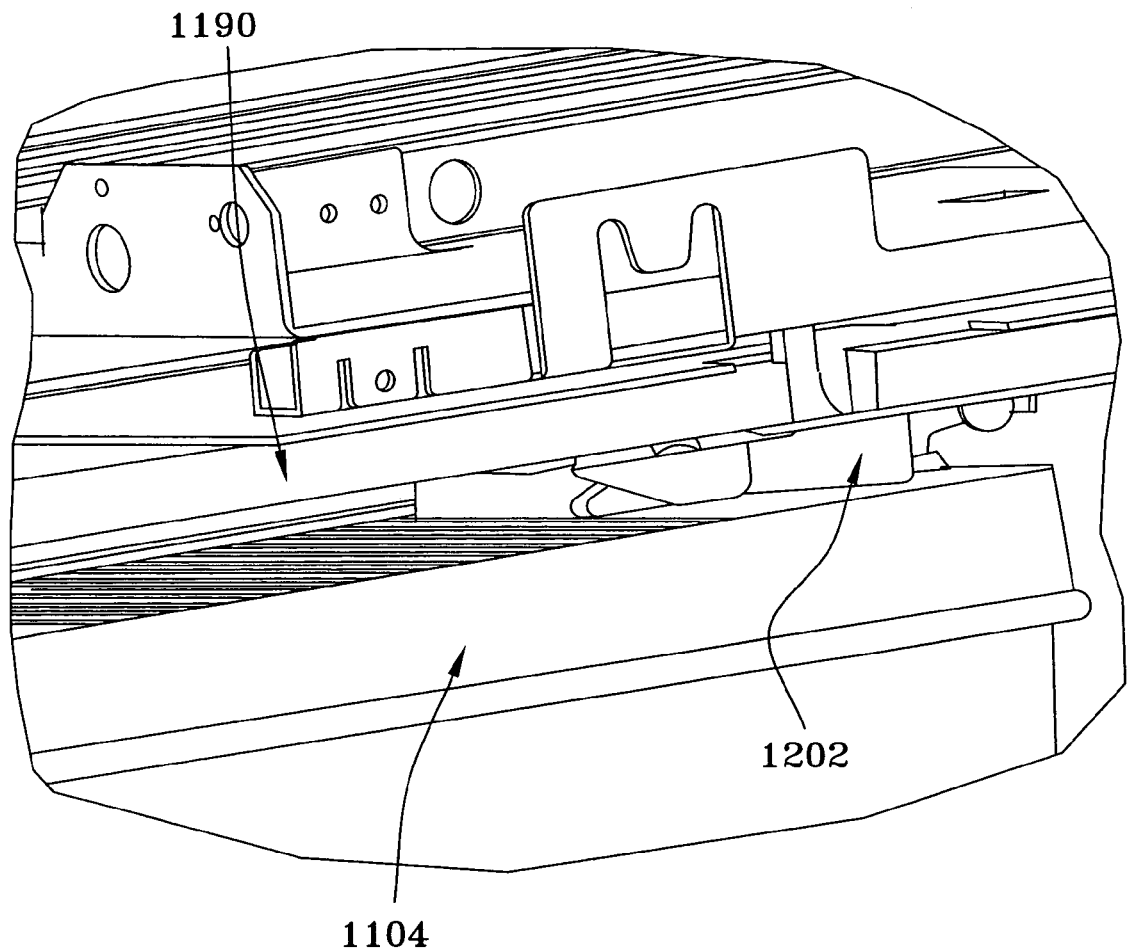

An exemplary embodiment of the automated banking machine is operative to prevent the acceptor device from moving outwardly to a service position while the cassette remains inserted in the bracket with its tambour door open. As shown in FIG. 118, the bracket may include a movable hook 1202. Before the cassette 1104 is inserted into the bracket 1190, the hook is operative to automatically rotate or otherwise move downwardly in response to a biasing force such as gravity, spring or other force. In this downward position, the hook is not operative to interfere with the movement of an acceptor device out of its docked position above the bracket and chest. However, as shown in FIG. 119. When the cassette 1104 is inserted into the bracket 1190, the cassette is operative to contact the hook 1202 and urge the hook 1202 to rotate or other wise move upwardly. In an upward position, the hook is operative to engage with portions of the acceptor device and prevent the acceptor device from moving outwardly into a service position which exposes an opening into the chest and cassette of the machine. To enable the acceptor device to move outwardly to a service position, the cassette 1104 may be removed first to allow the hook 1202 to move out of engagement with the acceptor device.

Figure 3:
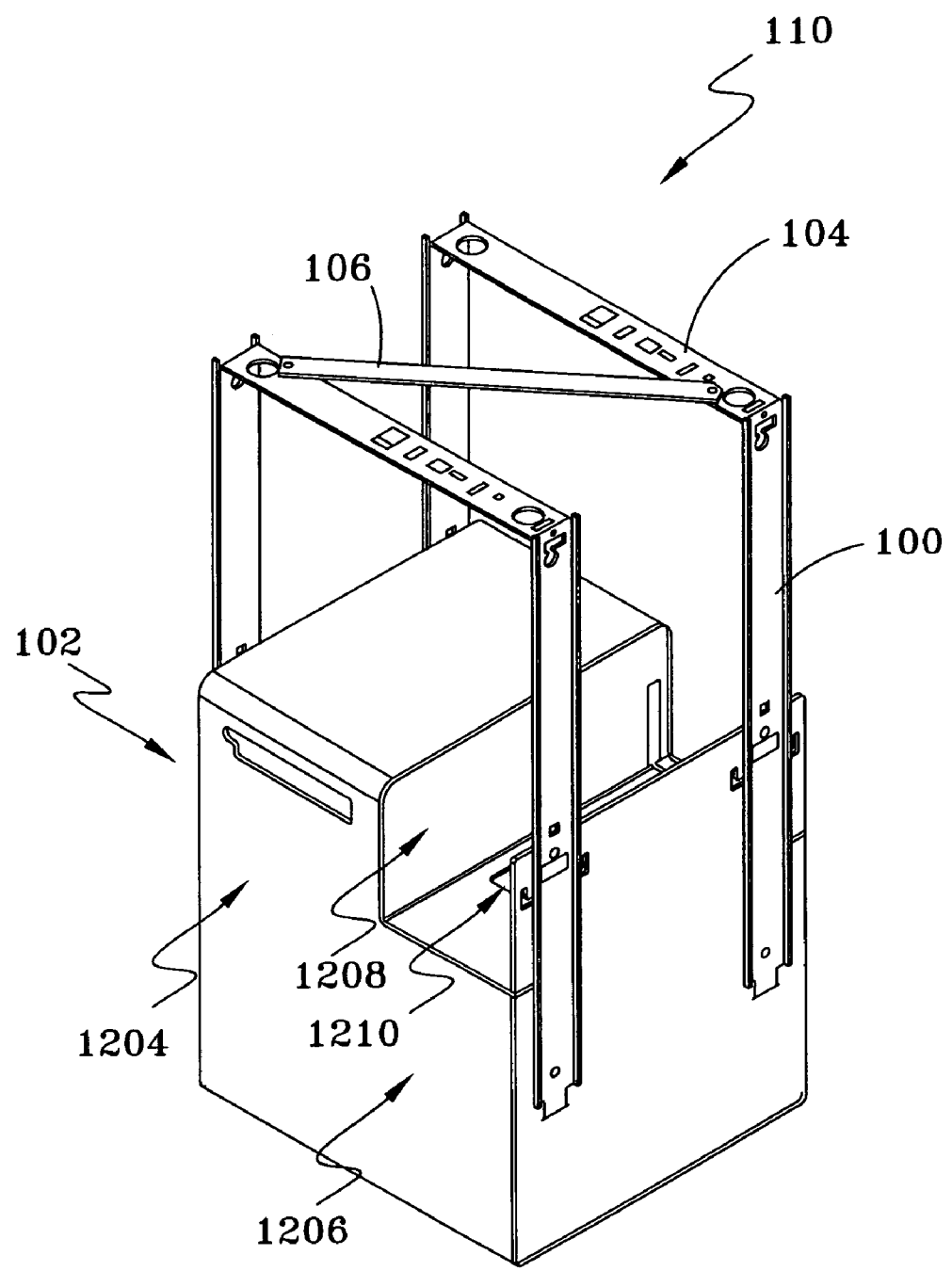
FIGS. 3–17 show exemplary embodiments of a frame of an automated banking machine.

In exemplary embodiments, the chest 102 may have a generally "L" shaped contour as shown in FIG. 3 with a taller portion 1204 adjacent a relatively shorter portion 1206. In this described exemplary embodiment, the acceptor device may be positioned above the shorter portion 1206 and adjacent an upper side wall 1208 of the taller portion. The cassette may be mounted to the bracket within the shorter portion 1206 of the chest. An upper surface of the shorter portion 1206 may includes the opening 1210 between the cassette within the chest and the acceptor device mounted outside the chest. As described previously, the acceptor device may be operative to move items through the opening into the cassette. In this described exemplary embodiment the cash dispenser of the machine may be mounted within the taller portion 1204 of the chest.

Thus the new automated banking machine system and method achieves one or more of the above stated objectives, eliminates difficulties encountered in the use of prior devices and systems, solves problems and attains the desirable results described herein.

In the foregoing description certain terms have been used for brevity, clarity and understanding, however no unnecessary limitations are to be implied therefrom because such terms are used for descriptive purposes and are intended to be broadly construed. Moreover, the descriptions and illustrations herein are by way of examples and the invention is not limited to the exact details shown and described.

In the following claims any feature described as a means for performing a function shall be construed as encompassing any means known to those skilled in the art to be capable of performing the recited function, and shall not be limited to the features and structures shown herein or mere equivalents thereof. The description of the exemplary embodiment included in the Abstract included herewith shall not be deemed to limit the invention to features described therein.

Having described the features, discoveries and principles of the invention, the manner in which it is constructed and operated, and the advantages and useful results attained; the new and useful structures, devices, elements, arrangements, parts, combinations, systems, equipment, operations, methods and relationships are set forth in the appended claims.

We claim:

1. An apparatus including:
   an automated banking machine housing,
   an automated banking machine fascia,
      wherein the fascia includes a plurality of automated banking machine input and output device access openings,
      wherein the fascia is connected to the housing,
      wherein the fascia is movable in and out of the housing between a docked position and an extended position, wherein in the extended position the fascia is operative to tilt relative to the housing to a tilted position.

2. The apparatus according to claim 1 wherein the fascia is operative to move in a generally horizontal direction in and out of the housing.

3. The apparatus according to claim 2 wherein the fascia is horizontally slidable in and out of the housing.

4. The apparatus according to claim 2 wherein the housing includes at least one stop, wherein the at least one stop is operative to limit outward movement of the fascia relative to the housing.

5. The apparatus according to claim 4 wherein the fascia includes at least one member operative to engage a respective stop.

6. The apparatus according to claim 5 wherein each stop comprises a projection, wherein each member comprises a hook member, wherein each respective hook member is operative to catch on a respective projection.

7. The apparatus according to claim 6 wherein in the extended position the fascia is operative to tilt by pivoting on the projection.

8. The apparatus according to claim 2 wherein the fascia includes rollers, wherein the fascia is movable relative to the housing on the rollers.

9. The apparatus according to claim 8 wherein the fascia is operative to tilt relative to the housing only when in the extended position, wherein when the fascia is in the tilted position at least one roller is located out of the housing and at least one other roller is located in the housing.

10. The apparatus according to claim 1 wherein the housing has at least one latch associated therewith, wherein the at least one latch is operative to retain the fascia in the docked position.

11. The apparatus according to claim 10 wherein the fascia includes at least one slot, wherein each latch includes at least one spring-biased latch bolt, wherein each bolt is biased toward a respective slot, where each slot is operative to receive a bolt therein to cause retainment of the fascia in the docked position.

12. The apparatus according to claim 11 wherein each latch includes a pull handle connected to a lever, wherein each lever is in operative connection with at least one bolt, wherein each pull handle is operative to be pulled to cause movement of at least one bolt away from a respective slot.

13. The apparatus according to claim 12 wherein each slot is located in a rear portion of the fascia, wherein each pull handle is only accessible at the rear portion when the fascia is in the docked position.

14. The apparatus according to claim 1 wherein the fascia is connected to the housing via at least one link arrangement, wherein the at least one link arrangement limits the tilt of the fascia relative to the housing.

15. The apparatus according to claim 14 wherein each link arrangement has a first end and a second end, wherein the first end is connected to an upper portion of the fascia, wherein the second end is connected to an upper portion of the housing, wherein each link arrangement comprises articulating linkage.

16. The apparatus according to claim 15 wherein the linkage limits the tilt to a predetermined degree angle, wherein the linkage is adjustable, wherein the predetermined angle is adjustable.

17. The apparatus according to claim 1 and further comprising a cash dispensing automated banking machine, wherein the machine includes the housing and the fascia.

18. The apparatus according to claim 17 wherein the machine comprises an ATM, wherein the ATM includes a currency dispenser and currency notes, wherein the currency dispenser is operative to dispense the currency notes from the ATM, wherein the machine includes at least one input device and at least one output device, wherein the at least one input device and the at least one output device are accessible to a machine user through the access openings.

19. A method of operating the apparatus recited in claim 17, comprising:
(a) moving the fascia from the docked position to the extended position;
(b) subsequent to (a), tilting the fascia relative to the housing to a tilted position;
(c) subsequent to (b), tilting the fascia relative to the housing to a non tilted position;
(d) subsequent to (c), moving the fascia from the extended position to the docked position.

20. An apparatus including:
a cash dispensing automated banking machine,
  wherein the machine includes a currency dispenser and currency notes,
    wherein the currency dispenser is operative to dispense the currency notes from the machine,
  wherein the machine includes a housing,
  wherein the housing has at least one latch associated therewith,
    wherein each latch includes at least one latch bolt,
      wherein each latch bolt is movable between a locking position and a non locking position,
    wherein each latch includes a pull handle connected to a lever,
      wherein each lever is in operative connection with at least one latch bolt,
  wherein the machine includes a fascia connected to the housing,
    wherein the fascia includes a plurality of input and output device access openings,
    wherein the fascia includes rollers,
      wherein the fascia is horizontally movable via the rollers in and out of the housing between a docked position and an extended position,
      wherein in the extended position the fascia is operative to tilt relative to the housing to a tilted position,
    wherein the housing includes at least one projection,
      wherein the at least one projection is operative to limit outward movement of the fascia relative to the housing,
    wherein the fascia includes at least hook member operative to catch on a respective projection,
      wherein in the extended position the fascia is operative to tilt by pivoting on the projection,
    wherein the fascia is connected to the housing via at least one link arrangement,
      wherein the at least one link arrangement limits the tilt of the fascia relative to the housing,
      wherein each link arrangement has a first end and a second end,
      wherein the first end is connected to an upper portion of the fascia,
      wherein the second end is connected to an upper portion of the housing,
    wherein the fascia includes at least one bolt engaging member, wherein in the locking position a latch bolt is operative to engage a bolt engaging member to cause the fascia to be locked in the docked position, wherein a pull handle is operative to be actuated to move the latch bolt from the locking position to the non locking position enabling the fascia to move relative to the latch bolt toward the extended position.

21. An automated banking machine comprising:
a housing of the machine;
a cash dispenser in operative connection with the housing;
a fascia in operative connection with the housing; and
at least one roller, wherein the at least one roller is operative to support the fascia in movable supporting connection with the housing, and wherein the fascia is movable in supporting connection with the housing along a horizontal direction between a first position and a second position, wherein in the first position the fascia is constrained to move only along the horizontal direction relative to the housing and in the second position the fascia is enabled to pivot relating to the housing such that at least a portion of the fascia moves in a vertical direction.

22. The machine according to claim 21, wherein the housing includes an interior portion bounded by a lower wall and two side walls, wherein when the fascia is in the first position, an extending portion of the fascia extends into the interior portion of the housing.

23. The machine according to claim 22, wherein the at least one roller is in operative connection with the extending portion of the fascia, wherein when the fascia is in the first position the at least one roller is in supporting connection with the lower wall of the housing.

24. The machine according to claim 22, wherein the extending portion of the fascia includes two support walls, wherein when the fascia is in the first position the support walls extend within the interior area of the housing adjacent the side walls of the housing.

25. The machine according to claim 24, wherein each support wall is in fixed operative engagement with an inwardly directed flange portion, wherein at least one roller is in supporting connection with each support wall, wherein each flange portion includes at least one aperture, wherein at least one roller portion of the at least one roller extends through each at least one aperture, wherein when the fascia moves between the first position and the second position, the at least one roller portion is in movable supporting connection with the lower wall of the housing.

26. The machine according to claim 22, wherein one of the extending portion of the fascia and the housing is in fixed operative connection with at least one hook, wherein the other of the extending portion of the fascia and the housing is in fixed operative connection with at least one engaging projection, wherein in the second position, the at least one hook is in operative engagement with the at least one engaging projection, wherein the fascia pivots relative to the housing with the at least one hook in movable rotatable engagement with the at least one projection.

27. The machine according to claim 26, wherein in the first position of the fascia the at least one hook is not engaged with the at least one projection.

28. The machine according to claim 21, wherein the fascia includes a plurality of openings therethrough, wherein when the fascia is in the first position, the machine is enabled to deliver at least one sheet through at least one of the openings, wherein when the fascia is in the second position, the at least one opening is disposed relative to the housing such that the machine cannot deliver at least one sheet through the at least one opening.

29. A method comprising:
a) moving a fascia of a cash dispensing automated banking machine in a first horizontal direction from a first position to a second position while in supporting connection with a housing of the machine;
b) with the fascia in the second position, pivoting the fascia in a first rotational direction relative to and in supporting connection with the housing such that at least a portion of the fascia moves in a vertical direction.

30. The method according to claim 29, wherein, during at least a portion of (a) the fascia is supported with respect to the housing through at least one rotating roller.

31. The method according to claim 30, wherein one of the fascia and the housing is in operative fixed connection with at least one hook, and the other of the fascia and the housing is in operative fixed connection with at least one hook engaging projection, further comprising:
c) wherein prior to (b) operatively engaging the at least one hook and the at least one hook engaging projection; wherein in (b), pivoting the fascia includes rotating the fascia relative to the engaged at least one hook and at least one hook engaging projection.

32. The method according to claim 31, wherein in (a) prior to the fascia being in the second position, the at least one hook is disposed from the at least one hook engaging projection.

33. The method according to claim 29, further comprising:
c) subsequent to (b), servicing at least one device of the machine in supporting connection with at least one of the fascia and the housing;
d) subsequent to (c), pivoting the fascia in a second rotational direction relative to the housing wherein the second rotational direction is opposite the first rotational direction; and
e) moving the fascia in a second horizontal direction that is opposite the first horizontal direction, from the second position to the first position.

34. The method according to claim 33, further comprising:
f) subsequent to (e), responsive to operation of at least one processor in the machine, causing the cash dispenser to dispense at least one sheet through an opening in the fascia.

35. The method according to claim 33, wherein the fascia includes a top, a first side and a second side opposed to the first side, and wherein in (b) the fascia moves so as to increase space between the housing and the top, first side and second side of the fascia, and wherein in (c) servicing the at least one device includes accessing the at least one device through space between at least one of the first side and the second side of the fascia, and the housing.

* * * * *